US012412451B2

(12) United States Patent
Joao

(10) Patent No.: US 12,412,451 B2
(45) Date of Patent: Sep. 9, 2025

(54) SPORTS BETTING APPARATUS AND METHOD

(71) Applicant: Raymond Anthony Joao, Yonkers, NY (US)

(72) Inventor: Raymond Anthony Joao, Yonkers, NY (US)

( * ) Notice: Subject to any disclaimer, the term of this patent is extended or adjusted under 35 U.S.C. 154(b) by 0 days.

(21) Appl. No.: 16/785,713

(22) Filed: Feb. 10, 2020

(65) Prior Publication Data

US 2020/0294354 A1 Sep. 17, 2020

Related U.S. Application Data

(60) Provisional application No. 62/816,943, filed on Mar. 12, 2019.

(51) Int. Cl.
*G07F 17/32* (2006.01)

(52) U.S. Cl.
CPC ...... *G07F 17/3241* (2013.01); *G07F 17/3223* (2013.01); *G07F 17/3288* (2013.01)

(58) Field of Classification Search
CPC ............. G07F 17/3288; G07F 17/3223; G07F 17/3244; G07F 17/3241
See application file for complete search history.

(56) References Cited

U.S. PATENT DOCUMENTS

| | | |
|---|---|---|
| 4,339,798 A | 7/1982 | Hedges et al. |
| 4,592,546 A | 6/1986 | Fascenda et al. |
| 4,759,549 A | 7/1988 | Beckwith |
| 5,042,809 A | 8/1991 | Richardson |

(Continued)

FOREIGN PATENT DOCUMENTS

| | | |
|---|---|---|
| AU | 751533 | 9/1999 |
| CA | 2552062 A1 | 1/2007 |

(Continued)

OTHER PUBLICATIONS

PCT/US2018/043257—International Preliminary Report On Patentability.

(Continued)

*Primary Examiner* — Steve Rowland

(74) *Attorney, Agent, or Firm* — Raymond A. Joao, Esq.

(57) ABSTRACT

An apparatus, including a processor which provides an electronic forum capable of providing a video or audio broadcast of a sporting event and allowing users to communicate with one another, place a bet or bets on an outcome of, or on an event occurring during, the sporting event, and receive information regarding bets available, betting odds, changes in betting odds, or analytics information; a transmitter which transmits the electronic forum to a user communication device; and a receiver which receives information from the user communication device. The apparatus provides player performance tracking or team performance tracking information and betting odds or changes in betting odds, processes information for placing the bet, generates a bet confirmation message containing information regarding the bet amount and date and time of the bet and sporting event, and a link to the electronic forum, and transmits the bet confirmation message to the user communication device.

21 Claims, 28 Drawing Sheets

(56) References Cited

U.S. PATENT DOCUMENTS 5,221,838 A 6/1993 Gutman et al.
5,283,734 A 2/1994 Von Kohorn
5,397,133 A 3/1995 Penzias
5,524,272 A 6/1996 Podowski et al.
5,537,143 A 7/1996 Steingold et al.
5,575,474 A 11/1996 Rossides
5,600,368 A 2/1997 Matthews, III et al.
5,697,844 A 12/1997 Von Kohorn
5,779,549 A 7/1998 Walker et al.
5,871,398 A 2/1999 Schneier et al.
5,878,337 A 3/1999 Joao et al.
5,903,830 A 5/1999 Joao et al.
6,007,426 A 12/1999 Kelly et al.
6,047,270 A 4/2000 Joao et al.
6,104,815 A 8/2000 Alcorn et al.
6,113,493 A 9/2000 Walker et al.
6,142,876 A 11/2000 Cumbers
6,236,900 B1 5/2001 Geiger
6,277,026 B1 8/2001 Archer
6,287,199 B1 9/2001 McKeown et al.
6,288,753 B1 9/2001 Denicola et al.
6,304,855 B1 10/2001 Burke
6,425,131 B2 7/2002 Crandall et al.
6,443,841 B1 9/2002 Rossides
6,464,583 B1 10/2002 Kidron
6,508,709 B1 1/2003 Karmarkar
6,508,710 B1 1/2003 Paravia et al.
6,529,725 B1 3/2003 Joao et al.
6,601,048 B1 7/2003 Gavan et al.
6,607,439 B2 8/2003 Schneier et al.
6,628,939 B2 9/2003 Paulsen
6,662,194 B1 12/2003 Joao
6,774,926 B1 8/2004 Ellis
6,910,965 B2 6/2005 Downes
7,035,626 B1 4/2006 Luciano, Jr.
7,096,003 B2 8/2006 Joao et al.
7,172,508 B2 2/2007 Simon et al.
7,306,514 B2 12/2007 Amaitis et al.
7,435,179 B1 10/2008 Ford
7,490,086 B2 2/2009 Joao
7,749,078 B2 7/2010 Vlazny et al.
7,899,717 B2 3/2011 Joao
8,088,000 B2 1/2012 Ginsberg et al.
8,128,485 B2 3/2012 Vlazny et al.
8,162,756 B2 4/2012 Amaitis et al.
8,241,100 B2 8/2012 Katz et al.
8,342,946 B2 1/2013 Amaitis et al.
8,342,966 B2 1/2013 Storm et al.
8,380,177 B2 2/2013 Laracey
8,627,399 B2 1/2014 White et al.
8,690,657 B2 4/2014 D'Angelo
8,727,892 B1 5/2014 Chun
8,776,149 B1 7/2014 Koch et al.
8,956,231 B2 2/2015 Amaitis et al.
9,005,016 B2 4/2015 Amaitis et al.
9,152,943 B2 10/2015 Joao
9,159,184 B2 10/2015 Okada
9,235,841 B2 1/2016 Joao
9,245,270 B2 1/2016 Joao
9,349,246 B1 5/2016 Paradise et al.
9,430,909 B2 8/2016 Shore et al.
9,483,908 B2 11/2016 Shore et al.
9,489,793 B2 11/2016 Williams et al.
9,524,077 B1 12/2016 Pattan et al.
9,547,995 B1 1/2017 Murray
9,697,512 B2 7/2017 Pitroda et al.
9,706,241 B2 7/2017 Felt et al.
9,760,864 B2 9/2017 Joao
9,870,674 B2 1/2018 Hayon
9,911,124 B2 3/2018 Joao
9,965,920 B2 5/2018 Joao
10,043,341 B1 8/2018 Joao
10,078,839 B1 9/2018 Mullins et al.
10,096,000 B2 10/2018 Joao
10,147,266 B2 12/2018 Joao
10,157,385 B2 12/2018 Joao
10,185,918 B2 1/2019 Joao
10,255,755 B2 4/2019 Joao
10,354,622 B2 7/2019 Khinchuk
10,504,123 B2 12/2019 Joao
10,515,516 B1 12/2019 Eckman et al.
10,726,470 B1 7/2020 Traina et al.
10,741,018 B2 8/2020 Joao
10,885,746 B2 1/2021 Joac
10,990,928 B1 4/2021 Wong et al.
11,017,630 B2 5/2021 Williams et al.
11,069,195 B2 7/2021 Joao
11,087,596 B2 8/2021 Nelson et al.
11,398,133 B2 7/2022 Joao
2001/0003099 A1* 6/2001 Von Kohorn .......... H04H 20/38 463/40
2001/0031663 A1 10/2001 Johnson
2001/0036622 A1 11/2001 Richter et al.
2001/0036853 A1 11/2001 Thomas
2001/0037211 A1 11/2001 McNutt et al.
2001/0044751 A1 11/2001 Pugliese et al.
2001/0047291 A1 11/2001 Garahi et al.
2001/0049087 A1 12/2001 Hale
2001/0051920 A1 12/2001 Joao et al.
2002/0002075 A1 1/2002 Rowe
2002/0025797 A1 2/2002 Joao et al.
2002/0037767 A1 3/2002 Ebin
2002/0039921 A1 4/2002 Rowe et al.
2002/0054088 A1 5/2002 Tanskanen et al.
2002/0065890 A1 5/2002 Barron
2002/0068633 A1 6/2002 Schlaifer
2002/0069105 A1 6/2002 do Rosario Botelho et al.
2002/0077178 A1 6/2002 Oberberger et al.
2002/0082085 A1 6/2002 Osterer
2002/0098829 A1 7/2002 Tendler
2002/0100040 A1 7/2002 Bull
2002/0108125 A1 8/2002 Joao
2002/0147049 A1 10/2002 Carter, Sr.
2002/0155885 A1 10/2002 Shvili
2002/0169835 A1 11/2002 Paul, Jr. et al.
2002/0183105 A1 12/2002 Cannon et al.
2002/0196342 A1 12/2002 Walker et al.
2003/0060262 A1 3/2003 Yeend
2003/0088878 A1 5/2003 Rogers et al.
2003/0096651 A1 5/2003 Black
2003/0110215 A1 6/2003 Joao
2003/0157976 A1 8/2003 Simon et al.
2003/0175676 A1 9/2003 Theilmann et al.
2003/0224854 A1 12/2003 Joao
2004/0029627 A1 2/2004 Hannan et al.
2004/0128157 A1 7/2004 Aquilino et al.
2004/0178880 A1 9/2004 Meyer et al.
2004/0185830 A1 9/2004 Joao et al.
2005/0064926 A1 3/2005 Walker et al.
2005/0082750 A1 4/2005 Grauzer et al.
2005/0096124 A1 5/2005 Stronach
2005/0170814 A1 8/2005 Joao et al.
2005/0181870 A1 8/2005 Nguyen et al.
2005/0227757 A1* 10/2005 Simon .................... G07F 17/32 463/25
2006/0035707 A1 2/2006 Nguyen et al.
2006/0036482 A1 2/2006 Huang et al.
2006/0094506 A1* 5/2006 Tarter .................... G06Q 10/00 463/42
2006/0183547 A1 8/2006 Mcmonigle
2006/0206586 A1 9/2006 Ling et al.
2006/0259942 A1 11/2006 Toyama
2006/0277564 A1 12/2006 Jarman
2006/0287068 A1 12/2006 Walker et al.
2007/0004509 A1 1/2007 Banton
2007/0017974 A1 1/2007 Joao
2007/0043608 A1 2/2007 May et al.
2007/0054739 A1 3/2007 Amaitis et al.
2007/0060380 A1 3/2007 Mcmonigle et al.
2007/0072679 A1* 3/2007 Kerns .................... A63F 13/65 463/42
2007/0087834 A1 4/2007 Moser et al.
2007/0094705 A1 4/2007 Crowley et al.
2007/0143130 A1 6/2007 Hearn

(56) References Cited

U.S. PATENT DOCUMENTS

2007/0197247 A1 8/2007 Inselberg
2007/0232398 A1 10/2007 Aikin et al.
2007/0237330 A1 10/2007 Srivastava
2007/0276521 A1 11/2007 Harris et al.
2008/0004107 A1 1/2008 Nguyen et al.
2008/0010215 A1 1/2008 Rackley, III et al.
2008/0039192 A1 2/2008 Laut
2008/0064490 A1 3/2008 Ellis
2008/0102956 A1 5/2008 Burman et al.
2008/0120190 A1 5/2008 Joao et al.
2008/0140719 A1 6/2008 Chaney et al.
2008/0180250 A1 7/2008 Steil
2008/0214300 A1 9/2008 Williams et al.
2008/0220840 A1 9/2008 Katz et al.
2008/0274802 A1 11/2008 Joao
2008/0275820 A1 11/2008 Joao et al.
2009/0042631 A1 2/2009 Randhawa
2009/0061978 A1 3/2009 Ahlin
2009/0093292 A1 4/2009 Randhawa
2009/0098923 A1 4/2009 Randhawa
2009/0143128 A1 6/2009 Cautley et al.
2009/0181353 A1 7/2009 Dasgupta
2009/0292376 A1 11/2009 Kazem
2009/0293088 A1 11/2009 Mukerji
2009/0319379 A1 12/2009 Joao
2010/0021877 A1 1/2010 Butler
2010/0048302 A1 2/2010 Lutnick et al.
2010/0081116 A1 4/2010 Barasch et al.
2010/0105464 A1 4/2010 Storm et al.
2010/0145737 A1 6/2010 Joao
2010/0151930 A1 6/2010 Oram
2010/0160012 A1* 6/2010 Amaitis ................. G06Q 50/34 463/2
2010/0281152 A1 11/2010 Istavan et al.
2010/0306103 A1 12/2010 Hankins et al.
2011/0034252 A1 2/2011 Morrison et al.
2011/0035240 A1 2/2011 Joao
2011/0055862 A1 3/2011 Harp et al.
2011/0065490 A1 3/2011 Lutnick
2011/0098096 A1 4/2011 Odom et al.
2011/0123972 A1 5/2011 Friedman
2011/0128382 A1 6/2011 Pennington et al.
2011/0145865 A1 6/2011 Simpson
2011/0177863 A1 7/2011 Davidson et al.
2011/0223989 A1* 9/2011 Owen ..................... G07F 17/32 463/25
2011/0251892 A1 10/2011 Laracey
2011/0275432 A1 11/2011 Lutnick et al.
2011/0306399 A1 12/2011 Erickson
2012/0058813 A1* 3/2012 Amaitis .............. G07F 17/3269 463/25
2012/0094737 A1 4/2012 Barclay et al.
2012/0101952 A1 4/2012 Raleigh et al.
2012/0115554 A1 5/2012 Cairns et al.
2012/0166295 A1 6/2012 Loevenguth et al.
2012/0214575 A1* 8/2012 Amaitis .............. G07F 17/3293 463/25
2012/0215637 A1 8/2012 Hermann
2012/0236210 A1 9/2012 Matsubayashi
2012/0264099 A1 10/2012 Craft
2012/0264503 A1* 10/2012 Lisenbee ............... G07F 17/326 463/25
2012/0330787 A1 12/2012 Hanson et al.
2013/0031175 A1 1/2013 Patel et al.
2013/0079094 A1 3/2013 Odom et al.
2013/0097093 A1 4/2013 Kolber et al.
2013/0116032 A1 5/2013 Lutnick
2013/0122475 A1 5/2013 Schoenfeldt
2013/0132727 A1 5/2013 Petrovic
2013/0132908 A1 5/2013 Lee
2013/0203483 A1 8/2013 Joshi et al.
2013/0204781 A1 8/2013 Flitcroft et al.
2013/0204784 A1 8/2013 Ogden
2013/0225282 A1 8/2013 Williams et al.
2013/0244768 A1 9/2013 Oiwa
2013/0303268 A1 11/2013 Miller
2013/0316322 A1 11/2013 Roschelle et al.
2014/0081667 A1 3/2014 Joao
2014/0081855 A1 3/2014 Hankins et al.
2014/0148238 A1 5/2014 D'Angelo
2014/0157298 A1 6/2014 Murphy
2014/0165094 A1 6/2014 Hardy
2014/0231499 A1 8/2014 Simmons, Jr.
2014/0232863 A1 8/2014 Paliga et al.
2014/0237500 A1 8/2014 Joao
2014/0258198 A1 9/2014 Spivack et al.
2014/0267555 A1 9/2014 Shane
2014/0274311 A1 9/2014 Aronowitz
2014/0368601 A1 12/2014 Decharms
2015/0012417 A1 1/2015 Joao et al.
2015/0026012 A1 1/2015 Gura et al.
2015/0032572 A1 1/2015 Spano et al.
2015/0038235 A1 2/2015 Kamekawa
2015/0087371 A1 3/2015 Hill
2015/0088744 A1 3/2015 Raduchel
2015/0157947 A1 6/2015 Amaitis et al.
2015/0170112 A1 6/2015 Decastro
2015/0170309 A1 6/2015 Diamond
2015/0170457 A1 6/2015 Veverka
2015/0228148 A1 8/2015 Barnes
2015/0249813 A1 9/2015 Cole et al.
2015/0287285 A1 10/2015 Shore et al.
2015/0304435 A1 10/2015 Bravo et al.
2015/0310434 A1 10/2015 Cheung
2015/0324764 A1 11/2015 Van Rooyen et al.
2015/0332256 A1 11/2015 Minor
2015/0379815 A1 12/2015 Hayon
2015/0379816 A1* 12/2015 Hayon .................... G07F 17/32 463/25
2016/0028736 A1 1/2016 Gehring
2016/0042651 A1 2/2016 Joac
2016/0104347 A1 4/2016 Yang
2016/0140802 A1 5/2016 Joao
2016/0150365 A1 5/2016 Brown et al.
2016/0189158 A1 6/2016 Eramian et al.
2016/0225230 A1 8/2016 Hill
2016/0247359 A1* 8/2016 De Knijff ........... G07F 17/3267
2016/0267747 A1 9/2016 Dengler et al.
2016/0300431 A1* 10/2016 Ortiz .................. G07F 17/3288
2016/0307395 A1 10/2016 Frenkel et al.
2017/0026683 A1 1/2017 Joao
2017/0039523 A1 2/2017 Rotimi
2017/0041296 A1 2/2017 Ford et al.
2017/0046905 A1 2/2017 Ramos et al.
2017/0076306 A1 3/2017 Snider et al.
2017/0084118 A1 3/2017 Robinson et al.
2017/0116870 A1 4/2017 Brem et al.
2017/0171216 A1 6/2017 Chhabra et al.
2017/0232340 A1 8/2017 Lockton
2017/0243438 A1* 8/2017 Merati ................ G07F 17/3288
2017/0287593 A1 10/2017 Ovalle
2017/0294070 A1 10/2017 Groetken
2017/0358173 A1 12/2017 McCafferty
2018/0005492 A1 1/2018 Hall
2018/0096752 A1 4/2018 Ovalle
2018/0102018 A1 4/2018 Cage et al.
2018/0144580 A1 5/2018 Frenkel et al.
2018/0158067 A1 6/2018 Joao
2018/0190077 A1* 7/2018 Hall .................... G07F 17/3288
2018/0190136 A1 7/2018 Joao
2018/0232828 A1 8/2018 Joao
2018/0293834 A1 10/2018 Cage et al.
2018/0316939 A1* 11/2018 Todd .................. H04N 21/6587
2018/0330385 A1 11/2018 Johnson et al.
2018/0375845 A1 12/2018 Burns et al.
2019/0020696 A1 1/2019 Winawer et al.
2019/0035208 A1 1/2019 Simons et al.
2019/0035209 A1 1/2019 Simons et al.
2019/0046863 A1 2/2019 Eurlings et al.
2019/0051103 A1 2/2019 Russ et al.
2019/0051116 A1 2/2019 Joao
2019/0051117 A1* 2/2019 Acres .................. G07F 17/3206
2019/0096191 A1 3/2019 Stuehling et al.

(56) References Cited

U.S. PATENT DOCUMENTS

| | | | | |
|---|---|---|---|---|
| 2019/0102726 | A1 | 4/2019 | Ushiki et al. | |
| 2019/0122500 | A1 | 4/2019 | Joao | |
| 2019/0130698 | A1 | 5/2019 | Simons | |
| 2019/0130701 | A1 | 5/2019 | Simons | |
| 2019/0164081 | A1 | 5/2019 | Deluca et al. | |
| 2019/0172310 | A1 | 6/2019 | Joao | |
| 2019/0180558 | A1* | 6/2019 | Merati | G06Q 20/3678 |
| 2019/0208251 | A1 | 7/2019 | Joao | |
| 2019/0272504 | A1 | 9/2019 | Pande | |
| 2019/0281066 | A1 | 9/2019 | Simons | |
| 2019/0281359 | A1 | 9/2019 | Johnson et al. | |
| 2019/0304253 | A1 | 10/2019 | Dabrowski | |
| 2019/0304259 | A1 | 10/2019 | Joao | |
| 2019/0362601 | A1* | 11/2019 | Kline | G07F 17/3223 |
| 2019/0371129 | A1 | 12/2019 | Hall | |
| 2019/0392684 | A1* | 12/2019 | McDonald | G06N 3/08 |
| 2020/0027315 | A1 | 1/2020 | Cotton | |
| 2020/0043296 | A1 | 2/2020 | Joao | |
| 2020/0051366 | A1 | 2/2020 | Crist et al. | |
| 2020/0051397 | A1 | 2/2020 | Jones | |
| 2020/0126363 | A1 | 4/2020 | Trepp et al. | |
| 2020/0143329 | A1 | 5/2020 | Gamaliel | |
| 2020/0175818 | A1 | 6/2020 | Joao | |
| 2020/0176095 | A1 | 6/2020 | Ansari et al. | |
| 2020/0213329 | A1 | 7/2020 | Simons | |
| 2020/0234544 | A1 | 7/2020 | Joao | |
| 2020/0242561 | A1 | 7/2020 | Kulkarni et al. | |
| 2020/0250918 | A1 | 8/2020 | Joao | |
| 2020/0294354 | A1 | 9/2020 | Joao | |
| 2020/0302745 | A1* | 9/2020 | Merati | G07F 17/3244 |
| 2020/0312089 | A1 | 10/2020 | Joao | |
| 2020/0357246 | A1 | 11/2020 | Nelson et al. | |
| 2020/0372763 | A1 | 11/2020 | Greiner, Jr. et al. | |
| 2021/0004807 | A1 | 1/2021 | Joao | |
| 2021/0019982 | A1* | 1/2021 | Todd | H04N 21/44 |
| 2021/0019987 | A1 | 1/2021 | Cohen | |
| 2021/0049865 | A1 | 2/2021 | Burns et al. | |
| 2021/0065516 | A1 | 3/2021 | Warren | |
| 2021/0090406 | A1 | 3/2021 | Joao | |
| 2021/0118265 | A1 | 4/2021 | Joao | |
| 2021/0150447 | A1 | 5/2021 | Badra | |
| 2021/0217126 | A1 | 7/2021 | Hayon | |
| 2021/0256478 | A1 | 8/2021 | Hood | |
| 2021/0264735 | A1 | 8/2021 | Joao | |
| 2021/0383489 | A1 | 12/2021 | Hutchinson | |
| 2022/0028017 | A1 | 1/2022 | Joao | |
| 2022/0343451 | A1 | 10/2022 | Fowler et al. | |

FOREIGN PATENT DOCUMENTS

| | | | |
|---|---|---|---|
| CN | 101268639 | A | 9/2008 |
| GB | 0113169-DO | | 7/2001 |
| GB | 2458981 | A | 10/2009 |
| JP | 2005018448 | A | 1/2005 |
| KR | 20020063080 | A | 8/2002 |
| KR | 100529221 | B1 | 11/2005 |
| WO | WO 01/55941 | A2 | 8/2001 |
| WO | WO 2004/015544 | A2 | 2/2004 |
| WO | WO-2007010055 | A1 | 1/2007 |
| WO | WO-2011024030 | A1 | 3/2011 |
| WO | WO-2013166456 | A2 | 11/2013 |
| WO | WO-2014118777 | A1 | 8/2014 |
| WO | WO-2017156054 | A1 | 9/2017 |
| WO | WO-2019244129 | A2 | 12/2019 |

OTHER PUBLICATIONS

PCT/US 18/43257—Written Opinion of the International Searching Authority.
PCT/US30/25122, Feb. 19, 2004, Hannan, et al.
U.S. Appl. No. 10/392,138, Hannan, et al.
U.S. Appl. No. 60/443,360, Hannan, et al.
U.S. Appl. No. 60/402,814, Hannan, et al.
PCT/US03/25122, Feb. 19, 2004, Hannan, et al.
Office Action, U.S. Appl. No. 16/939,030, mailed Jun. 29, 2021.
Office Action, U.S. Appl. No. 16/853,188, mailed Apr. 30, 2021.
Office Action, U.S. Appl. No. 16/219,984, mailed Feb. 12, 2020.
Office Action, U.S. Appl. No. 16/039,491, mailed Jun. 7, 2019.
Office Action, U.S. Appl. No. 16/596,842, mailed Dec. 15, 2020.
Office Action, U.S. Appl. No. 16/289,681, mailed Jul. 19, 2021.
Office Action, U.S. Appl. No. 16/840,697, mailed Jun. 23, 2021.
Office Action, U.S. Appl. No. 16/785,713, mailed Apr. 16, 2021.
Office Action, U.S. Appl. No. 16/901,197, mailed Aug. 9, 2021.
U.S. Appl. No. 61/850,602.
Office Action, mailed May 18, 2020, U.S. Appl. No. 16/294,272.
Office Action, mailed Mar. 16, 2020, U.S. Appl. No. 16/294,272.
Office Action, mailed Dec. 10, 2018, U.S. Appl. No. 15/287,436.
Office Action, mailed Jun. 29, 2018, U.S. Appl. No. 15/287,436.
Office Action, mailed Mar. 15, 2018, U.S. Appl. No. 15/287,436.
Office Action, mailed Sep. 26, 2017, U.S. Appl. No. 15/287,436.
Office Action, mailed Jul. 7, 2016, U.S. Appl. No. 14/161,726.
Office Action, mailed Feb. 2, 2016, U.S. Appl. No. 14/161,726.
Office Action, mailed Oct. 14, 2015, U.S. Appl. No. 14/161,726.
Playstation, "How to report in-game behaviour or user created content", [online], published May 15, 2017 [retrieved on Sep. 14, 2018]. Retrieved from the Internet <URL:.
Playstation (Continued) https://www.playstation.com/en-gb/get-help/helplibrary/my-account/parental-controls/how-to-report-in-game-behaviour-or-user-created-content/.
Playstation (Continued) >entire document, especially p. 1.
International Search Report for PCT/US 18/43257.
Office Action, mailed Jul. 19, 2021, U.S. Appl. No. 16/289,681.
Office Action, mailed Aug. 19, 2021, U.S. Appl. No. 16/510,878.
Office Action, mailed Jun. 23, 2021, U.S. Appl. No. 16/840,697.
Office Action, mailed Apr. 30, 2021, U.S. Appl. No. 16/853,188.
Office Action, mailed Aug. 9, 2021, U.S. Appl. No. 16/901,197.
Office Action, mailed Jun. 29, 2021, U.S. Appl. No. 16/939,030.
Office Action, mailed Oct. 6, 2021, U.S. Appl. No. 17/035,907.
Hannan, et al., U.S. Appl. No. 10/392,138, Filed Mar. 19, 2003, Entire Document.
Hannan, et al., U.S. Appl. No. 60/443,360, filed Jan. 29, 2003, Entire Document.
Hannan, et al. U.S. Appl. No. 60/402,814, filed Aug. 12, 2002, Entire Document.
Hannan, et al., PCT/US03/25122, Feb. 19, 2004, Published (International Publication Date) Feb. 19, 2004, Entire Document.
U.S. Appl. No. 61/958,389.
Office Action, mailed Feb. 7, 2017, U.S. Appl. No. 14/308,285.
Office Action, mailed Jun. 19, 2017, 2017, U.S. Appl. No. 14/308,285.
Office Action, mailed Sep. 6, 2017, U.S. Appl. No. 14/308,285.
Office Action, mailed Nov. 28, 2017, 2017, U.S. Appl. No. 14/308,285.
Office Action, mailed May 18, 2015, U.S. Appl. No. 14/161,726.
Office Action, mailed Feb. 12, 2020, U.S. Appl. No. 16/219,984.
Office Action, mailed Dec. 15, 2020, U.S. Appl. No. 16/596,842.
U.S. Appl. No. 62/035,387.
Office Action, mailed Nov. 15, 2019, U.S. Appl. No. 15/905,858.
Office Action, mailed Jul. 29, 2019, U.S. Appl. No. 15/905,858.
Office Action, mailed Nov. 5, 2017, U.S. Appl. No. 14/714,365.
Office Action, mailed May 15, 2017, U.S. Appl. No. 14/714,365.
Office Action, mailed Jun. 7, 2019, U.S. Appl. No. 16/039,491.
Office Action, mailed Nov. 2, 2021, U.S. Appl. No. 16/853,188.
Office Action, mailed Dec. 22, 2021, U.S. Appl. No. 16/840,697.
Office Action, mailed Mar. 9, 2022, U.S. Appl. No. 16/903,477.
Office Action, mailed Feb. 7, 2022, U.S. Appl. No. 16/901,197.
Office Action, mailed Mar. 10, 2022, U.S. Appl. No. 17/117,539.
Office Action, mailed Mar. 10, 2022, U.S. Appl. No. 17/035,907.
Office Action, mailed Mar. 1, 2022, U.S. Appl. No. 16/853,188.
Office Action, mailed May 5, 2022, U.S. Appl. No. 16/901,197.
Office Action, mailed Mar. 1, 2022, U.S. Appl. No. 17/117,539.
Office Action, mailed Sep. 28, 2022, U.S. Appl. No. 16/903,477.
Jane Ann Morrison, Tracking slot players becomes state-of-the-art system, Reno Gazette-Journal, Mar. 11, 1988 (and at 8B).
Ken Miller, Record slot jackpots luring high rollers, Reno Gazette-Journal, Mar. 9, 1987 (and at 1A and 6A).
Gary Thompson, "Harrah's launches customer-loyalty program," Sept. 4, 1997.

(56) References Cited

OTHER PUBLICATIONS

Gary Thompson (Cont.) https://lasvegassun.com/news/1997/sep/04/harrahs-launches-customer-loyalty-program/) Retrieved May 23, 2022.
Haidong Liu and Shaoping Zhao, "Harrah's E-Business" (The First International Conference on Electric Business, Dec. 19-21, 2001).
Harry Newton, Newton's Telecom Dictionary (11 th Edition, 1996).
Keith D. Foote, "A Brief History of Database Management," Oct. 25, 2021 (https://www.dataversity.net/brief-history-database-management/).
"E.212: The International Identification Plan for Public Networks and Subscriptions," Nov. 13, 1998.
David G. Schwartz, Roll the Bones The History of Gambling (2006).
Petition for Inter Partes Review of U.S. Pat. No. 10,255,755.
Petition for Inter Partes Review of U.S. Pat. No. 10,043,341.
Petition for Inter Partes Review of U.S. Pat. No. 9,965,920.
Petition for Inter Partes Review of U.S. Pat. No. 10,147,266.
Office Action, mailed Jul. 19, 2022, U.S. Appl. No. 16/840,697.
Office Action, mailed Aug. 24, 2022, U.S. Appl. No. 17/117,539.
Inter Partes Review Case No. IPR2023-00092 U.S. Pat. No. 9,965,920, Declaration of Garry Kitchen.
Inter Partes Review Case No. IPR2023-00093 U.S. Pat. No. 10,043,341, Declaration of Garry Kitchen.
Inter Partes Review Case No. IPR2023-00094 U.S. Pat. No. 10,147,266, Declaration of Garry Kitchen.
Inter Partes Review Case No. IPR2023-00095 U.S. Pat. No. 10,255,755, Declaration of Garry Kitchen.
Order, *Beteiro, LLC* V. *Betmgm, LLC*, United States District Court District of New Jersey, No. 1:21-cv-20156.
Aarthi Ravikumar, "History of GPS satellites and commercial GPS tracking," Jun. 23, 2020.
"25 years since the world's first text message," Dec. 4, 2017.
Alexa Lemzy, "When Was Texting Invented: The History of Texting," May 3, 2022.
Microsoft Computer Dictionary, 5 th Edition.
Stephen A. Zorn, "The Federal Income Tax Treatment of Gambling: Fairness or Obsolete Moralism?" The Tax Lawyer, vol. 49, No. 1, 1995, pp. 1-54.
"Fact Sheets: Taxes—History of the U.S. Tax System," (https://web.archive.org/web/20101204034946/http://www.treasury.gov/education/fact-sheets/taxes/ustax.shtml); (2010).
"Transmitter vs. Receiver—difference between transmitter and receiver types," RF Wireless World.
*Transmitter* vs. *Receiver* (Cont.) (https://www.rfwireless-world.com/Terminology/difference-between-transmitter-and-receiver-types.html).
Marsha Walton, "High-flying answer to cell phone coverage gaps?" Feb. 22, 2002.
Office Action, mailed Feb. 27, 2023, U.S. Appl. No. 17/959,097.
Office Action, mailed Apr. 24, 2023, U.S. Appl. No. 17/991,850.
IPR Institution Decision—IPR2023-00093 U.S. Pat. No. 10,043,341 B1.
IPR Institution Decision—IPR2023-00094 U.S. Pat. No. 10,147,266 B2.
IPR Institution Decision—IPR2023-00095 U.S. Pat. No. 10,255,755 B2.
IPR Institution Decision—IPR2023-00092 U.S. Pat. No. 9,965,920 B2.
"4 Ways Sports Business Intelligence is Changing the Game," by Sisense Team. Published Sep. 6, 2017.
"4 Ways . . . " (Cont.) Source: https://www.sisense.com/blog/4-ways-analytics-changing-professional-sports/ (Year: 2017).
"An analysis of difference expected goals models," Published Nov. 10, 2017. Source: https://www.pinnacle.com/en/betting-articles/soccer/expected-goals-model-analysis/.
"An analysis . . . " (Cont.) Source (cont.): /mep2n9vmg5ctw99d (Year: 2017).
"How to use standard deviation for betting," by Dominic Cortis, Jan. 22, 2015.
"How to use . . . " (Cont.) Source: https://www.pinnacle.com/en/betting-articles/betting-strategy/how-to-use-standard-deviation-for-betting/p8724ge57fbzwd3f (Year: 2015).
"Raheem Sterling Proves That Everything You Know About Goal-Scoring Is Wrong," by Bobby Gardiner, published Jan. 12, 2018.
"Raheem Sterling . . . " (Cont.) Source: https://www.theringer.com/2018/1/12/16879916/soccer-raheem-sterling-manchester-city-goal-scoring-expected-finishing-skill (Year: 2018).
"STATS Launches AUTOSTSATS . . . " published Mar. 4, 2019. Source: https://www.statsperform.com/press/stats-launches-autostats-the-first-patented-ai-powered-technology-to-capture-.
"STATS . . . " Source (Cont.) /sports-tracking-data-via-broadcast-video/ (Year: 2019).
Office Action, mailed Jan. 23, 2024, U.S. Appl. No. 17/991,850.
Office Action, mailed Oct. 20, 2023, U.S. Appl. No. 17/991,850.
Office Action, mailed Oct. 10, 2023, U.S. Appl. No. 16/785,713.
Office Action, mailed Nov. 20, 2023, U.S. Appl. No. 17/959,097.
Office Action, mailed Aug. 30, 2023, U.S. Appl. No. 16/596,842.
Office Action, mailed Aug. 3, 2023, U.S. Appl. No. 17/035,907.
Office Action, mailed Jul. 27, 2023, U.S. Appl. No. 17/959,097.
U.S. Appl. No. 62/935,959, Badra.
Office Action, mailed Dec. 18, 2023, U.S. Appl. No. 17/035,907.
CeeDee Lamb,Sep. 3, 2017, 247Sports.com, p. 1,at https://web.archive.org/web/20170903135339/https://247sports.com/player/ceedee-lamb-77892/, (last visited Dec. 15, 2023).(Year:2017).
Office Action, mailed May 21, 2024, U.S. Appl. No. 17/959,097.
Office Action, mailed Sep. 10, 2024, U.S. Appl. No. 16/289,681.
Office Action, mailed Sep. 17, 2024, U.S. Appl. No. 16/289,681.
Office Action, mailed Sep. 9, 2024, U.S. Appl. No. 16/596,842.
U.S. Appl. No. 60/267,010.
Office Action, mailed Jul. 10, 2006, U.S. Appl. No. 10/067,655.
Office Action, mailed Apr. 3, 2007, U.S. Appl. No. 10/067,655.

* cited by examiner

160

SPORTS BETTING APPARATUS AND METHOD

RELATED APPLICATIONS

This application claims the benefit of the priority of U.S. Provisional Patent Application Ser. No. 62/816,943, filed Mar. 12, 2019, and entitled "SPORTS BETTING APPARATUS AND METHOD", the subject matter and teachings of which are hereby incorporated by reference herein in their entirety.

FIELD OF THE INVENTION

The present invention pertains to a sports betting apparatus and methods and, in particular, to a sports betting apparatus and methods which provide users with the ability to place one or more sports bets on one or games, matches, competitions, or events, from any location and using any appropriate device while remote from the venue of the respective game, match, competition, or event, or while at the venue of the respective game, match, competition, or event, provides users with the ability to view or watch a respective game, match, competition, or event, in an electronic forum, chat room, or via a website, with others or while alone, provides users with the ability to interact with others while watching or viewing the respective game, match, competition, or event, provides users with the ability to obtain analytics data and/or information regarding one or more sports bets on one or games, matches, competitions, or events, and/or provides users with the ability to report, or receive, information regarding instances of match fixing, game-fixing, or cheating, relating to games, matches, competitions, or events.

BACKGROUND OF THE INVENTION

Sports betting and gambling on sporting events, games, matches, and other competitions, is very popular throughout the world and, no doubt, represents a huge global market. It has been estimated that the global sports gambling market could be worth up to $3 Trillion, with this estimate including legal and illegal sports betting or gambling activities.

Sports betting, while legal in some jurisdictions, is illegal in a number of other jurisdictions. Those who engage in sports betting also have obstacles to overcome in finding a level playing field on which to engage in sports betting. Bet facilitators, book makers, and other individuals, may have access to analytics data and/or information which provides them with advantages over those individuals or entities who or which do not have access to the same.

Bets, and especially bets on events which occur during a game, match, competition, or event, must be made within short windows of time, thereby precluding many individuals from participating in such bets. Further, with the high prevalence of game fixing, match fixing, or cheating, which has been known to occur in certain sports internationally, some individuals can be cheated of their money without recourse.

In short, it is submitted that the various sports betting products, services, practices, and technologies currently in use have failed to provide the necessary level, and fair, playing field for all those individuals who desire to engage in, and/or to participate in, sports betting and/or sports betting activities.

SUMMARY OF THE INVENTION

The present invention pertains to an apparatus and methods for providing and/or for facilitating sports betting or wagering, and/or other gambling or gaming, activities, on, for, and relating to any types or kinds of sporting or athletic games, matches, events, contests, competitions, or tournaments, on, for, and relating to, any players or participants in or of the same, and/or on, for, and relating to, any plays, events, occurrences, or happenings (hereinafter referred to as "game events", "match events" or "micro-events"), before, during, or after, the same, (hereinafter also referred to as "sports betting") which overcomes the shortfalls of the prior art.

The present invention also pertains to an apparatus and methods for providing and/or for facilitating betting, gambling, or gaming, activities on and/or for fantasy sports and e-sports competitions and activities. The present invention also pertains to an apparatus and methods for providing and/or facilitating betting, gambling, or gaming, activities on and/or for any non-sports-related or non-athletic-related activity or event for which a bet or a wager can be placed between individuals, parties, or entities, who or which utilize the present invention. In this regard, while the present invention can be utilized in a preferred embodiment for sports betting, it can also be utilized for any other betting, gambling, or gaming, activity which can the subject of a bet or wager between individuals, parties, or entities.

The present invention provides a platform and a network infrastructure by which sports betting of any nature, type, or kind, can be engaged in by any individuals, parties, or entities. The present invention also provides a system whereby, sports governing bodies, such as the International Olympic Committee (hereinafter the "IOC"), national Olympic committees ("NOCs"), international sports federations ("IFs"), regional sports federations and/or confederations, national sports federations ("NFs"), sports conferences, sports leagues at any level (such as for example, professional, amateur, college or university, semi-professional, high school, grade school, and/or local clubs or organizations), teams in any of the foregoing leagues or clubs, and/or players in any of the foregoing leagues or clubs, governmental regulatory bodies, such as national, state, and/or local, governmental regulatory bodies, gamming or gambling facilities, such as venues where events take place, casinos or betting halls, on-line casinos or on-line betting halls, financial institutions, escrow agents, content providers, television broadcasters, streaming video and/or streaming audio providers, and social networks and social network providers, providers of analytics data and/or information, sports analytics information, news information, and/or any other information, along with the individual parties or entities who engage in sports betting or sports betting activities, can all come together to utilize the apparatus and methods of the present invention.

The present invention also pertains to, and provides, an apparatus and methods which can allow individuals, parties, and entities, who or which place bets or wagers on any of the herein-described games, matches, activities, or events, whether sports-related or non-sports-related, to watch and/or listen to a video and/or audio transmission of the same. Bets or wagers can also be placed during the respective game, match, activity, or event. These bets or wagers can be placed using the same communication device which is being used to watch and/or listen to the respective game, match, activity, or event.

The present invention also pertains to, and provides, an apparatus and methods which can allow individuals, parties, and entities, who or which place bets or wagers on any of the herein-described games, matches, activities, or events, whether sports-related or non-sports-related, to watch and/or listen to a video and/or audio transmission of the same in a group environment, a social networking environment, or in a chat room environment, and to place bets or wagers during the respective game, match, activity, or event, as well as to place bets or wagers on game events, match event, or micro-events, during the respective game, match, activity, or event.

The present invention also pertains to, and provides, an apparatus and methods which can allow individuals, parties, and/or entities, to watch and/or listen to games, matches, activities, or events, in and/or using 360 degree video, virtual reality ("VR"), and/or augmented reality ("AR"), technologies while allowing the individuals, parties, and/or entities to also engage in placing bets or wagers via the respective 360 degree video, VR, or AR, user interface(s).

The present invention also pertains to, and provides, an apparatus and methods which can allow individuals, parties, and/or entities, to engage in social networking activities while watching and/or listening to a game, match, activity, or event, and in discussing or engaging in sports betting and/or sports betting activities. Individuals, parties, and/or entities, can also place bets or wagers during any social networking activities or discussions.

The present invention also pertains to, and provides, an apparatus and methods which can allow individuals, parties, and/or entities, to engage in a chat room discussion prior to, after, or while watching and/or listening to, a sporting event or any other game, match, activity, or event, and can allow users to place bets on the same. The present invention can also be utilized to allow users to place private bets with one another and/or in pools of individuals, parties, and/or entities.

The present invention also pertains to, and provides, an apparatus and methods which can be utilized to provide users with sports analytics data and/or information, analytics information, news information, and/or statistical, probabilistic, or other, information, for use in engaging in sports betting activities.

The present invention also pertains to, and provides, an apparatus and methods which can allow users to engage in selecting or predicting next plays or other activities and/or game events, match events, or micro-events, during a sporting event or any game, match, activity, or event. Users can also place bets game events, match events, or micro-events, and/or users can engage in competitions to predict game events, match events, or micro-events, for betting or wagering purposes, for recreational purposes, such as to engage in competitions with other users, and/or for training purposes such as when an individual may desire to train to be a team coach or manager.

The apparatus of the present invention includes a central processing computer or server computer, which can be a single computer or computer system or can include any number of computers and/or computer systems. The central processing computer is specially programmed and/or specially configured to provide a sports betting, gambling, or gaming, platform which can provide and/or perform all the functionalities described herein as being performed by present invention. The central processing computer is also specially programmed and/or specially configured to perform any and all of the various processing routines and/or functionalities described herein as being performed by the present invention.

The central processing computer can be associated with, and/or can be used by, any sports betting provider or facilitator, a gaming provider, a gaming facility, or a gaming venue, and/or any number of sports betting providers or facilitators, gaming providers, gaming facilities, or gaming venues. The central processing computer can also be associated with, and/or can be used by, the International Olympic Committee, national Olympic committees, international sports federations, regional sports federations and/or confederations, national sports federations, sports conferences, sports leagues, or sports teams or clubs, in providing sports betting. The central processing computer can also have a website or websites associated therewith as an interface for any of the herein-described users of the present invention.

The apparatus also includes any number of user computers or user communication devices which can be utilized by any individual, party, or entity, who or which uses the apparatus of the present invention in order to communicate with the central processing computer and/or with any of the other computers and communication devices described herein as being used in or with the present invention. The user communication device or devices can communicate with, and/or can be linked with, the central processing computer and/or any other computers or communication devices described herein, via a wired communication network, a wireless communication network, or any combination of wired and/or wireless communication networks.

The user communication device can be utilized by any of the herein-described users of the present invention in order to interface with, and/or interact with, the central processing computer and/or with any of the other computers and communication devices described herein. The user communication device can be a computer, a computer terminal, a terminal device connected to, or associated with, the central processing computer, a kiosk, a personal computer, a home computer, a personal communication device, a telephone, an interactive television, a smart phone, a cellular telephone, a wireless telephone, a videophone, a video telephone, a personal digital assistant, a watch, a smart watch, a 360 degree video headset or interface, a VR (virtual reality) headset or interface, an AR (augmented reality) headset or interface, a wearable communication device, glasses equipped with communications equipment, a beeper or a pager, or any other communication device or equipment. The user communication device can also be a server computer, a network computer, or any other computer capable of being utilized in a network.

The user communication device can also include, and/or can be utilized in conjunction with, a network computer, which is defined to be any computer which can be utilized to communicate with any other computer or communication device in any communication network, and which can also be utilized to send and receive text messages and/or e-mail messages to, for, or on behalf of, a user. The network computer can transmit the text messages or e-mail messages to any of the herein-described user communication devices and/or can provide a text message or an e-mail message to the user communication device when so requested by the user. The respective network computer can also automatically transmit or "push" a text message or an e-mail message or multiple text messages or e-mail messages to a user communication device as soon as same are received and/or in real-time.

The respective network computer can also serve as a conventional text message server or as an e-mail server which can allow a user to request or "pull" a text message or an e-mail message or text messages or e-mail messages to a user communication device when requested by the user or other authorized individual.

The apparatus also includes a sport governing body computer or computer system or any number be sport governing body computers which can be used by, and/or which can be associated with, any sports governing body, such as, for example, but not limited to, the International Olympic Committee, a national Olympic committee, an international sports federation, a regional sports federation or confederation, a national sports federation, any sports conference, any sports league (such as, for example, the U.S. Professional leagues such as the National Football League (NFL), the National Basketball Association (NBA), Major League Baseball (MLB), the National Hockey League (NHL), Major League Soccer (MLS), or any other U.S. sports leagues or conferences, or, for example, in Europe, the Premier League, La Liga, or the UEFA Champions League, in soccer (also referred to as "football" outside the U.S.), and/or any sports team or club, and/or any sports governing body, league, conference, team, or club, of or on any level.

The respective sport governing body can utilize its respective sport governing body computer to utilize the present invention for any purpose such as, for example, for monitoring and/or for providing oversight and/or for regulating sports betting activities regarding games, matches, events, or activities, in its sport, league, or conference and/or under its jurisdiction. The sport governing body computer can be utilized to allow the sport governing body, or an employee or agent of same, to communicate with and/or to interact with the central processing computer, the user communication devices, and/or with any of the other computers and communication devices described herein as being used in or with the apparatus. The sport governing body computer can communicate with, and/or can be linked with, the central processing computer and/or any other computers or communication devices described herein, via a wired communication network, a wireless communication network, or any combination of wired and/or wireless communication networks. Each sport governing body computer can include any number of computers, server computers, or computer systems, and can also have a website or websites associated therewith.

The apparatus also includes a governmental entity computer or computer system which can be used by, and/or which can be associated with, a governmental entity which can, for example, be a national government, federal government, regional government, state government, provincial government, local government, municipal government, or any other governmental entity, of any country or political or geographical subdivision. The governmental entity computer can also be used by, and/or can be associated with, a gaming commission, gaming administrator, or other entity, which can regulate, oversee, and/or administer, sports betting activities of any kind or type.

The governmental entity computer can be utilized to allow the governmental entity, or an employee or agent of same, to communicate with and/or interact with the central processing computer, the user communication devices, the sport governing body computer, and/or with any of the other computers and communication devices described herein as being used in or with the apparatus. The governmental entity computer can communicate with, and/or be linked with, the central processing computer and/or with any other computer or communication devices described herein, via a wired communication network, a wireless communication network, or any combination of wired and/or wireless communication networks.

The governmental entity computer can be used by its respective governmental entity for any purpose such as, for example, for monitoring and/or for providing oversight and/or for regulating sports betting activities regarding games, matches, events, or activities, within or under its jurisdiction.

The governmental entity computer can be utilized by any of the herein-described governmental entities in order to interface with, and/or to interact with, the central processing computer and/or any other computers and communication devices described herein as being used with the apparatus. Each governmental entity computer can include any number of computers, server computers, or computer systems, and can also have a website or websites associated therewith.

The apparatus also includes a gaming facility or venue computer or computer system which can be used by, and/or which can be associated with, a gaming facility or venue such as, for example, a casino, a race track, or a betting establishment, or a stadium, an arena, a gambling hall, a gaming outlet, a boat, a ship, a cruise ship, a commercial boat, a passenger boat, a ferry, a marine vehicle, a marine vessel, an aircraft, an airplane, a jet, a passenger aircraft, a shuttle aircraft, a commercial aircraft, a train, a subway train, a bus, and/or an automobile, and/or a website, and/or any other entity or venue, at which or from which a sporting game, match, event, or activity, or sports betting regarding same, can take place.

The gaming facility computer can be utilized to allow the gaming facility or venue, or an employee or agent of same, to communicate with and/or interact with the central processing computer, the user communication devices, the sport governing body computer, the governmental computers, and/or any of the other computers and communication devices described herein as being used in or with the apparatus. The gaming facility computer can communicate with, and/or can be linked with, the central processing computer and/or any other computer or communication devices described herein, via a wired communication network, a wireless communication network, or via any combination of wired and/or wireless communication networks.

The gaming facility computer can be used by its respective gaming facility or venue for any purpose such as, for example, for monitoring and/or for providing oversight and/or for regulating sports betting activities regarding games, matches, events, or activities, at or within its facility or venue. Each gaming facility computer can include any number of computers, server computers, or computer systems, and can also have a website or websites associated therewith.

The gaming facility computer can also include a kiosk, or any number of kiosks, or a computer terminal or any number of computer terminals, or any other interface(s), for allowing an individual attending the gaming facility or venue, such as to attend a sporting game, match, event, or activity, to access the central processing computer to place a bet on the same or on any other sporting game, match, event, or activity. In this regard, an individual can use the gaming facility computer to place a bet on a sporting event taking place at the gaming facility or venue while at the facility or venue and without using his or her user communication device.

The apparatus also includes a content provider computer or computer system which can be used by, and/or which can be associated with a television broadcasting network or station, a radio broadcasting network or station, an Internet streaming video and/or audio provider, or any other content provider. The content provider computer can be utilized to allow the content provider to broadcast or transmit, whichever the case may be, its respective content to any users of the apparatus as well as to communicate with and/or interact with the central processing computer, the user communication devices, the sport governing body computer, the governmental entity computers, the gaming facility computers, and/or any of the other computers and communication devices described herein as being used in or with the apparatus. The content provider computer can communicate with, and/or be linked with, the central processing computer, any of the user communication devices, and/or any other computers or communication devices described herein.

The content provider computer can communicate with, and/or be linked with, the central processing computer, any of the user communication devices, and/or any other computers or communication devices described herein, via a wired communication network, a wireless communication network, or via any combination of wired and/or wireless communication networks.

The content provider computer can transmit content, such as television broadcasts or Internet streaming broadcasts of video and/or audio of sporting events directly to a user communication device or to the central processing computer for re-transmission to a user communication device. The content provider computer can also transmit content, such as television broadcasts or Internet streaming broadcasts of video and/or audio of sporting events, in or as 360 degree videos, immersive videos, spherical videos, in virtual reality, or in augmented reality, directly to a user communication device or to the central processing computer for re-transmission to a user communication device. In this regard, the content provider computer and the central processing computer can be specially programmed and specially configured to transmit sporting events in or as 360 degree video, immersive video, or spherical video, in virtual reality (VR), and/or in augmented reality (AR).

The apparatus also includes an information/analytics provider computer or computer system which can be used by, and/or which can be associated with, an information provider, such as for example, a news service, a news web site, a web site associated with a newspaper or other periodical, an analytics company, a sports analytics company, an analytics provider, an analytics service, and/or any other provider of any data and/or information which can be utilized by users of the apparatus in engaging is sports betting of any kind or type. The information/analytics provider computer can be utilized to provide information, news, analytics information, sports analytics data and/or information, or any other statistical, historical, predictive, or forecasting, data and/or information, to any users of the present invention. The information/analytics provider computer can be utilized by the respective information/analytics provider associated with the same in order to communicate with and/or to interact with the central processing computer, the user communication devices, the sport governing body computer, the governmental entity computer, the gaming facility computer, the content provider computer, and/or any of the other computers and communication devices described herein.

The information/analytics provider computer can communicate with, and/or be linked with, the central processing computer, any of the user communication devices, and/or any other computers or communication devices described herein. The information/analytics provider computer can communicate with, and/or be linked with, the central processing computer, any of the user communication devices, and/or any other computers or communication devices described herein, via a wired communication network, a wireless communication network, or via any combination of wired and/or wireless communication networks.

The information/analytics provider computer can transmit information, news, analytics data and/or information, sports analytics information, or any other statistical, historical, predictive, or forecasting, data and/or information, directly to a user communication device or to the central processing computer for re-transmission to a user communication device. Each information/analytics provider computer can include any number of computers, server computers, or computer systems, and can also have a website or websites associated therewith.

The apparatus also includes a social network computer or computer system which can be used by a social networking company or a social networking provider to provide social networks, social networking services, and/or social networking forums, to and/or for any of the users of the present invention. The social network computer can be utilized by the social networking company or a social networking provider associated with the same in order to communicate with and/or to interact with the central processing computer, the user communication devices, the sport governing body computer, the governmental entity computer, the gaming facility computer, the content provider computer, the information/analytics provider computer, and/or any of the other computers and communication devices described herein as being used in or with the apparatus. The social network computer can communicate with, and/or be linked with, the central processing computer, any of the user communication devices, and/or any other computers or communication devices described herein.

The social network computer can communicate with, and/or be linked with, the central processing computer, any of the user communication devices, and/or any other computers or communication devices described herein, via a wired communication network, a wireless communication network, or via any combination of wired and/or wireless communication networks. The social network computer can transmit information directly to a user communication device or to the central processing computer for re-transmission to a user communication device. Each social network computer can include any number of computers, server computers, or computer systems, and can also have a website or websites associated therewith.

The apparatus also includes a financial institution/intermediary computer or computer system which can be used by, and/or which can be associated with a bank, a credit card company or service, a debit card company or service, an electronic money account or service, or any other financial institution which can administer and/or service financial accounts and/or gaming accounts for any of the herein-described users, sports governing bodies, governmental entities, gaming facilities or venues, content providers, information/analytics providers, and/or social networking companies or social networking providers, an/do or any other individuals or entities who or which use the present invention.

The financial institution computer can communicate with and/or interact with the central processing computer, the user communication devices, the sport governing body computer, the governmental entity computer, the gaming facility computer, the content provider computer, the information/analytics provider computer, the social network computer, and/or any of the other computers and communication devices described herein as being used in or with the apparatus. The financial institution computer can communicate with, and/or be linked with, the central processing computer, any of the user communication devices, and/or any other computers or communication devices described herein.

The financial institution computer can communicate with, and/or be linked with, the central processing computer, any of the user communication devices, and/or any other computers or communication devices described herein, via a wired communication network, a wireless communication network, or via any combination of wired and/or wireless communication networks. Each financial institution computer can include any number of computers, server computers, or computer systems, and can also have a website or websites associated therewith.

The apparatus also includes an escrow agent computer or computer system which can be used by, and/or can be associated with, an escrow agent or an escrow facility for holding bets or wagers and/or any other entities, monies, or objects, etc., which can be the subject of the bet or wager, for any user of the present invention. The escrow agent or escrow facility is a neutral administrator who or which can act as the escrow agent for parties to a bet or wager and/or who or which can be the officiating party or entity to officiate over a bet or wager when and/or if such a service or services are or may be needed and/or desired.

The escrow agent computer can communicate with and/or can interact with the central processing computer, the user communication devices, the sport governing body computer, the governmental entity computer, the gaming facility computer, the content provider computer, the information/analytics provider computer, the social network computer, the financial institution computer, and/or with any of the other computers and communication devices described herein. The escrow agent computer can communicate with, and/or can be linked with, the central processing computer, any of the user communication devices, and/or any other computers or communication devices described herein.

The escrow agent computer can communicate with, and/or be linked with, the central processing computer, any of the user communication devices, and/or any other computers or communication devices described herein, via a wired communication network, a wireless communication network, or via any combination of wired and/or wireless communication networks. Each escrow agent computer can include any number of computers, server computers, or computer systems, and can also have a website or websites associated therewith.

The apparatus can also include one or more wearable devices which can be worn by, or attached to the clothing or uniform of, an athlete or player during a respective game, match, or competition. The wearable device can be any of the many wearable devices which are equipped for, or utilized for, measuring and/or transmitting biological data and/or information, physiological data and/or information, pulse rate, heart rate, blood pressure, blood-sugar level or blood-glucose level data and/or information, athlete or player movement data and/or information, and/or any other data and/or information. The wearable device can also be equipped for, or utilized for, measuring steps taken, distance traveled, speed of travel, and/or any other data and/or information for monitoring an athlete's or a player's performance during a game, match, or competition.

The wearable device can communicate with and/or can interact with the central processing computer, the user communication devices, the sport governing body computer, the governmental entity computer, the gaming facility computer, the content provider computer, the information/analytics provider computer, the social network computer, the financial institution computer, and/or any of the other computers and communication devices described herein. The wearable device can communicate with, and/or be linked with, the central processing computer, any of the user communication devices, and/or any other computers or communication devices described herein.

The wearable device can communicate with, and/or be linked with, the central processing computer, any of the user communication devices, and/or any other computers or communication devices described herein, via a wired communication network, a wireless communication network, or via any combination of wired and/or wireless communication networks.

Any number of central processing computers, user communication devices, sport governing body computers, governmental entity computers, gaming facility computers, content provider computers, information/analytics provider computers, social network computers, financial institution computers, escrow agent computers, and wearable devices, can be utilized in, and/or in connection with or in association with, the present invention.

Any of the central processing computers, the user communication devices, the sport governing body computers, the governmental entity computers, the gaming facility computers, the content provider computers, the information/analytics provider computers, the social network computers, the financial institution computers, the escrow agent computers, and/or the wearable devices, can communicate with any other central processing computer(s), user communication device(s), sport governing body computer(s), governmental entity computer(s), gaming facility computer(s), content provider computer(s), information/analytics provider computer(s), social network computer(s), financial institution computer(s), escrow agent computer(s), and/or wearable device(s), in a bi-directional manner. In this regard, any computer or communication device, or any wearable device, described herein can communicate, in a bi-directional manner, with any other computer, communication device, or wearable device, described herein.

The present invention can be utilized on, over, or via, the Internet and/or the World Wide Web and/or on, over, or via, any suitable communication network and/or any combination of communication networks, including, but not limited to the Internet, the World Wide Web, a telecommunication network or system, a telephone network or system, a cable television communication network or system, a satellite television communication network or system, a digital television network or system, a satellite communication network or system, a broadband communication network or system, a radio frequency communication network or system, an optical communication network or system, a line-connected network or system, a wireless network or system, a radio communication network or system, a digital communication network or system, a personal communications services (PCS) network or system, a local area network (LAN), a wide area network (WAN), a wireless Internet network or system, a wireless World Wide Web network or system, an optical communication network or system, a broadband communication network or system, a Bluetooth communication network or system, a streaming video communication network or system, a streaming audio communication network or system, a live video communication network or system, and/or any other suitable communication network or system, and/or any combination(s) thereof.

The central processing computer includes a central processing unit (CPU) which can be microprocessor, a microcomputer, a minicomputer, a macro-computer, or a mainframe computer, depending upon the application. The CPU is specially programmed to perform all of the functionality described herein as being performed by the central processing computer. The central processing computer also includes a random access memory (RAM) device and a read only memory (ROM) device, and a user input device(s) which can be or include any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the central processing computer. Data, information, and/or commands or instructions, can also be input using voice recognition software and a microphone.

The central processing computer also includes a display device, such as a display monitor and/or a display screen. The central processing computer can also include an output device, such as a printer, a display device, and/or a modem, for outputting, in either or both of hard copy form or electronic form, any of the data and/or information which is described herein as being provided by, from, or at, the central processing computer.

The central processing computer can also include a receiver for receiving data and/or information, including any of the herein-described data and/or information, and/or any of the other data and/or information described herein as being provided or transmitted to the central processing computer from any of the user communication devices, sport governing body computers, governmental entity computers, gaming facility computers, content provider computers, information/analytics provider computers, social network computers, financial institution computers, escrow agent computers, wearable devices, and/or from any other central processing computers.

The central processing computer can also include a database(s), which can contain any and/or all of the data and/or information, and/or software programs or software applications, which may be required, and/or which may be desired, for performing any of the functionality and/or processing routines described herein as being performed by the central processing computer or the apparatus of the present invention.

The central processing computer can also include a transmitter for transmitting data and/or information, including any of the herein-described data and/or information, and/or any of the other data and/or information described herein as being provided or transmitted from the central processing computer to any of the user communication devices, sport governing body computers, governmental entity computers, gaming facility computers, content provider computers, information/analytics provider computers, social network computers, financial institution computers, escrow agent computers, and/or wearable devices, and/or to any other central processing computers.

The central processing computer can also include a global positioning device for determining the position or location of the central processing computer. The global positioning device can be utilized in order to determine the position or location of the central processing computer so as to, for example, determine a jurisdiction in which the central processing computer is located at any given time.

The central processing computer can also include a video and/or audio recording device(s) which can include a camera and/or a video recording device for recording pictures or video and/or video clips and/or a microphone or an audio recording device for recording audio or audio clips which can be recorded by, and/or transmitted live by, or from the central processing computer, or which can be recorded by, and stored at or in, the central processing computer for transmission by or from the central processing computer at a later time.

The user communication device can be any computer or communication device and/or can also be a computer terminal, a terminal device connected to, or associated with, the central processing computer, or a kiosk. The user communication device can also be, or can include, any 360 degree video headset or interface, VR (virtual reality) headset or interface, or AR (augmented reality) headset or interface, a wearable communication device, glasses equipped with communications equipment, or any other communication device or equipment.

The user communication device includes a central processing unit or CPU which is specially programmed to perform all of the functionality described herein as being performed by the user communication device, a random access memory device(s) (RAM), a read only memory device(s) (ROM), a user input device, and a display device. The user communication device also includes a transmitter (s), for transmitting signals and/or data and/or information to any one or more of the central processing computer(s), the sport governing body computers, the governmental entity computers, the gaming facility computers, the content provider computers, the information/analytics provider computers, the social network computers, the financial institution computers, the escrow agent computers, and/or the wearable devices, and/or any other user communication devices, which can be utilized in conjunction with the present invention.

The user communication device also includes a receiver, for receiving signals and/or data and/or information from any one or more of the central processing computer(s), the sport governing body computers, the governmental entity computers, the gaming facility computers, the content provider computers, the information/analytics provider computers, the social network computers, the financial institution computers, the escrow agent computers, and/or the wearable devices, and/or any other user communication devices, which may be utilized in conjunction with the present invention.

The user communication device also includes a database(s) which can contain, and/or be linked to, any of the data and/or information needed by the user communication device to perform any and/or all the functions described herein as being performed by the same, as well as can contain, and/or be linked to, data and/or information stored in the database of the central processing computer(s).

The user communication device also includes an output device, for outputting any of the data, information, and/or reports, described herein as being generated by or via the user communication device. The user communication device also includes a video and/or audio recording device(s) which can include a camera and/or a video recording device for recording pictures or video and/or video clips and/or a microphone or an audio recording device for recording audio or audio clips which can be recorded by, and/or transmitted live by, or from the user communication device, or which can be recorded by, and stored at or in, the user communication device for transmission by or from the user communication device at a later time. The user communication device also includes a global positioning device for determining the position or location of the user communication device.

Each of the sports governing body computers, the governmental entity computers, the gaming facility computers, the content provider computers, the information/analytics provider computers, the social network computers, the financial institution computers, the escrow agent computers, and the wearable devices, can also include a central processing unit or CPU, a random access memory device(s) (RAM), a read only memory device(s) (ROM), a user input device, a display device, a transmitter, a receiver, a database, and an output device. If needed or desired, each of the sports governing body computers, the governmental entity computers, the gaming facility computers, the content provider computers, the information/analytics provider computers, the social network computers, the financial institution computers, the escrow agent computers, and/or the wearable devices, can also include a global positioning device and/or a video and/or audio recording device(s).

The present invention can be utilized in a number of various preferred embodiments in order to allow individuals, groups of individuals, or entities, to place bets or wagers on sporting events, place bets during sporting events, watch and/or listen to sporting events via the apparatus, place bets while viewing sporting events via the apparatus, watch and/or listen to sporting events with other individuals in an electronic forum or a chat room, place bets with other individuals while watching and/or listening to sporting events via the electronic forum or chat room, and/or place bets in betting pools. The present invention can also be utilized in order to request and/or to receive data and/or information from a sports governing body, governmental entity, gaming facility, or content provider, before, during, or after, the sporting event.

The present invention can also be utilized in order to request and/or receive analytics information from a sports information and/or analytics provider regarding the sporting event before, during, or after, the sporting event. The present invention can also be utilized in order to request and/or obtain betting odds information from the central processing computer or from any information or analytics provider or content provider, or any other information provider who or which utilizes the present invention. The present invention can also be utilized in order to request and/or receive information obtained from wearable devices worn by players or athletes during sporting events.

The present invention can also be utilized in order to request and/or receive services from a financial institution and/or from an escrow agent or escrow service before, during, or after, a sporting event, as well as for placing bets and bet monies in escrow for safekeeping.

The present invention can also be utilized in order to allow an individual to watch and/or listen to games along with, and/or place bets with, other individuals and/or members of a social network or social networking group or subgroups in which the individual is a member. The present invention can also be utilized in order to allow an individual to watch and/or listen to games and places bets with other individuals or members of a social network or social networking group or subgroup before, during, and/or after, a sporting event.

The present invention can also be utilized by an individual to watch and/or listen to sporting events using 360 degree video, virtual reality (VR), or augmented reality (AR), or any combination of same.

The present invention can be used in connection with sports betting activities for or involving any and/or all types or kinds of games, matches, activities, events, or competitions, for any and/or all types or kinds of sporting and/or athletic games, matches, activities, events, and/or competitions. In this regard, and without limiting the use of the present invention in any way, the present invention can be utilized to engage in any and/or all types or kinds of sports betting and/or sports betting activities.

The present invention can also be utilized to allow an individual or user to search for, find, and/or be notified regarding, a sporting event, game, match, activity, competition, or tournament, on which he or she can place a bet, allow the individual or user to place a bet on the respective sporting event, game, match, activity, competition, or tournament, allow the individual or user to watch and/or listen to the sporting event, game, match, activity, competition, or tournament, via an electronic forum either alone or with a group of other individuals or users, allow the individual or user to place bets on events, plays, or happenings, which occur during the respective sporting event, game, match, activity, competition, or tournament, or during the course of the respective sporting event, game, match, activity, competition, or tournament, and/or allow the individual or user to communicate with other individuals or users in a social networking forum or chat room environment.

The electronic forum or chat room can also be used to provide an individual or user with a video screen by which the individual or user can watch and/or listen to the respective sporting event, game, match, activity, competition, or tournament, provide analytics data and/or information regarding the respective sporting event, game, match, activity, competition, or tournament, to the individual or user, provide the individual or user with information regarding his or her bets which have been placed, provide the individual or user with available bets which can be placed, provide the individual or user with information regarding betting odds for various bets as well as betting odds which can be continuously updated, and/or can provide the individual or user with the ability to communicate with, and see via video chatting or video conferencing, other individuals or users who can watch the respective sporting event, game, match, activity, competition, or tournament, along with the individual or user, thereby enabling the individual or user, and others, to watch and/or listen to the respective sporting event, game, match, activity, competition, or tournament, as a group, as well as be provided with any and/or all other data and/or information and/or services described herein as being provided by the present invention.

An individual or user can also utilize a headset as, or in conjunction with, the user communication device. In instances when an individual or user uses a headset as, or in conjunction with, the user communication device, the individual or user can utilize the microphone of the video and/or audio recording device(s) of his or her user communication device, along with associated voice recognition software provided with the user communication device or the with the headset, in order to verbally input data, information, commands, or instructions, into the user communication device, and/or into the central processing computer, the sport governing body computers, the governmental entity computers, the gaming facility computers, the content provider computers, the information/analytics provider computers, the social network computers, the financial institution computers, the escrow agent computers, and/or the wearable devices, described herein.

Each of the central processing computers, the user communication devices, the sport governing body computers, the governmental entity computers, the gaming facility computers, the content provider computers, the information/analytics provider computers, the social network computers, the financial institution computers, the escrow agent computers, and the wearable devices, described herein, are each specially programmed and/or specially configured to perform any and/or all of the various functions described herein as being performed or provided by the same.

The individual or user can download, from or via the central processing computer, to his or her user communication device, any copies of any needed or desired 360 degree video, virtual reality (VR), and/or augmented reality (AR), software, application ("app"), or applications ("apps"). In this regard, the individual or user can watch and/or listen to any sporting event, game, match, activity, competition, or tournament, in and using 360 degree video, virtual reality (VR), and/or augmented reality (AR).

The individual or user can also search for a sporting event, game, match, activity, competition, or tournament, or sporting events, games, matches, activities, competitions, or tournaments, on or for which he or she can place a bet. The individual or user can use his or her user communication device, in communication with, and/or in conjunction with, the central processing computer, to search for, and/or to locate, a sporting event, game, match, activity, competition, or tournament, on or for which he or she wants to place a bet. The individual or user can search for a sporting event, game, match, activity, competition, or tournament, by searching by the sport, by the country or region in the world in which the sporting event, game, match, activity, competition, or tournament, is to be held or is being held, by the team or teams playing in or participating in the sporting event, game, match, activity, competition, or tournament, by the player or players playing in or participating in the sporting event, game, match, activity, competition, or tournament, by betting odds placed on the sporting event, game, match, activity, competition, or tournament, or by or using any other search criteria. The central processing computer can transmit one or more search results to the user communication device.

The individual or user can review any search results and select the sporting event, game, match, activity, competition, or tournament, on which he or she desires to place a bet. The individual or user can also access the information/analytics provider computer in order to obtain any data and/or information or analytics data and/or information which he or she may want to obtain and review in advance of placing any bet. The individual or user can also request, for the sporting event, game, match, activity, competition, or tournament, on which the individual or user has selected to place a bet, that the information/analytics provider computer transmit updated data and/or information, including, but not limited to, analytics data and/or information, information regarding betting odds changes, information regarding new betting opportunities, and any other data and/or information, regarding the sporting event, game, match, activity, competition, or tournament, or any team(s) and/or player(s) or participant(s) in same, to the user communication device before the start of, during, or after, the selected sporting event, game, match, activity, competition, or tournament.

The individual or user can also request to be notified regarding, and can be provided with, data and/or information, including, but not limited to, analytics data and/or information, information regarding betting odds changes, information regarding new betting opportunities, any other data and/or information, regarding any other sporting event (s), game(s), match(es), activity or activities, competition(s), or tournament(s), or any team(s) and/or player(s) or participant(s) in same, in which the individual or user may be interested. The individual or user can place a bet on the selected sporting event, game, match, activity, competition, or tournament, and the individual or user can utilize a payment identifier, such as his or her sports betting account number, gaming account number, or gambling account number, in order to place and make payment for the bet. The individual or user can also provide a payment identifier such as, but not limited to, a credit account number, a credit card account number, a debit account number, a debit card account number, a charge account number, a charge card account number, a savings account number, a checking account number, or any other payment account number.

The individual or user can also access his or her sports betting account, gaming account, or gambling account, by accessing the same via the financial institution computer for the financial institution or bank which services the respective sports betting account, gaming account, or gambling account, in order to ascertain the status of the same or to make payment for the bet by utilizing the same. The individual or user can also instruct the central processing computer to place his or her bet monies into an escrow account in order to safeguard the same in the event that the sporting event, game, match, activity, competition, or tournament, on which the bet was placed, has been, or is, reported to be the subject of game fixing, match fixing, or cheating, activities. The individual or user can also instruct the escrow computer not make payment of any lost bet until after a certain, and/or a pre-defined, time period has elapsed after the sporting event, game, match, activity, competition, or tournament, so that the individual or user can be safeguarded against any game fixing, match fixing, or cheating, activities which may have occurred and/or played a role in the outcome of the selected sporting event, game, match, activity, competition, or tournament. Use of the escrow agent computer, to hold and/or maintain bet monies for a bet in escrow, can help safeguard against game fixing, match fixing, or cheating, and provide a much more secure sports betting environment.

The central processing computer can also generate a bet confirmation message which can contain information regarding the bet that was placed, the date and time of the selected sporting event, game, match, activity, competition, or tournament, on which the bet was placed, and a link to an electronic forum, in which the individual or user can watch or listen to the sporting event, game, match, activity, competition, or tournament, on which the bet was placed, with, and interact with other individuals or users, a link to a chat room in which the individual or user can watch and/or listen to the sporting event, game, match, activity, competition, or tournament, with, and interact with, other individuals or users in the individual's or user's social networking group or in the individual's or user's group of friends, and/or a link to a web site in which the individual or user can watch and/or listen to the watch and/or listen to the sporting event, game, match, activity, competition, or tournament, by himself or herself.

The central processing computer can be specially programmed to provide multiple broadcasts simultaneously of the sporting event, game, match, activity, competition, or tournament, to any number of different and distinct social networking groups in any number of electronic forums or chat rooms so that all of the individuals or users in the various social networking groups or other groups can watch and/or listen to the sporting event, game, match, activity, competition, or tournament, together and as a group, post comments, communicate and interact with one another, place additional bets on the sporting event, game, match, activity, competition, or tournament, or on other sporting events, games, matches, activities, competitions, or tournaments, request and be provided with data and/or information or analytical data and/or information for the sporting event, game, match, activity, competition, or tournament, or for another sporting event, game, match, activity, competition, or tournament, report instances of suspected game fixing, match fixing, or cheating, activities which any individual or user may notice. In this regard, the present invention allows an individual or user to place a bet on a sporting event, game, match, activity, competition, or tournament, and allows the individual or user to watch or listen to same with others while having the ability to communicate with others in an on-line social environment, obtain sports betting information, and report instances of suspected game fixing, match fixing, or cheating, activities.

The central processing computer can also be specially programmed to provide multiple broadcasts simultaneously of the sporting event, game, match, activity, competition, or tournament, and provide any and/or all of the herein-described functionality, to any number of different and distinct chat rooms of previously selected groups of individuals or users, which can include friends and/or acquaintances of the individual or user, or others, in an electronic forum or multimedia chat room so that all of the previously selected individuals in the social networking group or pre-selected group can watch and/or listen to the sporting event, game, match, activity, competition, or tournament and avail themselves to any and/or of all of the features and functionality capable of being provided by the present invention.

In instances in which the individual or user initially selected to watch and/or listen the sporting event, game, match, activity, competition, or tournament, by himself or herself, the individual or user can, at any time before or during the sporting event, game, match, activity, competition, or tournament, join any available electronic forum or chat room provided in the betting confirmation message. Links to any such electronic forums or chat rooms can also be provided along with a broadcast of the sporting event, game, match, activity, competition, or tournament provided on a website.

At any time, the individual or user can access the respective electronic forum, chat room, or website, to obtain information, such as the score, time remaining, or any other information regarding the sporting event, game, match, activity, competition, or tournament, simply by linking to same using the link in the betting confirmation message. In this regard, the individual or user need not watch or listen to the entire sporting event, game, match, activity, competition, or tournament, but can simply access the respective electronic forum, chat room, or website, via which same can be watched and/or listened to in order to obtain information regarding same at any time. The individual or user can obtain information which may be displayed via the video screen on which the score of the sporting event, game, match, activity, competition, or tournament, and/or the individual or user can obtain information from the postings of the other individuals or users.

The betting confirmation message can be transmitted from the central processing computer to the user communication device which was used by the individual or user in to place the bet, or the betting confirmation message can be transmitted in or as an email message to the email server servicing the individual's or user's email account. The betting confirmation message can also be transmitted in or as an instant message or as an SMS message to the user communication device or to another user communication device which can be used by the individual or user to receive the same and to access the sporting event, game, match, activity, competition, or tournament.

The individual or user can also program or request, at the time of the placing of the bet on the sporting event, game, match, activity, competition, or tournament, or upon registering an account with the apparatus or the central processing computer, that the central processing computer generate and/or transmit a sporting event message which can be transmitted to his or her the user communication device in or as an email message or in or as instant message or an SMS message prior to the start of the sporting event, game, match, activity, competition, or tournament, so as to remind the individual or user regarding the start of the same and to provide the individual or user with time to be able to watch and/or listen to same. The sporting event message can all contain all of the information contained in the betting confirmation message, including, but not limited to, a link to the respective electronic forum, chat room, or website. The sporting event message can be transmitted and/or retransmitted multiple times at pre-defined time intervals in advance of the sporting event, game, match, activity, competition, or tournament, to serve to remind the individual or user of the same.

The individual or user, prior to the start of a sporting event, game, match, activity, competition, or tournament, or at any time thereafter, can access the respective electronic forum, in which the individual or user can watch and/or listen to the sporting event, game, match, activity, competition, or tournament, with, and interact with other individuals or users, access the chat room in which the individual can watch and/or listen to the sporting event, game, match, activity, competition, or tournament, with, and interact with other individuals or users in the individual's or user's social networking group or in the individual's or user's group of friends, or access the web site in which the individual or user can watch and/or listen to the sporting event, game, match, activity, competition, or tournament, by himself or herself.

The sporting event, game, match, activity, competition, or tournament, which is the subject of the bet, can be transmitted, broadcast, or "streamed", from or via a gaming facility computer and/or a content provider computer which can be located at the venue of the sporting event, game, match, activity, competition, or tournament, to the central processing computer or directly to the individual's or user's user communication device. In this regard, the sporting event, game, match, activity, competition, or tournament, which is the subject of the bet, can also be transmitted, broadcast, or "streamed", to the user communication device from either the central processing computer or directly from the gaming facility computer or the content provider computer located at the venue of the sporting event, game, match, activity, competition, or tournament.

The individual or user can use the user communication device to access the respective electronic forum, chat room, or website, in order to watch and/or listen to a live video or a streaming video broadcast and/or audio broadcast of the sporting event, game, match, activity, competition, or tournament, as well as to obtain any data and/or information and/or any analytics data and/or information regarding the respective teams and/or players involved in, or participating, in the sporting event, game, match, activity, competition, or tournament. The respective electronic forum, chat room, or website, can also provide a listing of all available bets and their respective odds, and/or a listing of private bets offered by any individuals or users who may be watching or listening to, or interested in betting on, the sporting event, game, match, activity, competition, or tournament, via the respective electronic forum, chat room, or website.

In instances where the electronic forum or chat room is being used, any and all comments posted by any of the individuals or users who may be participating in the same can also be displayed via the display of the user communication device. The individual or user can also post comments on the website in a comments section. The individual or user can also engage in video conference calls or video chats with other individuals or users via the respective electronic forum or chat room.

The individual or user can use the present invention to watch and/or listen to the sporting event, game, match, activity, competition, or tournament, in 360 degree video, virtual reality (VR), or augmented reality (AR). Other information described herein as being provided in and/or by the respective electronic forum, chat room, or website, can also be provided and viewed via 360 degree video, virtual reality (VR), or augmented reality (AR).

The respective electronic forum, chat room, or webpage of the website, via which the sporting event, game, match, activity, competition, or tournament, is being watches and/or listened to, can be specially designed to allow the individual or user, or any other individuals or users, to watch and/or listen to the sporting event, game, match, activity, competition, or tournament, and to communicate with other participants in and via the electronic forum or chat room. The respective electronic forum, chat room, or webpage of the website, via which the sporting event, game, match, activity, competition, or tournament, is being watched or listened to, can also be specially designed to, simultaneously with providing the sporting event, game, match, activity, competition, or tournament, allow the individual or user, or any other individuals or users, to post comments regarding the sporting event, game, match, activity, competition, or tournament, and/or to communicate with any other individuals or users watching or listening to the sporting event, game, match, activity, competition, or tournament, via the electronic forum or chat room, to communicate with the central processing computer, and/or to communicate with any of the sport governing body computers, the governmental entity computers, the gaming facility computers, the content provider computers, the information/analytics provider computers, the social network computers, the financial institution computers, the escrow agent computers, and/or the wearable devices.

The respective electronic forum, chat room, or webpage of the website, via which the sporting event, game, match, activity, competition, or tournament, is being watched or listened to can also be specially designed to, simultaneously with providing the sporting event, game, match, activity, competition, or tournament, allow the individual or user, or any other individuals or users, to receive and view data and/or information and/or analytics data and/or information regarding the sporting event, game, match, activity, competition, or tournament, and/or the teams, players, or other participants, participating in the same, to receive and view information obtained by any wearable devices worn by or used by any players or participants in the sporting event, game, match, activity, competition, or tournament, to receive and view any analytics data and/or information relating to any data and/or information obtained from any of the wearable devices during the sporting event, game, match, activity, competition, or tournament, to view information regarding bets being offered by various book makers or other gaming or gambling entities or individuals, and/or to view, via the respective electronic forum, chat room, or webpage of the website, any private bets being offered by other individuals or users participating in the electronic forum or chat room, and/or to view private bets being offered by other individuals or users who or which utilize the present invention.

At any time, the individual or user can place any bet while in, or via, the respective electronic forum, chat room, or webpage of the website, or via the central processing computer. In all instances when the individual or user places the bet, information regarding or pertaining to the bet can be transmitted from the user communication device and can be received and processed by the central processing computer.

Any individuals or users can post any private bets, on or regarding the sporting event, game, match, activity, competition, or tournament, which can be provided across all electronic forums, chat room, or webpages of websites, providing that sporting event, game, match, activity, competition, or tournament for other individuals or users to be informed about. Any individual or user can place a private bet and any individual or user can accept a private bet.

The respective electronic forum, chat room, or webpage of the website, via which the sporting event, game, match, activity, competition, or tournament, is watched or listened to, can also be specially designed to, simultaneously with providing the sporting event, game, match, activity, competition, or tournament, allow the individual or user, or any other individuals or users, to place a bet or any number of bets on the outcome of the sporting event, game, match, activity, competition, or tournament, at any time prior to the conclusion of the sporting event, game, match, activity, competition, or tournament, as well as to place a bet or any numbers of bets on any plays, calls, occurrences, or events, which can occur during the sporting event, game, match, activity, competition, or tournament (hereinafter referred to as "game events" or "match events"). Game events or match events can include, for example, but are not limited to, any single play, activity, event, happening, occurrence, action by a team, action by a player or participant, penalty call, type of penalty, infraction, type of infraction, violation, type of violation, scoring play, type of play, type of activity engaged in, a score at a particular time of the sporting event, game, match, activity, competition, or tournament (for example, the score at the end of a quarter or at a half-time, or at any other specified time in the sporting event, game, match, activity, competition, or tournament), and/or any other play, activity, and/or call made by a game or match official, a referee, or an umpire, which can be the subject of a bet. Any bets on game events or match event will be referred to herein as "game event bets" or "match event bets".

Private bets, which can be or which can include outcome bets or game event bets or match event bets, which are offered by the individual or user or by any other individuals or users can also be offered via the electronic forum, chat room, or the webpage of the website. Betting odds for any bets described herein, as well as continuous updates to betting odds for any of the bets described herein, can also be provided via the electronic forum, chat room, or the webpage of the website.

The individual or user or any other individuals or users watching or listening to the sporting event, game, match, activity, competition, or tournament, can place any number and types of bets, including outcome events and bets on game events or match events which can or may take place during the course of the sporting event, game, match, activity, competition, or tournament. Each time a bet is placed, the central processing computer can process and store information regarding the bet placed by the individual or user, the bet placed by any other individual or user, the sporting event, game, match, activity, competition, or tournament, on which the bet is placed, the sporting event, game, match, activity, competition, or tournament, during which the bet is placed, the amount of the bet, the time of the bet, the date of the bet, a counterparty to the bet, the sports betting account, gaming account, or gambling account, used in placing the bet or in connection with the bet, any information regarding whether or not the bet monies are instructed to be placed in escrow with the escrow agent computer, and/or any other information regarding the bet.

The individual or user, or any other individuals or users watching or listening to the sporting event, game, match, activity, competition, or tournament, on which the bet is placed, can request data and/or information and/or analytics data and/or information at any time before, during, or after, the sporting event, game, match, activity, competition, or tournament. Any data and/or information and/or analytics data and/or information requested, or any data and/or information and/or analytics data and/or information which is provided without request, can be transmitted from the information/analytics provider computer and/or from the central processing computer to the user communication device being used by the individual or user.

The individual or user or any other individuals or users watching or listening to the sporting event, game, match, activity, competition, or tournament, can also place any number of posts or comments in the electronic forum, chat room, or webpage of the website. The individual or user or any other individuals or users watching or listening to the sporting event, game, match, activity, competition, or tournament, can place any number of outcome bets or game event bets or match event bets. Each time a bet is placed by the individual or user or by any other individual or user, information regarding the same can be stored in his or her respective sports betting account, gaming account, or gambling account, and information regarding same can also be transmitted to, stored, and/or maintained, at the central processing computer, the financial institution computer, and/or the escrow agent computer.

The central processing computer can receive, process, store, and maintain, all data and/or information regarding any and all of the individual's or user's bets which are placed on the sporting event, game, match, activity, competition, or tournament, as well any of the individual's or user's bets placed on any other sporting events, games, matches, activities, competitions, or tournaments, along with any scheduled playing time(s) of the same. In instances when the individual or user has bet on, seeks to bet on, or simply wants to watch and/or listen to, another sporting event, game, match, activity, competition, or tournament, the user can request a link to the respective electronic forum, chat room, or website, on which to watch or listen to that other sporting event, game, match, activity, competition, or tournament.

At any and/or at all times during the sporting event, game, match, activity, competition, or tournament, the central processing computer can provide, via the respective electronic forum, chat room, or website, and for each bet placed by the individual or user, an indication as to whether the individual or user is winning the respective bet or losing the respective bet at that point in time, or at that point in the sporting event, game, match, activity, competition, or tournament. For example, information regarding a bet which is a winning bet at that point in time, or at that point in the sporting event, game, match, activity, competition, or tournament, can be provided or displayed in one color, such as, for example, green, while information regarding a bet which is losing bet at that point in time, or at that point in the sporting event, game, match, activity, competition, or tournament, can be provided or displayed in another color, such as, for example, red. In instances in which it cannot be determined whether a bet is a winning or a losing bet, that bet can be provided or displayed in a third and neutral color such as, for example yellow, white, or any other appropriate color.

The central processing computer can also provide, via the electronic forum, chat room, or webpage of the website, and during the sporting event, game, match, activity, competition, or tournament, information regarding any new available bets and/or any new or updated betting odds for bets corresponding to the sporting event, game, match, activity, competition, or tournament, as well as the availability of bets and/or betting odds for bets which can allow the individual or user to protect his or her betting position and/or to increase his or her potential winnings or minimize his or her potential losses. The central processing computer can also provide, via the electronic forum, chat room, or webpage of the website, and during the sporting event, game, match, activity, competition, or tournament, information regarding a gaming insurance product or any number of gaming insurance products, and/or a gaming derivative product, or any number of gaming derivative products, which the individual or user can purchase in order to minimize his or her losses. If the individual or user chooses to purchase any gaming insurance product(s) or gaming derivative product(s), the individual or user can do so at any allowable time, and information regarding the purchase of the same can be transmitted to, received at, and stored and maintained at, the central processing computer.

Any information regarding any bets placed by the individual or user can be displayed in an appropriate location or section of the electronic forum, chat room, or webpage of the website. Any information regarding any gaming insurance product(s) or gaming derivative product(s) can also be displayed in an appropriate location or section of the electronic forum, chat room, or webpage of the website.

The individual or user can also, at any allowable time, decide to sell his or her position in a bet, or purchase another individual's or user's position in a bet. In such instances, bets available for sale can be displayed at an appropriate location or section of the electronic forum, chat room, or webpage of the website.

The individual or user, as well any other individuals or users watching or listening to the sporting event, game, match, activity, competition, or tournament, can also report, suspected instances of game fixing, match fixing, cheating, play irregularities, officiating irregularities, or any other instances which may call into question the integrity of the match fixing by making postings or comments regarding same in the electronic forum, chat room, or webpage of the website. The postings or comments can be posted by the individual or user, or by any other individual or user who is watching or listening to the sporting event, game, match, activity, competition, or tournament in or via the respective electronic forum, chat room, or webpage of the website. The postings or comments can be posted in a section of the respective electronic forum, chat room, or webpage of the website, and can be viewed by all participants in the electronic forum, chat room, or webpage of the website in order to obtain as many comments reported suspected game fixing, match fixing, or cheating, as possible. Each posting or comment can be time stamped and can also be transmitted to, and submitted to, the central processing computer via the user communication device.

The central processing computer can receive all submitted postings and comments posted and received from all individuals or users who are watching the sporting event, game, match, activity, competition, or tournament, store the same in a file associated with the sporting event, game, match, activity, competition, or tournament, and automatically transmit the file and all postings and comments to the sport governing body computer of the sport governing body associated by, or which governs, the sporting event, game, match, activity, competition, or tournament, or the league, team, players, or participants, participating in the sporting event, game, match, activity, competition, or tournament. In this manner, the present invention can be utilized to record and report instances of suspected game fixing, match fixing, or cheating, activity, or any other issues pertaining to game integrity or match integrity, to the sport governing body computer of the respective sport. In this regard, the international federation, the International Olympic Committee, and national federations, and/or any national Olympic Committees, or any other sports governing body can be apprised of the suspected game fixing, match fixing, or cheating, activity, or any other game integrity or match integrity issue.

In this regard, the present invention can be utilized to obtain and report instances of suspected game fixing, match fixing, or cheating, as reported by the individuals or users who use the present invention to watch and/or listen to sporting events, games, matches, activities, competitions, or tournaments, on which they have placed bets.

The central processing computer can also automatically transmit information regarding suspected game fixing, match fixing, or cheating, activity, or any other game integrity or match integrity issue to the respective governmental entity computer for each government which may have an interest in receiving the same. In this regard, each government having an interest in receiving this information can be apprised of the suspected game fixing, match fixing, or cheating, activity, or any other game fixing or match fixing issue.

The individual or user, as well any other individuals or users watching and/or listening to the sporting event, game, match, activity, competition, or tournament, can also report any complaints regarding the placing of any bets, the payment or satisfaction regarding any bets, and/or any suspected betting fraud, and/or any other problems encountered using the apparatus of the present invention. Information regarding any complaints can be transmitted from the user communication device to the central processing computer.

As noted herein, in instances when the individual or user is utilizing a headset as or with the user communication device, any and/or all data or information inputs, postings, comments, information requests, placing of bets, or reports or reportings of any kind, can be input verbally via the microphone of the video and/or audio recording device(s) of the user communication device. The headset or the user communication device can be equipped with software to translate the verbal information into text and, in this regard, any voice inputs can be translated into text and displayed in the electronic forum, chat room, or webpage of the website. The headset, the user communication device, and the central processing computer can each be equipped with any needed software for translating verbal inputs into text and for translating text from one language into another language so that the text can be displayed in the electronic forum, chat room, or webpage of the website.

Any and all interactions between the individual or user with any other individuals or users which take place in or via the electronic forum, chat room, or webpage of the website, can be recorded and stored by and at the central processing computer in a file associated with the electronic forum, chat room, or webpage of the website, for the sporting event, game, match, activity, competition, or tournament.

Any sport governing body computer, any governmental entity computer, any gaming facility computer, and/or any escrow agent computer, can be used by an authorized operator of same to monitor any and/or all activity occurring or transpiring in or via one or more electronic forums, chat rooms, or web pages of any websites, associated with the viewing, watching, and/or listening to, the sporting event, game, match, activity, competition, or tournament.

Upon a completing of the sporting event, game, match, activity, competition, or tournament, the individual or user can request that the central processing computer process a bet outcome or result, such as, for example, whether the individual or user won the bet or lost the bet, for each and every bet made by the individual or user regarding and/or during the sporting event, game, match, activity, competition, or tournament. The central processing computer can process each bet, one at a time, and, for each bet, the central processing computer can determine if the bet being processed is a winning bet or a losing bet. After determining whether the bet is a winning bet or a losing bet, the central processing computer can determine whether or not a hold has been placed on any payout for the bet.

If it should be determined that information regarding any suspected game fixing, match fixing, or cheating, activity, or any other issues pertaining to game integrity or match integrity, exists or has been reported to the central processing computer regarding the sporting event, game, match, activity, competition, or tournament, by or from any sport governing body computer, by or from any governmental entity computer, by or from any gaming facility computer, by or from any information/analytics provider computer, by or from any social network computer, by or from any financial institution computer, by or from any escrow agent computer, or by any user communication device, such as can be reported in any electronic forum, chat room, or web page of a web site, as described herein, or by or through any other independent or other means, then the central processing computer can withhold any payment on a winning bet, and/or suspend or withhold any charge on any losing, until the matter is resolved. The central processing computer can also automatically process information for placing all bets regarding the sporting event, game, match, activity, competition, or tournament into escrow with the escrow agent computer until the matter is resolved.

If it is determined that no information regarding any suspected game fixing, match fixing, or cheating, activity, or any other issues pertaining to game integrity or match integrity, exists or has been reported to the central processing computer regarding the sporting event, game, match, activity, competition, or tournament, then the central processing computer can, in the event of a winning bet, effectuate payment for the winning bet to the sports betting account, gaming account, or gambling account, of the individual or user and, in the event of a losing bet, extract payment from the sports betting account, gaming account, or gambling account, of the individual or user. In an instance where the individual or user placed the bet monies into escrow with the escrow agent computer, the central processing computer can generate and transmit to the escrow agent computer a request for funds, along with an official certification that no suspected game fixing, match fixing, or cheating, activity, or any other issues pertaining to game integrity or match integrity, exists or has been reported for the sports betting account, gaming account, or gambling account, of the individual or user, and thereby allow the escrow agent computer to release the bet monies to the central processing computer or to a sports betting account, gaming account, or gambling account, of the individual or user who won the bet, if all other escrow agreement conditions have been satisfied.

The central processing computer can also effectuate payment of a gaming fee to the respective financial account associated with the respective sport governing body computer for each sport governing body which is due a gaming fee payment, effectuate a gaming fee payment to the respective financial account associated with the respective governmental entity computer for each governmental entity due a gaming fee payment, effectuate a gaming fee payment to the respective financial account associated with the respective gaming facility computer for each gaming facility due a gaming fee payment, effectuate a gaming fee payment to the respective financial account associated with the respective content provider computer for each content provider, if any, due a gaming fee payment, and/or effectuate a gaming fee payment to the respective financial account associated with the respective information/analytics provider computer for each information/analytics provider, if any, due a gaming fee payment. In this regard, any stakeholders in or of the sports betting system of the present invention can be paid any gaming fees due them for each bet placed using the present invention.

The central processing computer can repeat the above bet processing routine for all bets placed by the individual or user.

The central processing computer can also generate a final report regarding and including information regarding all of the bets placed on the sports betting account, gaming account, or gambling account, of the individual or user, including outcome bets, and any game event bets or match events, the outcomes of all such bets, the identities of all of the individuals or users who bet on the sporting event, game, match, activity, competition, or tournament, the identities of all individuals or users who watched and/or listened to the sporting event, game, match, activity, competition, or tournament, via any electronic forum, chat room, and web page of any web site, and a record of all postings, comments, bets placed, and any and/or all activity which took place in the respective electronic forum(s), chat room(s), and web pages of any web site, for or regarding the sporting event, game, match, activity, competition, or tournament.

The final report can also contain any comments or reports regarding any instances of any suspected game fixing, match fixing, or cheating, activity, or any other issues pertaining to game integrity or match integrity. The final report can be stored in the database of the central processing computer, can be transmitted to any party or entity requesting same, and/or can be transmitted to and stored at any sport governing body computer, any governmental entity computer, any gaming facility computer, any information/analytics provider computer, any social network computer, any financial institution computer, or any escrow agent computer, either upon request or automatically. Requests for automated transmissions of any and/or all such final reports can be previously transmitted to, and stored at, the central processing computer.

Any data and/or information obtained, recorded by, processed by, or stored in, any wearable device can also be automatically transmitted to the information/analytics computer for use in generating data and/or information and/or analytics data and/or information using the same. Once processed by the information/analytics computer, the data and/or information, generated from the data and/or information obtained by the wearable device, can be transmitted to and stored in the central processing computer, and/or to any user communication device(s) of the individual or user, to the user communication device(s) or any other individuals or users, to the electronic forum, to the chat room, or to website providing the web page, and/or to any sport governing body computer, to any governmental entity computer, to any gaming facility computer, to any information/analytics provider computer, to any social network computer, to any financial institution computer, or to any escrow agent computer, either automatically or upon request from the respective individual or entity.

The present invention and/or the central processing computer can also be specially programmed and/or specially configured to account for any time zone differences between the local time of the sporting event, game, match, activity, competition, or tournament, and the time zone where the individual or user and any other individuals or users who watch and/or listen to the sporting event, game, match, activity, competition, or tournament, via an electronic forum, chat room, or web page of a web site, is/are located.

The present invention and/or the central processing computer can also be specially programmed and/or specially configured to delay any presentation of any information, comments, or postings, which are posted or presented to or in an electronic forum, chat room, or webpage of a website, in order to adjust for any time delays detected in any streaming video and/or audio of the sporting event, game, match, activity, competition, or tournament. In this manner, the present invention can delay any information, comments, or postings, until after a play or occurrence has been completed so as to adjust for any time delays in the video being streamed to the electronic forum, chat room, or webpage of a web site and, therefore, prevent instances where a posting regarding the play or occurrence is displayed in the electronic forum, chat room, or webpage of a website, before the play is shown therein.

In another preferred embodiment, as well as any and/or all of the embodiments described herein, the central processing computer can be specially programmed by the individual or user to provide the individual or user with a notification message regarding an upcoming sporting event, game, match, activity, competition, or tournament, for which the individual or user desires to be notified.

An individual or user can place any of the bets described herein, including, but not limited to any of the herein-described outcome bets, game event bets, match event bets, private bets, or any other bets, while at a gaming facility or venue either by using his or her user communication device or by placing a bet or bets via the gaming facility computer, such as by using a kiosk or computer terminal of the gaming facility computer.

The present invention can also be utilized in order to facilitate account owner authorization, notification, and/or security, for and/or in connection with, any financial transaction(s) involving any of the herein-described sports betting accounts, gaming accounts, or gambling accounts, and/or in connection with any checking accounts, savings accounts, credit accounts, credit card accounts, debit accounts, debit card accounts, charge accounts, or charge card accounts, which are or can be utilized in connection with the placing of any of the herein-described bets. The present invention can provide for the recording of a picture or a video clip, and/or a recording of an audio clip, of the individual or user while the individual or user is actually placing a bet on or involving his or her sports betting account, gaming account, or gambling account, or on or involving any checking account, savings account, credit account, credit card account, debit account, debit card account, charge account, or charge card account, or any other financial account.

The present invention can also be used to prevent and/or to thwart fraudulent transactions on or involving any sports betting accounts, gaming accounts, or gambling accounts, of the individuals and entities who or which utilize the present invention. An individual or user can place any bet using any of the user communication devices described herein or using any gaming facility computer, any kiosk or any computer terminal, or any other interface, associated with the gaming facility computer. In instances when the individual or user is using a 360 degree video headset, VR headset, or AR headset, as or in connection with the user communication device, the individual or user can place the bet verbally with all verbal instructions and commands associated with the bet being recorded by the respective audio input device or microphone of the input device or by the video and/or audio recording device(s) of the user communication device. In all other instances, a video recording or a video clip, and an audio recording, of the individual or user placing the bet can be recorded.

The audio recording, in the case of the user placing the bet via the 360 degree video headset, VR headset, or AR headset, or the video recording or video clip and the audio recording recorded, in the case of the individual or user using any other user communication device, can be recorded by and stored at the user communication device, and can be transmitted to, and stored at, the central processing computer. A copy of the respective audio recording or the copy of the video recording or video clip and the audio recording can also be transmitted to the user communication device, or to any other user communication device associated with the individual or user, in or attached to an alert message containing information regarding the bet placed on the individual's or user's sports betting account, gaming account, or gambling account, and any other information regarding the transaction associated with the bet.

Information regarding the placement of the bet, along with the copy of the respective audio recording or the video recording or video clip and the audio recording, along with any of other information regarding or pertaining to the bet can be stored in the individual's or user's sports betting account, gaming account, or gambling account, or file stored in the central processing computer. Information regarding the placement of the bet, along with the copy of the respective audio recording or the video recording or video clip and the audio recording, along with any other information regarding or pertaining to the bet can also be transmitted to, and stored in, the individual's or user's user communication device, and/or the sports governing body computer, governmental entity computer, gaming facility computer, financial institution computer, and/or escrow agent computer.

The present invention can also be utilized by an individual or user to access the central processing computer to view and review a statement of bet transactions which occurred on his or her sports betting account(s), gaming account(s), or gambling account(s). The individual or user can also access and listen to, or watch, for any given bet, a copy of the respective audio recording or the copy of the video recording or video clip and the audio recording of the individual or user who placed the subject bet.

Thee present invention can also be utilized in gaming or gambling activities involving bets placed on fantasy sports teams, leagues, events, or activities, and/or esports teams, leagues, events, or activities.

An individual or user can utilize the present invention to request to be notified upon a detected or an identified availability or scheduled occurrence or happening of a sporting event for which a bet or bets can be placed. For example, an individual or user desiring to bet on a game, match, team, tournament, player, or athlete, in or regarding any sporting event, can request to be notified or informed about the same, and the present invention can provide the individual or user with a notification regarding the same. As and for another example, an individual or user desiring to bet on a baseball, football, soccer, basketball, hockey, and/or any other sporting event, can request to be notified when a desired match up is scheduled (for example, a game featuring the New York Mets vs. New York Yankees). The individual or user can, thereafter, place a bet or bets on or regarding the respective sporting event.

The individual or user can also utilize the present invention to request any additional information, including, but not limited to, information regarding betting odds regarding the sporting event, analytics information for or regarding the sporting event, including, but not limited to, the teams or players participating in the sporting event, team records, sports players records, averages, and/or statistics, and/or any statistical and/or historical records regarding any of the herein-described sporting events, information regarding previous winning numbers and the probabilistic information regarding same, player statistics against an opposing team, historical records regarding prior meetings of the teams, player injuries, or line-ups for the game, and/or any other information which a user may find desirable, and/or any other information which an individual or user may be interested in receiving, considering, or using, in or regarding his or her betting activities regarding the respective sporting event.

The present invention can also be utilized in connection with any other gaming activities and/or gambling activities including any gaming activities and/or gambling activities provided, offered by, operated by, hosted by, or sponsored by, any casinos, including casinos housed in or at physical venues, brick and mortar casinos, and/or on-line or virtual casinos. For example, the present invention can be utilized in connection with gaming activities and/or gambling activities offered by and at casinos in Las Vegas, Atlantic City, and other locations in the U.S. and around the world, Indian reservations, horseracing tracks, racetracks, and/or any other gaming and/or gambling venues.

The present invention can also be utilized by individuals and users to play and bet on gaming activities and/or gambling activities provided, offered by, operated by, hosted by, or sponsored by, casinos or other gaming venues and/or gambling venues, as well as to watch and place bets on or regarding any gaming activities and/or gambling activities provided, offered by, operated by, hosted by, or sponsored by, casinos or other gaming venues and/or gambling venues, as well as to place derivative bets on any of the above-described gaming activities and/or gambling activities.

The present invention can also be utilized in connection with lottery games, lottery drawings, and/or any lottery-related gaming activities and/or gambling activities offered by any states, countries, and/or any other governments, governing bodies, or any governmental entities or agencies. Individuals or users can utilize the present invention to purchase lottery tickets for various lottery games or lottery drawings offered by any states, countries, and/or any other governments, governing bodies, or any governmental entities or agencies which desire to sell lottery tickets via the present invention. Individuals and users can also utilize the present invention to watch or view lottery drawings and/or to place bets relating to or regarding a lottery game or a lottery drawing, and/or to place derivative bets on or regarding lottery drawings. The present invention can be utilized so as to allow individuals and users to purchase lottery tickets remotely and/or on-line and/or via the Internet and/or the World Wide Web from any states, countries, and/or any other governments, governing bodies, or any governmental entities or agencies which desire to sell lottery tickets via the present invention.

The apparatus and methods of the present invention can be utilized in connection with a distributed ledger and with Blockchain technology. A distributed ledger and Blockchain technology can be utilized along with a central processing computer, in a combined system, wherein certain of the transactions can be processed and/or performed by and/or with a central processing computer and/or certain other transactions can be processed and/or performed by and/or with, and/or using, a distributed ledger and Blockchain technology or Blockchain technologies. Any and/or all transactions, described herein as being performed by the present invention, can also be processed and/or performed by and/or with, and/or using, a distributed ledger and Blockchain technology or Blockchain technologies, and/or any cryptocurrency Blockchain technology or technologies.

Any type of Blockchain technology can be utilized in connection with the present invention. In this regard, the present invention can utilize a distributed ledger(s) along with any Blockchain technology or technologies, Bitcoin Blockchain technology or technologies, Ethereum Blockchain technology or technologies, Bitcoin Cash Blockchain technology or technologies, Litecoin Blockchain technology or technologies, Privacy Coin Bitcoin technology or technologies, and/or any other suitable Blockchain technology or technologies, and/or Smart contracts and/or Smart contract technology or technologies and/or decentralized autonomous organizations (DAOs), decentralized autonomous organizations (DAOs) technology or technologies, and/or any combination of same.

The present invention can also be utilized with any suitable cryptocurrency, such as, but not limited to, Bitcoin, Bitcoin Cash, Ethereum, Ripple, Dash, Monero, Zcash, Digibyte, Litecoin, any privacy coins, and/or any other cryptocurrency and/or privacy coin cryptocurrency.

Applicant incorporates by reference herein the subject matter and teachings of "Blockchain Technology Explained" by Alan T. Norman, "Blockchain" by Abraham K. White, "Blockchain—A Practical Guide To Developing Business, Law, And Technology Solutions" by Joseph J. Bambara and Paul R. Allen, and "Blockchain—Ultimate Guide To Understanding Blockchain, Bitcoin, Cryptocurrencies, Smart Contracts And The Future of Money" by Mark Gates, in their entirety, for all of their respective subject matter and teachings regarding distributed ledger technology and/or technologies, Blockchain technology and/or technologies, Bitcoin technology and/or technologies, Bitcoin Blockchain technology and/or technologies, Ethereum technology and/or technologies, Ethereum Blockchain technology and/or technologies, cryptocurrencies, cryptocurrency technology and/or technologies, and/or smart contract technology and/or technologies, and/or decentralized autonomous organizations (DAOs) technologies, and/or peer-to-peer technology and/or technologies, and/or any other technology or technologies related thereto or which can be utilized in conjunction distributed ledgers, Blockchain technologies, Smart contracts, decentralized autonomous organizations (DAOs), and/or cryptocurrencies.

By utilizing a distributed ledger and a suitable Blockchain technology, the apparatus and methods of the present invention can reduce the amount of processing performed by, and reliance on, a central processing computer and/or can eliminate the need for a central processing computer and any centralized entity which might operate the central processing computer.

The apparatus can also include a central processing computer and distributed ledger/Blockchain technology system. The central processing computer/distributed ledger/Blockchain technology system can include a central processing computer component, which can perform any and/or all of the functions described herein as being performed by the central processing computer, and a distributed ledger/Blockchain technology system component.

Any and/or all of the various transactions, functions, and/or functionalities, described herein as being provided or performed by the present invention can be provided or performed by either the central processing computer component of the central processing computer/distributed ledger/Blockchain technology system and/or by the distributed ledger/Blockchain technology system component of the central processing computer/distributed ledger/Blockchain technology system.

For example, any and/or all of the financial transactions described herein, which relate to the placing of a bet or bets or which relate to the settlement of a bet or bets, can be performed by the distributed ledger/Blockchain technology system component of the central processing computer/distributed ledger/Blockchain technology system, while any and/or all non-financial transactions can be performed by the central processing computer component of the central processing computer/distributed ledger/Blockchain technology system. Any financial or non-financial transaction(s) or function(s) can also be performed by the distributed ledger/Blockchain technology system component of the central processing computer/distributed ledger/Blockchain technology system, and any financial or non-financial transaction(s) or function(s) can also be performed by the central processing computer component of the central processing computer/distributed ledger/Blockchain technology system. The present invention can also be utilized with any cryptocurrency or cryptocurrencies or with no cryptocurrency.

A distributed ledger/Blockchain technology system can be utilized to process and/or perform any and/or all of the transactions and/or functions described herein as being provided and/or performed by the apparatus of the present invention. The apparatus can include a distributed ledger/Blockchain technology system which can perform any and/or all of the transaction and/or functions described herein as being performed by the present invention.

In a preferred embodiment, any and/or all of the various transactions, functions, and/or functionalities, described herein as being provided or performed by the present invention can be performed by utilizing the distributed ledger/Blockchain technology system.

The user communication device(s) and/or the central processing computer, the central processing computer/distributed ledger/Blockchain technology system, and/or the distributed ledger/Blockchain technology system, can also transmit a control signal for activating and/or for controlling a selected camera, video recording device, microphone, and/or audio recording device, of any of the video and/or audio recording device(s) described herein, and/or for activating and/or for controlling any wearable device(s) described herein.

The apparatus of the present invention can also be utilized to gather and/or collect analytics information from multiple sources and to provide analytics products and/or services to any of the herein-described stakeholders and users of the present invention. Sports analytics information, casino gambling analytic information, and lottery analytics information, can be recorded, can be gathered and/or collected, and/or can be provided to an information/analytics computer. Various analytics products and/or services can be generated and/or provided to the various users and stakeholders described herein via the present invention.

Analytics data and/or information and/or any other data and/or information deemed useful in serving the needs of users and/or stakeholders of the present invention can be provided by various individuals, entities, or sources, at any time before, during, or after, any of the herein-described games, matches, competitions, or events, for which bets can or may be placed and/or for any casino games, lottery games, and/or lottery drawings. These individuals, entities, or sources can include official data, unofficial data, and/or analytics, sources, such as, for example, but not limited to, sports governing bodies, leagues, teams, tournaments, or competitions, governmental data and/or analytics sources such as, for example, but not limited to, countries, states, provinces, cities, municipalities, or any other political subdivisions, private data and/or analytics sources such as, for example, but not limited to, data and/or analytics entities and/or business entities and/or their employees and/or agents, private individuals and/or freelancers, and/or wearable device sources which wearable devices can be worn by players, athletes, and/or participants, in any of the herein-described games, matches, competitions, or events, and/or casino games, as well as any of the herein-described gaming facilities, gaming venues, content providers, financial institutions, escrow agents, and/or social networks.

Analytics data and/or information can be entered by, generated by, and/or transmitted from, each of the herein-described and respective sports governing bodies, leagues, teams, tournaments, or competitions, governmental data and/or analytics sources, data and/or analytics entities and/or business entities and/or their employees and/or agents, financial institutions, escrow agents, private individuals and/or freelancers, and wearable devices, can utilize a respective computer or communication device to collect and/or gather data, and transmit, analytics data and/or information to the information/analytics computer. Thereafter, any desired analytics data and/or information and/or any analytics products or services which can be derived from the same can be requested by, and/or can be transmitted to, any user, individual, sports governing body, governmental entity, gaming facility, content provider, information/analytics provider, social network, financial institution, and/or escrow agent, who or which utilizes the present invention. Any desired analytics data and/or information and/or any analytics products or services derived from the same can be requested by and/or transmitted to any user, individual, sports governing body, governmental entity, gaming facility, content provider, information/analytics provider, social network, financial institution, and/or escrow agent, at any time.

The analytics apparatus can include the information/analytics provider computer and can also include a user analytics device, which can be any user communication device which is suitably equipped to allow a user or individual to enter, collect, or gather, analytics data and/or information and which can be utilized by any user or individual who or which utilizes the present invention. The user analytics device can be connected with, or can be wirelessly linked to or with, the information/analytics provider computer. The analytics apparatus can also include a sport governing body analytics device which can be utilized by any of the sports governing bodies described herein, and/or entities offering, sponsoring, or operating, a lottery or lotteries, in order to provide official or unofficial analytics data and/or information to the analytics apparatus. The sport governing body analytics device can be connected with, or can be wirelessly linked to or with, the information/analytics provider computer.

The analytics apparatus can also include a governmental entity analytics device, which can be utilized by any of the governmental entities described herein in order to provide official or unofficial analytics data and/or information to the analytics apparatus. The governmental entity analytics device can be connected with, or can be wirelessly linked to or with, the information/analytics provider computer. The analytics apparatus can also include a gaming facility/venue analytics device which can be utilized by any of the gaming facilities or venues described herein, or by any casino or on-line casino, in order to provide official or unofficial analytics data and/or information to the analytics apparatus. The gaming facility/venue analytics device can be connected with, or can be wirelessly linked to or with, the information/analytics provider computer. The analytics apparatus can also include a content provider analytics device which can be utilized by any of the content providers described herein in order to provide official or unofficial analytics data and/or information to the analytics apparatus. The content provider analytics device can be connected with, or can be wirelessly linked to or with, the information/analytics provider computer.

The analytics apparatus can also include an information entity analytics device which can be utilized by any of the information/analytics providers, who or which utilize the present invention and/or any employees or agents of same, by any financial institutions who or which utilize the present invention and/or any employees or agents of same, and/or by any escrow agents who or which utilize the present invention and/or any employees or agents of same, in order to provide official or unofficial analytics data and/or information to the analytics apparatus. The information entity analytics device can be connected with, or can be wirelessly linked to or with, the information/analytics provider computer.

The analytics apparatus can also include a social network analytics device which can be utilized by any of the social networks which utilize the present invention and/or any employees or agents of same in order to provide official or unofficial analytics data and/or information to the analytics apparatus. The social network analytics device can be connected with, or can be wirelessly linked to or with, the information/analytics provider computer.

The analytics apparatus can also include a wearable device which can be worn by, attached to, or linked with, any player, athlete, or participant, of any sporting event, game, match, competition, or tournament, or to any clothing or equipment of the player, athlete, or participant. The wearable device can be used by a player, athlete, or participant, in order to provide official or unofficial analytics data and/or information to the analytics apparatus. The wearable device can be wirelessly linked to or with the information/analytics provider computer.

Any number of user analytics devices, sport governing body analytics devices, governmental entity analytics devices, gaming facility/venue analytics devices, content provider analytics devices, information entity analytics devices, social network analytics devices, and/or wearable devices, can be utilized in and/or with the analytics apparatus.

In another preferred embodiment, any number of user analytics devices, sport governing body analytics devices, governmental entity analytics devices, gaming facility/venue analytics devices, content provider analytics devices, information entity analytics devices, social network analytics devices, and/or wearable devices, can also provide analytics data and/or information directly to the central processing computer of the present invention and/or to the central processing computer and distributed ledger/Blockchain technology system of the present invention. Any of the herein-described user analytics devices, sport governing body analytics devices, governmental entity analytics devices, gaming facility/venue analytics devices, content provider analytics devices, information entity analytics devices, social network analytics devices, and/or wearable devices, can be connected to, or wirelessly linked to or with, the central processing computer of the present invention and/or the central processing computer and distributed ledger/Blockchain technology system of the present invention.

The analytics apparatus, as well as any of the user analytics devices, the sport governing body analytics devices, the governmental entity analytics devices, the gaming facility/venue analytics devices, the content provider analytics devices, the information entity analytics devices, the social network analytics devices, and/or the wearable devices, can be utilized to perform analytics data collection, gathering, recording, and/or reporting to any information/analytics provider computer, and/or the central processing computer of the present invention and/or the central processing computer and distributed ledger/Blockchain technology system of the present invention.

In a preferred embodiment, the analytics apparatus, as well as any of user analytics devices, the sport governing body analytics devices, the governmental entity analytics devices, the gaming facility/venue analytics devices, the content provider analytics devices, the information entity analytics devices, the social network analytics devices, and/or the wearable devices, can be utilized to facilitate analytics data collection, gathering, recording, and/or reporting, from any number of the various users and stakeholders who or which utilize the present invention.

The central processing computer, the central processing computer and distributed ledger/Blockchain technology system, the analytics apparatus, and/or any information/analytics provider computer, can be specially programmed to process any analytics data and/or information collected by the apparatus of the present invention, and/or any of the herein-described user analytics devices, sport governing body analytics devices, governmental entity analytics devices, gaming facility/venue analytics devices, content provider analytics devices, information entity analytics devices, social network analytics devices, and/or wearable devices, and can be specially programmed to generate any desired analytics product(s) and/or service(s). The central processing computer, the central processing computer and distributed ledger/Blockchain technology system, the analytics apparatus, and/or any information/analytics provider computer, can be specially programmed generate any desired analytics product(s) and/or service(s) for, or to meet the needs or requests of, any of the herein-described users, individuals, or stakeholders, who or which utilize the apparatus of the present invention.

The apparatus and methods of the present invention, the apparatus, the analytics apparatus, and/or any of the herein-described user analytics devices, sport governing body analytics devices, governmental entity analytics devices, gaming facility/venue analytics devices, content provider analytics devices, information entity analytics devices, social network analytics devices, and/or wearable devices, can be utilized in order to collect, record, process, and/or disseminate, player performance tracking data and/or information and/or athlete performance tracking data and/or information to any of the herein-described individuals, users, or stakeholders, who or which use the present invention.

The apparatus and methods of the present invention and/or any of the herein-described user analytics devices, sport governing body analytics devices, governmental entity analytics devices, gaming facility/venue analytics devices, content provider analytics devices, information entity analytics devices, social network analytics devices, and/or wearable devices, can be utilized in conjunction with player performance tracking systems, and/or as a component of the same, for monitoring the performance of players or athletes in and/or during games or matches.

The apparatus and methods of the present invention can process player performance tracking data and/or information and/or athlete performance tracking data and/or information in conjunction with historical or past player performance tracking data and/or information and/or athlete performance tracking data and/or information in order to provide performance assessment information for assessing the performance of any player or athlete, of any number of players or athletes, or any team or any number of teams, before, during, and after a game or match. The player performance tracking data and/or information and/or athlete performance tracking data and/or information, the assessment information, and/or any historical player performance tracking data and/or information and/or historical athlete performance tracking data and/or information, and/or any other historical data or information, statistical data or information, and/or probabilistic data and/or information, can be provided to any of the herein-described individuals or users, sports governing bodies, governmental entities, gaming facilities, content providers, information/analytics providers, social networks, financial institutions, escrow agents, Any of the herein-described individuals or users, sports governing bodies, governmental entities, gaming facilities, content providers, information/analytics providers, social networks, financial institutions, escrow agents, bookmakers, and fraud detection systems, can utilize the player performance tracking data and/or information and/or athlete performance tracking data and/or information, the assessment information, and/or any historical player performance tracking data and/or information and/or historical athlete performance tracking data and/or information, and/or any other historical data or information, statistical data or information, and/or probabilistic data and/or information, as they desire.

The player performance tracking data and/or information and/or athlete performance tracking data and/or information, the assessment information, and/or any historical player performance tracking data and/or information and/or historical athlete performance tracking data and/or information, and/or any other historical data or information, statistical data or information, and/or probabilistic data and/or information, can be used by individuals or users to place bets, can be used by bookmakers to determine, ascertain, or establish, betting odds before and/or during a game, match, or competition, or to determine, ascertain, or establish, betting odds after a game, match, or competition, and/or can be used by sports governing bodies, governmental entities, bookmakers, fraud detection systems, gaming facilities, content providers, information/analytics providers, social networks, financial institutions, escrow agents, and/or any other stakeholders to detect, report, be notified of, and/or investigate, any evidence and/or allegations indicative of, or evidencing, instances of match fixing, game fixing, cheating, irregular betting activities, and/or any other suspicious or wrongful activities, behavior, or occurrences.

The apparatus and methods of the present invention and/or the analytics apparatus, and/or any of the herein-described user analytics devices, sport governing body analytics devices, governmental entity analytics devices, gaming facility/venue analytics devices, content provider analytics devices, information entity analytics devices, and/or social network analytics devices, can be utilized in order to collect, record, process, and/or disseminate, bookmaker data and/or information regarding betting odds, betting lines, proposition bets, and/or betting activities, and/or any other sportsbook or sports betting data and/or information, established, determined, offered, or ascertained, by a bookmaker before, during, and/or after, any game(s), matches, or competitions, for which the bookmaker a sportsbook offers betting or wagering activities.

The apparatus and methods of the present invention and/or any of the herein-described user analytics devices, sport governing body analytics devices, governmental entity analytics devices, gaming facility/venue analytics devices, content provider analytics devices, information entity analytics devices, social network analytics devices, and/or the wearable devices, can be utilized in conjunction with fraud detection systems which can be utilized to monitor and/or compare changes in betting odds or wagering odds for games or matches before and/or during games with in-game or in-match performance tracking data and/or information.

Any number of bookmakers can provide any types or kinds of bookmaker data and/or information, which be provided to, or disseminated to, any of the individuals or users for placing bets or otherwise using the apparatus and methods of the present invention, to any other bookmakers to determine, ascertain, or establish, betting odds before and/or during a game, match, or competition, or to determine, ascertain, or establish, betting odds after a game, match, or competition, and/or to any sports governing bodies, governmental entities, bookmakers, fraud detection systems, gaming facilities, content providers, information/analytics providers, social networks, financial institutions, escrow agents, and/or any other stakeholders to detect, report, be notified of, and/or investigate, any evidence and/or allegations indicative of, or evidencing, instances of match fixing, game fixing, cheating, irregular betting activities, and/or any other suspicious or wrongful activities, behavior, or occurrences.

Bookmaker data and/or information can be provided to any of the herein-described individuals or users, sports governing bodies, governmental entities, other bookmakers, fraud detection systems, gaming facilities, content providers, information/analytics providers, social networks, financial institutions, escrow agents, and/or any other stakeholders, before, during, or after, a game, match, or competition, upon request, automatically, and/or live, in real-time, and/or otherwise.

The apparatus and methods of the present invention can correlate player performance tracking data and/or information and/or athlete performance tracking data and/or information, obtained from any player performance tracking system and/or from any athlete performance tracking system, or obtained from any number of player performance tracking systems and/or from any athlete performance tracking systems, with any type or kind of bookmaker data and/or information, provided by any bookmaker or provided by any number of bookmakers, in order to generate fraud detection system reports or other information which can be used for detecting, reporting, and/or investigating, instances of match fixing, game fixing, cheating, irregular betting activities, and/or any other suspicious or wrongful activities, behavior, or occurrences.

The apparatus of the present invention can also any number of bookmaker computers, any number of player performance tracking system computers, and/or any number of fraud detection system computers.

The player performance tracking system computer can utilize, and/or can receive, player performance tracking data and/or information and/or athlete performance tracking data and/or information obtained with, by, or from, any one or more of the various electronic performance and tracking systems ("EPTS"), which are known by those skilled in the art as of the time of the filing of this patent application, and which can be utilized to monitor, measure, and/or track, the in-game, in-match, or in-competition, performance of any player(s), athlete(s), or participant(s), and/or team(s), participating and/or competing in the respective game, match, or competition, and/or which can also be utilized to monitor and/or to track ball movement and/or speed, puck movement and/or speed, bat movement and/or speed, stick movement and/or speed, and/or the movement and/or speed of any object utilized in the playing of the respective game, match, or competition, and/or any equipment utilized in the playing of the respective game, match, or competition.

The various electronic performance and tracking systems, which can be utilized in conjunction the apparatus and methods of the present invention, can include, but are not limited to, optical camera based systems ("OCBS"), local positioning systems ("LPS"), global positioning systems ("GPS") and/or global navigation satellite systems ("GNSS"), and/or any combination of same. Each of the optical camera based systems ("OCBS"), local positioning systems ("LPS"), global positioning systems ("GPS") and/or global navigation satellite systems ("GNSS"), and/or any combination of same, can utilize any number of the wearable devices described herein, as a component or components of same, and/or in, during, or for, data and/or information gathering, and/or during system operation, and/or in performing player performance tracking and/or team performance tracking. In this regard, the wearable devices can be used as a component of each of, or of any of, the herein-described electronic performance and tracking systems, including the optical camera based systems ("OCBS"), the local positioning systems ("LPS"), and/or the global positioning systems ("GPS") and/or global navigation satellite systems ("GNSS"), and/or any combination of same, which are described herein as being used in connection with the present invention.

The player performance tracking system computer can be connected to, linked with, and/or wirelessly linked with, optical camera based player performance tracking system ("OCBS"), local positioning player performance tracking system ("LPS"), and global positioning system ("GPS")/global navigation satellite system ("GNSS") player performance tracking system, and can receive the respective provide player performance tracking data and/or information or athlete performance tracking data and/or information, and/or any ball, puck, bat, stick, object, or equipment, movement and/or speed, and/or other, tracking, data and/or information, and/or any team performance tracking data and/or information, which is collected, processed, and/or provided, by each of, or any combination of the optical camera based player performance tracking system ("OCBS"), the local positioning player performance tracking system ("LPS"), or the GPS/GNSS player performance tracking system. Any one or any combination of "player performance tracking systems, that is, any one of, or any combination of, an optical camera based player performance tracking system, a local positioning player performance tracking system, or a GPS/GNSS player performance tracking system, can be deployed at a gaming venue, stadium, arena, field, or other sporting venue or athletic venue, of or for, or which is hosting, a game, match, or competition, in order to obtain performing player performance tracking, team performance tracking, and/or ball, puck, bat, stick, object, or equipment, tracking, for and during any game, match, or competition.

Historical player performance tracking data and/or information, for each player, and historical team performance tracking data, for each team, which can be previously obtained from any one or more of the respective optical camera based player performance tracking systems, local positioning player performance tracking systems, or GPS/GNSS player performance tracking systems, can be recorded, processed, and stored, in the database of the central processing computer, and/or in the respective database(s) of the bookmaker computer(s), the player performance tracking system computer(s), and/or the fraud detection system computer(s). Algorithms and/or data processing routines and/or techniques, such as those which are known by those skilled in the art of player and team performance data tracking and analysis at the time of the filing of this patent application, can be utilized by the central processing computer, and/or the respective database(s) of the bookmaker computer(s), the player performance tracking system computer(s), and/or the fraud detection system computer(s), in order to process any of the herein-described player performance tracking data and/or information and/or any of the herein-described team performance tracking data and/or information, in order to identify averages, means, standard deviations, and/or any other statistical and/or probabilistic measures or metrics, or any number of player performance measurement categories and/or for any team performance measurement categories. For each player performance category or team performance category, historical norms can be identified for later use in future player performance evaluation and/or in team performance evaluation.

Thereafter, player performance tracking data and/or information, and/or team performance tracking data and/or information, obtained from a respective optical camera based player performance tracking systems, local positioning player performance tracking systems, or GPS/GNSS player performance tracking systems, for, from, or during, any subsequent game, match, or competition, can be compared, for each player and/or for each team in order to ascertain the whether or not each player or each team is performing at, or within a range of, their normal performance level(s), below their normal performance level(s), or above their normal performance level(s). Player or team performance irregularities can also be noted, analyzed, and/or recorded.

Each of the central processing computer, the bookmaker computer(s), the player performance tracking system computer(s), and/or the fraud detection system computer(s), can be provided with, and can store and/or can process and/or compare, using any suitable algorithms and/or data processing routines and/or techniques, any of the herein-described historical player performance tracking data and/or information, for each player, and the herein-described historical team performance tracking data, for each team, as well as any player performance tracking data and/or information, and/or team performance tracking data and/or information, obtained for, from, or during, any game, match, or competition.

Each of the central processing computer, the bookmaker computer(s), the player performance tracking system computer(s), and/or the fraud detection system computer(s), can compare the player performance tracking data and/or information for each player and/or the team performance tracking data and/or information for each team, which is obtained for, from, or during, any game, match, or competition against, or in conjunction with, the historical player performance tracking data and/or information for each player and/or the historical team performance tracking data for each team. Each of the central processing computer, the bookmaker computer(s), the player performance tracking system computer(s), and/or the fraud detection system computer(s), can then determine if each player or team is performing at their normal performance level(s), below their normal performance level(s), or above their normal performance level(s), during each game, match, or competition, or if each player or team had performed at their normal performance level(s), below their normal performance level(s), or above their normal performance level(s).

Player performance tracking data and/or information and/or team performance tracking information, and/or any ball, puck, bat, stick, object, or equipment, tracking data and/or information can be transmitted to the central processing computer from a respective optical camera based player performance tracking system, local positioning player performance tracking system, or GPS/GNSS player performance tracking system, during a game, match, or competition. The central processing computer can also transmit the player performance tracking data and/or information and/or team performance tracking information, and/or any ball, puck, bat, stick, object, or equipment, tracking data and/or information to each bookmaker computer during the game and/or as close to in real-time as possible so that the bookmaker computer can process same and can calculate in-game, in-match, or in-competition, betting odds based on the player performance tracking data and/or information and/or team performance tracking information, and/or any ball, puck, bat, stick, object, or equipment, tracking data and/or information received. The player performance tracking system computer can transmit any of the data and/or information it records directly to the bookmaker computer(s) for processing thereat, to an information/analytics provider computer(s) for processing thereat, and/or to a fraud detection system computer for processing thereat.

The central processing computer can also transmit the player performance tracking data and/or information and/or team performance tracking information, and/or any ball, puck, bat, stick, object, or equipment, tracking data and/or information to each fraud detection system computer during the game and/or as close to in real-time as possible so that the fraud detection system computer can process the same and can determine if any suspicious activities regarding any action or actions of any player or of team has been identified or could have possibly occurred. The player performance tracking system computer can transmit any of the data and/or information it records directly to the fraud detection system computer(s).

The central processing computer can also process the player performance tracking data and/or information and/or team performance tracking information, and/or any ball, puck, bat, stick, object, or equipment, tracking data and/or information, obtain results therefrom, and can transmit any results, or any data and/or information relating to, or indicative of, the results to any user communication device(s) associated with any individuals or users who may be interested in the same and/or to any of the herein-described electronic forums, chat rooms, or websites. The player performance tracking system computer can transmit any of the data and/or information it records directly to any user communication device(s) associated with any individuals or users who may be interested in the same and/or to any of the herein-described electronic forums, chat rooms, or websites.

Each bookmaker computer can process information regarding any betting activities and/or any bets which have been placed, along with times corresponding to the same, and/or along with any noted irregularities of evidence of suspicious betting activities indicative of game-fixing, match-fixing, or cheating, for and/or during each game, match, or competition, and can transmit the same to the central processing computer and/or to the fraud detection system computer. The central processing computer and/or the fraud detection system computer, can receive and process the information transmitted from the bookmaker 94 of received from any number of bookmaker computers, and determine if irregular or suspicious betting activities are occurring, or have occurred, during the game, match, or competition, which may be indicative of game-fixing, match-fixing, or cheating.

If irregular or suspicious betting activities have been identified, then the central processing computer and/or the fraud detection system computer can generate a suspicious activity report for the game, match, or competition, and can transmit the same to the bookmaker computer(s), to the sports governing body computer(s) for the particular sporting event or competition, and/or to the governmental entity computer(s) for the jurisdiction in which the sporting event or competition is taking, or has taken, place, and/or to any other fraud detection system computer(s). The central processing computer and/or the fraud detection system computer can generate and transmit a suspicious betting activity message and transmit the same to the user communication device(s) of any individual or user who placed a bet on the sporting event or competition and/or to any of the herein-described electronic forums, chat rooms, or websites, associated with or providing a transmission or broadcast of the sporting event or competition.

The apparatus of the present invention can provide information regarding player performance and/or team performance to individuals or users who have placed bets or wagers, or who are placing, or who are continuing to place, bets or wagers, on games, matches, or competitions, via the apparatus of the present invention. The apparatus can also provide bookmaker information, odds for bets or wagers and/or changes in odds for bets or wagers which are offered by one or more bookmakers or sportsbooks, and/or information regarding fraud alerts related to suspicious betting activities and/or related to questionable player performance or team performance, before and/or during a game, match, or competition. The apparatus of the present invention can also provide information regarding player performance and/or team performance to individuals or users who have placed bets or wagers, or who are placing, or who are continuing to place, bets or wagers, on games, matches, or competitions, bookmaker information, odds for bets or wagers and/or changes in odds for bets or wagers which are offered by one or more bookmakers or sportsbooks, and/or information regarding fraud alerts related to suspicious betting activities and/or related to questionable player performance or team performance, before and/or during a game, match, or competition, to any of the herein-described sport governing bodies, governmental entities, gaming facilities, content providers, information/analytics providers, social networks, fraud detection systems, financial institutions, bookmakers, escrow agents, and/or any other individuals or entities who or which use the present invention.

The apparatus of the present invention and/or the central processing computer can determine if a bet or wager is legal in a jurisdiction, state, country, or political subdivision, based on the individual's or user's position or location when he or she places the bet. If an individual or user must be physically located within a respective jurisdiction, state, country, or political subdivision, when placing a bet or wager, the apparatus or the central processing computer can determine, using position or location data or information obtained by the global positioning device of the user's user communication device, whether or not the individual or user is located within the respective jurisdiction, state, country, or political subdivision, when placing the bet or the wager.

If the individual or user is determined to be within the respective jurisdiction, state, country, or political subdivision, then the apparatus or the central processing computer can determine that the bet or the wager is legal and can process information for placing the bet or the wager. If, however, the apparatus or the central processing computer determines that the individual or user is not located within the respective jurisdiction, state, country, or political subdivision, when placing the bet or the wager, then the apparatus or the central processing computer can determine that the bet or the wager is not legal and can disallow the placing of the bet or the wager. The apparatus or the central processing computer can transmit navigation directions to a destination within the respective jurisdiction, state, country, or political subdivision, so that the bet can be placed automatically by or from the user's user communication device when individual or user arrives at that destination.

The apparatus and/or the central processing computer can also be programmed to use the position or location information regarding or obtained from the user communication device in order to identify a jurisdiction, country, state, province, or political subdivision, in which is sport betting activities are legal and which is located nearest to the user communication device. In this regard the apparatus and/or the central processing computer can identify, and provide information to the user communication device regarding, a jurisdiction, country, state, province, or political subdivision, in which is sport betting activities are legal and which is located nearest to the user communication device.

The collection, gathering, recording, and/or reporting, of various analytics data and/or information, from the various users and stakeholders, can provide for more efficient data and/or information gathering from multiple sources, and can provide the present invention with the capability to generate and/or to provide improved analytics products and/or services to, as well as new and next generation analytics products and/or services which can be are specifically tailored for, and directed at serving the needs of, any of the various stakeholders who or which utilize the present invention. For example, a sport governing body can obtain and/or be provided with analytics products or services regarding and/or pertaining to the number and/or amounts of bets placed, or taking place, on the league, teams, competitions, or tournaments, which the sport governing body governs, or can obtain analytics products or services regarding and/or pertaining to various player actions, game integrity or match integrity, and/or regarding and/or pertaining to any other subject of interest to that or any other sport governing body.

As and for another example, a governmental entity can, among numerous other things, obtain and/or be provided with analytics products and/or services regarding and/or pertaining to the number and/or amounts of bets placed, or being placed, by sport, game, match, tournament, or competition, which takes place within its borders, as well as the amounts of gaming fees which are or may be due to be paid to that governmental entity, and/or regarding and/or pertaining to any other subject of interest to that, or any other, governmental entity.

As and for still another example, a gaming facility or venue can, among numerous other things, obtain and/or be provided with analytics products and/or services regarding the number and/or amounts of bets placed, or being placed, by sport, game, match, tournament, or competition, which takes place within its facility or venue as well as the amounts of gaming fees which are or may be due to be paid to that gaming facility or venue, and/or regarding and/or pertaining to any other subject of interest to that, or any other, gaming facility or venue.

As and for another example, a content provider can, among numerous other things, obtain and/or be provided with analytics products and/or services regarding the number and/or amounts of bets placed, or being placed, by sport, game, match, tournament, or competition, which takes place before, during, or after, its providing of its content via the present invention, as well as the amounts of gaming fees which are or may be due to be paid to that content provider, and/or regarding and/or pertaining to any other subject of interest to that, or any other, content provider.

In a same, a similar, and/or an analogous manner, any information/analytics provider, financial institution, escrow agent, and/or social network, can obtain and/or be provided with any analytics products and/or services regarding any aspect of, or any subject of interest regarding and/or pertaining to, their respective business or businesses.

Any analytics data and/or information obtained by or from any of the herein-described user analytics devices, sport governing body analytics devices, governmental entity analytics devices, gaming facility/venue analytics devices, content provider analytics devices, information entity analytics devices, social network analytics devices, and/or wearable devices, can include data and/or information of any kind or type, and can also include data and/or information which can include video information, audio information, and/or text information.

Any of the analytics data and/or information products and/or services described herein can be provided to any user, individual, or stakeholder, who or which utilizes the apparatus of the present invention. Further, any of the analytics data and/or information products and/or services described herein can be provided to any user, individual, or stakeholder, who or which utilizes the apparatus of the present invention, before, during, or after, any game, match, competition, tournament, or event, and/or at any other time.

The apparatus can also be utilized to provide any user, individual, or stakeholder, who or which utilizes the apparatus of the present invention, with any analytics products and/or services at any time, at scheduled times, and/or on demand. The apparatus, the central processing computer, the information/analytics provider computer, and/or the central processing computer and distributed ledger/Blockchain technology system, can be specially programmed to generate any type or kind of any analytics product(s) and/or service(s), as well any type or kind of customized analytics products and/or services for any user, individual, or stakeholder, who or which utilizes the apparatus of the present invention. The apparatus, the central processing computer, the information/analytics provider computer, and/or the central processing computer and distributed ledger/Blockchain technology system, can be specially programmed to generate any type or kind of any analytics product(s) and/or service(s), as well any type or kind of customized analytics products and/or services for any user, individual, or stakeholder, who or which utilizes the apparatus of the present invention at any time, upon demand, and/or pursuant to a subscription or other service.

Each of the central processing computer(s), the user communication device(s), the sport governing body computer(s), the governmental entity computer(s), the gaming facility computer(s), the information/analytics provider computer(s), the social network computer(s), the financial institution computer(s), the escrow agent computer(s), and the wearable device(s), are specially programmed and/or specially configured to perform their respective functionalities.

The present invention provides and facilitates a global and international sports betting platform whereby individuals, users, or entities, can place bets on various sporting events, games, matches, activities, competitions, or tournaments, in a safe and secure manner and in a socially enjoyable environment. The present invention also provides and facilitates a global and international sports betting platform whereby governmental entities can regulate and oversee sports betting activities and whereby sports governing bodies can oversee sports betting activities in order to maintain the integrity of their sport. The present invention can also be utilized as a content distribution platform as well as an analytics products and/or services distribution platform.

DESCRIPTION OF THE PREFERRED EMBODIMENTS

Figure 1:
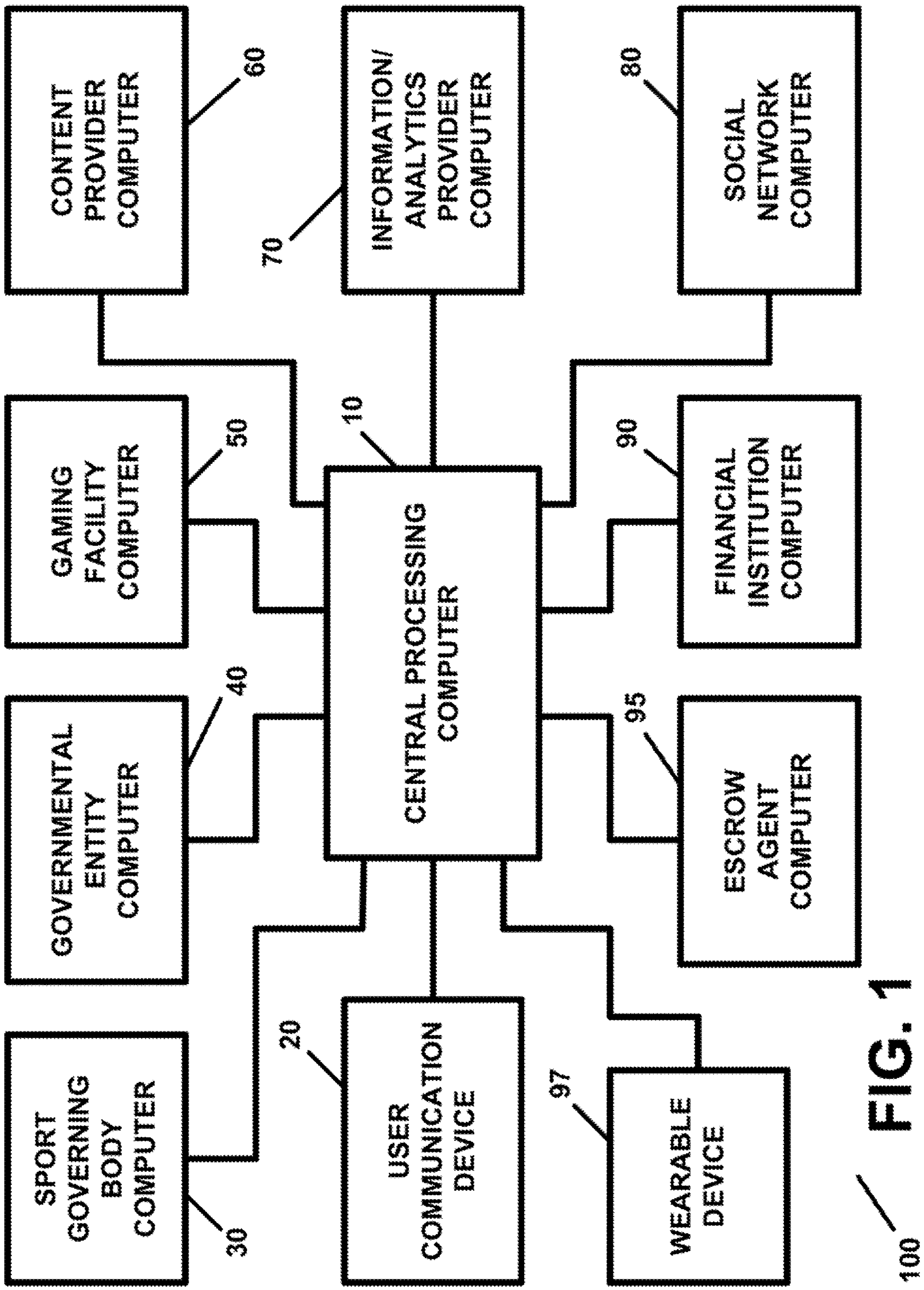
FIG. 1 illustrates a preferred embodiment of the apparatus of the present invention, in block diagram form.

The present invention pertains to an apparatus and methods for providing and/or for facilitating sports betting or wagering, and/or other gambling or gaming, activities, on, for, and relating to any types or kinds of sporting or athletic games, matches, events, contests, competitions, or tournaments, on, for, and relating to, any players or participants in or of the same, and/or on, for, and relating to, any plays, events, occurrences, or happenings (also referred to herein as "game events", "match events" or "micro-events"), before, during, or after, the same.

The present invention also pertains to an apparatus and methods for providing and/or for facilitating betting, gambling, or gaming, activities on and/or for fantasy sports and e-sports competitions and activities. The apparatus and methods of the present invention also provide and/or facilitate betting, gambling, or gaming, activities on and/or for any non-sports-related or non-athletic-related activity or event for which a bet or a wager can be placed between individuals, parties, or entities, who or which utilize the present invention. In this regard, while the apparatus and methods of the present invention can be utilized in a preferred embodiment for sports betting, they can also be utilized for any other betting, gambling, or gaming, activity which can the subject of a bet or wager between individuals, parties, or entities.

The apparatus and methods of the present invention also provide a platform and a network infrastructure by which sports betting of any nature, type, or kind, can be engaged in by any individuals, parties, or entities. The apparatus and methods of the present invention also provide a system whereby, sports governing bodies, such as the International Olympic Committee (hereinafter the "IOC"), national Olympic committees ("NOCs"), international sports federations ("IFs"), regional sports federations and/or confederations, national sports federations ("NFs"), sports conferences, sports leagues at any level (such as for example, professional, amateur, college or university, semi-professional, high school, grade school, and/or local clubs or organizations), teams in any of the foregoing leagues or clubs, and/or players in any of the foregoing leagues or clubs, governmental regulatory bodies, such as national, state, and/or local, governmental regulatory bodies, gamming or gambling facilities, such as venues where events take place, casinos or betting halls, on-line casinos or on-line betting halls, financial institutions, escrow agents, content providers, television broadcasters, streaming video and/or streaming audio providers, and social networks and social network providers, providers of analytics data and/or information, sports analytics information, news information, and/or any other information, along with the individual parties or entities who engage in sports betting or sports betting activities, can all come together to utilize the apparatus and methods of the present invention.

The present invention also pertains to, and provides, an apparatus and methods which can allow individuals, parties, and entities, who or which place bets or wagers on any of the herein-described games, matches, activities, or events, whether sports-related or non-sports-related, to watch and/or listen to a video and/or audio transmission of the same. Bets or wagers can also be placed during the respective game, match, activity, or event. These bets or wagers can be placed using the same communication device which is being used to watch and/or listen to the respective game, match, activity, or event.

The apparatus and methods of the present invention can allow individuals, parties, and entities, who or which place bets or wagers on any of the herein-described games, matches, activities, or events, whether sports-related or non-sports-related, to watch and/or listen to a video and/or audio transmission of the same in a group environment, a social networking environment, or in a chat room environment, and to place bets or wagers during the respective game, match, activity, or event, as well as to place bets or wagers on game events, match event, or micro-events, during the respective game, match, activity, or event.

The apparatus and methods of the present invention can also allow individuals, parties, and/or entities, to watch and/or listen to games, matches, activities, or events, in and/or using 360 degree video, virtual reality ("VR"), and/or augmented reality ("AR"), technologies while allowing the individuals, parties, and/or entities to also engage in placing bets or wagers via the respective 360 degree video, VR, or AR, user interface(s).

The apparatus and methods of the present invention can also allow individuals, parties, and/or entities, to engage in social networking activities while watching and/or listening to a game, match, activity, or event, and in discussing or engaging in sports betting and/or sports betting activities. Individuals, parties, and/or entities, can also place bets or wagers during any social networking activities or discussions.

The apparatus and methods of the present invention can also allow individuals, parties, and/or entities (also referred to as "users"), to engage in a chat room discussion prior to, after, or while watching and/or listening to, a sporting event or any other game, match, activity, or event, and can allow users to place bets on the same. The apparatus and methods of the present invention can also be utilized to allow users to place private bets with one another and/or in pools of individuals, parties, and/or entities.

The apparatus and methods of the present invention can also be utilized to provide users with sports analytics data and/or information, analytics information, news information, and/or statistical, probabilistic, or other, information, for use in engaging in sports betting activities.

The apparatus and methods of the present invention can also be utilized to allow users to engage in selecting or predicting next plays or other activities and/or game events, match events, or micro-events, during a sporting event or any game, match, activity, or event. Users can place bets on game events, match events, or micro-events, and/or users can engage in competitions to predict game events, match events, or micro-events, for betting or wagering purposes, for recreational purposes, such as to engage in competitions with other users, and/or for training purposes such as when an individual may desire to train to be a team coach or manager.

The apparatus and methods of the present invention can be utilized to provide any and/or all of the functionality described herein in order to provide a new and novel sports betting platform which can provide users with a safe, regulated, and dynamic, environment for engaging in sports betting and/or wagering activities of any kind or type.

Applicant hereby incorporates by reference herein the subject matter and teachings of U.S. Provisional Patent Application Ser. No. 62/816,943, filed Mar. 12, 2019, and entitled "SPORTS BETTING APPARATUS AND METHOD", the subject matter and teachings of which are hereby incorporated by reference herein in their entirety.

FIG. 1 illustrates a preferred embodiment of the apparatus of the present invention which is designated by reference numeral 100, in block diagram form. With reference to FIG. 1, the apparatus includes a central processing computer or server computer 10 (hereinafter "central processing computer 10"). The central processing computer 10 can include any number of central processing computers and/or computer systems. In this regard, the central processing computer 10 can be a single computer or server computer or can include a plurality of any number of computers, server computers, or computer systems. In this regard, in any and/or all of the embodiments described herein, the central processing computer 10 can be comprised of one computer or computer system and/or can be comprised of a plurality of computers or computer systems. Any number of central processing computers 10 can be utilized in the apparatus 100 of the present invention.

In the preferred embodiment, the central processing computer 10 is specially programmed and specially configured to provide a sports betting, gambling, or gaming, platform which can provide and/or which can perform all the functionalities described herein as being performed by the apparatus 100 and methods of the present invention. The central processing computer 10, in the preferred embodiment, is also specially programmed and/or specially configured to perform any of and/or all of the processing routines and/or functionalities described herein as being performed by the apparatus 100 of the present invention.

The central processing computer 10, in a preferred embodiment, can be associated with, and/or can used by, any sports betting provider, sports gaming provider, sports gaming facility, or sports gaming venue, and/or any betting provider, and/or any number of betting providers, sports betting providers, sports gaming providers, sports gaming facilities, or sports gaming venues. In a preferred embodiment, the central processing computer 10 can also be associated with, and/or can be used by, any sports betting provider or service of or associated with any sports governing body such as, for example, the International Olympic Committee, national Olympic committees, international sports federations, regional sports federations and/or confederations, national sports federations, sports conferences, or sports leagues, with any governmental entities, and/or with any gaming facilities, in providing sports betting. In the preferred embodiment, the central processing computer 10 will have a website or websites associated therewith as an interface for any of the users or other entities described herein as using or participating in using the apparatus 100 and methods of the present invention.

With reference to FIG. 1, the apparatus 100 also includes any number of user computers or user communication devices 20 (hereinafter "user communication device 20"). The user communication device 20 can be utilized by any user, individual, party, or entity, who or which uses the apparatus 100 of the present invention in order to communicate with the central processing computer(s) 10 described herein and/or to communicate with any of the other computers and communication devices described herein as being utilized in or with the apparatus 100.

In the preferred embodiment, the user communication device 20 can communicate with, and/or can be linked with, the central processing computer(s) 10 and/or any other computers or communication devices described herein, via a wired communication network, a wireless communication network, or via any combination of wired and/or wireless communication networks.

The user communication device 20 can be utilized by any of the herein-described users in order to interface with, and/or interact with, the central processing computer 10 or with any of the other computers and communication devices described herein as being used in or with the apparatus 100. In the preferred embodiment, the user communication device 20 can be a computer, a computer terminal, a terminal device connected to, or associated with, the central processing computer 10, a kiosk, a personal computer, a home computer, a personal communication device, a telephone, an interactive television, a smart phone, a cellular telephone, a wireless telephone, a videophone, a video telephone, a personal digital assistant, a watch, a smart watch, a 360 degree video headset or interface, a VR (virtual reality) headset or interface, an AR (augmented reality) headset or interface, a wearable communication device, glasses equipped with communications equipment, a beeper or a pager, or any other communication device or equipment. The user communication device 20 can also be a server computer, a network computer, or any other computer capable of being utilized in a network.

The user communication device 20 can also include and/or be utilized in conjunction with a network computer or any other computer which can be utilized to send and receive text messages and/or e-mail messages for or on behalf of a user. The network computer, in the preferred embodiment, can be any computer which can be used in a computer communication network to transmit and/or receive text messages or e-mail messages to and/or from any of the herein-described user communication devices 20 and/or can provide a text message or an e-mail message to the user communication device 20. In any and/or all of the embodiments described herein, the respective network computer or other computer can also automatically transmit or "push" a text message or an e-mail message or e-mail messages to a user communication device 20 as soon as same are received and/or in real-time.

In any and/or all of the embodiments described herein, the respective network computer or computer can also serve as a conventional text message server or as an e-mail server which can allow a user to request or "pull" a text message or an e-mail message or e-mail messages to a user communication device 20 when requested by the user or other authorized individual. In this regard, any network computer or other computer, such as one that can receive and send text messages or email messages to a user communication device 20 is also considered to be a user communication device 20 in and of itself. In this regard, text message server or an e-mail server can also be deemed to be a user communication device 20. In a preferred embodiment, each user communication device 20 can also have a website or websites associated therewith.

In the preferred embodiment, any number of user communication devices 20 can be utilized in, or in connection with, the apparatus 100. The user communication devices 20 described herein can be utilized to communicate with the central processing computer(s) 10 and/or with any other computers or communication devices described herein in a bi-directional manner.

With reference once again to FIG. 1, the apparatus also includes a sport governing body computer or computer system 30 (hereinafter "sport governing body computer 30") or any number of sport governing body computers 30 which can be used by, and/or which can be associated with, any sports governing body, such as, for example, but not limited to, the International Olympic Committee, a national Olympic committee, an international sports federation, a regional sports federation or confederation, a national sports federation, a sports conference, a sport league (such as, for example, the U.S. Professional leagues such as the National Football League (NFL), the National Basketball Association (NBA), Major League Baseball (MLB), the National Hockey League (NHL), Major League Soccer (MLS), or any other U.S. sports league or conference, or in Europe, for example, the Premier League, La Liga, or the UEFA Champions League, in soccer (also referred to as "football" outside the U.S.), or any sports governing body, league, or conference, of or on any level.

The respective sport governing body can utilize its respective sport governing body computer 30 to utilize the apparatus 100 and methods of the present invention for any purpose such as, for example, for monitoring and/or for providing oversight and/or for regulating sports betting activities or sports wager activities regarding games, matches, events, activities, competitions, or tournaments, in its sport, country or political subdivision, league, or conference. The sport governing body computer 30 can be utilized to allow the sport governing body, or an employee or agent of same, to communicate with and/or to interact with the central processing computer(s) 10, the user communication devices 20, and/or with any of the other computers and communication devices described herein as being used in or with the apparatus 100. In the preferred embodiment, the sport governing body computer 30 can communicate with, and/or be linked with, the central processing computer(s) 10 and/or any other computer or communication devices described herein, via a wired communication network, a wireless communication network, or via any combination of wired and/or wireless communication networks.

The sport governing body computer 30 can be utilized by any of the herein-described sport governing bodies in order to interface with, and/or interact with, the central processing computer 10 or with any other computers and communication devices described herein as being utilized in or with the apparatus 100. In a preferred embodiment, each sport governing body computer 30 can include any number of computers, server computers, or computer systems. In a preferred embodiment, each sport governing body computer 30 can also have a website or websites associated therewith.

With reference once again to FIG. 1, the apparatus also includes a governmental entity computer or computer system 40 (hereinafter "governmental entity computer 40") which can be used by, and/or which can be associated with, a governmental entity which can, for example, be a national government, federal government, regional government, state government, provincial government, state government, local government, municipal government, or any other government of any political or geographical subdivision. The governmental entity computer 40 can also be used by, and/or can be associated with, a gaming commission, a gaming administrator, or any other entity which can regulate, oversee, and/or administer, sports betting activities or sports wagering activities, or any other betting, wagering, gambling, or gaming activities, of any kind or type.

The governmental entity computer 40 can be utilized to allow the governmental entity, or an employee or agent of same, to communicate with and/or interact with the central processing computer(s) 10, the user communication devices 20, the sport governing body computer 30, and/or with any of the other computers and communication devices described herein as being utilized in or with the apparatus 100. In the preferred embodiment, the governmental entity computer 40 can communicate with, and/or can be linked with, the central processing computer(s) 10 and/or any other computer or communication devices described herein, via a wired communication network, a wireless communication network, or via any combination of wired and/or wireless communication networks.

The governmental entity computer 40 can be used by its respective governmental entity for any purpose such as, for example, for monitoring and/or for providing oversight and/or for regulating sports betting activities or sports wager activities regarding games, matches, events, or activities, within its jurisdiction.

The governmental entity computer 40 can be utilized by any of the herein-described governmental entities in order to interface with, and/or interact with, the central processing computer 10 or with any other computers and communication devices described herein as being used in or with the apparatus 100. In a preferred embodiment, each governmental entity computer 40 can include any number of computers, server computers, or computer systems. In a preferred embodiment, each governmental entity computer 40 can also have a website or websites associated therewith.

With reference once again to FIG. 1, the apparatus also includes a gaming facility or venue computer or computer system 50 (hereinafter "gaming facility computer 50") which can be used by, and/or which can be associated with, a gaming facility or venue such as, for example, a casino, a race track, or a betting establishment or a sport betting establishment, or a stadium, an arena, a gambling hall, a gaming outlet, a boat, a ship, a cruise ship, a commercial boat, a passenger boat, a ferry, a marine vehicle, a marine vessel, an aircraft, an airplane, a jet, a passenger aircraft, a shuttle aircraft, a commercial aircraft, a train, a subway train, a bus, and/or an automobile, a website, and/or any other entity or venue which can be the place, location, and/or venue, of a sporting event or an entity at which one may engage in sports betting activities or gambling or gaming activities of any type or kind.

The gaming facility computer 50 can be utilized to allow the gaming facility or venue, or an employee or agent of same, to communicate with and/or interact with the central processing computer(s) 10, the user communication devices 20, the sport governing body computer 30, the governmental computer 40, and/or with any of the other computers and communication devices described herein as being utilized in or with the apparatus 100. In the preferred embodiment, the gaming facility computer 50 can communicate with, and/or can be linked with, the central processing computer(s) 10 and/or any other computer or communication devices described herein, via a wired communication network, a wireless communication network, or via any combination of wired and/or wireless communication networks.

The gaming facility computer 50 can be used by its respective gaming facility or venue for any purpose such as, for example, for monitoring and/or for providing oversight and/or for regulating sports betting activities or sports wager activities regarding games, matches, events, or activities, within its facility or venue.

The gaming facility computer 50 can be utilized by any of the herein-described gaming facilities or venues in order to interface with, and/or interact with, the central processing computer 10 or with any other computers and communication devices described herein as being used in or with the apparatus 100. In a preferred embodiment, each gaming facility computer 50 can include any number of computers, server computers, or computer systems. In a preferred embodiment, each gaming facility computer 50 can also have a website or websites associated therewith.

The gaming facility computer 50 can also include a kiosk, or any number of kiosks, or a computer terminal or any number of computer terminals, or any other interface(s), for allowing an individual attending the gaming facility or venue, such as to attend a sporting event, game, or match, to access the central processing computer in order to place a bet or a wager on the same or to place a bet or wager on any other sporting event, game, or match. In this regard, an individual can use the gaming facility computer 50 to place a bet or wager on a sporting event taking place at the gaming facility or venue while the individual is at or in the facility or venue and without using his or her user communication device 20.

With reference once again to FIG. 1, the apparatus also includes a content provider computer or computer system 60 (hereinafter "content provider computer 60") which can be used by, and/or which can be associated with a television broadcasting network or station, a radio broadcasting network or station, an Internet streaming video and/or audio provider, or any other content provider. The content provider computer 60 can be utilized to allow the content provider to broadcast or transmit, whichever the case may be, its respective content to any users of the apparatus 100 as well as to communicate with and/or interact with the central processing computer(s) 10, the user communication devices 20, the sport governing body computer 30, the governmental entity computer 40, the gaming facility computer 50, and/or with any of the other computers and communication devices described herein as being utilized in or with the apparatus 100. In the preferred embodiment, the content provider computer 60 can communicate with, and/or can be linked with, the central processing computer(s) 10, any of the user communication devices 20, and/or any other computers or communication devices described herein.

In the preferred embodiment, the content provider computer 60 can communicate with, and/or can be linked with, the central processing computer(s) 10, any of the user communication devices 20, and/or any other computers or communication devices described herein, via a wired communication network, a wireless communication network, or via any combination of wired and/or wireless communication networks. In a preferred embodiment, the content provider computer 60 can transmit content, such as television broadcasts or Internet streaming broadcasts of video or audio of sporting events directly to a user communication device 20 or to the central processing computer 10 for re-transmission to a user communication device 20. In a preferred embodiment, the content provider computer 60 can also transmit content, such as television broadcasts or Internet streaming broadcasts of video and/or audio of sporting events, in or as 360 degree videos, immersive videos, spherical videos, in virtual reality, or in augmented reality, directly to a user communication device 20 or to the central processing computer 10 for re-transmission to a user communication device 20. In this regard, in a preferred embodiment, the content provider computer 60 and the central processing computer 10 are also specially programmed and specially configured to transmit sporting events in or as 360 degree video, immersive video, or spherical video, in virtual reality (VR), and/or in augmented reality (AR).

In a preferred embodiment, each content provider computer 60 can include any number of computers, server computers, or computer systems. In a preferred embodiment, each content provider computer 60 can also have a website or websites associated therewith.

With reference once again to FIG. 1, the apparatus also includes an information/analytics provider computer or computer system 70 (hereinafter "information/analytics provider computer 70") which can be used by, and/or which can be associated with an information provider, such as for example, a news service, a news website, a website associated with a newspaper or other periodical, an analytics company, a sports analytics company, an analytics provider, an analytics service, and/or any other provider of any data and/or information which can be utilized by users of the apparatus 100 in engaging is sports betting activities or sports wagering activities, of any kind or type.

The information/analytics provider computer 70 can be utilized to provide information, news, analytics information, sports analytics data and/or information, or any other statistical, historical, predictive, or forecasting, data and/or information, to any users of the apparatus 100 of the present invention. The information/analytics provider computer 70 can be utilized by the respective information/analytics provider associated with the same in order to communicate with and/or to interact with the central processing computer(s) 10, the user communication devices 20, the sport governing body computer 30, the governmental entity computer 40, the gaming facility computer 50, the content provider computer 60, and/or any of the other computers and communication devices described herein as being utilized in or with the apparatus 100. In the preferred embodiment, the information/analytics provider computer 70 can communicate with, and/or can be linked with, the central processing computer(s) 10, any of the user communication devices 20, and/or any other computers or communication devices described herein.

In the preferred embodiment, the information/analytics provider computer 70 can communicate with, and/or can be linked with, the central processing computer(s) 10, any of the user communication devices 20, and/or any other computers or communication devices described herein, via a wired communication network, a wireless communication network, or via any combination of wired and/or wireless communication networks. In a preferred embodiment, the information/analytics provider computer 70 can transmit information, news, analytics information, sports analytics data and/or information, or any other statistical, historical, predictive, or forecasting, data and/or information, directly to a user communication device 20 or to the central processing computer 10 for re-transmission to a user communication device 20.

In a preferred embodiment, each information/analytics provider computer 70 can include any number of computers, server computers, or computer systems. In a preferred embodiment, each information/analytics provider computer 70 can also have a website or websites associated therewith.

With reference once again to FIG. 1, the apparatus also includes a social network computer or computer system 80 (hereinafter "social network computer 80") which can be used by any social networking company or any social networking provider to provide social networks, social networking services, and/or social networking forums, to and/or for any of the users of the apparatus 100 of the present invention.

The social network computer 80 can be utilized by the social networking company or a social networking provider associated with the same in order to communicate with and/or to interact with the central processing computer(s) 10, the user communication devices 20, the sport governing body computer 30, the governmental entity computer 40, the gaming facility computer 50, the content provider computer 60, the information/analytics provider computer 70, and/or any of the other computers and communication devices described herein as being utilized in or with the apparatus 100. In the preferred embodiment, the social network computer 80 can communicate with, and/or can be linked with, the central processing computer(s) 10, any of the user communication devices 20, and/or any other computers or communication devices described herein.

In the preferred embodiment, the social network computer 80 can communicate with, and/or be linked with, the central processing computer(s) 10, any of the user communication devices 20, and/or any other computers or communication devices described herein, via a wired communication network, a wireless communication network, or via any combination of wired and/or wireless communication networks. In a preferred embodiment, the social network computer 80 can transmit information directly to a user communication device 20 or to the central processing computer 10 for re-transmission to a user communication device 20.

In a preferred embodiment, each social network computer 80 can include any number of computers, server computers, or computer systems. In a preferred embodiment, each social network computer 80 can also have a website or websites associated therewith.

With reference once again to FIG. 1, the apparatus 100 also includes a financial institution/intermediary computer or computer system 90 (hereinafter "financial institution computer 90") which can be used by, and/or which can be associated with a bank, a credit card company or service, a debit card company or service, a charge card company or service, an electronic money account service, or any other financial institution which can administer and/or service financial accounts and/or any of the sports betting accounts, gaming accounts, or gambling accounts, for any of the herein-described individuals, users, entities, sports governing bodies, governmental entities, gaming facilities or venues, content providers, information/analytics providers, social networking companies or social networking providers, and/or escrow agent service providers, who or which use the apparatus 100 of the present invention.

The financial institution computer 90, in a preferred embodiment, can communicate with and/or can interact with the central processing computer(s) 10, the user communication devices 20, the sport governing body computer 30, the governmental entity computer 40, the gaming facility computer 50, the content provider computer 60, the information/analytics provider computer 70, the social network computer 80, and/or with any of the other computers and communication devices described herein as being utilized in or with the apparatus 100. In the preferred embodiment, the financial institution computer 90 can communicate with, and/or be linked with, the central processing computer(s) 10, any of the user communication devices 20, and/or any other computers or communication devices described herein.

In the preferred embodiment, the financial institution computer 90 can communicate with, and/or be linked with, the central processing computer(s) 10, any of the user communication devices 20, and/or any other computers or communication devices described herein, via a wired communication network, a wireless communication network, or any combination of wired and/or wireless communication networks.

In a preferred embodiment, each financial institution computer 90 can include any number of computers, server computers, or computer systems. In a preferred embodiment, each financial institution computer 90 can also have a website or websites associated therewith.

With reference once again to FIG. 1, the apparatus 100 can also include an escrow agent computer or computer system 95 (hereinafter referred to as "escrow agent computer 95") which can be used by, and/or associated with, an escrow agent or an escrow facility for holding bets or wagers and/or any other monies or objects which can be the subject of the bet or wager, for any user of the apparatus 100. In the preferred embodiment, the escrow agent or escrow facility is a neutral administrator who or which can act as the escrow agent for a party or parties to a bet or wager and/or who or which can be the officiating party or entity over a bet or wager when and/or if such a service or services are or may be needed and/or desired.

The escrow agent computer 95, in a preferred embodiment, can communicate with and/or interact with the central processing computer(s) 10, the user communication devices 20, the sport governing body computer 30, the governmental entity computer 40, the gaming facility computer 50, the content provider computer 60, the information/analytics provider computer 70, the social network computer 80, the financial institution computer 90, and/or any of the other computers and communication devices described herein as being utilized in or with the apparatus 100. In the preferred embodiment, the escrow agent computer 95 can communicate with, and/or can be linked with, the central processing computer(s) 10, any of the user communication devices 20, and/or any other computers or communication devices described herein.

In the preferred embodiment, the escrow agent computer 95 can communicate with, and/or be linked with, the central processing computer(s) 10, any of the user communication devices 20, and/or any other computers or communication devices described herein, via a wired communication network, a wireless communication network, or any combination of wired and/or wireless communication networks.

In a preferred embodiment, each escrow agent computer 95 can include any number of computers, server computers, or computer systems. In a preferred embodiment, each escrow agent computer 95 can also have a website or websites associated therewith.

With reference once again to FIG. 1, the apparatus 100 can also include a wearable device 97 which can be worn by, or attached to the clothing or uniform of, an athlete or player during a respective game, match, or competition. In the preferred embodiment, the wearable device 97 can be any one the many wearable devices which are equipped for, or utilized for, measuring and transmitting biological data and/or information, physiological data and/or information, pulse rate, heart rate, blood pressure, blood-sugar level or blood-glucose level data and/or information, and/or any other data and/or information. The wearable device 97 can also be equipped for, or utilized for, measuring steps taken, distance traveled, speed of travel, and/or any other data and/or information for monitoring an athlete's or a player's movements and/or performance during a game, match, or competition. Any number of wearable devices 97 can be utilized with or in conjunction with the apparatus 100.

The wearable device 97, in a preferred embodiment, can communicate with and/or can interact with the central processing computer(s) 10, the user communication devices 20, the sport governing body computer 30, the governmental entity computer 40, the gaming facility computer 50, the content provider computer 60, the information/analytics provider computer 70, the social network computer 80, the financial institution computer 90, and/or any of the other computers and communication devices described herein as being utilized in or with the apparatus 100. In the preferred embodiment, the wearable device 97 can communicate with, and/or can be linked with, the central processing computer (s) 10, any of the user communication devices 20, and/or any other computers or communication devices described herein.

In the preferred embodiment, the wearable device 97 can communicate with, and/or be linked with, the central processing computer(s) 10, any of the user communication devices 20, and/or any other computers or communication devices described herein, via a wired communication network, a wireless communication network, or any combination of wired and/or wireless communication networks.

In a preferred embodiment, any number of central processing computers 10, user communication devices 20, sport governing body computers 30, governmental entity computers 40, gaming facility computers 50, content provider computers 60, information/analytics provider computers 70, social network computers 80, financial institution computers 90, escrow agent computers 95, and wearable devices 97, can be utilized in, and/or in connection with or in association with, the apparatus 100 of the present invention.

In a preferred embodiment, any of the central processing computers 10, the user communication devices 20, the sport governing body computers 30, the governmental entity computers 40, the gaming facility computers 50, the content provider computers 60, the information/analytics provider computers 70, the social network computers 80, the financial institution computers 90, the escrow agent computers 95, and/or wearable devices 97, can communicate with any other central processing computer(s) 10, user communication device(s) 20, sport governing body computer(s) 30, governmental entity computer(s) 40, gaming facility computer(s) 50, content provider computer(s) 60, information/analytics provider computer(s) 70, social network computer(s) 80, financial institution computer(s) 90, escrow agent computer(s) 95, and/or wearable device(s) 97, in a bi-directional manner. In this regard, any computer or communication device described herein can communicate, in a bi-directional manner, with any other computer or communication device regardless of whether the respective computer or communication device is a central processing computer 10, a user communication device 20, a sport governing body computer 30, a governmental entity computer 40, a gaming facility computer 50, a content provider computer 60, an information/analytics provider computer 70, a social network computer 80, a financial institution computer 90, an escrow agent computer 95, and/or a wearable device 97.

In the preferred embodiment, the apparatus 100 and methods of the present invention is utilized on, over, or via, the Internet and/or the World Wide Web. In the preferred embodiment, the apparatus 100 and methods of the present invention can also be utilized over any suitable communication network and/or any combination of computer networks, including, but not limited to the Internet, the World Wide Web, a telecommunication network or system, a telephone network or system, a cable television communication network or system, a satellite television communication network or system, a digital television network or system, a satellite communication network or system, a broadband communication network or system, a radio frequency communication network or system, an optical communication network or system, a line-connected network or system, a wireless network or system, a radio communication network or system, a digital communication network or system, a personal communications services (PCS) network or system, a local area network (LAN), a wide area network (WAN), a wireless Internet network or system, a wireless World Wide Web network or system, an optical communication network or system, a broadband communication network or system, a Bluetooth communication network or system, a streaming video and communication network or system, a streaming audio communication network or system, a live video communication network or system, and/or any other suitable communications network or system, and/or any combination(s) thereof.

Figure 2:
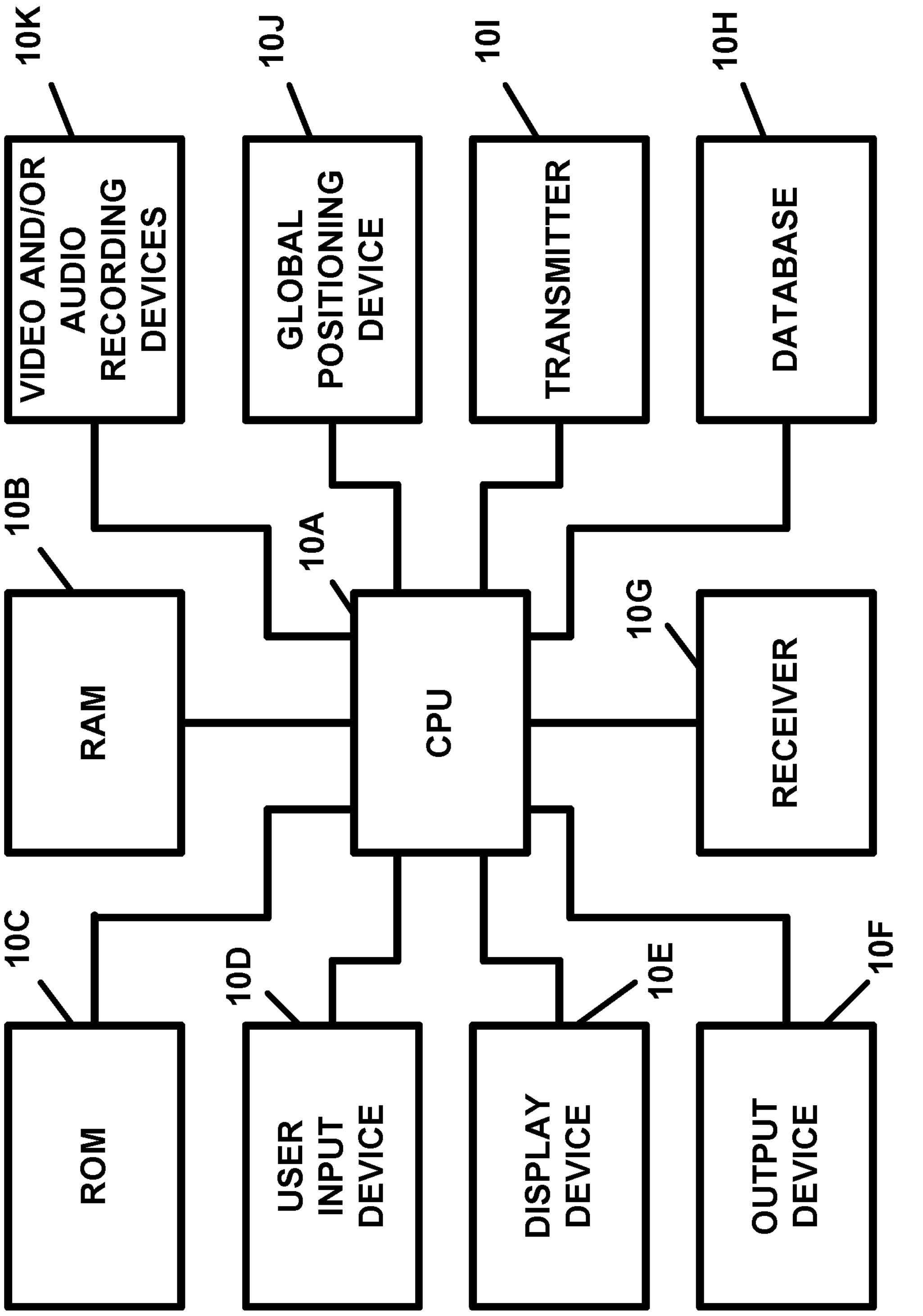
FIG. 2 illustrates the central processing computer of FIG. 1, in block diagram form.

FIG. 2 illustrates the central processing computer 10 of FIG. 1, in block diagram form. With reference to FIG. 2, the central processing computer 10 includes a central processing unit (CPU) 10A. The central processing unit (CPU) 10A may be a microprocessor, a microcomputer, a minicomputer, a macro-computer, or a mainframe computer, depending upon the application. The CPU 10A is specially programmed and/or specially configured to perform all of the functionality described herein as being performed by the central processing computer 10.

The central processing computer 10 also includes a random access memory (RAM) device(s) 10B and a read only memory (ROM) device(s) 10C which are connected to the CPU 10A. The central processing computer 10 also includes a user input device(s) 10D which can be or can include any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, instructions, or commands, to be entered into the central processing computer 10. The input device(s) 10D is also connected to the CPU 10A. In a preferred embodiment, data, information, instructions, or commands, can also be input using voice a microphone as an input device and recognition software.

The central processing computer 10 also includes a display device 10E, such as a display monitor and/or a display screen, for providing the herein-described data and/or information to the operator or user of the central processing computer 10. The display device 10E is also connected to the CPU 10A.

The central processing computer 10 can also include an output device 10F, such as a printer, a display device, and/or a modem, for outputting, in either or both of hard copy form or electronic form, any of the data and/or information which is described herein as being provided by, from, or at, the central processing computer 10. The output device 1OF can also be connected to the CPU 10A.

The central processing computer 10 can also include a receiver 10G for receiving data and/or information, including any of the herein-described data and/or information, and/or any of the other data and/or information described herein as being provided to the central processing computer 10 from any of the user communication devices 20, from any of the sport governing body computers 30, from any of the governmental entity computers 40, from any of the gaming facility computers 50, from any of the content provider computers 60, from any of the information/analytics provider computers 70, from any of the social network computers 80, from any of the financial institution computers 90, from any of the escrow agent computers 95, from any of the wearable devices 97, or from any of the other central processing computers 10.

The central processing computer 10 can also include a database(s) 10H, which can contain any data and/or information, and/or software programs or software applications, which may be required, and/or which may be desired, for performing any of the functionality and/or processing routines described herein as being performed by the central processing computer 10 and/or the apparatus 100.

In a preferred embodiment, the database 10H can contain data and/or information regarding each individual, party, entity, or user, who or which uses the apparatus 100 of the present invention to engage in sports betting or in any other sports betting, gambling, gaming, betting, or wagering, activities. The database 10H can also contain data and/or information for each sports governing body, league, team, and player of any team or club, for each governmental entity, for each gaming facility or venue, for each content provider, for each information/analytics provider, for each social network, for each financial institution, and for each escrow agent, and for each team, club, or player, which or who participates in games, matches, or competitions, which can be the subject of a bet or on which bets can be placed.

For each individual, party, entity, or user, the database 10H can contain any and/or all data and/or information regarding the sports betting, or other betting, history and/or betting patterns. For each sports betting account, gaming account, or gambling account, serviced by the apparatus 100 of the present invention, the database 10H can contain data and/or information for each bet placed on the respective account, the data and time of the bet, the sporting event, game, match, activity, competition, or tournament, which was the subject of the bet, the position taken by the bet or the bet made, the amount of the bet, whether or not the bet was placed in escrow, whether suspected game fixing, match fixing, or cheating, activity was noted for the sporting event, game, match, activity, competition, or tournament, the outcome of the sporting event, game, match, activity, competition, or tournament, whether the bet was a winning bet or a losing bet, a link to a recording of the respective electronic forum, chat room, or webpage, activity for the respective electronic forum, chat room, or webpage, via which the sporting event, game, match, activity, competition, or tournament, was watched or listened to, and/or any other data and/or information pertaining to each bet placed on the respective sporting event, game, match, activity, competition, or tournament. A video and/or audio recording of the placement of, or the making of, the bet can also be stored in the database 10H for each bet for which such a recording was made.

For each individual, party, entity, or user, and for each sports governing body, league, team, and player of the team, for each governmental entity, for each gaming facility or venue, for each content provider, for each information/analytics provider, for each social network, for each financial institution, and for each escrow agent, the database 10H can contain data and/or information regarding he, she, or its, name, address, telephone number, cellular telephone number, text messaging number, mail address, website (if applicable), financial account information, sports betting account information, gaming account information, gambling account information, bank account number, credit account number, credit card account number, debit account number, debit card account number, charge account number, charge card account number, electronic money account number, payment service provider (for example, PayPal® or other payment system), information regarding any limitation(s) or restrictions on an individual's, party's, entity's, or user's, sports betting account, gaming account, gambling account, sports betting. gaming account, or gambling account, betting limits for an individual's, party's, entity's, or user's, any restrictions or limitations placed on a use of the sports betting account, gaming account, gambling account, respective account, sports, leagues, teams, clubs, or players, or games, matches, or events for which an individual, party, entity, or user, has expressed an interested in placing sports bets or wagers, information regarding an individual's, party's, entity's, or user's, sports betting history, sports wagering history, or gambling or gaming history, information regarding an individual's, party's, entity's, or user's, request to receive alerts regarding sporting events for which the individual, party, entity, or user, may be interested in pacing a bet or wager, information regarding an individual's, party's, entity's, or user's, request to receive alerts regarding betting odds, changes in betting odds, and/or analytics information, regarding sporting events for which the individual, party, entity, or user, may be interested in pacing a bet or wager, sports, games, matches, events, or activities in which the individual, party, entity, or user, is interested in placing a sports bet or wager or any bet or wager, games or games of chance which can be played via the apparatus 100 of the present invention, sporting events, games, matches, activities, competitions, or tournaments, and/or or any other gaming activities or games of chance, for which bets can be placed or which can be the subject of sport betting activities, schedules of sporting events, games, matches, activities, competitions, or tournaments, results of, sporting events, games, matches, activities, competitions, or tournaments, analytical information, historical information, statistical information, and/or forecasting information, and information regarding results regarding, sporting events, games, matches, activities, competitions, or tournaments, and/or any other data and/or information described herein and/or otherwise which is needed and/or desired in order to perform any and/or all of the processing routines and/or functionality described herein as being performed by and/or provided by the apparatus 100 and methods of the present invention and/or by the central processing computer 10, and/or by any of the user communication devices 20, sport governing body computers 30, governmental entity computers 40, gaming facility computers 50, content provider computers 60, information/analytics provider computers 70, social network computers 80, financial institution computers 90, escrow agent computers 95, and/or wearable devices 97, described herein.

The database 10H can also contain any needed software for providing electronic forums, chat rooms, video conference calls, Skype™ or other video conference calls, and telephone conference calls, which can be monitored and recorded, and the database 10H can store recorded electronic forum sessions, chat room sessions, video conference calls, Skype™ or other video conference calls, and/or telephone conference calls, involving any individuals, parties, entities, or users, and/or any individuals representing any of the users or operators of any of the herein-described sport governing body computers 30, the governmental entity computers 40, the gaming facility computers 50, the content provider computers 60, the information/analytics provider computers 70, the social network computers 80, the financial institution computers 90, and/or the escrow agent computers 95.

The database 10H can also contain data and/or information regarding schedules, and/or television broadcast schedules, or streaming video and/or audio transmission schedules, if applicable and/or available, for all games, matches, events, competitions, tournaments, or activities, for all sports, leagues, teams, players, or athletes, for which sports betting activity can occur via the apparatus 100, and/or any other sport betting, gaming, or gambling, activities which can be performed with or via the apparatus 100 of the present invention.

The database 10H can also contain software programs or software applications needed for providing 360 degree videos, immersive videos, and/or spherical videos, of sporting events, games, matches, activities, competitions, or tournaments, and/or for sporting events, games, matches, activities, competitions, or tournaments, in virtual reality (VR), and for providing data and/or information along with sporting events, games, matches, activities, competitions, or tournaments, in augmented reality (AR).

The database 10H also contains any data and/or information regarding each sports governing body or league which uses the apparatus 100 including, but not limited to, data and/or information regarding the body, its bylaws, its teams, and any and/or all players or athletes on each team, and/or analytics or statistical data and/or information for or regarding each body, its teams, and the players or athletes on each team, and/or sports betting fees or gambling fees charged by the sports governing body or league, and/or any other data and/or information which can be used in connection with the apparatus 100 of the present invention.

The database 10H also contains any data and/or information regarding each governmental entity which uses the apparatus 100 including, but not limited to, information regarding the name of the governmental entity and its betting, wagering, and gambling, laws, rules, and/or regulations, fees charged by the governmental entity, and/or any other data and/or information which can be used in connection with the apparatus 100 of the present invention.

The database 10H also contains any data and/or information regarding each gaming facility or venue which uses the apparatus 100 including, but not limited to, information regarding the name of the gaming facility or venue, and any betting, wagering, and gambling, laws, rules, and/or regulations, of or relating to the gaming facility or venue, and/or fees charged by the gaming facility or venue, and/or any other data and/or information which can be used in connection with the apparatus 100 of the present invention.

The database 10H also contains any data and/or information regarding each content provider which uses the apparatus 100 including, but not limited to, information regarding the games, matches, events, activities, and/or players or athletes, broadcasted by, or streamed by, the provider, schedules of television broadcasts and streaming video and/or audio transmissions or broadcasts, fees charged by the content provider, if applicable, and/or any other data and/or information which can be used in connection with the apparatus 100 of the present invention.

The database 10H also contains any data and/or information regarding each information provider or analytics provider which uses the apparatus 100 including, but not limited to, the type or kind of data and/or information it provides, the price for same, subscriptions available and the prices for same, other fees charged by the data and/or information provider or analytics provider, if applicable, and/or any other data and/or information which can be used in connection with the apparatus 100 of the present invention.

The database 10H also contains any data and/or information regarding each social network which uses the apparatus 100 including, but not limited to, the website for same, the names and profile pages for each member of the social network as well for each individual, user, party, or entity, who or which used the apparatus 100, and/or any other data and/or information which can be used in connection with the apparatus 100 of the present invention.

The database 10H also contains any data and/or information regarding each financial institution which uses the apparatus 100 including, but not limited to, the type or kind of accounts they provide, the types or kinds of financial services they provide, and any fees charged by the financial institution, if applicable, and/or any other data and/or information which can be used in connection with the apparatus 100 of the present invention.

The database 10H also contains any data and/or information regarding each escrow agent which or who uses the apparatus 100 including, but not limited to, the type or kind of escrow services it/he/she provides, and any fees charged by the escrow agent, if applicable, and/or any other data and/or information which can be used in connection with the apparatus 100 of the present invention.

The database 10H also contains data and/or information regarding each wearable device 97 used in connection with the apparatus 100 including, but not limited to, the make and model of the wearable device, the player or athlete who uses the same, and any data and/or information recorded by the wearable device 97 for each sporting event, game, match, activity, competition, or tournament, in which it is used.

The apparatus 100 of the present invention can also provide a social network for all of its members which can include all individual, parties, entities, and users, and all sports governing bodies, leagues, teams, and players of the teams, governmental entities, gaming facilities or venues, content providers, information/analytics providers, social networks, financial institutions, and escrow agents, and their respective employees and agents. For each member, the database 10H can store the respective member's profile information, profile pages, posts, comments, posted picture or video clips, and/or any other information typically found on a social network. In a preferred embodiment, posts and comments can be shared to or on any social networks which use the apparatus 100 as well as shared to or on any social networks which may not use the apparatus.

The database 10H can also store any data and/or information, and/or software programs or software applications, needed or required for allowing the central processing computer 10 to accept bets or wagers, process game, match, event, or activity results, determine if a bet or wager is a winning bet or wager or a losing bet or wager, effectuate payment to a winning party, and exact payment from a losing party.

The database 10H can also contain any data and/or information, and/or software programs or software applications, which is known to a person having ordinary skill in the art in gambling platforms and betting platforms as of the filing date of this application, which is or may be needed or required for operating a sports betting platform or other gambling or gaming platform.

The database 10H can also contain information regarding sports betting laws, regulations, and rules, gaming laws, regulations, and rules, income tax laws, withholding laws, and/or any other information, for each country or jurisdiction in which the apparatus 100 and methods of the present invention can be utilized in order to provide for proper oversight, monitoring, and/or regulation, of all sports betting activities which can take place via the apparatus 100 of the present invention.

The database 10H can also contain any data and/or information stored in the respective databases of any of the herein-described user communication devices 20, sport governing body computers 30, governmental entity computers 40, gaming facility computers 50, content provider computers 60, information/analytics provider computers 70, social network computers 80, financial institution computers 90, escrow agent computers 95, and wearable devices 97, which are utilized in conjunction with the apparatus 100 and methods of the present invention.

The database 10H can also contain any other data and/or information, and/or software programs or software applications, which may be needed and/or desired for performing any and/or all of the processing routines and/or functionality described herein as being provided by the central processing computer 10 and/or apparatus 100. In this regard, whether or not noted herein, the database 10H can contain any and/or all data and/or information which may be needed or desired in performing any and/or all of the functionality described herein as being performed by the apparatus 100, the central processing computer 10, and any of the herein-described user communication devices 20, sport governing body computers 30, governmental entity computers 40, gaming facility computers 50, content provider computers 60, information/analytics provider computers 70, social network computers 80, financial institution computers 90, escrow agent computers 95, and any wearable devices 97. The database 10H can also be connected to the CPU 10A.

The central processing computer 10 can also include a transmitter 101 for transmitting data and/or information, including any of the herein-described data and/or information, and/or any other data and/or information described herein as being provided by, from, or to, the central processing computer 10, any of the user communication devices 20, any of the sport governing body computers 30, any of the governmental entity computers 40, any of the gaming facility computers 50, any of the content provider computers 60, any of the information/analytics provider computers 70, any of the social network computers 80, any of the financial institution computers 90, any of the escrow agent computers 95, and any wearable devices 97, or to any of the other central processing computer 10. The transmitter 101 can also be connected to the CPU 10A.

With reference to FIG. 2, the central processing computer 10 can also include a global positioning device 10J for determining the position or location of the central processing computer 10. In a preferred embodiment, the global positioning device 10J can be utilized in order to determine the position or location of the central processing computer 10 so as to, for example, determine a jurisdiction in which the central processing computer 10 is located at any given time.

For example, if the central processing computer 10 is located on board a boat, ship, aircraft, or jet, the global positioning device 10J can be utilized in order to determine if the respective boat, ship, aircraft, or jet, is in or over international waters or international airspace, and, therefore, outside of a state's or a country's gaming laws, or within the jurisdiction of international gaming laws, etc., if applicable. In another embodiment, when traveling over land, such as in a bus, automobile, or train, etc., the global positioning device 10J can be utilized in order to determine the position or location of the central processing computer 10 and/or to determine when a state or national line has been crossed in order to ascertain that new or different sports betting or gaming laws should be used in administering, governing, or processing a bet. The global positioning device 10J can also be connected with the CPU 10A.

The central processing computer 10 can also include a video and/or audio recording device(s) 10K which can include a camera and/or a video recording device for recording pictures or video and/or video clips and/or a microphone or an audio recording device for recording audio or audio clips which can be recorded by, and/or transmitted live, by or from the central processing computer 10, or which can be recorded by, and stored at or in, the central processing computer 10 for transmission by or from the central processing computer 10 at a later time. The video and/or audio recording device(s) 10K can also be utilized to facilitate one-way broadcasts from the central processing computer 10, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, the user or operator of the central processing computer 10 can engage in telephone calls and video conferencing calls via the same. The user or operator of the central processing computer 10 can also use the video and/or audio recording device(s) 10K to record and broadcast or transmit content via its transmitter 101.

Figure 3:
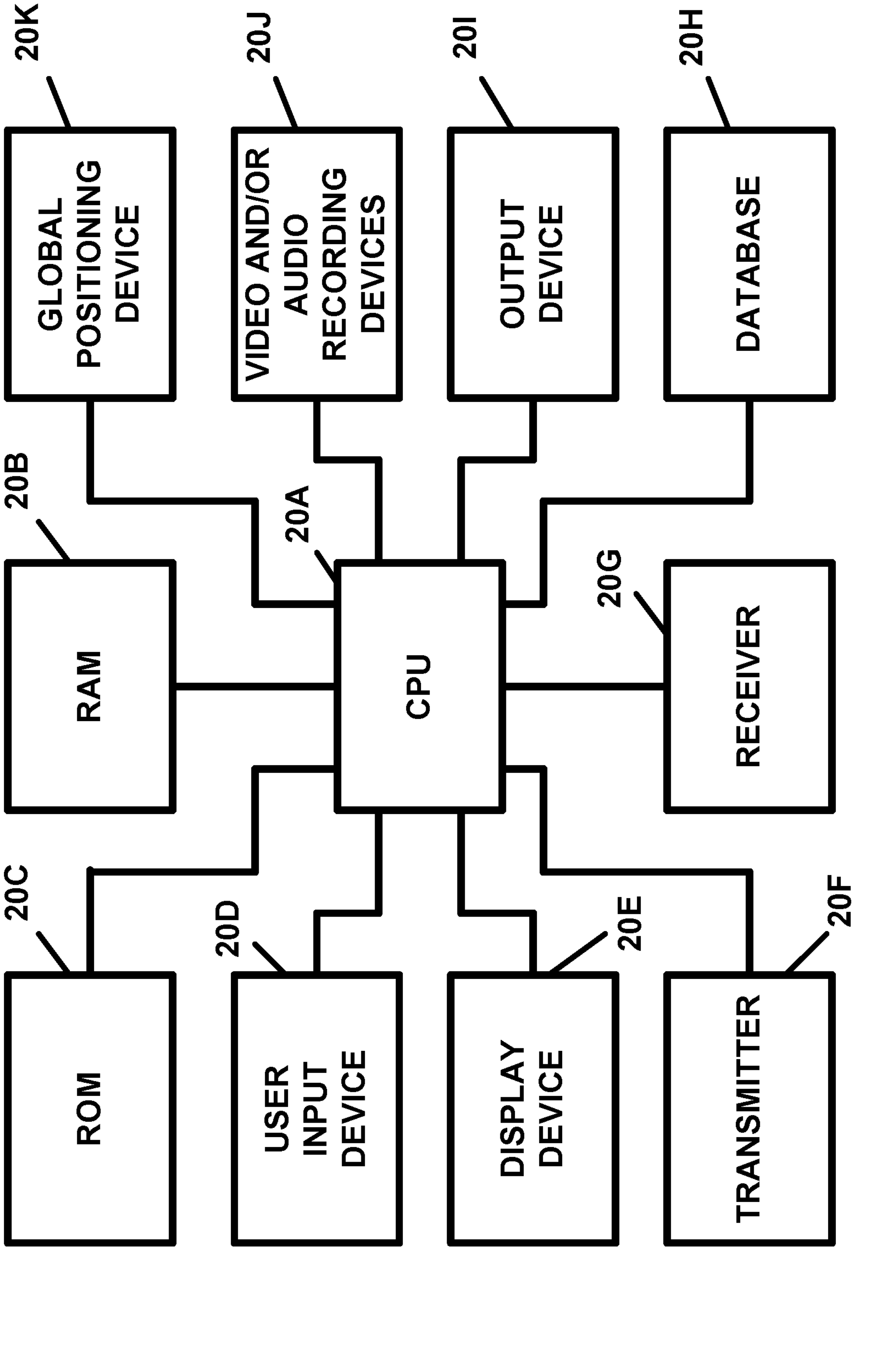
FIG. 3 illustrates the user communication device of FIG. 1, in block diagram form.

FIG. 3 illustrates the user communication device 20 of FIG. 1, in block diagram form. The user communication device 20, in the preferred embodiment, can be a computer, a personal computer, a home computer, a personal communication device, a telephone, an interactive television, a smart phone, a cellular telephone, a wireless telephone, a videophone, a video telephone, a personal digital assistant, a watch, a VR (virtual reality) headset or interface, an AR (augmented reality) headset or interface, a wearable communication device, glasses equipped with communications equipment, or any other communication device or equipment. The user communication device can also be a computer terminal, a terminal device connected to, or associated with, the central processing computer 10, or a kiosk. The user communication device 20 can also be any headset or other wearable device which can have all of the herein-described components of the user communication device 20. In instances when a headset is used as, or in conjunction with, the user communication device 20, the user of the same can verbally input information and/or instructions into the user communication device 20 via the microphone of the video and/or audio recording device(s) 20J described herein. In such an embodiment, the user communication device 20, and/or the headset utilized in conjunction with the same, can be specially programmed and/or equipped with voice recognition software in order to process the user's verbal or voice comments, commands, and/or instructions. The user communication device 20 can also be integrated within a headset or other wearable device. The headset or other wearable device can also be a component of the user communication device 20. The user communication device 20 can also be a server computer, a network computer, or any other computer capable of being utilized in a network.

With reference to FIG. 3, in the preferred embodiment, the user communication device 20 includes a central processing unit or CPU 20A which, in the preferred embodiment, is a microprocessor. The CPU 20A may also be a microcomputer, a minicomputer, a macro-computer, and/or a mainframe computer, depending upon the application. The CPU 20A is specially programmed and/or specially configured to perform any and/or all of the functionality described herein as being performed by the user communication device 20.

The user communication device 20 also includes a random access memory (RAM) device(s) 20B and a read only (ROM) memory device(s) 20C, each of which is connected to the CPU 20A, and a user input device 20D, for entering data or information and/or instructions and/or commands into the user communication device 20. The user input device 20D can be or can include any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the user communication device 20. The input device(s) 20D is/are also connected to the CPU 20A.

The user communication device 20 also includes a display device 20E for displaying data and/or information to a user. The user communication device 20 also includes a transmitter(s) 20F, for transmitting signals and/or data and/or information to any one or more of the central processing computers 10, the sport governing body computers 30, the governmental entity computers 40, the gaming facility computers 50, the content provider computers 60, the information/analytics provider computers 70, the social network computers 80, the financial institution computers 90, the escrow agent computers 95, the wearable devices 97, and/or any other user communication devices 20, which may be utilized in conjunction with the apparatus 100 of the present invention. The user communication device 20 also includes a receiver 20G, for receiving signals and/or data and/or information from any one or more of the central processing computers 10, the sport governing body computers 30, the governmental entity computers 40, the gaming facility computers 50, the content provider computers 60, the information/analytics provider computers 70, the social network computers 80, the financial institution computers 90, the escrow agent computers 95, the wearable devices 97, and/or any other user communication devices 20, which may be utilized in conjunction with the apparatus 100 of the present invention.

The user communication device 20 also includes a database(s) 20H. The database 20H can contain and/or be linked to any of the data and/or information described herein as being stored in the database 10H.

The database 20H can also contain and/or include any data and/or information regarding the individual, party, or entity, or user ("user") who or which utilizes the user communication device 20, and for each user, the database 10H can contain and/or include, but not be limited to, data and/or information regarding the user's, or each user's name, address, telephone number (s), cellular telephone number(s), mobile or wireless telephone number(s), e-mail address or e-mail addresses, and/or text message, instant message, SMS message, or MMS message, or any other messaging, telephone number or other address or identifier. The database 20H can also contain data and/or information regarding the user's or each user's sports betting account, gaming account, or gambling account.

The database 20H can also contain any data and/or information which may be required, and/or which may be desired, for performing any of the functionality and/or processing routines described herein as being performed by the user communication device 20 and/or the apparatus 100. In a preferred embodiment, the database 20H can also include any of the data and/or information described herein as being contained in the respective databases of the central processing computer(s) 10, the sport governing body computers 30, the governmental entity computers 40, the gaming facility computers 50, the content provider computers 60, the information/analytics provider computers 70, the social network computers 80, the financial institution computers 90, the escrow agent computers 95, and the wearable devices 97. The database 20H can also be connected to the CPU 20A.

The user communication device 20 also includes an output device 201 for outputting any of the data, information, and/or reports, described herein as being generated by or via the user communication device 20. In the preferred embodiment, the output device 201 can be a printer, a display, a transmitter, a modem, and/or any other device which can be used to output data or information of any kind or type.

The user communication device 20 also includes a video and/or audio recording device(s) 20J which can include a camera and/or a video recording device for recording pictures or video and/or video clips and/or a microphone or an audio recording device for recording audio or audio clips which can be recorded by, and/or transmitted live, by or from the user communication device 20, or which can be recorded by, and stored at or in, the user communication device 20 for transmission by or from the user communication device 20 at a later time. The video and/or audio recording device(s) 20J can also be utilized to facilitate one-way broadcasts from the user communication device 20, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, the user of the user communication device 20 can engage in telephone calls and video conferencing calls via the same. The user of the user communication device 20 can also use the video and/or audio recording device(s) 20J to record and broadcast or transmit content via its transmitter 20F.

With reference to FIG. 3, the user communication device 20, in the preferred embodiment, also includes a global positioning device 20K for determining the position or location of the user communication device 20. In a preferred embodiment, the global positioning device 20K can be utilized to determine the position or location of the user communication device 20 so as to, for example, determine a jurisdiction in which the user communication device 20 is located and/or is being utilized while placing a bet or a wager on a sporting event, game, match, activity, competition, or tournament, while engaging in sports betting or in a sports betting activity, while placing a bet or wager on or involving any sports betting activity, or while engaging in any gaming or gambling activity.

For example, if the user and his or her user communication device 20 is at a fixed location, or is moving, the global positioning device 20K can determine the position or location of the user's user communication device 20K at the time or instant the user places any bet or wager on or involving a sporting event, game, match, activity, competition, or tournament, or any other gambling activity or gaming activity. The global positioning device 20K can also be utilized when the user communication device 20 is located on board a boat, ship, aircraft, or jet, in order to determine if the user communication device 20 and the respective boat, ship, aircraft, or jet, are in or over international waters or international airspace, and, therefore, outside of a state's or a country's gaming laws, or within the jurisdiction of international gaming laws, etc., if applicable. In another embodiment, when traveling over land, such as in a bus, automobile, or train, etc., the global positioning device 20K can be utilized in order to determine the position or location of the user communication device 20 and/or to determine when a state or national line has been crossed in order to ascertain that new or different sports betting or gaming laws should be used in administering, governing, or processing a bet. The global positioning device 20K can also be connected with the CPU 20A.

Figure 4:
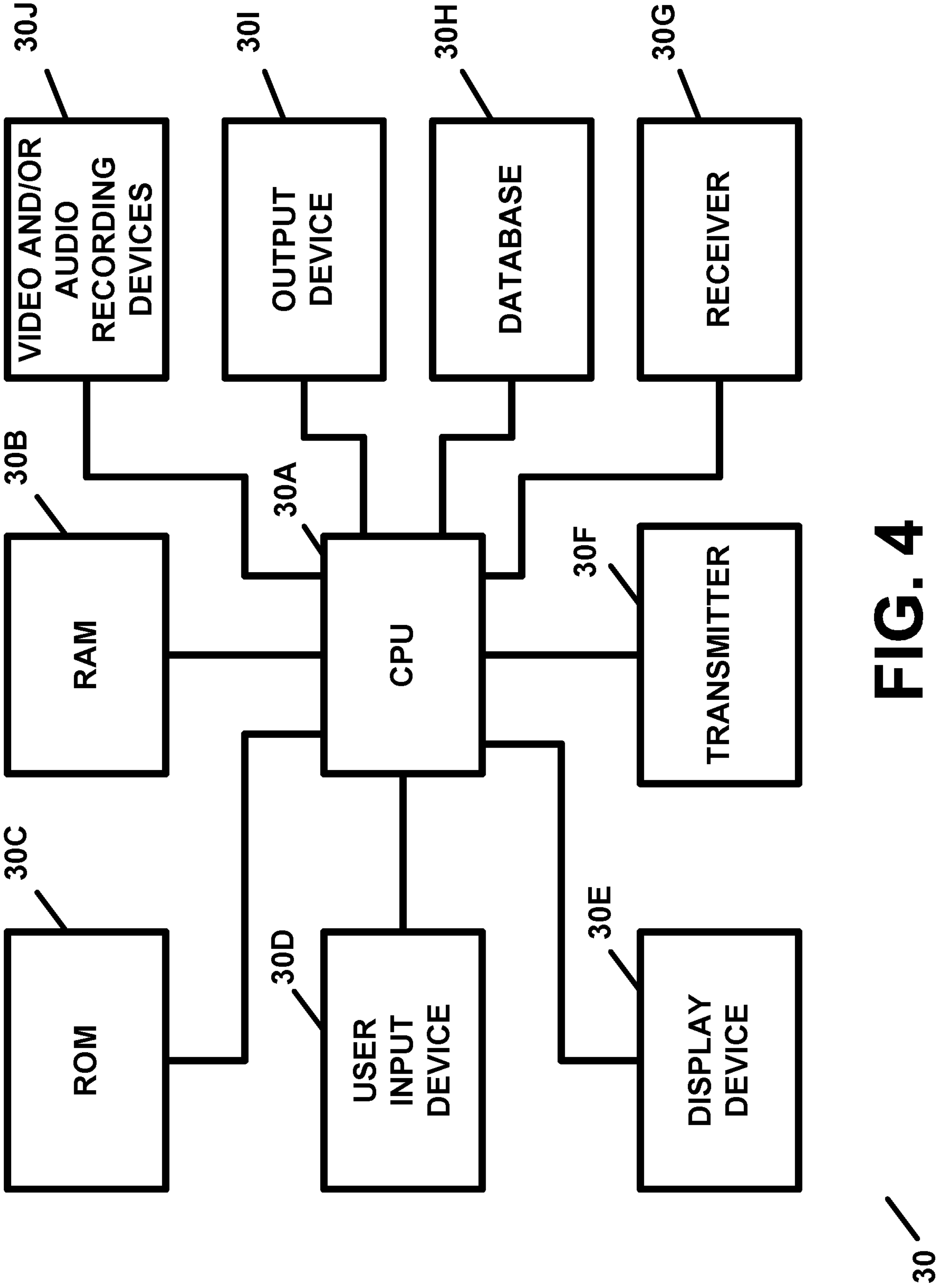
FIG. 4 illustrates the sports governing body computer of FIG. 1, in block diagram form.

FIG. 4 illustrates the sports governing body computer 30 of FIG. 1, in block diagram form. The sports governing body computer 30, in the preferred embodiment, can be a computer, a server computer, a computer terminal or a terminal device connected to a computer or a server computer, a personal computer, a home computer, a personal communication device, a telephone, an interactive television, a smart phone, a cellular telephone, a wireless telephone, a videophone, a video telephone, a personal digital assistant, a watch, a smart watch, a VR (virtual reality) headset or interface, an AR (augmented reality) headset or interface, a wearable communication device, glasses equipped with communications equipment, a beeper or a pager, or any other communication device or equipment. The sports governing body computer 30 can also be any computer capable of being utilized in a network.

With reference to FIG. 4, in the preferred embodiment, the sports governing body computer 30 includes a central processing unit or CPU 30A which, in the preferred embodiment, is a microprocessor. The CPU 30A may also be a microcomputer, a minicomputer, a macro-computer, and/or a mainframe computer, depending upon the application. The CPU 30A is specially programmed to perform all of the functionality described herein as being performed by the sports governing body computer 30.

The sports governing body computer 30 also includes a random access memory (RAM) device(s) 30B and a read only memory (ROM) device(s) 30C, each of which is connected to the CPU 30A, and a user input device 30D, for entering data and/or information or instructions and/or commands into the sports governing body computer 30, and which can be or can include any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the sports governing body computer 30. The input device(s) 30D is/are also connected to the CPU 30A.

The sports governing body computer 30 also includes a display device 30E for displaying data and/or information to a user. The sports governing body computer 30 also includes a transmitter(s) 30F, for transmitting signals and/or data and/or information to any one or more of the central processing computer(s) 10, the user communications devices 20, the governmental entity computers 40, the gaming facility computers 50, the content provider computers 60, the information/analytics provider computers 70, the social network computers 80, the financial institution computers 90, the escrow agent computers 95, the wearable devices 97, and/or any other sport governing body computers 30, which may be utilized in conjunction with the apparatus 100 of the present invention.

The sport governing body computer 30 also includes a receiver 30G, for receiving signals and/or data and/or information from any one or more of the central processing computer(s) 10, the user communication devices 20, the governmental entity computers 40, the gaming facility computers 50, the content provider computers 60, the information/analytics provider computers 70, the social network computers 80, the financial institution computers 90, the escrow agent computers 95, the wearable devices 97, and/or any other sport governing body computers 30, which may be utilized in conjunction with the apparatus 100 of the present invention.

The sport governing body computer 30 also includes a database(s) 30H. The database 30H can contain and/or be linked to any of the data and/or information described herein as being stored in the database 10H.

The database 30H can also contain and/or include data and/or information which may be required, and/or which may be desired, for performing any of the functionality and/or processing routines described herein as being performed by the sport governing body computer 30 and/or the apparatus 100. In a preferred embodiment, the database 30H can also include any of the data and/or information described herein as being contained in the respective databases of the central processing computer(s) 10, the user communication devices 20, the governmental entity computers 40, the gaming facility computers 50, the content provider computers 60, the information/analytics provider computers 70, the social network computers 80, the financial institution computers 90, the escrow agent computers 95, and the wearable devices 97. The database 30H can also be connected to the CPU 30A.

The sport governing body computer 30 also includes an output device 301 for outputting any of the data, information, and/or reports, described herein as being generated by or via the sport governing body computer 30. In the preferred embodiment, the output device 301 can be a printer, a display, a transmitter, a modem, and/or any other device which can be used to output data or information of any kind or type.

The sport governing body computer 30 can also include a video and/or audio recording device(s) 30J which can include a camera and/or a video recording device for recording pictures or video and/or video clips and/or a microphone or an audio recording device for recording audio or audio clips which can be recorded by, and/or transmitted live, by or from the sport governing body computer 30, or which can be recorded by, and stored at or in, the sport governing body computer 30 for transmission by or from the sport governing body computer 30 at a later time. The video and/or audio recording device(s) 30J can also be utilized to facilitate one-way broadcasts from the sport governing body computer 30, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, the user of the sport governing body computer 30 can engage in telephone calls and video conferencing calls via the same. The user of the sport governing body computer 30 can also use the video and/or audio recording device(s) 30J to record and broadcast or transmit content via its transmitter 30F.

Figure 5:
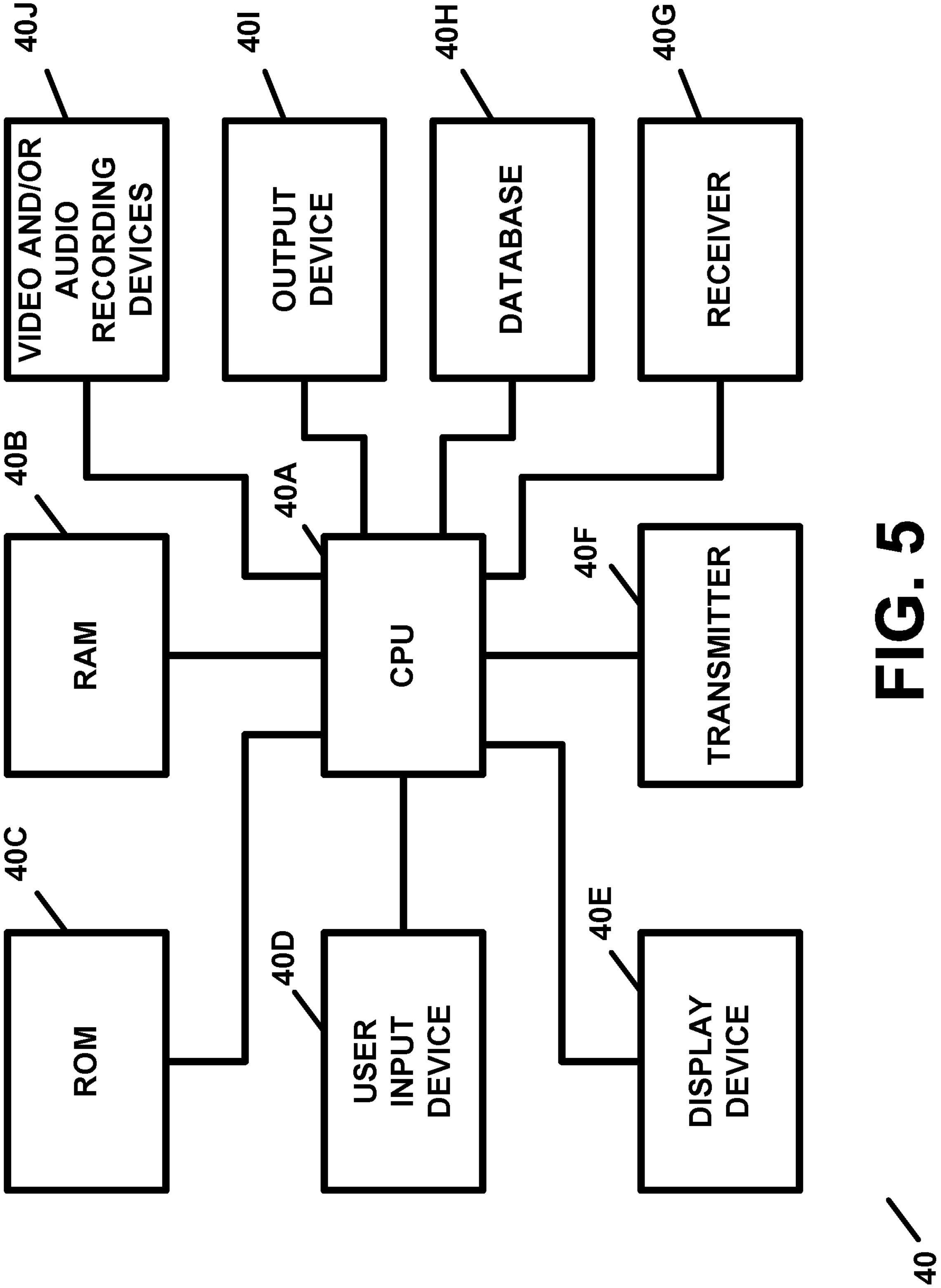
FIG. 5 illustrates the governmental entity computer of FIG. 1, in block diagram form.

FIG. 5 illustrates the governmental entity computer 40 of FIG. 1, in block diagram form. The governmental entity computer 40, in the preferred embodiment, can be a computer, a server computer, a computer terminal or a terminal device connected to a computer or a server computer, a personal computer, a home computer, a personal communication device, a telephone, an interactive television, a smart phone, a cellular telephone, a wireless telephone, a videophone, a video telephone, a personal digital assistant, a watch, a smart watch, a VR (virtual reality) headset or interface, an AR (augmented reality) headset or interface, a wearable communication device, glasses equipped with communications equipment, a beeper or a pager, or any other communication device or equipment. The governmental entity computer 40 can also be any computer capable of being utilized in a network.

With reference to FIG. 5, in the preferred embodiment, the governmental entity computer 40 includes a central processing unit or CPU 40A which, in the preferred embodiment, is a microprocessor. The CPU 40A may also be a microcomputer, a minicomputer, a macro-computer, and/or a mainframe computer, depending upon the application. The CPU 40A is specially programmed to perform all of the functionality described herein as being performed by the governmental entity computer 40.

The governmental entity computer 40 also includes a random access memory (RAM) device(s) 40B and a read only memory (ROM) device(s) 40C, each of which is connected to the CPU 40A, and a user input device 40D, for entering data or information and/or instructions and/or commands into the governmental entity computer 40, which can be or which can include any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the governmental entity computer 40. The input device(s) 40D is/are also connected to the CPU 40A.

The governmental entity computer 40 also includes a display device 40E for displaying data and/or information to a user. The governmental entity computer 40 also includes a transmitter(s) 40F, for transmitting signals and/or data and/or information to any one or more of the central processing computer(s) 10, the user communications devices 20, the sport governing body computers 30, the gaming facility computers 50, the content provider computers 60, the information/analytics provider computers 70, the social network computers 80, the financial institution computers 90, the escrow agent computers 95, the wearable devices 97, and/or any other governmental entity computers 40, which may be utilized in conjunction with the apparatus 100 of the present invention. The governmental entity computer 40 also includes a receiver 40G, for receiving signals and/or data and/or information from any one or more of the central processing computer(s) 10, the user communication devices 20, the sport governing body computers 30, the gaming facility computers 50, the content provider computers 60, the information/analytics provider computers 70, the social network computers 80, the financial institution computers 90, the escrow agent computers 95, the wearable devices 97, and/or any other governmental entity computers 40, which may be utilized in conjunction with the present invention.

The sport governing body computer 30 also includes a database(s) 40H. The database 40H can contain and/or can be linked to any of the data and/or information described herein as being stored in the database 10H.

The database 40H can also contain and/or include data and/or information which may be required, and/or which may be desired, for performing any of the functionality and/or processing routines described herein as being performed by the governmental entity computer 40 and/or the apparatus 100. In a preferred embodiment, the database 40H can also include any of the data and/or information described herein as being contained in the respective databases of the central processing computer(s) 10, the user communication devices 20, sport governing body computers 30, the gaming facility computers 50, the content provider computers 60, the information/analytics provider computers 70, the social network computers 80, the financial institution computers 90, the escrow agent computers 95, and the wearable devices 97. The database 40H can also be connected to the CPU 40A.

The governmental entity computer 40 also includes an output device 401 for outputting any of the data, information, and/or reports, described herein as being generated by or via the governmental entity computer 40. In the preferred embodiment, the output device 401 can be a printer, a display, a transmitter, a modem, and/or any other device which can be used to output data or information of any kind or type.

The governmental entity computer 40 also includes a video and/or audio recording device(s) 40J which can include a camera and/or a video recording device for recording pictures or video and/or video clips and/or a microphone or an audio recording device for recording audio or audio clips which can be recorded by, and/or transmitted live, by or from the governmental entity computer 40, or which can be recorded by, and stored at or in, the governmental entity computer 40 for transmission by or from the governmental entity computer 40 at a later time. The video and/or audio recording device(s) 40J can also be utilized to facilitate one-way broadcasts from the governmental entity computer 40, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, a user of the governmental entity computer 40 can engage in telephone calls and video conferencing calls via the same. The user of the governmental entity computer 40 can also use the video and/or audio recording device(s) 40J to record and broadcast or transmit content via its transmitter 40F.

Figure 6:
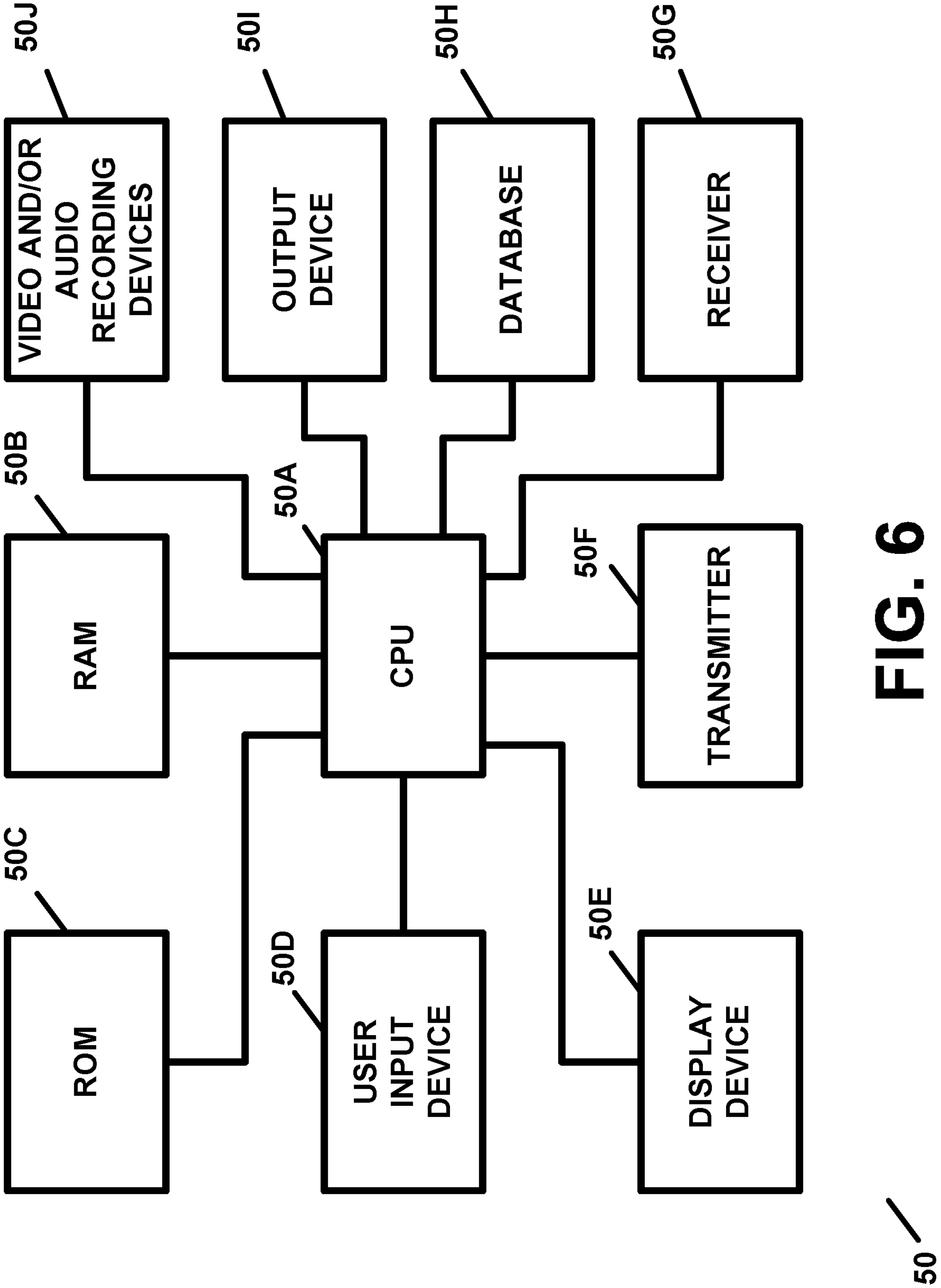
FIG. 6 illustrates the gaming facility computer of FIG. 1, in block diagram form.

FIG. 6 illustrates the gaming facility computer 50 of FIG. 1, in block diagram form. The gaming facility computer 50, in the preferred embodiment, can be a computer, a server computer, a computer terminal or a terminal device connected to a computer or a server computer, a personal computer, a home computer, a personal communication device, a telephone, an interactive television, a smart phone, a cellular telephone, a wireless telephone, a videophone, a video telephone, a personal digital assistant, a watch, a smart watch, a VR (virtual reality) headset or interface, an AR (augmented reality) headset or interface, a wearable communication device, glasses equipped with communications equipment, a beeper or a pager, or any other communication device or equipment. The gaming facility computer 50 can also be any computer capable of being utilized in a network.

With reference to FIG. 6, in the preferred embodiment, the gaming facility computer 50 includes a central processing unit or CPU 50A which, in the preferred embodiment, is a microprocessor. The CPU 50A may also be a microcomputer, a minicomputer, a macro-computer, and/or a mainframe computer, depending upon the application. The CPU 50A is specially programmed and/or specially configured to perform all of the functionality described herein as being performed by the gaming facility computer 50.

The gaming facility computer 50 also includes a random access memory (RAM) device(s) 50B and a read only memory (ROM) device(s) 50C, each of which is connected to the CPU 50A, and a user input device 50D, for entering data or information and/or instructions and/or commands into the gaming facility computer 50, and which can be, or can include, any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the gaming facility computer 50.

The input device(s) 50D can also include any kiosks or computer terminals used by individuals to place a sports bet or sports wager via the gaming facility computer 50 and while at the gaming facility or venue. The input device(s) 50D is/are also connected to the CPU 50A.

The gaming facility computer 50 also includes a display device 50E for displaying data and/or information to a user. The gaming facility computer 50 also includes a transmitter (s) 50F, for transmitting signals and/or data and/or information to any one or more of the central processing computer(s) 10, the user communications devices 20, the sport governing body computers 30, the governmental entity computers 40, the content provider computers 60, the information/analytics provider computers 70, the social network computers 80, the financial institution computers 90, the escrow agent computers 95, the wearable devices 97, and/or any other gaming facility computers 50, which may be utilized in conjunction with the apparatus 100 of the present invention.

The gaming facility computer 50 also includes a receiver 50G, for receiving signals and/or data and/or information from any one or more of the central processing computer(s) 10, the user communication devices 20, the sport governing body computers 30, the governmental entity computers 40, the content provider computers 60, the information/analytics provider computers 70, the social network computers 80, the financial institution computers 90, the escrow agent computers 95, the wearable devices 97, and/or any other gaming facility computers 50, which may be utilized in conjunction with the apparatus 100 of the present invention.

The gaming facility computer 50 also includes a database (s) 50H. The database 50H can contain and/or can be linked to any of the data and/or information described herein as being stored in the database 10H.

The database 50H can also contain and/or can include data and/or information which may be required, and/or which may be desired, for performing any of the functionality and/or processing routines described herein as being performed by the gaming facility computer 50 and/or the apparatus 100. In a preferred embodiment, the database 50H can also include any of the data and/or information described herein as being contained in the respective databases of the central processing computer(s) 10, the user communication devices 20, the sport governing body computers 30, the governmental entity computers 40, the content provider computers 60, the information/analytics provider computers 70, the social network computers 80, the financial institution computers 90, the escrow agent computers 95, and the wearable devices 97. The database 50H can also be connected to the CPU 10A.

The gaming facility computer 50 also includes an output device 501 for outputting any of the data, information, and/or reports, described herein as being generated by or via the gaming facility computer 50. In the preferred embodiment, the output device 501 can be a printer, a display, a transmitter, a modem, and/or any other device which can be used to output data or information of any kind or type.

The gaming facility computer 50 also includes a video and/or audio recording device(s) 50J which can include a camera and/or a video recording device for recording pictures or video and/or video clips and/or a microphone or an audio recording device for recording audio or audio clips which can be recorded by, and/or transmitted live, by or from the gaming facility computer 50, or which can be recorded by, and stored at or in, the gaming facility computer 50 for transmission by or from the gaming facility computer 50 at a later time. The video and/or audio recording device(s) 50J can also be utilized to facilitate one-way broadcasts from the gaming facility computer 50, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, a user of the gaming facility computer 50 can engage in telephone calls and video conferencing calls via the same. The user of the gaming facility computer 50 can also use the video and/or audio recording device(s) 50J to record and broadcast or transmit content via its transmitter 50F.

Figure 7:
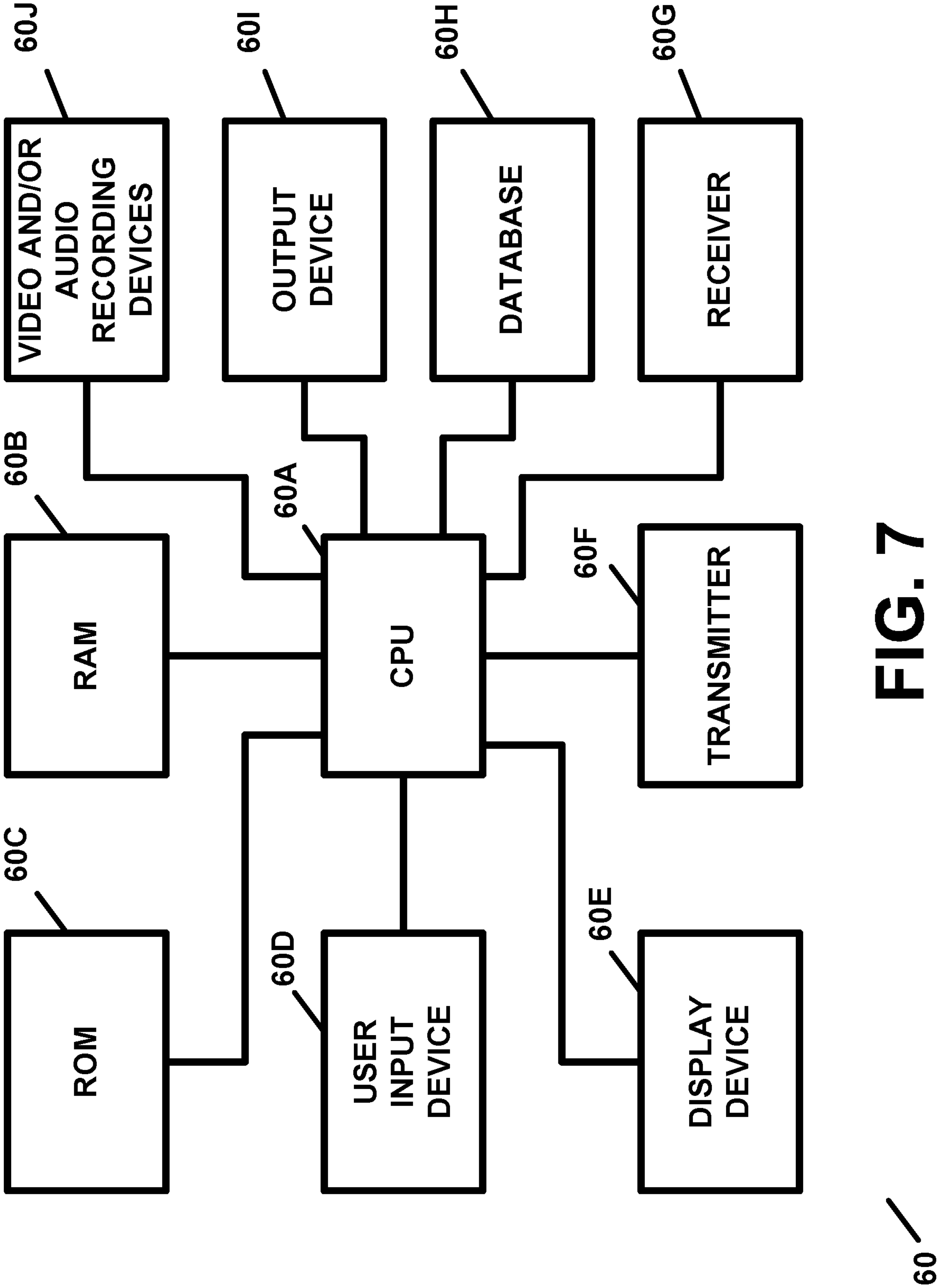
FIG. 7 illustrates the content provider computer of FIG. 1, in block diagram form.

FIG. 7 illustrates the content provider computer 60 of FIG. 1, in block diagram form. The content provider computer 60, in the preferred embodiment, can be a computer, a server computer, a computer terminal or a terminal device connected to a computer or a server computer, a personal computer, a home computer, a personal communication device, a telephone, an interactive television, a smart phone, a cellular telephone, a wireless telephone, a videophone, a video telephone, a personal digital assistant, a watch, a smart watch, a VR (virtual reality) headset or interface, an AR (augmented reality) headset or interface, a wearable communication device, glasses equipped with communications equipment, a beeper or a pager, or any other communication device or equipment. The content provider computer 60 can also be any computer capable of being utilized in a network.

With reference to FIG. 7, in the preferred embodiment, the content provider computer 60 includes a central processing unit or CPU 60A which, in the preferred embodiment, is a microprocessor. The CPU 60A may also be a microcomputer, a minicomputer, a macro-computer, and/or a mainframe computer, depending upon the application. The CPU 60A is specially programmed and/or specially configured to perform all of the functionality described herein as being performed by the content provider computer 60.

The content provider computer 60 also includes a random access memory (RAM) device(s) 60B and a read only memory (ROM) device(s) 60C, each of which is connected to the CPU 60A, and a user input device 60D, for entering data or information and/or instructions and/or commands into the content provider computer 60, which can be, or which can include, any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the content provider computer 60. The input device(s) 60D is/are also connected to the CPU 60A.

The content provider computer 60 also includes a display device 60E for displaying data and/or information to a user. The content provider computer 60 also includes a transmitter (s) 60F, for transmitting signals and/or data and/or information to any one or more of the central processing computer(s) 10, the user communications devices 20, the sport governing body computers 30, the governmental entity computers 40, the gaming facility computers 50, the information/analytics provider computers 70, the social network computers 80, the financial institution computers 90, the escrow agent computers 95, the wearable devices 97, and/or any other content provider computers 60, which may be utilized in conjunction with the apparatus 100 of the present invention.

The content provider computer 60 also includes a receiver 60G, for receiving signals and/or data and/or information from any one or more of the central processing computer(s) 10, the user communication devices 20, the sport governing body computers 30, the governmental entity computers 40, the gaming facility computers 50, the information/analytics provider computers 70, the social network computers 80, the financial institution computers 90, the escrow agent computers 95, the wearable devices 97, and/or any other content provider computers 60, which may be utilized in conjunction with the apparatus 100 of the present invention.

The content provider computer 60 also includes a database(s) 60H. The database 60H can contain and/or can be linked to any of the data and/or information described herein as being stored in the database 10H.

The database 60H can also contain and/or include data and/or information which may be required, and/or which may be desired, for performing any of the functionality and/or processing routines described herein as being performed by the content provider computer 60 and/or the apparatus 100. In a preferred embodiment, the database 60H can also include any of the data and/or information described herein as being contained in the respective databases of the central processing computer(s) 10, the user communication devices 20, the sport governing body computers 30, the governmental entity computers 40, the gaming facility computers 50, the information/analytics provider computers 70, the social network computers 80, the financial institution computers 90, the escrow agent computers 95, and the wearable devices 97. The database 60H can also be connected to the CPU 10A.

The content provider computer 60 also includes an output device 601 for outputting any of the data, information, and/or reports, described herein as being generated by or via the content provider computer 60. In the preferred embodiment, the output device 601 can be a printer, a display, a transmitter, a modem, and/or any other device which can be used to output data or information of any kind or type.

The content provider computer 60 also includes a video and/or audio recording device(s) 60J which can include a camera and/or a video recording device for recording pictures or video and/or video clips and/or a microphone or an audio recording device for recording audio or audio clips which can be recorded by, and/or transmitted live, by or from the content provider computer 60, or which can be recorded by, and stored at or in, the content provider computer 60 for transmission by or from the content provider computer 60 at a later time. The video and/or audio recording device(s) 60J can also be utilized to facilitate one-way broadcasts from the content provider computer 60, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, a user of the content provider computer 60 can engage in telephone calls and video conferencing calls via the same. The user of the content provider computer 60 can also use the video and/or audio recording device(s) 60J to record and broadcast or transmit content via its transmitter 60F.

Figure 8:
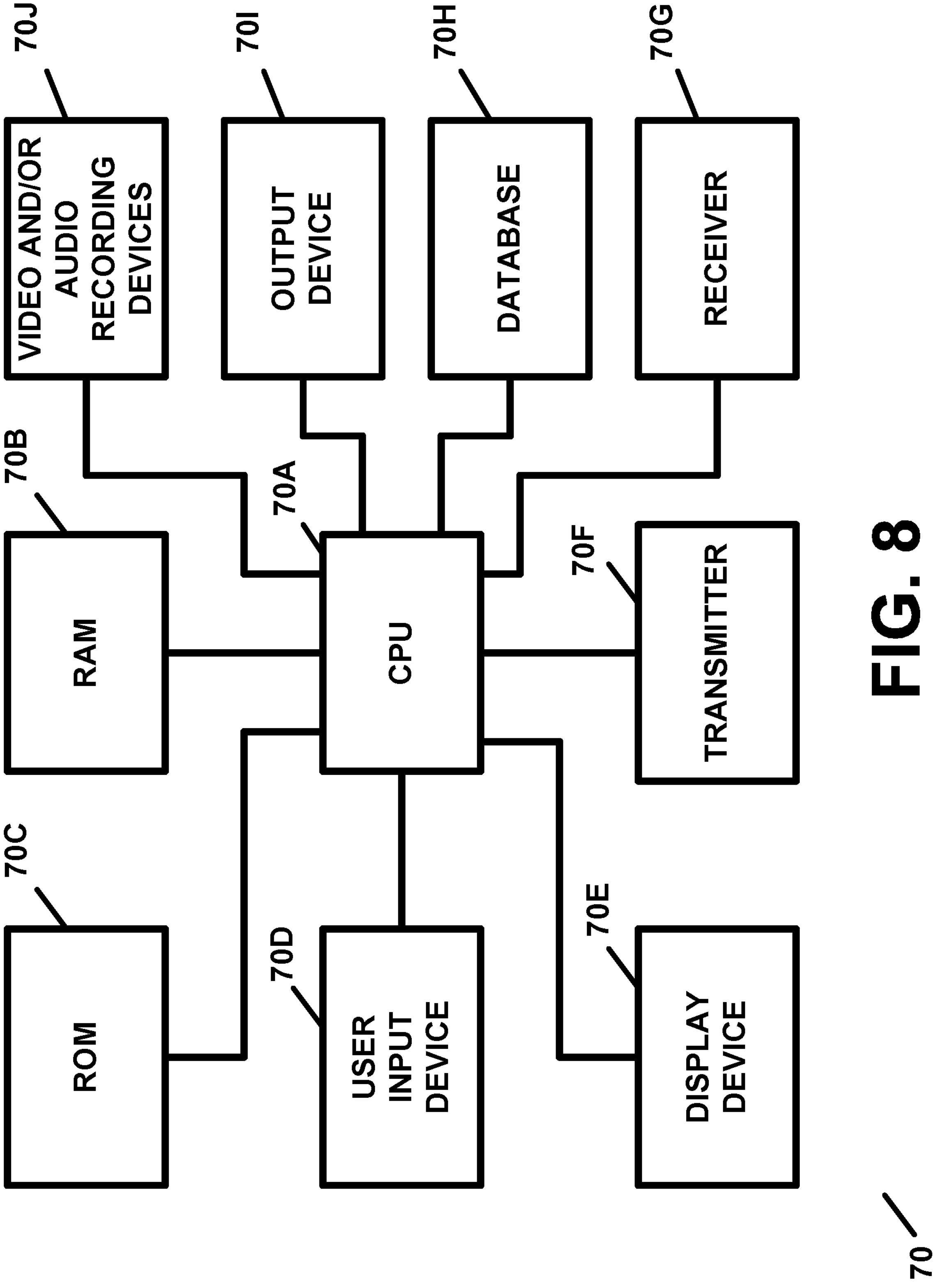
FIG. 8 illustrates the information and/or analytics provider computer of FIG. 1, in block diagram form.

FIG. 8 illustrates the information/analytics provider computer 70 of FIG. 1, in block diagram form. With reference to FIG. 8, in the preferred embodiment, the information/analytics provider computer 70 includes a central processing unit or CPU 70A which, in the preferred embodiment, is a microprocessor. The CPU 70A may also be a microcomputer, a minicomputer, a macro-computer, and/or a mainframe computer, depending upon the application. The CPU 70A is specially programmed and/or specially configured to perform all of the functionality described herein as being performed by the information/analytics provider computer 70.

The information/analytics provider computer 70 also includes a random access memory (RAM) device(s) 70B and a read only memory (ROM) device(s) 70C, each of which is connected to the CPU 70A, and a user input device 70D, for entering data or information and/or instructions and/or commands into the information/analytics provider computer 70, which can be or which can include any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the information/analytics provider computer 70. The input device(s) 70D is/are also connected to the CPU 70A.

The information/analytics provider computer 70 also includes a display device 70E for displaying data and/or information to a user. The information/analytics provider computer 70 also includes a transmitter(s) 70F, for transmitting signals and/or data and/or information to any one or more of the central processing computer(s) 10, the user communications devices 20, the sport governing body computers 30, the governmental entity computers 40, the gaming facility computers 50, the content provider computers 60, the social network computers 80, the financial institution computers 90, the escrow agent computers 95, the wearable devices 97, and/or any other information/analytics provider computers 70, which may be utilized in conjunction with the apparatus 100 of the present invention.

The information/analytics provider computer 70 also includes a receiver 70G, for receiving signals and/or data and/or information from any one or more of the central processing computer(s) 10, the user communication devices 20, the sport governing body computers 30, the governmental entity computers 40, the gaming facility computers 50, the content provider computers 70, the social network computers 80, the financial institution computers 90, the escrow agent computers 95, the wearable devices 97, and/or any other information/analytics provider computers 70, which may be utilized in conjunction with the apparatus 100 of the present invention.

The information/analytics provider computer 70 also includes a database(s) 70H. The database 70H can contain and/or can be linked to any of the data and/or information described herein as being stored in the database 10H.

The database 70H can also contain and/or include data and/or information which may be required, and/or which may be desired, for performing any of the functionality and/or processing routines described herein as being performed by the information/analytics provider computer 70 and/or the apparatus 100. In a preferred embodiment, the database 70H can also include any of the data and/or information described herein as being contained in the respective databases of the central processing computer(s) 10, the user communication devices 20, the sport governing body computers 30, the governmental entity computers 40, the gaming facility computers 50, the content provider computers 60, the social network computers 80, the financial institution computers 90, the escrow agent computers 95, and the wearable devices 97. The database 70H can also be connected to the CPU 70A.

The database 70H can also contain any and/or all of the data, information, news, statistical data and/or information, historical data and/or information, forecasting data and/or information, predictive data and/or information, analytics data and/or information, and/or sports analytics data and/or information, and/or information regarding products and/or services, and/or information regarding subscriptions for products and or services which are, or can be, provided by the information/analytics provider which or who utilizes the information/analytics provider computer 70.

The information/analytics provider computer 70 also includes an output device 701 for outputting any of the data, information, and/or reports, described herein as being generated by or via the information/analytics provider computer 70. In the preferred embodiment, the output device 701 can be a printer, a display, a transmitter, a modem, and/or any other device which can be used to output data or information of any kind or type.

The information/analytics provider computer 70 also includes a video and/or audio recording device(s) 70J which can include a camera and/or a video recording device for recording pictures or video and/or video clips and/or a microphone or an audio recording device for recording audio or audio clips which can be recorded by, and/or transmitted live, by or from the information/analytics provider computer 70, or which can be recorded by, and stored at or in, the information/analytics provider computer 70 for transmission by or from the information/analytics provider computer 70 at a later time. The video and/or audio recording device(s) 70J can also be utilized to facilitate one-way broadcasts from the information/analytics provider computer 70, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, a user of the information/analytics provider computer 70 can engage in telephone calls and video conferencing calls via the same. The user of the information/analytics provider computer 70 can also use the video and/or audio recording device(s) 70J to record and broadcast or transmit content via its transmitter 70F.

Figure 9:
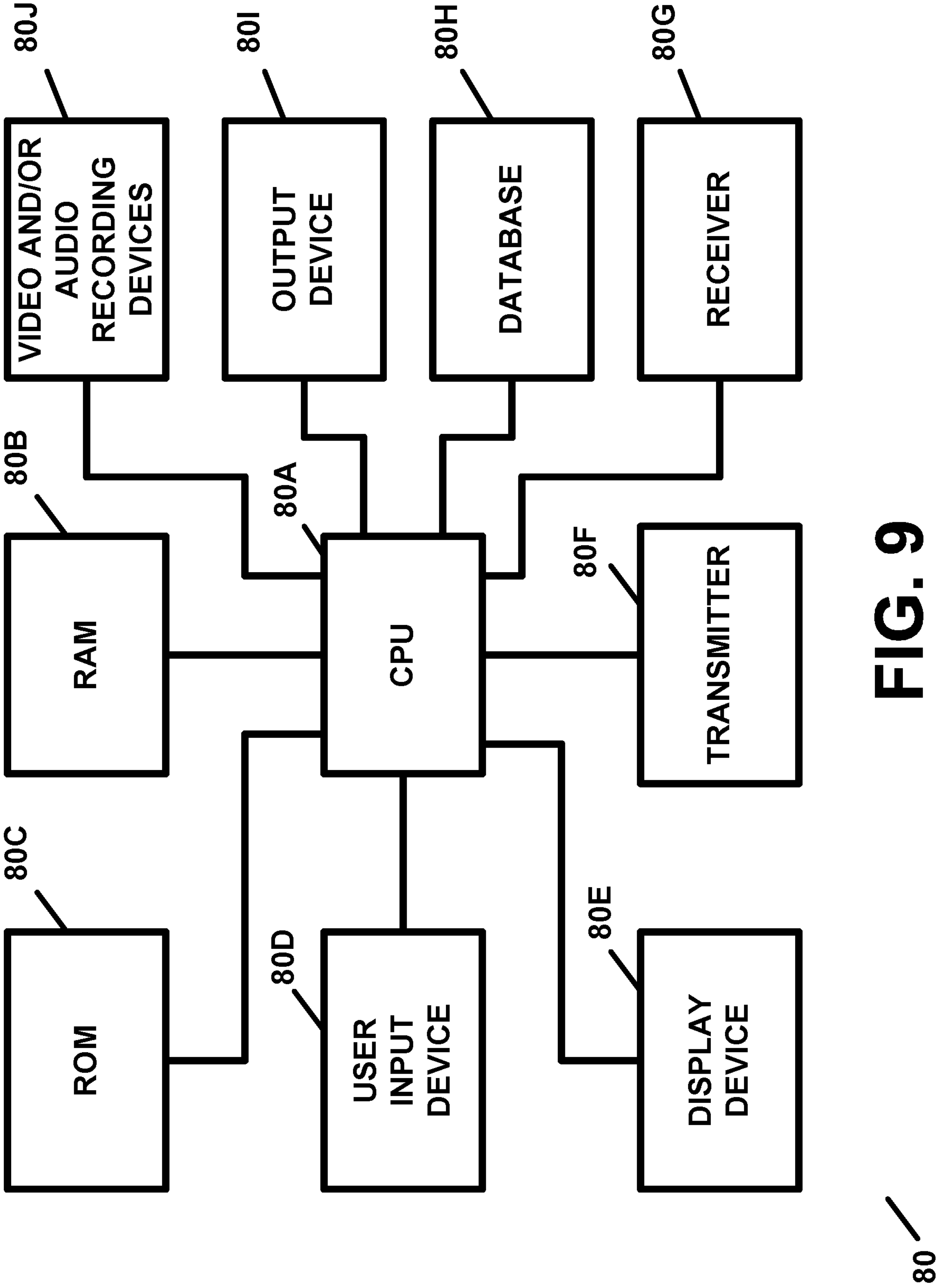
FIG. 9 illustrates the social network computer of FIG. 1, in block diagram form.

FIG. 9 illustrates the social network computer 80 of FIG. 1, in block diagram form. With reference to FIG. 9, in the preferred embodiment, the social network computer 80 includes a central processing unit or CPU 80A, which in the preferred embodiment, is a microprocessor. The CPU 80A may also be a microcomputer, a minicomputer, a macro-computer, and/or a mainframe computer, depending upon the application. The CPU 80A is specially programmed and/or specially configured to perform all of the functionality described herein as being performed by the social network computer 80.

The social network computer 80 also includes a random access memory (RAM) device(s) 80B and a read only memory (ROM) device(s) 80C, each of which is connected to the CPU 80A, and a user input device 80D, for entering data or information and/or instructions and/or commands into the social network computer 80, which can be, or which can include, any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the social network computer 80. The input device(s) 80D is/are also connected to the CPU 80A.

The social network computer 80 also includes a display device 80E for displaying data and/or information to a user. The social network computer 80 also includes a trans mitter(s) 80F, for transmitting signals and/or data and/or information to any one or more of the central processing computer(s) 10, the user communications devices 20, the sport governing body computers 30, the governmental entity computers 40, the gaming facility computers 50, the content provider computers 60, the information/analytics provider computers 70, the financial institution computers 90, the escrow agent computers 95, the wearable devices 97, and/or any other social network computers 80, which may be utilized in conjunction with the apparatus 100 of the present invention.

The social network computer 80 also includes a receiver 80G, for receiving signals and/or data and/or information from any one or more of the central processing computer(s) 10, the user communication devices 20, the sport governing body computers 30, the governmental entity computers 40, the gaming facility computers 50, the content provider computers 60, the information/analytics provider computers 70, the financial institution computers 90, the escrow agent computers 95, the wearable devices 97, and/or any other social network computers 80, which may be utilized in conjunction with the apparatus 100 of the present invention.

The social network computer 80 also includes a database(s) 80H. The database 80H can contain and/or can be linked to any of the data and/or information described herein as being stored in the database 10H.

The database 80H can also contain and/or include data and/or information which may be required, and/or which may be desired, for performing any of the functionality and/or processing routines described herein as being performed by the social network computer 80 and/or the apparatus 100. In a preferred embodiment, the database 80H can also include any of the data and/or information described herein as being contained in the respective databases of the central processing computer(s) 10, the user communication devices 20, the sport governing body computers 30, the governmental entity computers 40, the gaming facility computers 50, the content provider computers 60, the information/analytics provider computers 70, the financial institution computers 90, the escrow agent computers 95, and the wearable devices 97. The database 80H can also be connected to the CPU 10A.

The database 80H can also contain information including profiles, posts, comments, and any other social network information for or regarding the members of the social network which can include all of the herein-described individuals, parties, entities, and users, and all sports governing bodies, leagues, teams, and players of the teams, governmental entities, gaming facilities or venues, content providers, information/analytics providers, social networks, financial institutions, and escrow agents, and their respective employees and agents. For each member, the database 80H can store the respective member's profile information, profile pages, posts, comments, posted pictures or video clips and any other information typically found on a social network website or in an on-line social network community.

The social network computer 80 also includes an output device 801 for outputting any of the data, information, and/or reports, described herein as being generated by or via the social network computer 80. In the preferred embodiment, the output device 801 can be a printer, a display, a transmitter, a modem, and/or any other device which can be used to output data or information of any kind or type.

The social network computer 80 also includes a video and/or audio recording device(s) 80J which can include a camera and/or a video recording device for recording pictures or video and/or video clips and/or a microphone or an audio recording device for recording audio or audio clips which can be recorded by, and/or transmitted live, by or from the social network computer 80, or which can be recorded by, and stored at or in, the social network computer 80 for transmission by or from the social network computer 80 at a later time. The video and/or audio recording device(s) 80J can also be utilized to facilitate one-way broadcasts from the social network computer 80, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, a user of the social network computer 80 can engage in telephone calls and video conferencing calls via the same. The user of the social network computer 80 can also use the video and/or audio recording device(s) 80J to record and broadcast or transmit content via its transmitter 80F.

Figure 10:
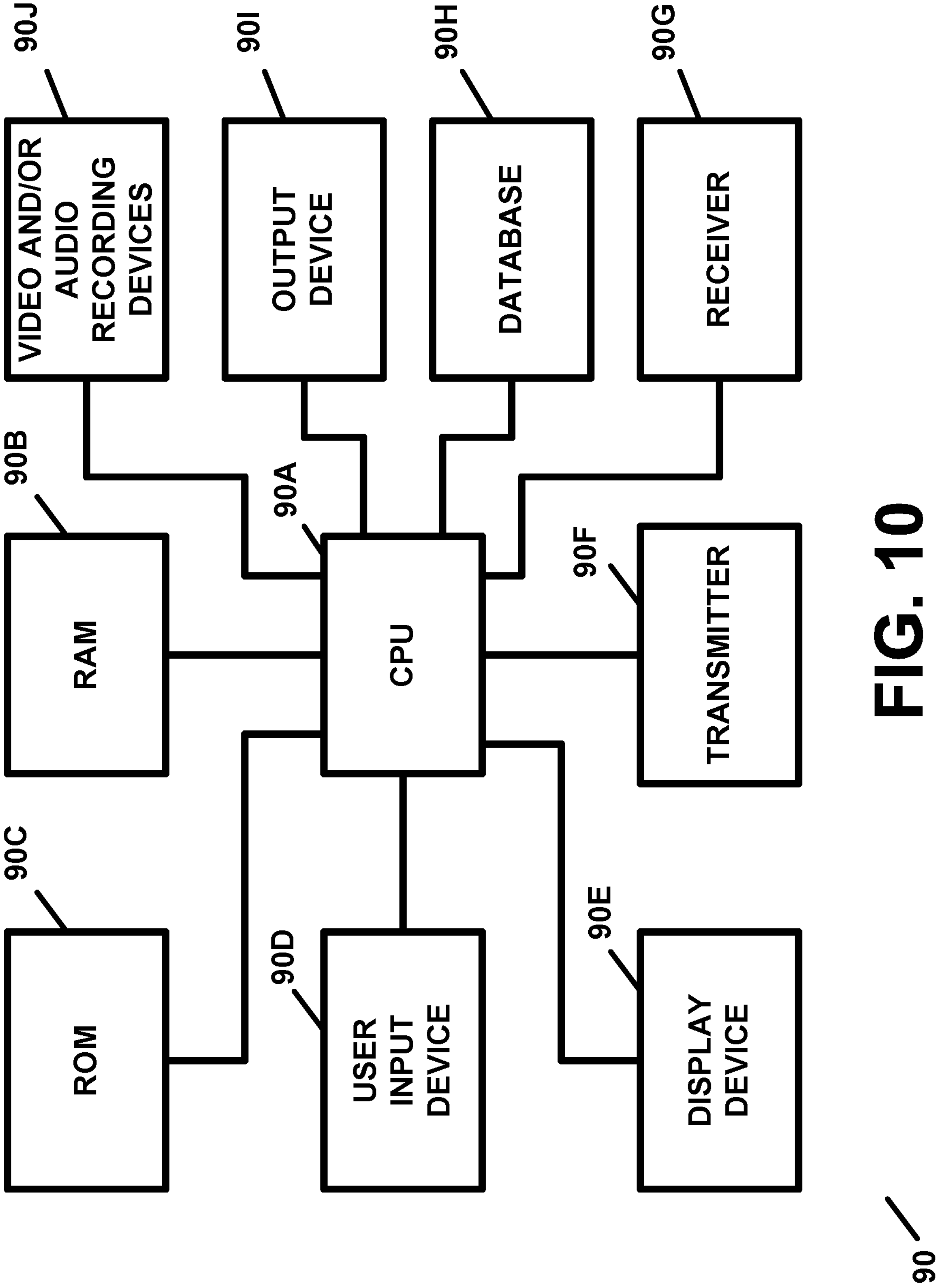
FIG. 10 illustrates the financial institution computer of FIG. 1, in block diagram form.

FIG. 10 illustrates the financial institution computer 90 of FIG. 1, in block diagram form. With reference to FIG. 10, in the preferred embodiment, the financial institution computer 90 includes a central processing unit or CPU 90A which, in the preferred embodiment, is a microprocessor. The CPU 90A may also be a microcomputer, a minicomputer, a macro-computer, and/or a mainframe computer, depending upon the application. The CPU 90A is specially programmed and/or specially configured to perform all of the functionality described herein as being performed by the financial institution computer 90.

The financial institution computer 90 also includes a random access memory (RAM) device(s) 90B and a read only memory (ROM) device(s) 90C, each of which is connected to the CPU 90A, and a user input device 90D, for entering data or information and/or instructions and/or commands into the financial institution computer 90, which can be, or which can include, any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the financial institution computer 90. The input device(s) 90D is/are also connected to the CPU 90A.

The financial institution computer 90 also includes a display device 90E for displaying data and/or information to a user. The financial institution computer 90 also includes a transmitter(s) 90F, for transmitting signals and/or data and/or information to any one or more of the central processing computer(s) 10, the user communications devices 20, the sport governing body computers 30, the governmental entity computers 40, the gaming facility computers 50, the content provider computers 60, the information/analytics provider computers 70, the social network computers 80, the escrow agent computers 95, the wearable devices 97, and/or any other financial institution computers 90, which may be utilized in conjunction with the apparatus 100 of the present invention.

The financial institution computer 90 also includes a receiver 90G, for receiving signals and/or data and/or information from any one or more of the central processing computer(s) 10, the user communication devices 20, the sport governing body computers 30, the governmental entity computers 40, the gaming facility computers 50, the content provider computers 60, the information/analytics provider computers 70, the social network computers 80, the escrow agent computers 95, the wearable devices 97, and/or any other financial institution computers 90, which may be utilized in conjunction with the apparatus 100 of the present invention.

The financial institution computer 90 also includes a database(s) 90H. The database 90H can contain and/or can be linked to any of the data and/or information described herein as being stored in the database 10H.

The database 90H can also contain and/or include data and/or information which may be required, and/or which may be desired, for performing any of the functionality and/or processing routines described herein as being performed by the financial institution computer 90 and/or the apparatus 100. In a preferred embodiment, the database 90H can also include any of the data and/or information described herein as being contained in the respective databases of the central processing computer(s) 10, the user communication devices 20, the sport governing body computers 30, the governmental entity computers 40, the gaming facility computers 50, the content provider computers 60, the information/analytics provider computers 70, the social network computers 80, the escrow agent computers 95, and the wearable devices 97. The database 90H can also be connected to the CPU 10A.

The database 90H can also contain information regarding any sports betting accounts, gaming accounts, or gambling accounts, maintained or serviced by the financial institution computer 90, and can also contain financial account information, payment information, payment identifier information, bank account information, credit account information, credit card account information, debit account information, debit card account information, charge account information, charge card account information, electronic money account information, and/or any other financial account information and/or payment information, for any of the herein-described individuals, parties, entities, and users, and/or their respective sports betting accounts, gaming accounts, or gambling accounts, and for of the sports governing bodies, leagues, teams, and players of the teams, governmental entities, gaming facilities or venues, content providers, information/analytics providers, social networks, financial institutions, and escrow agents, and their respective employees and agents, who or which use the apparatus 100 of the present invention.

The financial institution computer 90 also includes an output device 901 for outputting any of the data, information, and/or reports, described herein as being generated by or via the financial institution computer 90. In the preferred embodiment, the output device 901 can be a printer, a display, a transmitter, a modem, and/or any other device which can be used to output data or information of any kind or type.

The financial institution computer 90 also includes a video and/or audio recording device(s) 90J which can include a camera and/or a video recording device for recording pictures or video and/or video clips and/or a microphone or an audio recording device for recording audio or audio clips which can be recorded by, and/or transmitted live, by or from the financial institution computer 90, or which can be recorded by, and stored at or in, the financial institution computer 90 for transmission by or from the financial institution computer 90 at a later time. The video and/or audio recording device(s) 90J can also be utilized to facilitate one-way broadcasts from the financial institution computer 90, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, a user of the financial institution computer 90 can engage in telephone calls and video conferencing calls via the same. The user of the financial institution computer 90 can also use the video and/or audio recording device(s) 90J to record and broadcast or transmit content via its transmitter 90F.

Figure 11:
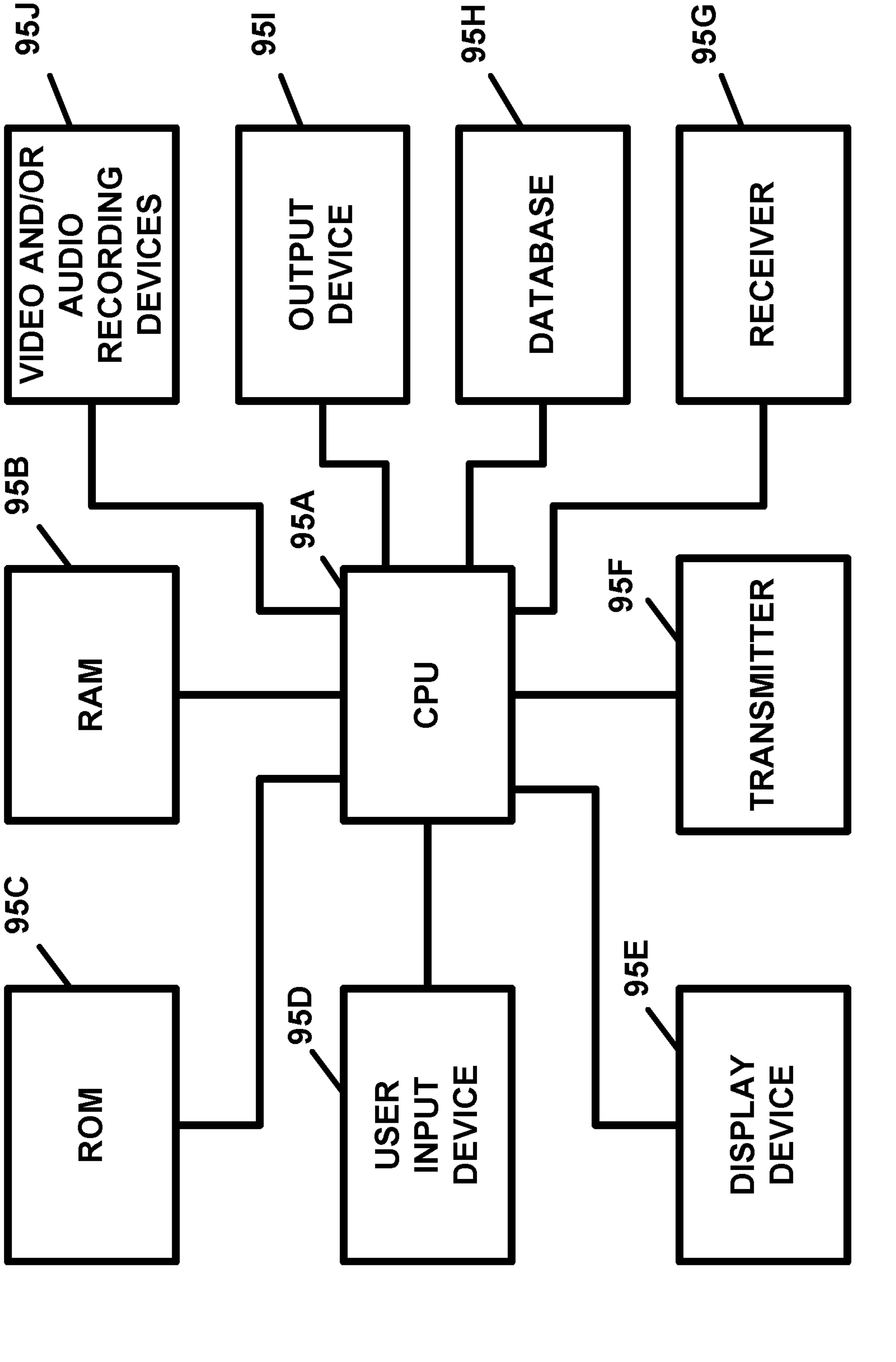
FIG. 11 illustrates the escrow agent computer of FIG. 1, in block diagram form.

FIG. 11 illustrates the escrow agent computer 95 of FIG. 1, in block diagram form. With reference to FIG. 11, in the preferred embodiment, the escrow agent computer 95 includes a central processing unit or CPU 95A, which in the preferred embodiment, is a microprocessor. The CPU 95A may also be a microcomputer, a minicomputer, a macro-computer, and/or a mainframe computer, depending upon the application. The CPU 95A is specially programmed and/or specially configured to perform all of the functionality described herein as being performed by the escrow agent computer 95.

The escrow agent computer 95 also includes a random access memory (RAM) device(s) 95B and a read only memory (ROM) device(s) 95C, each of which is connected to the CPU 95A, and a user input device 95D, for entering data or information and/or instructions and/or commands into the escrow agent computer 95, which can be, or which can include, any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the escrow agent computer 95. The input device(s) 95D is/are also connected to the CPU 95A.

The escrow agent computer 95 also includes a display device 95E for displaying data and/or information to a user. The escrow agent computer 95 also includes a transmitter(s) 95F, for transmitting signals and/or data and/or information to any one or more of the central processing computer(s) 10, the user communications devices 20, the sport governing body computers 30, the governmental entity computers 40, the gaming facility computers 50, the content provider computers 60, the information/analytics provider computers 70, the social network computers 80, the financial institution computers 90, the wearable devices 97, and/or any other escrow agent computer 95, which may be utilized in conjunction with the apparatus 100 of the present invention.

The escrow agent computer 95 also includes a receiver 95G, for receiving signals and/or data and/or information from any one or more of the central processing computer(s) 10, the user communication devices 20, the sport governing body computers 30, the governmental entity computers 40, the gaming facility computers 50, the content provider computers 60, the information/analytics provider computers 70, the social network computers 80, the financial institution computers 90, the wearable devices 97, and/or any other escrow agent computers 95, which may be utilized in conjunction with the present invention.

The escrow agent computer 95 also includes a database(s) 95H. The database 95H can contain and/or can be linked to any of the data and/or information described herein as being stored in the database 10H.

The database 95H can also contain and/or include data and/or information which may be required, and/or which may be desired, for performing any of the functionality and/or processing routines described herein as being performed by the escrow agent computer 95 and/or the apparatus 100. In a preferred embodiment, the database 95H can also include any of the data and/or information described herein as being contained in the respective databases of the central processing computer(s) 10, the user communication devices 20, the sport governing body computers 30, the governmental entity computers 40, the gaming facility computers 50, the content provider computers 60, the information/analytics provider computers 70, the social network computers 80, the financial institution computers 90, and the wearable devices 97. The database 95H can also be connected to the CPU 10A.

The database 95H can also contain any data and/or information regarding any of individuals, parties, entities, or users, who or which utilize the services provided by the escrow agent computer 95 or by the escrow service or company providing these escrow services. The database 95H can, for example, contain data and/or information regarding, for each individual, party, entity, or user, and of each escrow accounts associated with the respective individual, party, entity, or user, the escrow account number and the terms or conditions of the escrow agreement governing the escrow relationship.

The escrow agent computer 95 also includes an output device 951 for outputting any of the data, information, and/or reports, described herein as being generated by or via the escrow agent computer 95. In the preferred embodiment, the output device 951 can be a printer, a display, a transmitter, a modem, and/or any other device which can be used to output data or information of any kind or type.

The escrow agent computer 95 also includes a video and/or audio recording device(s) 95J which can include a camera and/or a video recording device for recording pictures or video and/or video clips and/or a microphone or an audio recording device for recording audio or audio clips which can be recorded by, and/or transmitted live, by or from the escrow agent computer 95, or which can be recorded by, and stored at or in, the escrow agent computer 95 for transmission by or from the escrow agent computer 95 at a later time. The video and/or audio recording device(s) 95J can also be utilized to facilitate one-way broadcasts from the escrow agent computer 95, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, a user of the escrow agent computer 95 can engage in telephone calls and video conferencing calls via the same. The user of the escrow agent computer 95 can also use the video and/or audio recording device(s) 95J to record and broadcast or transmit content via its transmitter 95F.

Figure 12:
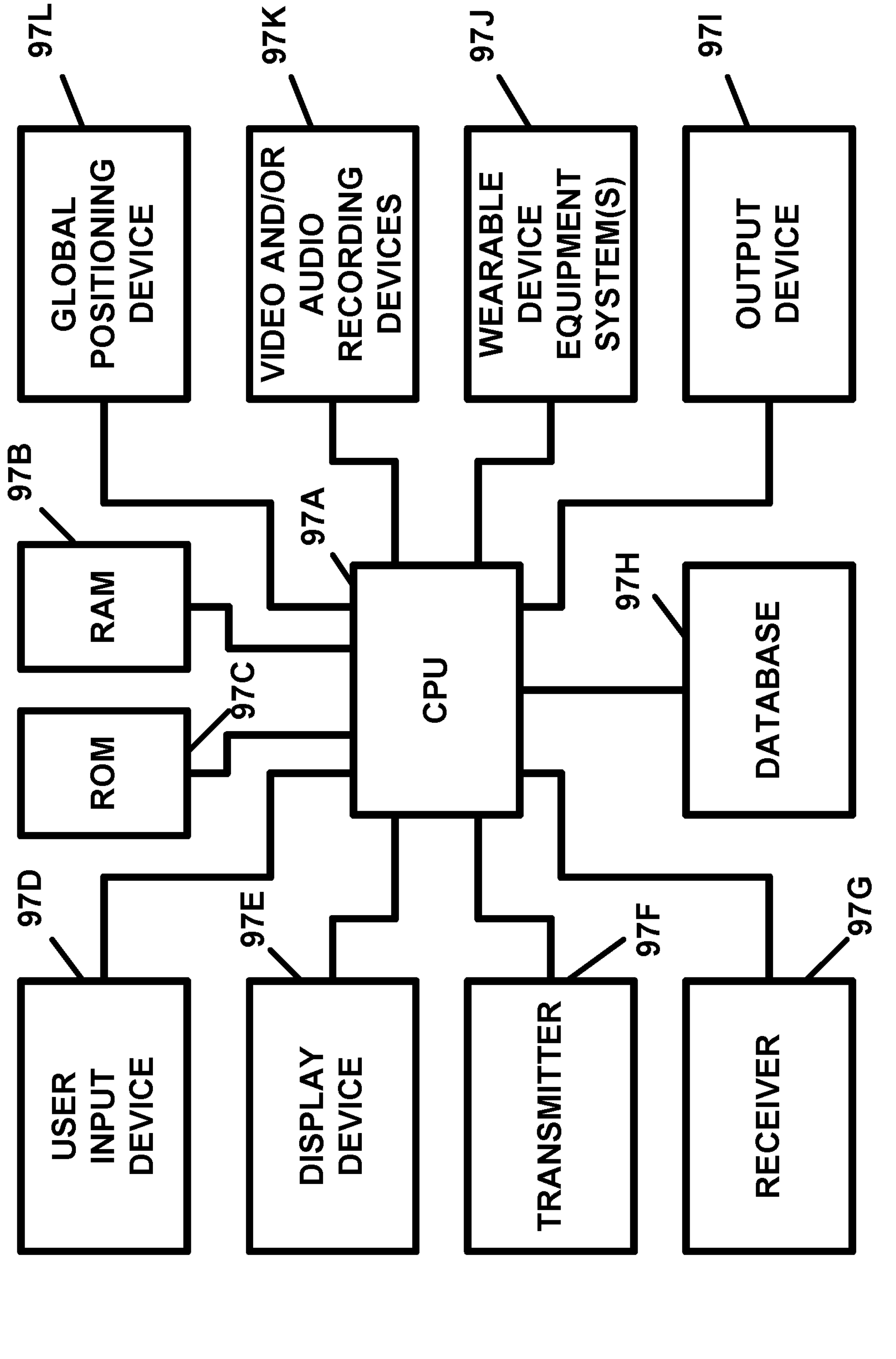
FIG. 12 illustrates the wearable device of FIG. 1, in block diagram form.

FIG. 12 illustrates the wearable device 97 of FIG. 1, in block diagram form. With reference to FIG. 12, in the preferred embodiment, the wearable device 97 includes a central processing unit or CPU 97A, which in the preferred embodiment, is a microprocessor. The CPU 97A may also be a microprocessor or any other processor which can be utilized in connection with any wearable devices. The CPU 97A is specially programmed and/or specially configured to perform all of the functionality described herein as being performed by the wearable device 97.

The wearable device 97 also includes a random access memory (RAM) device(s) 97B and a read only memory (ROM) device(s) 97C, each of which is connected to the CPU 97A, and a user input device 97D, for entering data or information and/or instructions and/or commands into the wearable device 97, which can include any one or more of a keyboard, a touch screen keyboard, a scanner, a user pointing device, such as, for example, a mouse, an audio input device, a microphone, a camera, a video recording device, a touch pad, or a touch screen, or any other device or component for allowing data, information, or instructions and/or commands, to be entered into the wearable device 97. The input device(s) 97D is/are also connected to the CPU 97A.

The wearable device 97 can also include a display device 97E for displaying data and/or information to a user. The wearable device 97 also includes a transmitter(s) 97F, for transmitting signals and/or data and/or information to any one or more of the central processing computer(s) 10, the user communications devices 20, the sport governing body computers 30, the governmental entity computers 40, the gaming facility computers 50, the content provider computers 60, the information/analytics provider computers 70, the social network computers 80, the financial institution computers 90, the escrow agent computers 90, and/or any other wearable devices 97, which may be utilized in conjunction with the apparatus 100 of the present invention.

The wearable device 97 also includes a receiver 97G, for receiving signals and/or data and/or information from any one or more of the central processing computer(s) 10, the user communication devices 20, the sport governing body computers 30, the governmental entity computers 40, the gaming facility computers 50, the content provider computers 60, the information/analytics provider computers 70, the social network computers 80, and financial institution computers 90, the escrow agent computers 90, and/or any other wearable devices 97, which may be utilized in conjunction with the apparatus 100 of the present invention.

The wearable device 97 can also include a database(s) 97H which can contain and/or can be linked to any of the data and/or information described herein as being stored in the database 10H. The database 97H can also contain and/or include data and/or information which may be required, and/or which may be desired, for performing any of the functionality and/or processing routines described herein as being performed by the wearable devices 97 and/or the apparatus 100. In a preferred embodiment, the database 97H can also include any of the data and/or information described herein as being contained in the respective databases of the central processing computer(s) 10, the user communication devices 20, the sport governing body computers 30, the governmental entity computers 40, the gaming facility computers 50, the content provider computers 60, the information/analytics provider computers 70, the social network computers 80, the financial institution computers 90, and the escrow agent computers 95. The database 97H can also be connected to the CPU 97A.

The wearable device 97 also includes an output device 971 for outputting any of the data, information, and/or reports, described herein as being generated by or via the wearable device 97. In the preferred embodiment, the output device 971 can be a printer, a display, a transmitter, a modem, and/or any other device which can be used to output data and/or information of any kind or type.

The wearable device 97, in a preferred embodiment, also includes wearable device equipment system(s) 97J which can be utilized to measure biological, physiological, or any other data and/or information related to the athlete or player or the athlete's or player's performance. For example, the equipment system(s) 97 can be, or can include, equipment for measuring pulse rate, heart rate, blood pressure, blood-sugar level, glucose-sugar level, speed of movement, steps taken, distance traveled, or any other data and/or information regarding the athlete or player, or the performance and/or movements of the athlete or player during a game, match, or competition. The wearable device equipment system(s) 97J can also include a gyroscope, an accelerometer, a decelerometer, a magnetometer, an RFID tag(s), a thermometer for measuring temperature of the environment, a device for measuring body temperature, a device for measuring speed of movement, a device for measuring distance traveled, or any other device or devices which can measure and record information regarding three-dimensional movements of an athlete or player and/or which can be used to monitor, measure, and/or track athlete or player performance. In a preferred embodiment, the wearable device equipment system(s) 97J can also include any other devices or equipments which are needed, required, or desired, for measuring, monitoring, and/or tracking athlete or player performance using any type or kind of optical-based camera (OBC) player tracking systems, local positioning system (LPS) player tracking systems, and/or global positioning system/global navigation satellite system (GPS/GNSS) player tracking systems, and/or any other player tracking system.

In a preferred embodiment, the respective optical-based camera (OBC) player tracking systems, local positioning system (LPS) player tracking systems, and/or global positioning system/global navigation satellite system (GPS/GNSS) player tracking systems, which are utilized to track athlete or player performance also includes RFID tags or other devices, which are or can be utilized to measure and/or track the respective movement, speed of movement, distance traveled, and/or any other data and/or information regarding the movement or speed of movement of a ball or puck used in a game, a bat or a stick, or any other equipment used in any game by any athlete or player.

The wearable device 97 also includes a video and/or audio recording device(s) 95K which can include a camera and/or a video recording device for recording pictures or video and/or video clips and/or a microphone or an audio recording device for recording audio or audio clips which can be recorded by, and/or transmitted live, by or from the wearable device 97, or which can be recorded by, and stored at or in, the wearable device 97 for transmission by or from the wearable device 97 during a game, match, or competition, or at a later time. The video and/or audio recording device(s) 95K can also be utilized to facilitate one-way broadcasts from the wearable device 97, and/or can be utilized to facilitate video conferencing, video chatting, and/or audio conferencing, and/or video and audio conferencing, between any of the herein-described users, individuals, parties, or entities, who or which utilize the apparatus 100 and method of the present invention. In this regard, a user of the wearable device 97 can engage in telephone calls and video conferencing calls via the same. The user of the wearable device 97 can also use the video and/or audio recording device(s) 95K to record and broadcast or transmit content via its transmitter 97F.

With reference to FIG. 12, the wearable device 97, in the preferred embodiment, also includes a global positioning device 97L for determining the position or location of the wearable device 97. In a preferred embodiment, the global positioning device 97L can be utilized to determine the position or location of the wearable device 97 and can be utilized to track and measure an amount of movement, and/or or a distance traveled, and/or a speed of movement or travel, by an athlete or player during a game, match, or competition.

For example, the wearable device 97 can utilize the global positioning device 97L in determining an athlete's or a player's speed of movement, direction of travel, frequency of movements, and/or total distance traveled, during a game, match, or competition.

The apparatus 100 of the present invention can be utilized in a number of various preferred embodiments in order to allow individuals or users, or groups of individuals or users, to place bets on sporting events, games, matches, activities, competitions, or tournaments, of all types or kinds, via the apparatus 100. Individuals or users can also watch and/or listen to a sporting event, game, match, activity, competition, or tournament, via an electronic forum, chat room, or webpage, with others or while alone, communicate with other individuals or users participating in the electronic forum or chat room, place bets via the electronic forum, chat room, or webpage, obtain information via the apparatus 100, electronic forum, chat room, or webpage, and/or report instances of suspected game fixing, match fixing, or cheating, via the apparatus 100, electronic forum, chat room, or webpage.

The apparatus 100 of the present invention can also be utilized by an individual or user to communicate with, and/or obtain information from, a sports governing body, governmental entity, gaming facility, or content provider, before, during, or after, a sporting event, game, match, activity, competition, or tournament, obtain analytics information from a sports information and/or analytics provider regarding a sporting event, game, match, activity, competition, or tournament, obtain betting odds information regarding a sporting event, game, match, activity, competition, or tournament, and/or obtain data and/or information from wearable devices worn by players or athletes during sporting events, games, matches, activities, competitions, or tournaments.

The apparatus 100 of the present invention can also be utilized in order to obtain services from a financial institution and/or an escrow agent or escrow service before, during, or after, a sporting event, game, match, activity, competition, or tournament, as well as for placing bets or bet monies in escrow for safekeeping.

The apparatus 100 of the present invention can also be utilized in order to allow an individual or user to watch and/or listen to sporting events, games, matches, activities, competitions, or tournaments, with other individuals or users, who may be friends of the individual or user or members of the individual's or user's social network or social networking group, and to place bets while watching or listening to the sporting events, games, matches, activities, competitions, or tournaments.

The apparatus 100 of the present invention can also be utilized by an individual or user to watch and/or listen to a sporting event, game, match, activity, competition, or tournament, using 360 degree video, virtual reality (VR), or augmented reality (AR), or any combination of same.

The apparatus 100 of the present invention can be utilized in connection with sports betting activities for any and all types or kinds of sporting events, games, matches, activities, competitions, or tournaments. In this regard, and without any limiting the use the use of the apparatus 100 of the present invention in any way, the apparatus 100 can be utilized to engage in sports betting activities and/or any sports betting-related activities involving football games, soccer games, baseball games, basketball games, ice hockey games, field hockey, American football games, cricket games or matches, lacrosse games, tennis matches, car races, track and field events, contests, or tournaments, swimming tournaments, dividing tournaments, boxing matches, martial arts matches, mixed martial arts matches, curling matches, bobsledding matches, as well as any and/or all variations of any sporting, athletic, gymnastic, or any other games, matches, activities, competitions, or tournaments, for which a bet can be placed. The apparatus 100 of the present invention can also be utilized to place bets on Esports (or "esports") games, matches, or competitions, and/or any video games, matches, or competitions. The apparatus 100 of the present invention can also be utilized to place bets on any team or club, as well as individual, sporting events, games, matches, activities, competitions, or tournaments, of any type or kind.

In a preferred embodiment, the apparatus 100 of the present invention can also be utilized to allow an individual or user to search for, find, and/or be notified regarding, a sporting event, game, match, activity, competition, or tournament, on which he or she can place a bet, allow the individual or user to place a bet on the respective sporting event, game, match, activity, competition, or tournament, allow the individual or user to watch and/or listen to the sporting event, game, match, activity, competition, or tournament, via the apparatus 100, an electronic forum, a chat room, or a webpage, either alone or with other individuals or users, and allow the individual or user to engage in, or participate in, a number of various activities.

The apparatus 100 can provide an electronic forum or chat room (not shown), or a webpage, which can provide an individual or user with a video screen via which he or she can watch and/or listen to a sporting event, game, match, activity, competition, or tournament. The apparatus 100, the electronic forum, the chat room, or the webpage can also provide the individual or user with sports betting and other data and/or information, which can be continuously updated, and allow the individual or user to place bets, communicate with others, and engage in a wide variety of activities described herein.

Figure 13A:
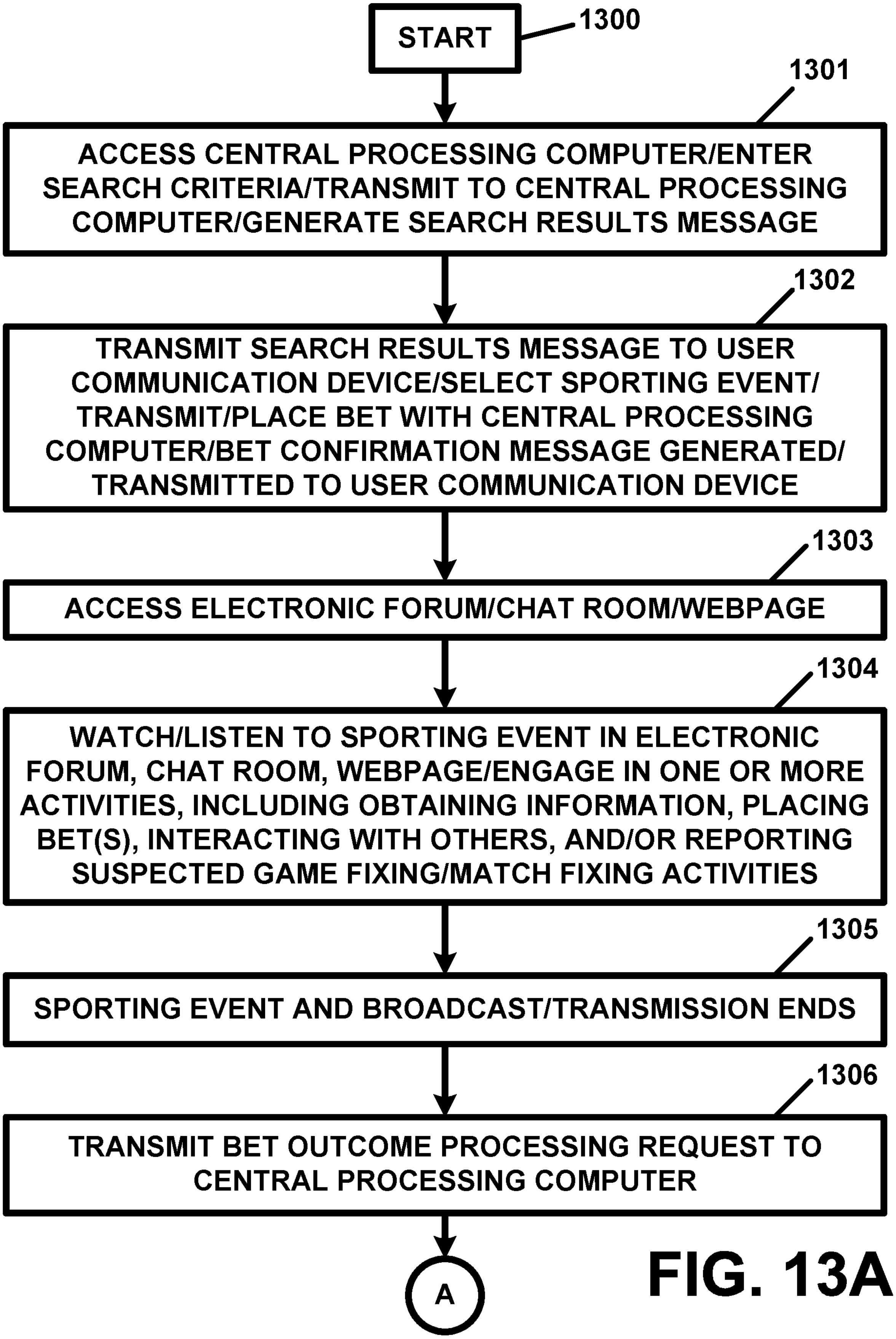
FIGS. 13A and 13B illustrate a preferred embodiment method for utilizing the apparatus and methods of the present invention, in flow diagram form.
Figure 13B:
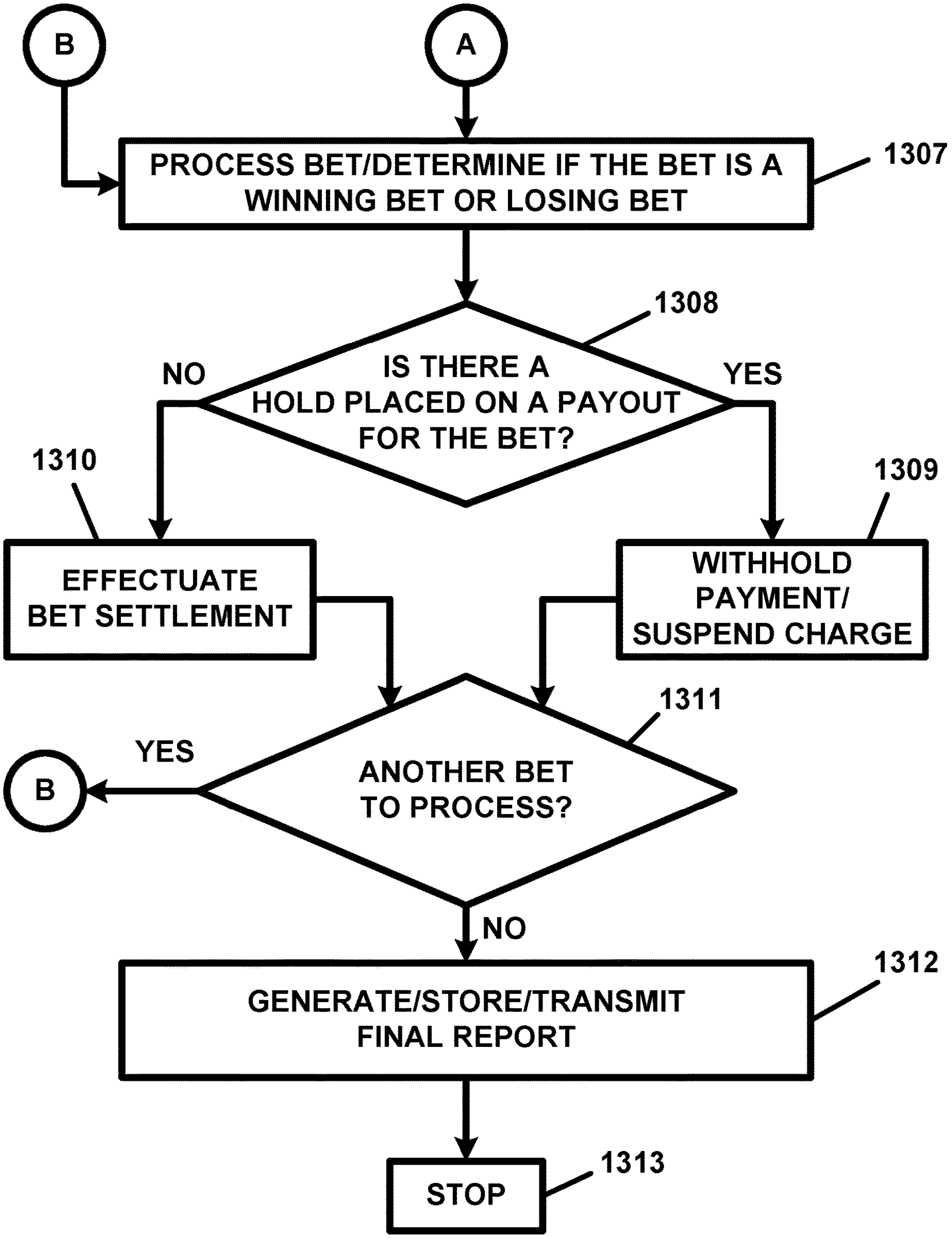

FIGS. 13A and 13B illustrate a preferred embodiment method for utilizing the apparatus 100 and methods of the present invention, in flow diagram form. With reference to FIGS. 13A and 13B, the operation of the apparatus 100 commences at step 1300. At step 1301, the individual or user can access the central processing computer 10 by using the user communication device 20. In a preferred embodiment, the central processing computer 10 can be operated and/or maintained by any on-line sports betting, gaming, or gambling, company or entity of any type of kind. In a preferred embodiment, the individual or user can utilize any user communication device 20 in order to access the central processing computer 10.

In another preferred embodiment of FIGS. 13A and 13B, the individual or user can utilize a headset as, or in conjunction with, the user communication device 20. In a preferred embodiment, whenever the individual or user uses a headset as, or in conjunction with, the user communication device 20, the individual or user can utilize the microphone of the video and/or audio recording device(s) 20J of the communication device 20 and associated voice recognition software in order to verbally input data, information, commands, or instructions, into the user communication device 20, and the individual or user can also utilize the same to verbally communicate with the central processing computer(s) 10, the sport governing body computers 30, the governmental entity computers 40, the gaming facility computers 50, the content provider computers 60, the information/analytics provider computers 70, the social network computers 80, the financial institution computers 90, the escrow agent computers 95, and the wearable devices 97.

With reference once again to step 1301, the individual or user can search for a sporting event, game, match, activity, competition, or tournament, on which he or she can place a bet. At step 1301, the individual or user can, using the user communication device 20 in communication with the central processing computer 10, search for the sporting event, game, match, activity, competition, or tournament, on which he or she wants to place a bet, or the individual or user can search for and locate a sporting event, game, match, activity, competition, or tournament, by searching for same via the central processing computer 10. In instances when the individual or user is in search of a sporting event, game, match, activity, competition, or tournament, on which to place a bet, the individual or user can search for the same by searching by sport, by country or region in the world in which the sporting event, game, match, activity, competition, or tournament, is being held, by team or teams playing in or participating in the sporting event, game, match, activity, competition, or tournament, by player or players playing in or participating in the sporting event, game, match, activity, competition, or tournament, by betting odds placed on the sporting event, game, match, activity, competition, or tournament, or by any other criteria. At step 1301, after entering the search criteria into the user communication device 20, the search criteria can be transmitted to, and received by, the central processing computer 10. At step 1301, the central processing computer 10 can receive and process the search criteria and can generate a search results message containing information regarding one or more sporting events, games, matches, activities, competitions, or tournaments, on or for which a bet(s) can be placed.

At step 1302, central processing computer 10 can transmit the search results message to the user communication device 20. At step 1302, user communication device 20 can receive the search results message. At step 1302, the individual or user can review the information contained in the search results message and select the sporting event, game, match, activity, competition, or tournament, on or for which he or she desires to place a bet. In a preferred embodiment, the individual or user, at step 1302, can, but not need, access the information/analytics provider computer 70 in order to obtain any data and/or information, or analytics data and/or information, which he or she may want to obtain and review in advance of placing any bet.

At step 1302, the individual or user can also request that the information/analytics provider computer 70 transmit updated data and/or information, including, but not limited to, analytics data and/or information, information regarding betting odds or betting odds changes, information regarding new betting opportunities, and/or any other data and/or information regarding the sporting event, game, match, activity, competition, or tournament, for which the individual or user wants to place a bet, or data and/or information regarding any teams and/or players or participants in or of same, to the user communication device 20, before the start of, during, or after, the selected sporting event, game, match, activity, competition, or tournament. At step 1302, the individual or user can also request to be notified regarding, and be provided with, data and/or information, including, but not limited to, analytics data and/or information, data and/or information regarding betting odds or betting odds changes, information regarding new betting opportunities, and/or any other data and/or information regarding any other sporting sporting events, games, matches, activities, competitions, or tournaments, or any teams, players, or participants, involved in same, in which the individual or user may be interested.

At step 1302, the individual or user can place a bet on the selected sporting event, game, match, activity, competition, or tournament. In a preferred embodiment, the individual or user can place a bet by transmitting information regarding the bet or a bet message from the user communication device 20 to the central processing computer 10. In a preferred embodiment, the information regarding the bet or the bet message can contain information regarding the bet, the betting position taken, and/or the amount of the bet. In a preferred embodiment, the bet, information regarding the bet, or the bet message, can also contain information regarding the position or location of the user communication device 20 at the time of the placing of the bet or at the time of the transmission of the information regarding the bet or the bet message from the user communication device 20 to the central processing computer 10.

In a preferred embodiment, the position or location of the user communication device 20 can be determined by the global positioning device 20K of the user communication device 20. In another preferred embodiment, and especially in instances in which the user communication device 20 is not a mobile device, but rather, is a stationary device such as, for example, but not limited to, a desktop computer, a personal computer, or a computer located at a venue, the position or location of the user communication device 20 can be determined by the IP address assigned to or for the user communication device 20 at the time of the transmission of the bet, information regarding the bet, or the bet message, from the user communication device 20. In a preferred embodiment, information regarding the position or location, or the IP address, of the user communication device 20, at the time of the placing of the bet or at the time of the transmission of the information regarding the bet, or the bet message, can be used to determine the jurisdiction, country, state, province, or political subdivision, from which the bet is placed so that the central processing computer 10 can ascertain the same in order to determine whether or not the bet is a legal, authorized, or allowed, bet in the jurisdiction, country, state, province, or political subdivision, and so as to effectuate a payment of a gaming fee or betting fee, if needed, to the respective jurisdiction, country, state, province, or political subdivision.

In a preferred embodiment, the individual or user can utilize is or her sports betting account, gaming account, or gambling account, or any appropriate or suitable payment identifier, in order to place, and make payment for, the bet. In another preferred embodiment, the individual or user can provide a payment identifier such as, but not limited to, a credit account number, a credit card account number, a debit account number, a debit card account number, a charge account number, a charge card account number, a savings account number, a checking account number, or any other payment account number.

In a preferred embodiment, the individual or user, at step 1302, can also access his or her sports betting account, gaming account, or gambling account, by accessing the same via the financial institution computer 90, of the financial institution which services the respective account, in order to ascertain the status of the same or to make payment for the bet by utilizing the same. In another preferred embodiment, the individual or user can also instruct the central processing computer 10 to place his or her bet into an escrow account in order to protect the individual or user in instances of game fixing, match fixing, or cheating, should such conduct be reported or discovered before, during, or after, the selected sporting event, game, match, activity, competition, or tournament. At step 1302, the individual or user can also instruct that the escrow computer 95 not make payment of any lost bet until after a certain and/or predefined time period has elapsed, so that the individual or user can be protected against any game fixing, match fixing, or cheating, activities.

For example, if the apparatus 100 is utilized in connection with practices designed to identify and combat game fixing, match fixing, or cheating, activities, then the individual or user, or any entities who or which utilize the apparatus 100 of the present invention, can utilize the escrow agent computer 95 so as to hold any or all bets in escrow for a certain amount of time, which can be any pre-selected time period, such as, but not limited to, one hour, two hours, six hours, twelve hours, twenty four hours, or any other desired time period, so as to provide operators of the apparatus 100, and any other individuals to entities, with sufficient opportunity to ensure that no game fixing, match fixing, or cheating, activities have occurred, with regards to a sporting event, game, match, activity, competition, or tournament, which could defraud the individual or user or any other individuals or users of the apparatus 100.

The above-described features of the apparatus 100, including the use of the escrow agent computer 95 to hold and keep a placed bet in escrow, can provide a safeguard against game fixing, match fixing, or cheating, activities and provide a more secure sports betting environment. At step 1302, the central processing computer 10 can receive and process the information regarding the bet and store the information regarding the bet in the database 10H. At step 1302, the user communication device 20 used by the individual or user can also store the information regarding the bet in the database 20H. The bet, described as being placed above, at step 1302, can be referred to herein as the "outcome bet".

In a preferred embodiment, the central processing computer 10 can also, at step 1302, determine whether or not the bet is a legal bet, an authorized bet, or an allowed bet, or an illegal bet, an unauthorized bet, or a disallowed bet, based on and using information regarding any applicable statutes, rules, or regulations, of the jurisdiction, country, state, province, or political subdivision, from which the bet is placed and/or in the jurisdiction, country, state, province, or political subdivision, in which the sporting event is taking place. In a preferred embodiment, where applicable, the central processing computer 10 can utilize information regarding the position or location of, or the IP address of, the user communication device 20 at the time the bet is placed or at the time the bet, information regarding the bet, or the bet message, is transmitted from the user communication device 20 in order to ascertain the jurisdiction, country, state, province, or political subdivision, in or from which the bet is placed. In a preferred, the central processing computer 20, at step 1302, can process information for placing the bet if the bet is legal, authorized, or allowed. If the bet is not legal, not authorized, or not allowed, then the central processing computer 10 can or will disallow the bet.

At step 1302, if the bet is legal, authorized, or allowed, and the bet is processed, the central processing computer 10 can also generate a bet confirmation message containing information regarding the bet that was placed, the date and time of the bet, the amount of the bet, the date and time of the selected sporting event, game, match, activity, competition, or tournament, on or for which the bet was placed, and a link to an electronic forum, a chat room, or a webpage of a website, in or via which the individual or user can watch and/or listen to the sporting event, game, match, activity, competition, or tournament, in or via which the individual or user can interact with other individuals or users in a group or social networking environment, and/or in or via which the individual or user can engage in any of the other herein-described activities.

In a preferred embodiment, the central processing computer 10 can be specially programmed and/or specially configured to provide multiple broadcasts simultaneously of the sporting event, game, match, activity, competition, or tournament, to any number of different and distinct social networking groups in or via any number of electronic forums, chat rooms, or webpages of websites, allow individuals or users to watch and/or listen to the sporting event, game, match, activity, competition, or tournament, with others, with friends or acquaintances, with social network group members, or while alone, and allow individuals or users to communicate and/or interact with other individuals or users or with one another, engage in a video conference or video chat with others or with one another, post messages, comments, and other postings, place additional bets on the sporting event, game, match, activity, competition, or tournament, place bets on other sporting events, matches, games, competitions, or tournaments, request and be provided with data and/or information or analytical data and/or information for the sporting event, game, match, activity, competition, or tournament, or for another sporting event, game, match, activity, competition, or tournament, and report instances of game fixing, match fixing, or cheating.

In instances in which the individual or user initially selected to watch and/or listen the sporting event, game, match, activity, competition, or tournament, by himself or herself, the individual or user can, at any time before or during the sporting event, game, match, activity, competition, or tournament, join any available electronic forum or chat room provided in the betting confirmation message. It is noted that the terms "bet confirmation message" and "bet confirmation message" can be utilized interchangeably herein. Links to any such electronic forums or chat rooms can also be provided along with a broadcast of the sporting event, game, match, activity, competition, or tournament provided on a website.

At step 1302, the bet confirmation message can be transmitted from the central processing computer 10 to the user communication device 20 used by the individual or user to place the bet, and/or the bet confirmation message can also be transmitted in or as an email message and be transmitted to the email server servicing the individual's or user's email account so that the individual or user can access the bet confirmation message from any user communication device 20. The betting confirmation message can also be transmitted, as an instant message or as an SMS message, to the user communication device 20 or to another user communication device 20 which can be used by the individual or user to receive the same and to access the sporting event, game, match, activity, competition, or tournament or the electronic forum, chat room, or webpage.

In another preferred embodiment, the individual or user can program, or request, at the time of the placing of the bet on the sporting event, game, match, activity, competition, or tournament, or upon registering an account with the apparatus 100 or the central processing computer 10, that the central processing computer 10 generate a sporting event message, containing information or containing reminder information regarding the sporting event, game, match, activity, competition, or tournament, on which the bet, or a bet, has been placed by the individual or user, and transmit the sporting event message to any user communication device 20 used by the individual or user, as a text message, as an instant message, or as an SMS message, or in or as an email message, transmitted to the email server servicing the individual's or user's email account, prior to the start of the sporting event, game, match, activity, competition, or tournament. In a preferred embodiment, the sporting event message can contain all of the information and link or links described herein as being included in the betting confirmation message, and can serve to remind the individual or user about the sporting event, game, match, activity, competition, or tournament. In a preferred embodiment, the sporting event message can be transmitted and/or retransmitted multiple times and/or at pre-defined time intervals in advance of the sporting event, game, match, activity, competition, or tournament, to serve to remind the individual or user of the same and provide the individual or user with a sufficient amount of time to be ready to watch and/or listen to the same.

At step 1303, the individual or user, prior to the start of the sporting event, game, match, activity, competition, or tournament, or at any time thereafter, can access the respective electronic forum, chat room, or webpage of the website, in or via which the individual or user can watch and/or listen to the sporting event, game, match, activity, competition, or tournament, and, in the case of the individual or user accessing the electronic forum or chat room, interact with other individuals or users or interact with individuals or users in the individual's or user's social networking group or in the individual or user's group of friends, or, in the case of the webpage of the website, watch and/or listen to the sporting event, game, match, activity, competition, or tournament, by himself or herself. Thereafter, the individual or user can watch and/or listen to the respective sporting event, game, match, activity, competition, or tournament, and/or interact with any other individual(s) or user(s), and/or engage in any of activities described herein.

At step 1304, the individual or user can watch and/or listen to the sporting event, game, match, activity, competition, or tournament, which is the subject of the bet. In a preferred embodiment, the sporting event, game, match, activity, competition, or tournament, can be transmitted, broadcast, or "streamed" from or via a gaming facility computer 50 and/or a content provider computer 60 located at the venue of the sporting event, game, match, activity, competition, or tournament, to the central processing computer 10, or directly to the individual's or user's user communication device 20. In this regard, the sporting event, game, match, activity, competition, or tournament, which is the subject of the bet, can be transmitted, broadcast, or "streamed" to the user communication device 20 from either the central processing computer 10 or from the gaming facility computer 50 or the content provider computer 60 located at the venue of the sporting event, game, match, activity, competition, or tournament.

In a preferred embodiment, the respective electronic forum, chat room, of website, can transmit and provide, to the user communication 20, for display via the display device 20E of same, a live video or a streaming video and/or audio of the sporting event, game, match, activity, competition, or tournament, data and/or information and/or analytics data and/or information regarding the respective teams, players, or other competitors involved in or participating in the sporting event, game, match, activity, competition, or tournament, a listing of all available bets and their respective odds, and a listing of all private bets offered by any of the individuals or users who may be watching and/or listening to the sporting event, game, match, activity, competition, or tournament, via the respective electronic forum or chat room. In a preferred embodiment, in instances where the electronic forum or chat room is being used, any and all comments, messages, or postings, posted by any of the individuals or users who may be watching and/or listening to the sporting event, game, match, activity, competition, or tournament, via the respective electronic forum or chat room can also be displayed via the display device 20E of the user communication device 20. In a preferred embodiment, the individual or user can also engage in video conference calls or video chats with other individuals or users via the respective electronic forum or chat room. In a preferred embodiment, the individual or user watching and/or listening to the sporting event, game, match, activity, competition, or tournament, via the webpage of the website can also post comments in a comments section on the website.

In a preferred embodiment, the individual or user can also watch and/or listen to the sporting event, game, match, activity, competition, or tournament, in 360 degree video, in virtual reality (VR), or in augmented reality (AR). In a preferred embodiment, any data and/or information, and any functionalities and/or individual or user activities, described herein as being provided in and via the respective electronic forum, chat room, or website, can also be provided to the individual or user in and via a 360 degree video, a virtual reality (VR), or an augmented reality (AR), presentation and experience. In a preferred embodiment, the individual or user can download, from the central processing computer 10 to his or her user communication device, any needed or desired 360 degree video, virtual reality (VR), and/or augmented reality (AR), software or software applications (also referred to as "apps"). Any such downloading of any 360 degree video, virtual reality (VR), and/or augmented reality (AR), software or apps can take place during step 1301.

At step 1304, the individual or user can watch and/or listen to the sporting event, game, match, activity, competition, or tournament, via the respective electronic forum, chat room, or website. In the preferred embodiment, the respective electronic forum, chat room, or webpage of the website, via which the sporting event, game, match, activity, competition, or tournament, is being watch and/or listen to, can be specially designed to allow the individual or user, or any other individuals or users, to watch and/or listen to the sporting event, game, match, activity, competition, or tournament, and to communicate with other individuals or users in the electronic forum or chat room.

In a preferred embodiment, the respective electronic forum, chat room, or webpage of the website, on, in, or via, which the sporting event, game, match, activity, competition, or tournament, can be watched and/or listened to can also be specially designed and/or specially configured to, simultaneously with providing the sporting event, game, match, activity, competition, or tournament, allow the individual or user, or any other individuals or users, to post comments or messages regarding the sporting event, game, match, activity, competition, or tournament, and/or to communicate with any other individual(s) or user(s) watching and/or listening to the sporting event, game, match, activity, competition, or tournament, via the electronic forum or chat room, and/or to communicate with the central processing computer 10, and/or with any of the sport governing body computers 30, the governmental entity computers 40, the gaming facility computers 50, the content provider computers 60, the information/analytics provider computers 70, the social network computers 80, the financial institution computers 90, the escrow agent computers 95, and the wearable devices 97, described herein as being utilized with the apparatus 100.

In the preferred embodiment, the respective electronic forum, chat room, or webpage of the website, on, in, or via, which the sporting event, game, match, activity, competition, or tournament, can be watched and/or listened to can also be specially designed and/or specially configured to, simultaneously with providing the sporting event, game, match, activity, competition, or tournament, allow the individual or user, or any other individuals or users, to view data and/or information and/or analytics and/or information regarding the sporting event, game, match, activity, competition, or tournament, and/or the teams, players, or participants, participating in the same, to view information obtained by of from any wearable devices 97 worn or used by any players or participants in the sporting event, game, match, activity, competition, or tournament, and/or to view any analytics data and/or information relating to any data and/or information obtained by or from any of the wearable devices 97 during the sporting event, game, match, activity, competition, or tournament.

In the preferred embodiment, the respective electronic forum, chat room, or webpage of the website, on, in, or via, which the sporting event, game, match, activity, competition, or tournament, can be watched and/or listened to can also be specially designed and/or specially configured to, simultaneously with providing the sporting event, game, match, activity, competition, or tournament, allow the individual or user, or any other individuals or users, to view information regarding available bets being offered by various book makers or other gaming or gambling entities or individuals or users, to view private bets being offered by other individuals or users participating in the electronic forum or chat room, and/or to view private bets being offered by other individuals or users who or which utilize the apparatus 100 and method of the present invention.

In the preferred embodiment, the respective electronic forum, chat room, or webpage of the website, on, in, or via, which the sporting event, game, match, activity, competition, or tournament, can be watched and/or listened to can also be specially designed and/or specially configured to, simultaneously with providing the sporting event, game, match, activity, competition, or tournament, allow the individual or user, or any other individuals or users, to place a bet or any number of bets on the outcome of the sporting event, game, match, activity, competition, or tournament, at any time prior to the conclusion of the sporting event, game, match, activity, competition, or tournament, and/or to place a bet or any numbers of bets on any plays, calls, occurrences, or events, which occur during the game (hereinafter referred to as "game events", "match events", or "micro-events"). Game events, match events, or micro-events, can include, for example, but are not limited to, any play, activity, action by a team, action by a player or participant, penalty call, type of penalty, infraction, type of infraction, violation, type of violation, scoring play, type of play, type of activity engaged in, a score at a particular time of the sporting event, game, match, activity, competition, or tournament, such as, for example, the score at the end of a quarter or at the half-time, or at any other specified time in or during the sporting event, game, match, activity, competition, or tournament, and/or any other play, activity, and/or call made by a game or match official, referee, or umpire, which can be the subject of a bet. Any bets on game events or match event can also be referred to herein as "game event bets" or "match event bets".

Private bets, which can be, or which can include, outcome bets or game event bets or match event bets, and which can be offered by the individual or user or by any other individual(s) or user(s), can also be offered via the electronic forum, chat room, or the webpage of the website. Betting odds for any bets described herein, as well as continuous updates to any betting odds for any of the bets described herein, can also be provided via the electronic forum, chat room, or the webpage of the website.

At step 1304, the individual or user, or any other individual(s) or user(s) watching and/or listening to the sporting event, game, match, activity, competition, or tournament, can place any number and/or types of bets, including outcome events and bets on game events ("game event bets) or match events ("match event bets") which can or may take place during the course of the sporting event, game, match, activity, competition, or tournament. Each time a bet is placed by the individual or user or by any other individual or user, the central processing computer 10 can process and store information regarding the bet placed, the individual or user who placed the bet, the sporting event, game, match, activity, competition, or tournament, on or during which the bet was placed, the amount of the bet, the time of the bet, the date of the bet, any counterparty to the event, the sports betting account, gaming account, or gambling account, used in placing the bet, and/or any information regarding whether or not any bet monies were instructed to be placed in escrow with the escrow agent computer 95, and/or any other information regarding the bet.

At step 1304, the individual or user, or any other individual(s) or user(s) watching and/or listening to the sporting event, game, match, activity, competition, or tournament, can request any data and/or information and/or analytics data and/or information at any time before, during, or after, the sporting event, game, match, activity, competition, or tournament. Any data and/or information and/or any analytics data and/or information requested, or any data and/or information and/or analytics data and/or information which is provided without request, can be transmitted from the information/analytics provider computer 70 and/or from the central processing computer 10 and can be viewed in or via the electronic forum, chat room, or webpage of the website.

At step 1304, the individual or user, or any other individual(s) or user(s) watching and/or listening to the sporting event, game, match, activity, competition, or tournament, can place any number of posts or comments in the electronic forum, chat room, or webpage of the website. At step 1304, the individual or user, or any other individual(s) or user(s) watching and/or listening to the sporting event, game, match, activity, competition, or tournament, can place any number of outcome bets, or game event bets or match event bets, before or during the sporting event, game, match, activity, competition, or tournament.

In a preferred embodiment, the individual or user can, at step 1304 or at any other time, place any bet while in, or via, the respective electronic forum, chat room, or webpage of the website, or via the central processing computer 10. In all instances when the individual or user places any bet, information regarding or pertaining to the bet can be transmitted from the user communication device 20 and can be received and processed by the central processing computer 10. At step 1304, each time a bet is placed by the individual or user, information regarding the same can be stored in his or her sports betting account, gaming account, or gambling account, which information can be stored and maintained at the central processing computer 10, the individual's or user's user communication device 20, the financial institution computer 90, and/or the escrow agent computer 95.

In a preferred embodiment, the central processing computer 10 can transmit information regarding any and/or all of the individual's or user's bets which are placed on the sporting event, game, match, activity, competition, or tournament, as well as any information regarding any and/or all of the individual's or user's bets which are placed on any other sporting event(s), game(s), match(es), activities, competition(s), or tournament(s), along with the playing time(s) of same, which might be occurring concurrently with, or which might overlap in time in any way with, the sporting event, game, match, activity, competition, or tournament watched and/or listened to. In another preferred embodiment, in instances when the individual or user has bet on, seeks to bet on, or simply wants to watch and/or listen to, another sporting event, game, match, activity, competition, or tournament, the individual or user can request a link to the respective electronic forum, chat room, or website, on or via which that other sporting event, game, match, activity, competition, or tournament can be watched or listened to.

With reference once again to FIGS. 13A and 13B, at any time during the sporting event, game, match, activity, competition, or tournament, the central processing computer 10 can, at step 1304, provide, via the respective electronic forum, chat room, or website, for each bet placed by the individual or user, an indication as to whether the individual or user is winning the bet or losing the bet at that point in time or at that point in the sporting event, game, match, activity, competition, or tournament. For example, information regarding a bet which is a winning bet at that point in time, or at that point in the sporting event, game, match, activity, competition, or tournament, can be provided or displayed in one color, such as, for example, green, while information regarding a bet which is losing bet at that point in time, or at that point in the sporting event, game, match, activity, competition, or tournament, can be provided or displayed in another color, such as, for example, red. In instances in which it cannot be determined whether a bet is a winning or a losing bet, that bet can be provided or displayed in a third and neutral color such as, for example yellow, white, or any other appropriate color.

In a preferred embodiment, at step 1304, the central processing computer 10 can also provide, via the electronic forum, chat room, or webpage of the website, and during the sporting event, game, match, activity, competition, or tournament, information regarding available new bets, betting odds for same, and/or any new or updated betting odds for bets corresponding to the sporting event, game, match, activity, competition, or tournament, as well as the availability of bets and/or betting odds for same which can provide the individual or user with an opportunity to increase his or her winnings, minimize his or her losses, or obtain any hedge position to protect his or her interests regarding any bets he or she has already placed. The individual or user can place any bet or bets using this above-described information. In a preferred embodiment, at step 1304, the central processing computer 10 can also provide, via the electronic forum, chat room, or webpage of the website, and during the sporting event, game, match, activity, competition, or tournament, information regarding a gaming insurance product or any number of gaming insurance products, and/or a gaming derivative product or any number of gaming derivative products, which the individual or user can purchase in order to minimize his or her losses.

If the individual or user chooses to purchase any gaming insurance product(s) or any gaming derivative product(s), the individual or user can enter the purchase request(s) at step 1304 and the same can be transmitted to the central processing computer 10 for processing and information storage regarding the same. Thereafter, any information regarding the individual's or user's purchase of any gaming insurance product(s) or any gaming derivative product(s) can be stored at the central processing computer 10 and, in particular, in the database 10H of same and in the individual's or user's sports betting account, gaming account, or gambling account.

Any information regarding any bets placed by the individual or user can be displayed to the individual or user in an appropriate location or section of the electronic forum, chat room, or webpage of the web site. Any information regarding any gaming insurance product(s) or any gaming derivative product(s) can also be displayed to the individual or user in an appropriate location or section of the electronic forum, chat room, or webpage of the website.

In a preferred embodiment, at step 1304, the individual or user, can also decide to sell his or her position in a bet, or purchase another individual's or user's position in a bet. In such instances, bets available for sale can be displayed to the individual or user in an appropriate location or section of the electronic forum, chat room, or webpage of the website.

In a preferred embodiment, at step 1304, the individual or user, as well any other individual(s) or user(s) watching and/or listening to the sporting event, game, match, activity, competition, or tournament, can report suspected instances of match fixing, game fixing, cheating, play irregularities, officiating irregularities, or any other instances which may call into question the integrity of the sporting event, game, match, activity, competition, or tournament. Information, postings, or comments, can be posted by the individual or user, or any other individual(s) or user(s) watching and/or listening to the sporting event, game, match, activity, competition, or tournament, in a section of the electronic forum, chat room, or webpage of the website, dedicated for same, and the information, postings, or comments, can be time stamped. This allows for information, postings, or comments, relating to the integrity of the respective sporting event, game, match, activity, competition, or tournament, to be posted by the individual or user, and by any other individual(s) or user(s) watching and/or listening to the respective sporting event, game, match, activity, competition, or tournament, during the same. The posted information, postings, or comments can be transmitted to the central processing computer 10 for dissemination to the appropriate entities and/or authorities.

In this regard, the apparatus 100 of the present invention can be utilized to obtain and report instances of suspected game fixing, match fixing, or cheating, as reported by the individuals or users who use the apparatus 100 of the present invention to watch and/or listen to sporting events, games, matches, activities, competitions, or tournaments, on which they have placed bets.

The central processing computer 10 can receive the submitted information or comments received from the individual or user, or from any other individuals or users, store the same in a file associated with the sporting event, game, match, activity, competition, or tournament, and automatically transmit the same to the sport governing body computer 30 of the sport governing body for the sport associated with, or which governs, the sporting event, game, match, activity, competition, or tournament, or the league, team, players, or participants, participating in the sporting event, game, match, activity, competition, or tournament. In this manner, the apparatus 100 can be utilized to report instances of suspected game fixing, match fixing, or cheating, activity, or any other issues pertaining to game integrity or match integrity, to the sport governing body computer 30 of the respective sport. In this regard, an international federation, the International Olympic Committee, a nation federations, and/or any national Olympic Committee, can be apprised of the suspected game fixing, match fixing, or cheating, activity, or any other game integrity or match integrity issue.

The central processing computer 10 can also automatically transmit information regarding suspected game fixing, match fixing, or cheating, activity, or any other game integrity or match integrity issue, to the respective governmental entity computer 40 for each government which may have an interest in receiving the same. In this regard, each government having an interest in receiving this information can be apprised of the suspected game fixing, match fixing, or cheating, activity, or any other game integrity or match integrity issue.

In a preferred embodiment, at step 1304, the individual or user, as well any other individuals or users watching and/or listening to the sporting event, game, match, activity, competition, or tournament, can also report any complaints regarding the placing of any bets, the payment or satisfaction regarding any bets, and/or any suspected betting fraud, and/or any other problems encountered in using via the apparatus 100. Information regarding any such complaints can be transmitted from the user communication device 20 to the central processing computer 10.

In a preferred embodiment, if the individual or user is utilizing a headset as or with the user communication device 20, and any all data or information inputs, postings, comments, information requests, placing of bets, or reports or reportings of any kind, can be input verbally via the microphone of the video and/or audio recording device(s) 20J of the user communication device 20. Any voice inputs can also translated into text and displayed in the electronic forum, chat room, or webpage of the website. The present invention can also be equipped with any needed software for translating text from one language into another language and/or translating verbal information into text and then translating the text into another language.

In a preferred embodiment, any and all interactions between the individual or user and/or any other individuals or users which take place in or via the electronic forum, chat room, or webpage of the website, can be recorded and stored by and at the central processing computer 10 in a file associated with the electronic forum, chat room, or webpage of the website, and/or in a file associated with the sporting event, game, match, activity, competition, or tournament.

In a preferred embodiment, at step 1304, any sport governing body computer 30, any governmental entity computer 40, any gaming facility computer 50, and/or any escrow agent computer 95, can be used by an authorized operator of same to monitor any and/or all activity occurring or transpiring in or via one or more electronic forums, chat rooms, or web pages of any websites, associated with any watching and/or listening to the sporting event, game, match, activity, competition, or tournament.

In a preferred embodiment, the sporting event, game, match, activity, competition, or tournament, and the streaming broadcast or transmission of same, will end at step 1305. At step 1306, the individual or user can transmit a bet outcome request to the central processing computer 10 to request that the central processing computer 10 process and determine a bet outcome or result, such as, for example, whether the individual or user has won the bet or has lost the bet, for each and every bet made by the individual or user regarding and/or during the sporting event, game, match, activity, competition, or tournament. At step 1307, the central processing computer can process each bet, one at a time as described herein. For each bet, the central processing computer 10 can determine whether the bet which is being processed is a winning bet or a losing bet. After determining whether the bet is a winning bet or a losing bet, the operation of the central processing computer 10 can proceed to step 1308 and the central processing computer 10 can determine whether or not a hold has been placed on any payouts for the bet, such as may occur in cases of suspected betting fraud, game fixing, match fixing, or cheating.

If, at step 1308, it is determined that information regarding any suspected betting fraud, game fixing, match fixing, or cheating, activity, or any other issues pertaining to game integrity or match integrity, exists or has been reported to the central processing computer 10 regarding the sporting event, game, match, activity, competition, or tournament, by or from any sport governing body computer 30, by or from any governmental entity computer, by or from any gaming facility computer 50, by or from any information/analytics provider computer 70, by or from any social network computer 80, by or from any financial institution computer 90, by or from any escrow agent computer 95, or by any user communication device 20, such as can be reported in any electronic forum, chat room, or web page of a website, as described herein, or by or through any other independent or other means, then the operation of the central processing computer 10 will proceed to step 1309 and the central processing computer 10 can withhold any payment on a winning bet, and/or suspend or withhold any charge on any losing bet, until the matter is resolved. In another preferred embodiment, the central processing computer 10 can also automatically process information for placing all bets regarding the sporting event, game, match, activity, competition, or tournament, into escrow with the escrow agent computer 95 until the matter is resolved. Thereafter, the operation of the apparatus will proceed to step 1311.

If, at step 1308, it is determined that no information regarding any suspected betting fraud, game fixing, match fixing, or cheating, activity, or any other issues pertaining to game integrity or match integrity, exists or has been reported to the central processing computer 10 regarding the sporting event, game, match, activity, competition, or tournament, then the operation of the central processing computer 10 will proceed to step 1310. At step 1310, the central processing computer 10 will effectuate a settlement of the bet by, in the event of a winning bet, effectuating a payment to the sports betting account, gaming account, or gambling account, of the individual or user, or, in the event of a losing bet, extracting payment from the sports betting account, gaming account, or gambling account, of the individual or user.

In an instance where the individual or user placed the bet monies into escrow with the escrow agent computer 95, the central processing computer 10 can generate and transmit, to the escrow agent computer 95, a request for funds, along with an official certification that no suspected game fixing, match fixing, or cheating, activity, or any other issues pertaining to game integrity or match integrity, exists or has been reported for the sporting event, game, match, activity, competition, or tournament, and thereby request the escrow agent computer 95 release the bet monies to the central processing computer 10 if all other escrow agreement conditions have been met or satisfied.

At step 1310, the central processing computer 10 can also effectuate a gaming fee payment to the respective financial account associated with the respective sport governing body computer 30 for each sport governing body which is due a gaming fee payment, effectuate a gaming fee payment to the respective financial account associated with the respective governmental entity computer 40 for each governmental entity due a gaming fee payment, effectuate a gaming fee payment to the respective financial account associated with the respective gaming facility computer 50 for each gaming facility due a gaming fee payment, effectuate a gaming fee payment to the respective financial account associated with the respective content provider computer 60 for each content provider, if any, due a gaming fee payment, and/or effectuate a gaming fee payment to the respective financial account associated with the respective information/analytics provider computer 70 for each information/analytics provider, if any, due a gaming fee payment.

In instances in which a gaming fee is due to a jurisdiction, country, state, province, or political subdivision, from which a bet is placed, or to a jurisdiction, country, state, province, or political subdivision, a gaming fee payment can be effectuated to the respective financial account associated with the respective governmental entity computer 40 for the respective jurisdiction(s), country or countries, state(s), province(s), or political subdivision(s). In this regard, any stakeholders in or of the sports betting system of the apparatus 100 of the present invention can be paid any gaming fees due them for each bet placed using the apparatus 100. Thereafter, the operation of the apparatus will proceed to step 1311.

At step 1311, the central processing computer 10 can determine if another bet or if any other bets need to be processed for the individual or user. If, at step 1311, it is determined that there are no more bets that need to be processed for the individual or user, then the operation of the apparatus 100 will proceed to step 1312. If, however, it is determined that there are other bets which need to be processed, then the operation of the apparatus 100 will proceed to step 1307 and the above-described processes of steps 1307 through 1311 can be repeated for the next bet to be processed, and thereafter for all remaining bets to be processed.

At step 1312, the central processing computer 10 can also generate a final report regarding and including information regarding all of the bets placed on the sporting event, game, match, activity, competition, or tournament, including outcome bets, and any game event bets or match event bet, the outcomes of all such bets, the identities of the all individuals or users who placed each of the bets and/or who watched and/or listened to the sporting event, game, match, activity, competition, or tournament, via any electronic forum, chat room, or web page of any website, and a record of all posting, comments, and messages, bets placed, and any and/or all activity which took place in or via the respective electronic forum(s), chat room(s), and web pages of any web sites. The final report can also contain any comments or reports regarding any instances of any suspected game fixing, match fixing, or cheating, activity, or any other issues pertaining to game integrity or match integrity.

In a preferred embodiment, the final report can be stored in the database 10H of the central processing computer 10, can be transmitted to any party or entity requesting same, and/or can be transmitted to any sport governing body computer 30, any governmental entity computer 40, any gaming facility computer 50, any information/analytics provider computer 70, any social network computer 80, any financial institution computer 90, and/or any escrow agent computer 95, either upon request or automatically. In a preferred embodiment, any requests for automated transmissions of any and/or all of the herein-described final reports, by any of the operators or owners of any of the above-described computers or communication devices, can be previously transmitted to, received by, and stored at, the central processing computer 10. Thereafter, the operation of the apparatus 100 will cease at step 1313.

In another preferred embodiment, the individual or user can, at any time, access the respective electronic forum, chat room, or website, to obtain information, such as the score, time remaining, or any other information, regarding the sporting event, game, match, activity, competition, or tournament, simply by linking to same using the link in the betting confirmation message. In this regard, the individual or user need not watch or listen to the entire sporting event, game, match, activity, competition, or tournament, but can simply access the respective electronic forum, chat room, or website, via which same can be watched and/or listened to in order to obtain information regarding same at any time. The individual or user can obtain information which may be displayed via the video screen on which the score of the sporting event, game, match, activity, competition, or tournament, and/or the individual or user can obtain information from the postings of the other individuals or users.

In another preferred embodiment, in instances in which the individual or user initially selected to watch and/or listen the sporting event, game, match, activity, competition, or tournament, by himself or herself, the individual or user can, at any time before or during the sporting event, game, match, activity, competition, or tournament, join any available electronic forum or chat room provided in the betting confirmation message. Links to any such electronic forums or chat rooms can also be provided along with a broadcast of the sporting event, game, match, activity, competition, or tournament provided on a website.

In another preferred embodiment, as well and any and/or all of the embodiments described herein, any data and/or information obtained by, recorded by, processed by, or stored in, any wearable device 97 can also be automatically transmitted to the information/analytics computer 70 for use in generating data and/or information and/or analytics data and/or information using the same. Once processed by the information/analytics computer 70, the information so generated can be transmitted to or provided to the central processing computer 10, to any user communication device 20, to the electronic forum, chat room, or webpage of a website broadcasting a sporting event, game, match, activity, competition, or tournament, to any sport governing body computer 30, to any governmental entity computer 40, to any gaming facility computer 50, to any information/analytics provider computer 70, to any social network computer 80, to any financial institution computer 90, or to any escrow agent computer 95, either automatically or upon request from a respective individual or entity.

In another preferred embodiment, as well as any and/or all of the embodiments described herein, the apparatus 100 and/or the central processing computer 10 can be specially programmed and/or specially configured to account for any time zone differences between the local time of a respective sporting event, game, match, activity, competition, or tournament, and the time zone from which an individual or user is watching and/or listening to the sporting event, game, match, activity, competition, or tournament, in or via a respective electronic forum, chat room, or webpage of a web site.

In another preferred embodiment, the apparatus 100 and/or the central processing computer 10 can also be specially programmed and/or specially configured to delay any presentation of any information, comments, or postings, which are posted or presented to or in an electronic forum, chat room, or webpage of a website, in order to adjust for any time delays detected in any streaming video and/or audio of the sporting event, game, match, activity, competition, or tournament. In this manner, the apparatus 100 can delay any posting of any information, comments, or postings, until after a play has been completed so as to adjust for any time delays in the video being streamed to the electronic forum, chat room, or webpage of a website and, therefore, prevent instances where a posting regarding a play or occurrence is displayed in the electronic forum, chat room, or webpage of a website, before the play or occurrence is shown in or via the electronic forum, chat room, or webpage of a website.

In another preferred embodiment, as well as any and/or all of the embodiments described herein, the apparatus 100 and/or the central processing computer 10 can be specially programmed by the individual to provide the individual with a notification message(s) regarding upcoming an sporting event, game, match, activity, competition, or tournament, which the individual desires to be notified. In a preferred embodiment, the individual can access the central processing computer 10 via any user communication device 20 and enter a request to be notified, with or by means of an event notification message, which can be generated and transmitted via email, instant message, SMA message, or any other electronic message transmission, regarding any one or more upcoming sporting events, games, matches, activities, competitions, or tournaments, for which bets can be placed. The event notification message can identify any number of sporting events, games, matches, activities, competitions, or tournaments, the teams, players, or participants in or of same, any betting odds associated with same, and a link for use in accessing the central processing computer 10 in order to place a bet or bets regarding any sporting event(s), game(s), match(es), competition(s), or tournament(s), identified in the event notification message.

In another preferred embodiment, as well as in any and/or all of the embodiments described herein, the individual or user or any individual or user, who uses the apparatus 100 of the present invention, can place any of the bets described herein, including, but not limited to, any of the herein-described outcome bets, game event bets, match event bets, private bets, or any other bets while at a gaming facility or venue, either by using his or her user communication device 20 or by using any gaming facility computer 50.

The apparatus 100 of the present invention can also be utilized in order to facilitate account owner authorization, notification, and/or security, for and/or in connection with, any financial transaction(s) involving any of the herein-described sports betting accounts, gaming accounts, or gambling accounts, and/or in connection with any checking accounts, savings accounts, credit accounts, credit card accounts, debit accounts, debit card accounts, charge accounts, or charge card accounts, which are or which can be utilized in connection with the placing of any of the herein-described bets. In such a preferred embodiment, the apparatus 100, and the various components of same, can provide for the recording of a picture or a video clip, and/or a recording of an audio clip, of the individual or user while the individual or user is actually placing a bet on or involving his or her sports betting account, gaming account, or gambling account, or on or involving any checking account, savings account, credit account, credit card account, debit account, debit card account, charge account, or charge card account, or any other financial account.

In another preferred embodiment, the apparatus 100 and methods of the present invention can be used to prevent and/or to thwart fraudulent transactions on or involving any sports betting accounts, gaming accounts, or gambling accounts, of the individuals, users, and/or entities who or which utilize the apparatus 100 and methods of the present invention. In such a preferred embodiment, the individual or user can place any bet using any of the user communication devices 20 described herein, or using any gaming facility computer 50, or any kiosk or any computer terminal, or any other interface, associated with the gaming facility computer 50. In instances when the individual is using a 360 degree video headset, VR headset, or AR headset, with or as the user communication device 20, the individual or user can place the bet verbally, with all verbal instructions and commands associated with the bet being recorded by the respective audio input device or microphone of the input device 20D, or by the video and/or audio recording device(s) 20J, of the user communication device 20. In all other instances, a video recording or a video clip, and an audio recording, of the individual or user placing the bet can be recorded and stored.

The audio recording which is recorded, in the case of the individual or user placing the bet via the 360 degree video headset, VR headset, or AR headset, or the video recording or video clip and the audio recording recorded, in the case of the individual or user using any other user communication device 20, can be recorded by and stored at the user communication device 20, and can be transmitted to, and stored at, the central processing computer 10. A copy of the recorded audio recording, in the case of the individual placing the bet via the 360 degree video headset, VR headset, or AR headset, or a copy of the recorded video recording or video clip and the audio recording, in the case of the individual using any other user communication device 20, can thereafter be transmitted to the user communication device 20, or to any other user communication device 20 associated with the individual or user, in or attached to an alert message which contains information regarding the bet placed on the individual's sports betting account, gaming account, or gambling account, and any other information regarding the transaction associated with the bet ("the bet transaction"), including, but not limited to, any one or more of the respective account number, or other identifying information for or regarding, the respective sports betting account, gaming account, or gambling account, used in or involved in the bet, or any other account number of any other financial account (such as, for example, checking account, savings account, credit account, credit card account, debit account, debit card account, charge account, or charge card account) used in or involved in the bet, the date and time of the bet, sporting event, game, match, activity, competition, or tournament, on which the bet was placed, the party with whom the bet was placed, and any information regarding any other parties or counterparties to the bet, if available.

In a preferred embodiment, information regarding the placement of the bet, along with the copy of the respective audio recording or the video recording or video clip and the audio recording, along with any of the herein-described information regarding or pertaining to the bet or the bet transaction can be stored in the individual's sports betting account, gaming account, or gambling account, information or file stored in the database 10H of the central processing computer 10.

Information regarding the placement of the bet, along with the copy of the respective audio recording or the video recording or video clip and the audio recording, along with any of the herein-described information regarding or pertaining to the bet transaction can also be transmitted to, and stored in, the database 20H of the individual's user communication device 20, and/or the respective databases 30H, 40H, 50H, 90H, and/or 95H, of the respective sports governing body computer 30, governmental entity computer 40, gaming facility computer 50, financial institution computer 90, and/or escrow agent computer 95. In this regard, an audio record and/or a video record and audio record for each bet placed can recorded and stored for security purposes by and at any of the herein-described computers or communication devices 10, 20, 30, 40, 50, 90, and 95, so as to serve to prevent or combat fraud involving any of the herein-described sports betting account, gaming accounts, or gambling accounts.

Figure 14A:
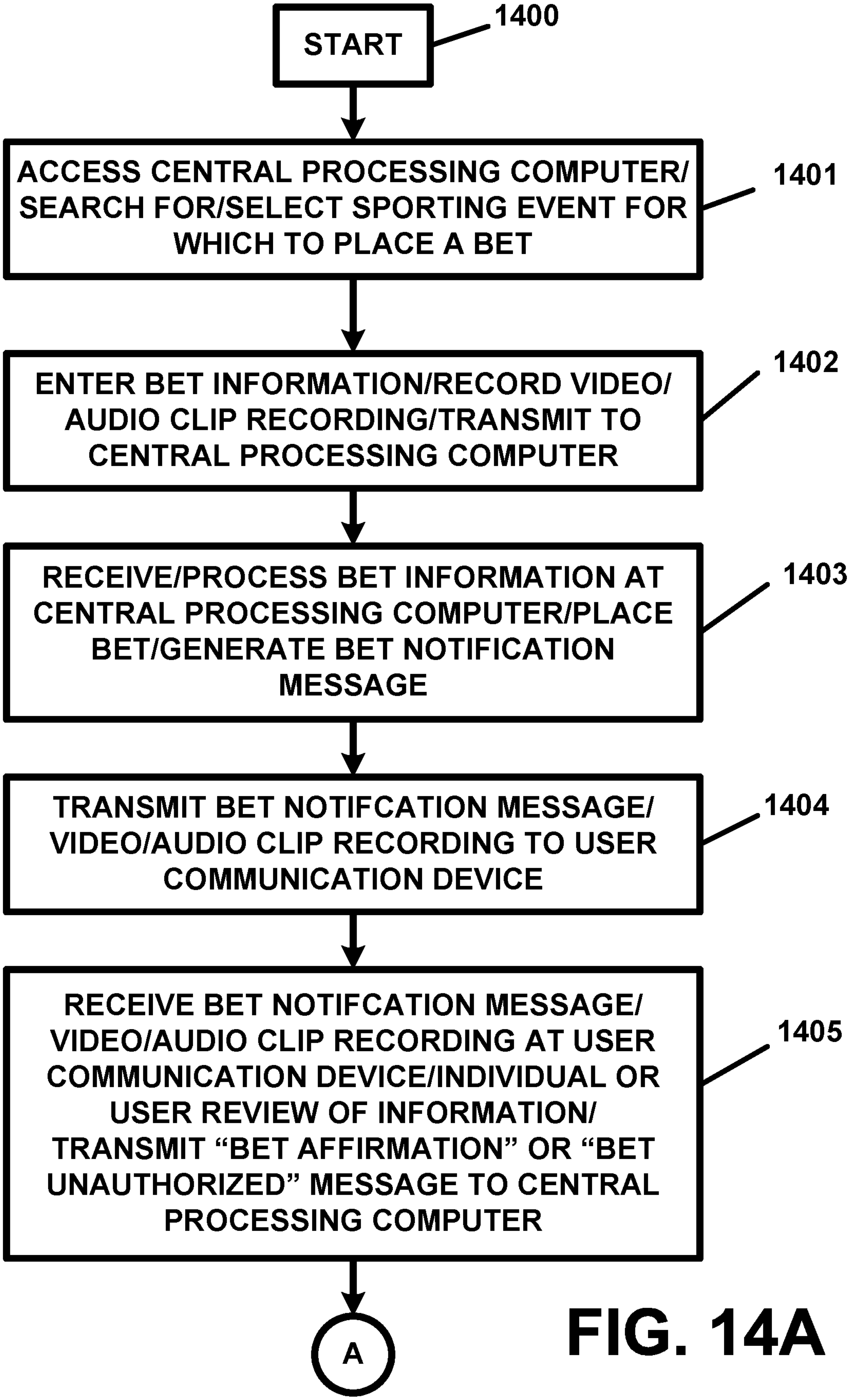
FIGS. 14A and 14B illustrate another preferred embodiment method for utilizing the apparatus and methods of the present invention, in flow diagram form.
Figure 14B:
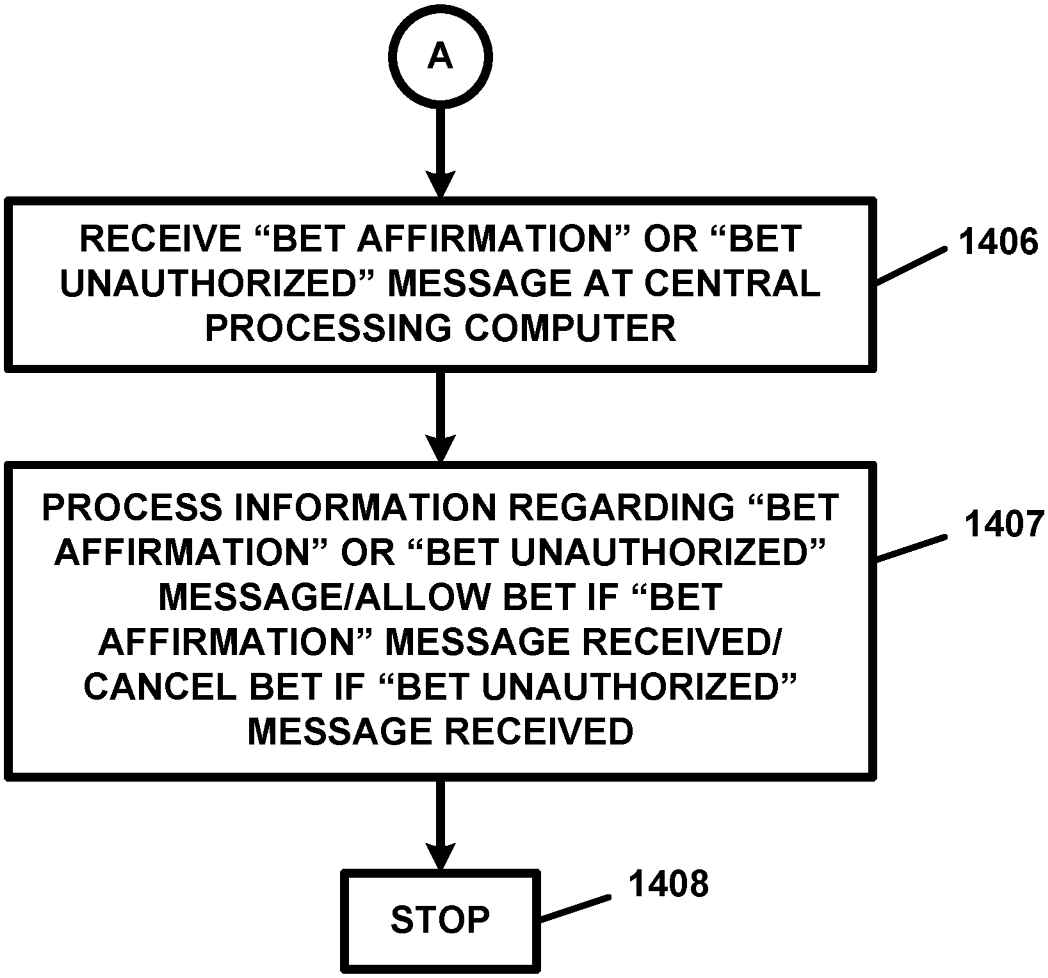

FIGS. 14A and 14B illustrate another preferred embodiment method for utilizing the apparatus 100 of the present invention, in flow diagram form. With reference to FIGS. 14A and 14B, the operation of the apparatus commences at step 1400. At step 1401, the individual or user can access the central processing computer 10 and search for and/or select the sporting event, game, match, activity, competition, or tournament, on or for which he or she wants to place a bet. If the individual or user is already watching and/or listening a sporting event, game, match, activity, competition, or tournament, and/or is participating in an electronic forum, chat room, or webpage, the individual can select the sporting event, game, match, activity, competition, or tournament, on or for which the he or she wants to place a bet via the respective electronic forum, chat room, or webpage.

At step 1402, the individual or user can enter information for placing the bet on the sporting event, game, match, activity, competition, or tournament, by utilizing the input device 20D of the user communication device 20 to enter information regarding the bet into the user communication device, and by, at the same time, obtaining a video and audio clip recording of himself or herself placing the bet by using the video and/or audio recording device(s) 20J of the user communication device 20. At step 1402, the individual or user can then submit the bet by transmitting the information for placing the bet and the video and audio clip recording to the central processing computer 10. In a preferred embodiment, the information regarding the bet can contain information regarding the date and time of the bet, the sporting event, game, match, activity, competition, or tournament, on which the bet has been placed, the actual bet being made, such as, for example, that Team A will beat Team B in the game, the amount of the bet, an identification of the sports betting account the individual or user, or other payment identifier, used in the placing of the bet, and any other information, such as whether or not the bet is to be placed in escrow. In another preferred embodiment, if the individual or user is placing the bet using a 360 degree video headset, a VR headset, or an AR headset, he or she can enter all information regarding the bet verbally using the microphone of the input device 20D and all can be recorded in an audio clip recording by using the microphone of the video and/or audio recording device(s) 20J.

At step 1403, the central processing computer 10 can receive the information regarding the bet and the video and audio clip recording. At step 1403, the central processing computer 10 can process the information regarding the bet and place the bet for the individual or user. At step 1403, the central processing computer 10 can also generate a bet notification message. In the preferred embodiment, the bet notification message can contain the herein-described information regarding the bet, such as to example, the date and time of the bet, the sporting event, game, match, activity, competition, or tournament on which the bet has been placed, the actual bet being made, such as, for example, that Team A will beat Team B in the game, the amount of the bet, an identification of the sports betting account the individual or user, or other payment identifier, used in the placing of the bet, and/or any other information. The bet notification message can also contain, contain as an attachment, or contain a link to, the video and audio clip recording. The bet notification message can be generated as a text message, an instant message, an SMS message, or an email message, or any other message, which can contain, contain as an attachment, or contain a link to, the video and audio clip recording. At step 1403, the central processing computer can store information regarding the bet, the bet message, and the video and audio clip recording in the database 10H and in a file associates the individual or user in the database 10H.

At step 1404, the central processing computer can transmit bet notification message and the video and audio clip recording to the user communication device 20 which has been registered by the individual or user as being the user communication device 20 to which bet notification messages should be transmitted. At step 1405, the user communication device 20 can receive the bet notification message and the video and audio clip recording, or the bet notification message and the video and audio clip recording can be accessed via the user communication device 20. At step 1405, the individual or user can review the information contained in the bet notification message and view the video and audio clip recording. At step 1405, the individual or user can transmit a "bet affirmation message" to the central processing computer 10 if he or she recognizes that he or she placed the bet identified therein, or that the bet identified therein was authorized, or the individual or user can transmit a "bet unauthorized message" to the central processing computer 10 if he or she recognizes that he or she did not place the bet identified therein, or that the bet identified therein is an unauthorized bet.

At step 1406, the "bet affirmation message" or the "bet unauthorized message" can be received at the central processing computer 10. At step 1407, the central processing computer 10 can process information regarding the "bet affirmation message" or the "bet unauthorized message" and can either allow the bet to stand in the case where the message received is a "bet affirmation message", or cancel the bet in the case where the message received is a "bet unauthorized message". Thereafter, the operation of the apparatus 100 will cease at step 1408.

In another preferred embodiment, at step 1405, the user or individual can also choose to ignore the bet notification message if he or she recognizes that he or she placed the bet identified therein, or that the bet identified therein was authorized.

In another preferred embodiment, the individual or user can access the central processing computer 10 to view and review a statement of bets or bet transactions which have occurred on his or her sports betting account(s), gaming account(s), or gambling account(s). In a preferred embodiment, the individual or user can also access and view and/or listen to, for any given bet, the hereinabove-described video and audio clip recording or audio clip recording associated for each bet.

Figure 15:
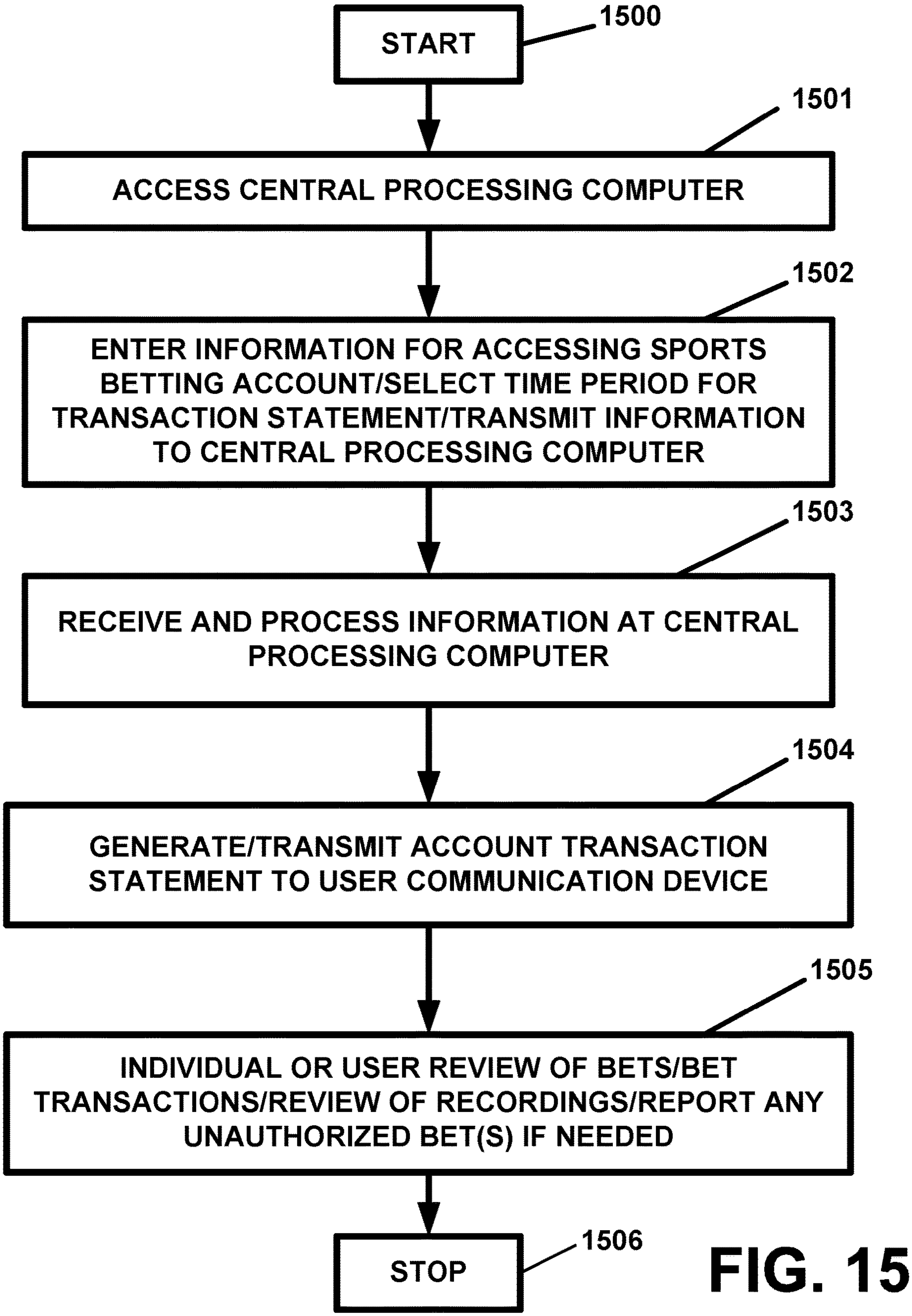
FIG. 15 illustrates another preferred embodiment method for utilizing the apparatus and methods of the present invention, in flow diagram form.

FIG. 15 illustrates another preferred embodiment method for utilizing the apparatus 100 of the present invention, in flow diagram form. With reference to FIG. 15, the operation of the apparatus commences at step 1500. At step 1501, the individual or user can access the central processing computer 10. At step 1502, the individual or user can enter the needed information for accessing his or her sports betting account, gaming account, or gambling account, and select or enter the time period for which he or she wants to view bets or bet transactions which have occurred on his or her sports betting account, gaming account, or gambling account. After entering the above information into the user communication device 20, the individual or user, at step 1502, can transmit the same to the central processing computer 10.

At step 1503, the central processing computer 10 can receive and process the information received. At step 1504, the central processing computer 10 can generate and transmit the requested bet transaction statement and/or a link to same to the user communication device 20. In a preferred embodiment, the bet transaction statement can include, for each bet or each bet transaction, a link to the video and audio clip recording or the audio clip recording associated with each bet or bet transaction.

At step 1505, the individual or user can thereafter review all bets or bet transactions made on his or her sports betting account, gaming account, or gambling account. At step 1505, the individual or user can also view or listen to any video and audio clip recording or the audio clip recording associated with each bet or bet transaction. If all of the bets or bet transactions in the bet transaction statement are deemed to be authorized bets or bet transaction, then the individual or user will not need to take any action and the operation of the apparatus 100 will proceed to step 1506.

If, however, at step 1505, the individual or user identifies a fraudulent or unauthorized bet or a fraudulent or unauthorized bet transaction in the transaction statement, or an attempt to place a fraudulent or unauthorized bet or a fraudulent or unauthorized bet transaction on his or her sports betting account, gaming account, or gambling account, the individual or user can report the bet or the bet transaction to the central processing computer 10, to the sport governing body computer 30 for the sport governing body overseeing the sporting event, game, match, activity, competition, or tournament, which was the subject of the bet or bet transaction, to the governmental entity computer(s) 40 for the respective governmental entity or entities which might have an interest in receiving information regarding the fraudulent activity, to the gaming facility computer 50 for the respective gaming facility at which the sporting event, game, match, activity, competition, or tournament, is being, or has been, held, to the information/analytics provider computer(s) 70 of the information/analytics provider(s) which may desire to receive information regarding fraudulent activity, to the financial institution computer 90 of the financial institution computer, if any, which administers or services the individual's or user's sports betting account, gaming account, or gambling account, or other financial account or accounts used in connection with the sports betting account, gaming account, or gambling account, and/or to the escrow agent computer 95 of the escrow agent who or which is providing, or has provided, escrow services for the bet or bet transaction. In this regard, the individual or user can report any fraudulent betting activity involving his or her sports betting account, gaming account, or gambling account.

In a preferred embodiment, the report made by the individual or user can contain a copy of the bet transaction statement, information regarding the identified unauthorized bet, and a copy of the video and audio clip recording or the audio clip recording. In a preferred embodiment, the video and audio clip recording or the audio clip recording can thereafter be utilized to provide evidence and assistance in the attempt to identify and/or to apprehend the perpetrator of the fraudulent activity and/or the unauthorized bet or bet transaction involving the individual's or user's sports betting account, gaming account, or gambling account. Thereafter, the operation of the apparatus 100 will cease at step 1506.

In another preferred embodiment, an individual or user can request to be notified upon a detected or an identified availability or scheduled occurrence or happening of a sporting event for which a bet or bets can be placed. For example, an individual or user desiring to bet on a game, match, team, tournament, player, or athlete, in or regarding any sporting event, can request to be notified or informed about the same, and the apparatus 100 can provide the individual or user with a notification regarding the same. As and for another example, an individual or user desiring to bet on a baseball, football, soccer, basketball, hockey, and/or any other sporting event, can request to be notified when a desired match up is scheduled (for example, a game featuring the New York Mets vs. New York Yankees). The individual or user can, thereafter, place a bet or bets on or regarding the respective sporting event.

The individual or user can also request any additional information, including, but not limited to, information regarding betting odds regarding the sporting event, analytics information for or regarding the sporting event, including, but not limited to, the teams or players participating in the sporting event, team records, sports players records, averages, and/or statistics, and/or any statistical and/or historical records regarding any of the herein-described sporting events, information regarding previous winning numbers and the probabilistic information regarding same, player statistics against an opposing team, historical records regarding prior meetings of the teams, player injuries, or line-ups for the game, and/or any other information which a user may find desirable, and/or any other information which an individual or user may be interested in receiving, considering, or using, in or regarding his or her betting activities regarding the respective sporting event.

In a preferred embodiment, the individual or user can access the central processing computer 10 and/or a particular gaming facility computer 50 via the user communication device 20 and transmit a message to the central processing computer 10 and/or a particular gaming facility computer 50. The message can contain information regarding the identity, type, or kind, of sporting event(s), for which the individual or user desires to be notified. The message can also request to receive notification of sporting events having certain betting limits (i.e. maximum bets, or minimum bets, etc.), notification of sporting events having certain winning odds, notification of sporting events having certain participants or teams involved, notification of sporting events having any other desired criteria of interest to the individual or user. The message can also contain a request to receive analytical data and/or information related to or regarding the sporting event or sporting events.

The message can also contain a user authorization to the respective central processing computer 10 and/or gaming facility computer 50 to automatically place a bet for the individual or user. For example, an individual or user desiring to bet $10.00 on the New York Mets to win against the New York Yankees in a next match-up between the two teams can program the central processing computer 10 and/or the particular gaming facility computer 50 to automatically place the bet for the individual or user. In instances when the individual or user desires to have a bet automatically placed by the central processing computer 10 and/or by the particular gaming facility computer 50, the message can contain a payment identifier such as any of the payment identifiers and/or payment methods described herein.

In another preferred embodiment, the individual or user can also request to be notified if betting odds change regarding a sporting event. Information regarding these types of requests can also be contained in the message transmitted by the individual or user to the central processing computer 10 and/or the particular gaming facility computer 50.

The individual's or user's message can be received, processed, and/or stored by the respective central processing computer 10 and/or particular gaming facility computer 50.

Figure 16A:
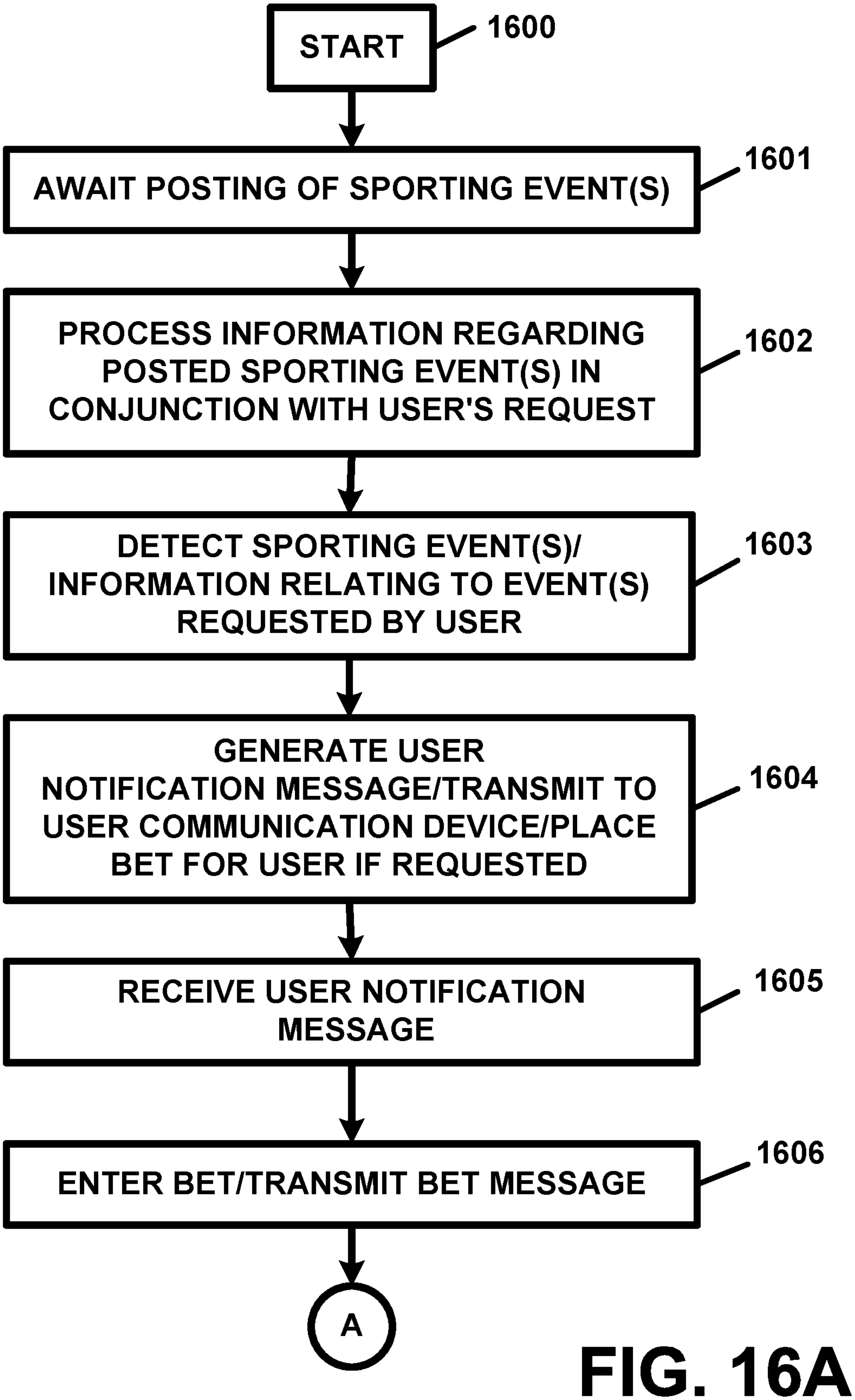
FIGS. 16A and 16B illustrate another preferred embodiment method for utilizing the apparatus 100 and method of the present invention, in flow diagram form.
Figure 16B:
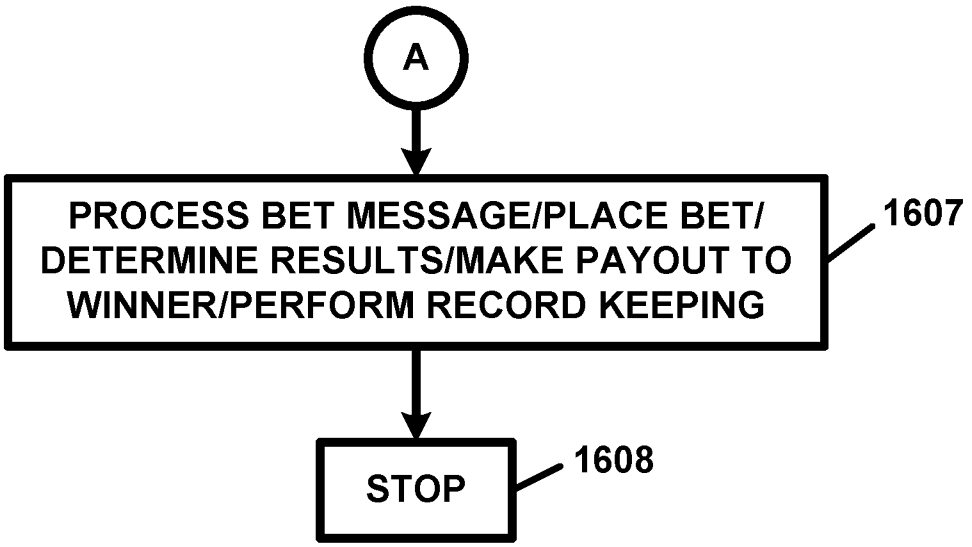

FIGS. 16A and 16B illustrate another preferred embodiment method for utilizing the apparatus 100 and method of the present invention, in flow diagram form. With reference to FIGS. 16A and 16B, the operation of the apparatus 100 and method of the present invention commences at step 1600. At step 1601, the central processing computer 10 and/or the gaming facility computer 50 can await a posting regarding a sporting event or sporting events. In a preferred embodiment, postings can be made my any of the herein-described sports governing bodies or sports leagues. Upon the detection of a posting of a sporting event or sporting events, the central processing computer 10 and/or the gaming facility computer 50 will process the information regarding the posting of the same.

In another preferred embodiment, schedules of sporting events can be pre-stored in the respective database 10H of the central processing computer 10 and/or the particular gaming facility computer 50 and the respective central processing computer 10 and/or the particular gaming facility computer 50 can perform periodic searches of their respective databases 10H and/or 50H.

At step 1602, the respective central processing computer 10 and/or the particular gaming facility computer 50 can process the information regarding the posting of the sporting event or sporting events, and/or information stored in their respective databases 10H and/or 50H upon the detection of the posting and/or upon the occurrence of a scheduled review of the respective database 10H or 50H in conjunction with the individual's or user's request. At step 1603, the central processing computer 10 and/or the gaming computer 50 can detect a sporting event or sporting events for which the individual or user desires to be notified. The central processing computer 10 and/or the gaming facility computer 50 can also search for and detect a change of betting odds for a sporting event or sporting events for which the individual or user desires to be notified.

At step 1604, upon detecting a sporting event or sporting events for which the individual or user desires to be notified, the respective central processing computer 10 and/or the gaming facility computer 50 can generate a user notification message and transmit the same to the user communication device 20. In a preferred embodiment, the user notification message can be transmitted from the central processing computer 10 and/or the gaming facility computer 50 in, as, or attached to, an email message to the email server, servicing the individual's or user's email account, or in, as, or attached to, an instant message or as an SMS message transmitted to the user communication device 20 or to another user communication device 20 which can be used by the individual or user to receive the same. In another preferred embodiment, the user notification message can also be transmitted at any time and/or in real-time and/or otherwise.

At step 1604, the respective central processing computer 10 and/or the gaming facility computer 50 can also automatically place an individual's or user's bet on a sporting event or sporting events if the individual or user has requested the same.

The user notification message can contain information regarding the sporting event or sporting events, and any additional or other requested information regarding the sporting event or sporting events as well as any analytical data and/or information related to or regarding the sporting event or sporting events. At step 1605, the individual or user can receive the user notification message at the user communication device 20 and can review same.

At step 1606, the individual or user can decide whether or not to place a bet and/or place additional bets on or regarding the sporting event or sporting events. If, at step 1606, the individual or user has decides to place a bet or bets on a sporting event or sporting events identified in the user notification message, the individual or user can enter information regarding a bet he or she desires to place, into the user communication device 20, and can transmit the entered information as a bet, information regarding a bet, or a bet message, to the central processing computer 10 and/or to the gaming facility computer 50. In a preferred embodiment, the bet, information regarding the bet, or the bet message, can contain information regarding the sporting event or sporting events for which the individual or user desires to place a bet or bets, the amount of the individual's or user's bet, and/or any payment identifier information for effectuating payment for the bet.

Thereafter, the operation of the apparatus 100 will proceed to step 1607 and respective central processing computer 10 and/or the gaming computer 50 will, for the sporting event or for each sporting event for which a bet is placed, process information regarding the bet, and generate and transmit a betting confirmation message for each bet placed for the individual or user. In another preferred embodiment, the individual or user can utilized the apparatus 100 of the present invention in the manner described in the embodiment of FIGS. 13A and 13B to watch, view, or listen to, the sporting event of sporting events and/or to engage in, and/or to participate in, any and/or all of the activities described herein as being provided by the apparatus 100 in the preferred embodiment of FIGS. 13A and 13B. In another preferred embodiment, at step 1607, the central processing computer 10 and/or the gaming facility computer 50 can determine the results of the sporting event, determine if a bet is a winning bet or a losing bets and make any winning pay out to the individual or user if the individual or user wins the bet, or make a pay out to the winning counterparty if the individual or user losses the bet, and/or perform any record keeping and/or reporting functions, such as, for example, performing the operations similar to, the same as, and/or analogous to the operations described herein as being performed by the central processing computer 10 in any and/or all of the embodiments described herein. Thereafter, the operation of the apparatus 100 will cease at step 1608.

In another preferred embodiment, as well as in any and/or all of the embodiments described herein the apparatus 100 and methods of the present invention can be utilized in gaming or gambling activities involving bets placed on fantasy sports teams, leagues, events, or other activities. In another preferred embodiment, as well as in any and/or all of the embodiments described herein, the apparatus 100 and methods of the present invention can also be utilized in gaming or gambling activities involving bets placed on esports teams, leagues, events, or activities. In any and/or all of the embodiments described herein, each of the central processing computer(s) 10, the user communication device (s) 20, the sport governing body computer(s) 30, the governmental entity computer(s) 40, the gaming facility computer(s) 50, the information/analytics provider computer(s) 70, the social network computer(s) 80, the financial institution computer(s) 70, the escrow agent computer(s) 95, and the wearable device(s) 97, can each be specially programmed and/or specially configured to perform of all of their respective functionalities whether either explicitly disclosed or implicitly disclosed.

In another preferred embodiment, any and/or all of the herein-described embodiments of the apparatus 100 of the present invention, including, but not limited to, the embodiments of FIGS. 13A, 13B, 14A, 14B, 15, and 16, can be utilized in connection with any other gaming activities and/or gambling activities including any gaming activities and/or gambling activities provided, offered by, operated by, hosted by, or sponsored by, any casinos, including casinos housed in or at physical venues, brick and mortar casinos, and/or on-line or virtual casinos. For example, the apparatus 100 can be utilized in connection with gaming activities and/or gambling activities offered by and at casinos in Las Vegas, Atlantic City, and other locations in the U.S. and around the world, Indian reservations, horseracing tracks, racetracks, and/or any other gaming and/or gambling venues.

In another preferred embodiment, the apparatus 100 can be utilized by individuals and users to play and bet on gaming activities and/or gambling activities provided, offered by, operated by, hosted by, or sponsored by, casinos or other gaming venues and/or gambling venues, as well as to watch and place bets on or regarding any gaming activities and/or gambling activities provided, offered by, operated by, hosted by, or sponsored by, casinos or other gaming venues and/or gambling venues, as well as to place derivative bets on any of the above-described gaming activities and/or gambling activities.

In another preferred embodiment, any and/or all of the herein-described embodiments of the apparatus 100 of the present invention can be utilized in connection with lottery games, lottery drawings, and/or any lottery-related gaming activities and/or gambling activities offered by any states, countries, and/or any other governments, governing bodies, or any governmental entities or agencies. In a preferred embodiment, individuals or users can utilize the apparatus 100 of the present invention to purchase lottery tickets for various lottery games or lottery drawings offered by any states, countries, and/or any other governments, governing bodies, or any governmental entities or agencies which desire to sell lottery tickets via the apparatus 100. Individuals and users can also utilize the apparatus 100 of the present invention to watch or view lottery drawings and/or to place bets relating to or regarding a lottery game or a lottery drawing, and/or to place derivative bets on or regarding lottery drawings. The apparatus 100 can be utilized so as to allow individuals and users to purchase lottery tickets remotely and/or on-line and/or via the Internet and/or the World Wide Web from any states, countries, and/or any other governments, governing bodies, or any governmental entities or agencies which desire to sell lottery tickets via the apparatus 100.

Figure 17A:
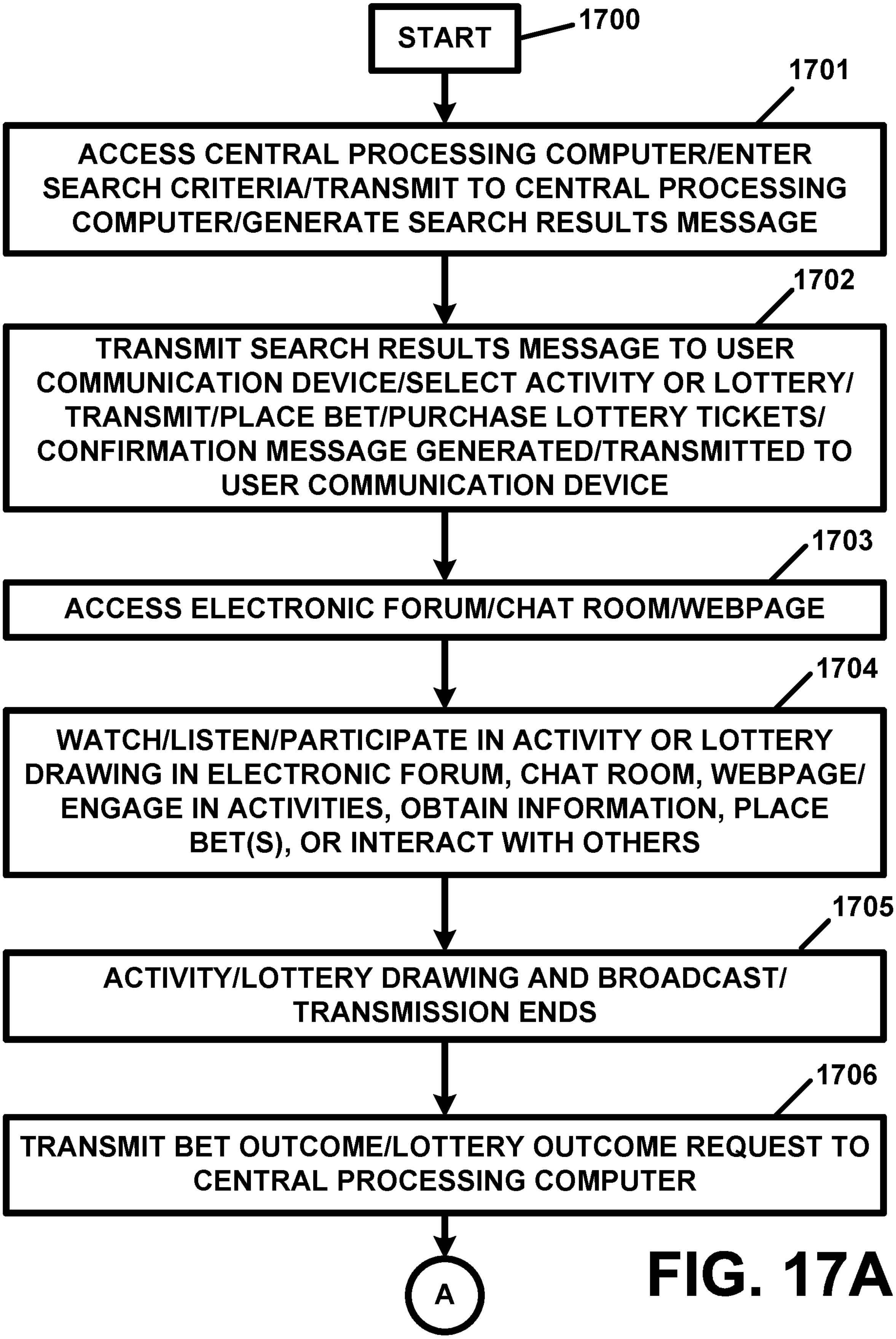
FIGS. 17A and 17B illustrate another preferred embodiment method for utilizing the apparatus and methods of the present invention, in flow diagram form.
Figure 17B:
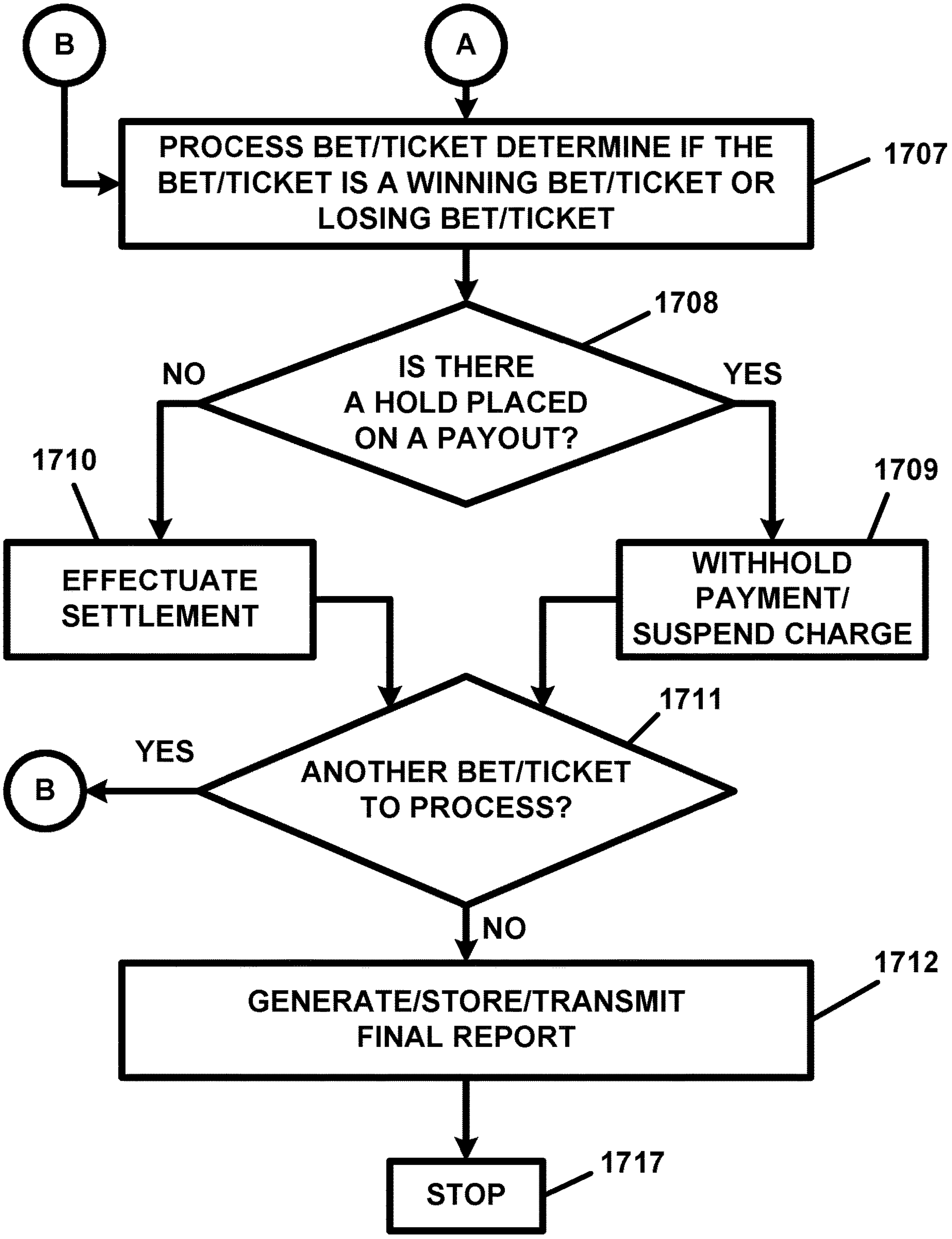

FIGS. 17A and 17B illustrate a preferred embodiment method for utilizing the apparatus 100 and methods of the present invention, in flow diagram form. The apparatus 100 of the present invention can be utilized, in the preferred embodiment of FIGS. 17A and 17B, to allow individuals and users to remotely access and play and/or bet on gaming activities and/or gambling activities offered by casinos and other governmental entities, including, but not limited to games of chance, including, but not limited to, slot machine games, slots, Black Jack, Poker, Craps, Baccarat, Roulette wheel, Keno, Multispin, Multiline, Draw Poker, Reel games, Spin Poker, "21", pinball, Bingo, Solitaire, lottery games, state or other subdivision lottery games, federal lottery games, multi-state or multi jurisdictional lottery games, Powerball lottery games, horse racing, dog racing, jai alai, off track betting games, and any other gaming activities and/or gambling activities described (hereinafter referred to as "gaming activities" or "gambling activities") offered by any of the herein-described, or other, casinos and/or governmental entities. The apparatus 100 of FIGS. 17A and 17B can also be utilized so as to allow individuals or users to place bets on, regarding, or relating to, or any types or kinds of derivative bets on, regarding, or relating to, any of the herein-described, or other, gaming activities and/or gambling activities. In a preferred embodiment, the individual or user can remotely access a respective casino game, casino venue, or other venue, and/or a lottery drawing, and obtain video and/or audio of at the accessed location or venue, such as video and/or audio obtained by or recorded by a respective video and/or audio recording device(s) 50J located at a respective casino game, casino venue, or other venue, and/or lottery drawing, which can be transmitted from the gaming facility computer 50 to the central processing computer 10, for re-transmission to the user communication device 20 of an individual or user, or which can be transmitted from the gaming facility computer 50 to the user communication device 20 of an individual or user.

With reference to FIGS. 17A and 17B, the operation of the apparatus 100 commences at step 1700. At step 1701, the individual or user can access the central processing computer 10 by using the user communication device 20. In a preferred embodiment, the central processing computer 10 can be operated and/or maintained by any on-line sports betting, gaming, or gambling, company or entity of any type of kind or can be operated by any casino or other gaming entity and/or gambling entity, and/or by any governmental entity or governmental agency. In a preferred embodiment, the individual or user can utilize any user communication device 20 in order to access the central processing computer 10.

In another preferred embodiment of FIGS. 17A and 17B, the individual or user can utilize a headset as, or in conjunction with, the user communication device 20. In a preferred embodiment, whenever the individual or user uses a headset as, or in conjunction with, the user communication device 20, the individual or user can utilize the microphone of the video and/or audio recording device(s) 20J of the communication device 20 and associated voice recognition software in order to verbally input data, information, commands, or instructions, into the user communication device 20, and the individual or user can also utilize the same to verbally communicate with the central processing computer(s) 10, the sport governing body computers 30, the governmental entity computers 40, the gaming facility computers 50, the content provider computers 60, the information/analytics provider computers 70, the social network computers 80, the financial institution computers 90, the escrow agent computers 95, and the wearable devices 97.

With reference once again to step 1701, the individual or user can search for a gaming activity or gambling activity and/or a lottery, on or for which he or she can place a bet or which he or she can watch and place a bet or bets, or for which he or she can watch and/or place a derivative bet or derivative bets. At step 1701, the individual or user can, using the user communication device 20 in communication with the central processing computer 10, search for one or more gaming activities or gambling activities and/or a lotteries, for which he or she may be interested in placing a bet or multiple bets, by searching for same via the central processing computer 10. In a preferred embodiment, the individual or user can for gaming activities and/or gambling activities and/or lotteries by game, casino, gaming venue, gambling venue, participants, prize amounts, betting odds, or by using any other searching criteria and/or gaming and/or gambling criteria. At step 1701, after entering the search criteria into the user communication device 20, the search criteria can be transmitted to, and received by, the central processing computer 10. At step 1701, the central processing computer 10 can receive and process the search criteria and can generate a search results message containing information regarding one or more gaming activities, gambling activities, and/or lotteries, on or for which a bet(s) can be placed.

At step 1702, central processing computer 10 can transmit the search results message to the user communication device 20. At step 1702, user communication device 20 can receive the search results message. At step 1702, the individual or user can review the information contained in the search results message and can select the gaming activity or the gaming activities, and/or the gambling activity or the gambling activities, and/or the lottery or lotteries, on, for, or regarding, which he or she desires to watch, participate in, place a bet, and/or purchase a lottery ticket of tickets. In a preferred embodiment, the individual or user, at step 1702, can, but not need, access the information/analytics provider computer 70 in order to obtain any data and/or information, or analytics data and/or information, which he or she may want to obtain and review in advance of placing any bet or bets or purchasing any lottery ticket or lottery tickets. At step 1702, the individual or user can also request that the information/analytics provider computer 70 transmit updated data and/or information, including, but not limited to, analytics data and/or information, information regarding betting odds or betting odds changes, information regarding new betting opportunities, and/or any other data and/or information regarding the gaming activity or the gaming activities, and/or the gambling activity or the gambling activities, and/or the lottery or lotteries, in or for which the individual or user wants to participate, place a bet or bets, or purchase a lottery ticket or lottery tickets, to the user communication device 20.

At step 1702, the individual or user can also request to be notified regarding, and be provided with, data and/or information, including, but not limited to, analytics data and/or information, data and/or information regarding betting odds or betting odds changes, information regarding new betting opportunities, and/or any other data and/or information regarding any other gaming activity or gaming activities, and/or gambling activity or gambling activities, and/or lottery or lotteries, in which the individual or user may be interested.

At step 1702, the individual or user can, but need not place a bet or an initial bet on the, or on each of, the selected gaming activity or gaming activities, and/or gambling activity or gambling activities. In a preferred embodiment, the individual or user can place a bet or an initial bet by transmitting information regarding the bet or initial bet, or a bet message, from the user communication device 20 to the central processing computer 10. In a preferred embodiment, the information regarding the bet or initial bet, or the bet message, can contain information regarding the bet or initial bet, the betting position taken, and/or the amount of the bet or the initial bet. In a preferred embodiment, the bet or the initial bet, information regarding the bet or the initial bet, or the bet message, can also contain information regarding the position or location of the user communication device 20 at the time of the placing of the bet or at the time of the transmission of the information regarding the bet or the bet message from the user communication device 20 to the central processing computer 10.

In a preferred embodiment, the position or location of the user communication device 20 can be determined by the global positioning device 20K of the user communication device 20. In another preferred embodiment, and especially in instances in which the user communication device 20 is not a mobile device, but rather, is a stationary device such as, for example, but not limited to, a desktop computer, a personal computer, or a computer located at a venue, the position or location of the user communication device 20 can be determined by the IP address assigned to or for the user communication device 20 at the time of the transmission of the bet, information regarding the bet, or the bet message, from the user communication device 20. In a preferred embodiment, information regarding the position or location, or the IP address, of the user communication device 20, at the time of the placing of the bet or at the time of the transmission of the information regarding the bet, or the bet message, can be used to determine the jurisdiction, country, state, province, or political subdivision, from which the bet is placed so that the central processing computer 10 can ascertain the same to determine whether or not the bet is a legal, authorized, or allowed bet, and so as to effectuate a payment of a gaming fee or betting fee, if needed, to the respective jurisdiction, country, state, province, or political subdivision.

At step 1702, the individual or user can, instead of or in addition to placing a bet, can purchase one or more lottery tickets for any lottery or lotteries in which the individual or users desires to purchase tickets or in which the individual or user desires to participate.

In a preferred embodiment, the individual or user can utilize is or her sports betting account, gaming account, or gambling account, or any appropriate or suitable payment identifier, in order to place, and make payment for, the bet or the initial bet, or for the lottery ticket or lottery tickets purchased. In another preferred embodiment, the individual or user can provide a payment identifier such as, but not limited to, a credit account number, a credit card account number, a debit account number, a debit card account number, a charge account number, a charge card account number, a savings account number, a checking account number, or any other payment account number.

In a preferred embodiment, the individual or user, at step 1702, can also access his or her sports betting account, gaming account, or gambling account, by accessing the same via the financial institution computer 90, of the financial institution which services the respective account, in order to ascertain the status of the same or to make payment for the bet, the initial bet, or the lottery ticket or lottery tickets, by utilizing the same. In another preferred embodiment, if applicable, the individual or user can also instruct the central processing computer 10 to place his or her bet or initial bet into an escrow account in order to protect the individual or user in instances of cheating, should such conduct be reported or discovered before, during, or after, the selected gaming activity or gaming activities, and/or gambling activity or gambling activities. At step 1702, the individual or user can also, if applicable, instruct that the escrow computer 95 not make payment of any lost bet until after a certain and/or pre-defined time period has elapsed, so that the individual or user can be protected against any cheating activity or activities.

At step 1702, if applicable, the central processing computer 10 can receive and process the information regarding the bet or the initial bet and store the information regarding the bet or the initial bet in the database 10H. At step 1702, the user communication device 20 used by the individual or user can also store the information regarding the bet or the initial in the database 20H. At step 1702, if applicable, the central processing computer 10 can receive and process the information regarding the lottery ticket or lottery tickets purchased, including an electronic lottery ticket or tickets or an electronic receipt evidencing the same and store the information regarding the same in the database 10H. At step 1702, the user communication device 20 used by the individual or user can also store the information regarding lottery ticket or lottery tickets purchased, including an electronic lottery ticket or tickets or an electronic receipt evidencing the same in the database 20H.

In a preferred embodiment, the central processing computer 10 can also, at step 1702, determine whether or not the respective bet or initial bet, or the lottery ticket purchase or purchases is or are a legal, authorized, or allowed, or illegal, unauthorized, or disallowed, using information regarding any applicable statutes, rules, or regulations, of the jurisdiction, country, state, province, or political subdivision, from which the bet or lottery ticket purchase is placed or made and/or in the jurisdiction, country, state, province, or political subdivision, in which the gaming activity, the gambling activity, or the lottery, is taking place. In a preferred embodiment, where applicable, the central processing computer 10 can utilize information regarding the position or location of, or the IP address of, the user communication device 20 at the time the bet is placed or the lottery ticket is purchased in order to ascertain the jurisdiction, country, state, province, or political subdivision, in or from which the bet is placed or the lottery ticket is purchased. In a preferred, the central processing computer 20, at step 1702, can process information for placing the bet or the initial bet if the bet is legal, authorized, or allowed, or effectuate the purchase of the lottery ticket or lottery tickets if the purchase is legal, authorized, or allowed. In a preferred embodiment, the apparatus 100 and/or the central processing computer 10 can consummate the transaction regarding the placing of the bet or the initial bet, or any number of bets or initial bets, and/or the apparatus 100 and/or the central processing computer 10 can consummate the transaction regarding the purchase of the lottery ticket or any number of lottery tickets, for and/or on behalf of the individual or user. In this regard, the apparatus 100 can be used to allow an individual or user to place bets on gaming activities and/or gambling activities remotely and/or on-line, and the apparatus 100 can be used to allow an individual or user to purchase lottery tickets remotely and/or on-line.

At step 1702, if applicable, the central processing computer 10 can also, for each bet or initial bet, generate a bet confirmation message containing information regarding the bet or the initial bet that was placed, the date and time of the bet, the amount of the bet, the date and time of the gaming activity or gaming activities and/or the gambling activity or gambling activities on or for which the bet or the initial bet was placed, and a link to allow the individual or user to remotely access video or audio of the gaming activity or the gambling activity, obtained and recorded at the casino or gaming venue, in or via an electronic forum, a chat room, or a webpage of a website. In a preferred embodiment, the video and/or audio of the gaming activity or gambling activity can be obtained and recorded by a respective video and/or audio recording device(s) 50J located at the gaming activity or gambling activity or in the vicinity of same, and can be transmitted, via the gaming facility computer 50 associated with the casino or the gaming venue, to the user communication device 20, and can be viewed via the electronic forum, the chat room, of the webpage of the website.

At step 1702, if applicable, the central processing computer 10 can also, for each lottery ticket purchased, generate a lottery ticket purchase confirmation message containing information regarding the lottery ticket purchased, the numbers on or for the lottery ticket, the date and time of the purchase of the lottery ticket, the date and time of the lottery drawing, and a link to allow the individual or user to remotely access video or audio of the lottery drawing in or via an electronic forum, a chat room, or a webpage of a website. In a preferred embodiment, the video and/or audio of the lottery drawing can be obtained and recorded by a respective video and/or audio recording device(s) 50J located at the lottery drawing venue and can be transmitted, via the gaming facility computer 50 associated with the casino or the gaming venue, to the user communication device 20, and can be viewed via the electronic forum, the chat room, of the webpage of the website.

In a preferred embodiment, if applicable, the central processing computer 10 can be specially programmed and/or specially configured to provide multiple broadcasts simultaneously of the gaming activity or gambling activity or of the lottery drawing to any number of different and distinct social networking groups in or via any number of electronic forums, chat rooms, or webpages of websites, allow individuals or users to watch and/or listen to, to participate in, and/or to place bets on or regarding, the gaming activity or gambling activity or of the lottery drawing. In a preferred embodiment, the apparatus 100 of the present invention can allow for the individual or user to watch and/or place bets on the outcome of, or any numbers of plays or other micro-events, happenings, or occurrences, which occur during the gaming activity or the gambling activities, place bets on or regarding a player or player participating in the gaming activity or the gambling activity, participate in and/or place bets in and./or during the gaming activity or the gambling activity, and/or place derivative bets of any kind, nature, or type regarding or relating to the gaming activity or the gambling activity, and/or the apparatus 100 of the present invention can allow for the individual or user to watch and/or place bets on the outcome of lottery drawing and/or place derivative bets of any kind, nature, or type regarding or relating to the lottery drawing.

In a preferred embodiment, the apparatus 100 can allow the individual or user to watch the gaming activity, gambling activity, or lottery drawing with others, with friends or acquaintances, with social network group members, or while alone, and allow individuals or users to communicate and/or interact with other individuals or users or with one another, engage in a video conference or video chat with others or with one another, post messages, comments, and other postings, place additional bets on the gaming activity, the gambling activity, or the lottery drawing, place bets on other gaming activities, gambling activities, or lottery drawings, request and be provided with data and/or information or analytical data and/or information for one or more gaming activities, gambling activities, or lottery drawings, and/or report instances of cheating.

At step 1702, the bet confirmation message or the lottery ticket purchase confirmation message can be transmitted from the central processing computer 10 to the user communication device 20 used by the individual or user to place the bet or the initial bet, or to purchase the lottery ticket, and/or the bet confirmation message or the lottery ticket purchase confirmation message can also be transmitted in or as an email message and be transmitted to the email server servicing the individual's or user's email account so that the individual or user can access the bet confirmation message or the lottery ticket purchase confirmation message from any user communication device 20. The betting confirmation message or the lottery ticket purchase confirmation message can also be transmitted, as an instant message or as an SMS message, to the user communication device 20 or to another user communication device 20 which can be used by the individual or user to receive the same and to access the gaming activity, the gambling activity, or the lottery drawing, or the electronic forum, chat room, or webpage.

In another preferred embodiment, the individual or user can program, or request, at the time of the placing of the bet or the initial bet, or at the time of purchasing the lottery ticket, or upon registering an account with the apparatus 100 or the central processing computer 10, that the central processing computer 10 generate a gaming activity event message, a gambling activity event message, or a lottery drawing event message, containing information or containing reminder information regarding the gaming activity, the gambling activity, or the lottery drawing, and transmit the same to any user communication device 20 used by the individual or user, as a text message, as an instant message, or as an SMS message, or in or as an email message, transmitted to the email server servicing the individual's or user's email account, prior to the start of the gaming activity, the gambling activity, or the lottery drawing. In a preferred embodiment, the respective gaming activity event message, gambling activity event message, or lottery drawing event message, can contain all of the information and link or links described herein as being included in the betting confirmation message or the lottery ticket purchase confirmation message and can serve to remind the individual or user about the gaming activity, the gambling activity, or the lottery drawing. In a preferred embodiment, the gaming activity event message, gambling activity event message, or lottery drawing event message, can be transmitted and/or retransmitted multiple times and/or at pre-defined time intervals in advance of the gaming activity, the gambling activity, or the lottery drawing, to serve to remind the individual or user of the same and provide the individual or user with a sufficient amount of time to be ready to watch and/or listen to the same.

At step 1703, the individual or user, prior to the start of the gaming activity, the gambling activity, or the lottery drawing, or at any time thereafter, can access the respective electronic forum, chat room, or webpage of the website, in or via which the individual or user can watch and/or listen to the gaming activity, the gambling activity, or the lottery drawing, and, in the case of the individual or user accessing the electronic forum or chat room, interact with other individuals or users or interact with individuals or users in the individual's or user's social networking group or in the individual or user's group of friends, or, in the case of the webpage of the website, watch and/or listen to the gaming activity, the gambling activity, or the lottery drawing, by himself or herself. Thereafter, the individual or user can watch and/or listen to the respective gaming activity, gambling activity, or lottery drawing, and/or interact with any other individual(s) or user(s), and/or engage in any of activities described herein.

At step 1704, the individual or user can watch and/or listen to, and/or participate in, and/or place bets on or regarding, the gaming activity, the gambling activity, or the lottery drawing. In a preferred embodiment, the gaming activity, the gambling activity, or the lottery drawing, can be transmitted, broadcast, or "streamed" from or via a gaming facility computer 50 located at the venue of the gaming activity, the gambling activity, or the lottery drawing, to the central processing computer 10, or directly to the individual's or user's user communication device 20. In this regard, the gaming activity, the gambling activity, or the lottery drawing, can be transmitted, broadcast, or "streamed" to the user communication device 20 from either the central processing computer 10 or from the gaming facility computer 50 located at the venue of the gaming activity, the gambling activity, or the lottery drawing.

In a preferred embodiment, the respective electronic forum, chat room, of website, can transmit and provide, to the user communication 20, for display via the display device 20E of same, a live video or a streaming video and/or audio of the gaming activity, the gambling activity, or the lottery drawing, and/or any data and/or information and/or analytics data and/or information regarding the gaming activity, the gambling activity, or the lottery drawing In a preferred embodiment, in instances where the electronic forum or chat room is being used, any and all comments, messages, or postings, posted by any of the individuals or users who may be watching and/or listening to the gaming activity, the gambling activity, or the lottery drawing, via the respective electronic forum or chat room can also be displayed via the display device 20E of the user communication device 20. In a preferred embodiment, the individual or user can also engage in video conference calls or video chats with other individuals or users via the respective electronic forum or chat room. In a preferred embodiment, the individual or user watching and/or listening to the gaming activity, the gambling activity, or the lottery drawing, via the webpage of the website can also post comments in a comments section on the website.

In a preferred embodiment, the individual or user can also watch and/or listen to the gaming activity, the gambling activity, or the lottery drawing, in 360 degree video, in virtual reality (VR), or in augmented reality (AR). In a preferred embodiment, any data and/or information, and any functionalities and/or individual or user activities, described herein as being provided in and via the respective electronic forum, chat room, or website, can also be provided to the individual or user in and via a 360 degree video, a virtual reality (VR), or an augmented reality (AR), presentation and experience. In a preferred embodiment, the individual or user can download, from the central processing computer 10 to his or her user communication device, any needed or desired 360 degree video, virtual reality (VR), and/or augmented reality (AR), software or software applications (also referred to as "apps"). Any such downloading of any 360 degree video, virtual reality (VR), and/or augmented reality (AR), software or apps can take place during step 1701.

At step 1704, the individual or user can watch and/or listen to the gaming activity, the gambling activity, or the lottery drawing, participate in same, and/or place a bet or bets on or regarding same, via the respective electronic forum, chat room, or website. In the preferred embodiment, the respective electronic forum, chat room, or webpage of the website, via which the gaming activity, the gambling activity, or the lottery drawing, is being watch and/or listen to, can be specially designed to allow the individual or user, or any other individuals or users, to watch and/or listen to the gaming activity, the gambling activity, or the lottery drawing, and to communicate with other individuals or users in the electronic forum or chat room.

In a preferred embodiment, the respective electronic forum, chat room, or webpage of the website, on, in, or via, which the gaming activity, the gambling activity, or the lottery drawing, can be watched and/or listened to can also be specially designed and/or specially configured to, simultaneously with providing the gaming activity, the gambling activity, or the lottery drawing, allow the individual or user, or any other individuals or users, to post comments or messages the gaming activity, the gambling activity, or the lottery drawing, and/or to communicate with any other individual(s) or user(s) watching and/or listening to the gaming activity, the gambling activity, or the lottery drawing, via the electronic forum or chat room, and/or to communicate with the central processing computer 10, and/or with any of the governmental entity computers 40, the gaming facility computers 50, the information/analytics provider computers 70, the social network computers 80, the financial institution computers 90, and the escrow agent computers 95, described herein as being utilized with the apparatus 100.

In the preferred embodiment, if applicable, the respective electronic forum, chat room, or webpage of the website, on, in, or via, which the gaming activity, the gambling activity, or the lottery drawing, can be watched and/or listened to can also be specially designed and/or specially configured to, simultaneously with providing the gaming activity, the gambling activity, or the lottery drawing, allow the individual or user, or any other individuals or users, to view data and/or information and/or analytics and/or information regarding the gaming activity, the gambling activity, or the lottery drawing, and/or any players, or participants, participating in the same, and/or to view any analytics data and/or information relating to any data and/or information obtained during the gaming activity, the gambling activity, or the lottery drawing.

In the preferred embodiment, the respective electronic forum, chat room, or webpage of the website, on, in, or via, which the gaming activity, the gambling activity, or the lottery drawing, can be watched and/or listened to can also be specially designed and/or specially configured to, simultaneously with providing the gaming activity, the gambling activity, or the lottery drawing, allow the individual or user, or any other individuals or users, to view information regarding available bets being offered by various book makers or other gaming or gambling entities or individuals or users, to view private bets being offered by other individuals or users participating in the electronic forum or chat room, and/or to view private bets being offered by other individuals or users who or which utilize the apparatus 100 and method of the present invention.

In the preferred embodiment, the respective electronic forum, chat room, or webpage of the website, on, in, or via, which the gaming activity, the gambling activity, or the lottery drawing, can be watched and/or listened to can also be specially designed and/or specially configured to, simultaneously with providing the gaming activity, the gambling activity, or the lottery drawing, allow the individual or user, or any other individuals or users, to place a bet or any number of bets on the outcome of the gaming activity, the gambling activity, or the lottery drawing, at any time prior to the conclusion of the gaming activity, the gambling activity, or the lottery drawing, and/or to place a bet or any numbers of bets on occurrences or events which occur during the game (also hereinafter referred to as "game events" or "micro-events").

Private bets, which can be, or which can include, outcome bets or game event bets can also be offered via the electronic forum, chat room, or the webpage of the website. If applicable, betting odds for any bets described herein, as well as continuous updates to any betting odds for any of the bets described herein, can also be provided via the electronic forum, chat room, or the webpage of the website.

At step 1704, the individual or user, or any other individual(s) or user(s) watching and/or listening to the gaming activity, the gambling activity, or the lottery drawing, can place any number and/or types of bets, including outcome events and bets on game events or micro-events during the gaming activity, the gambling activity, or the lottery drawing.

If applicable, each time a bet is placed by the individual or user or by any other individual or user, the central processing computer 10 can process and store information regarding the bet placed, the individual or user who placed the bet, the gaming activity, the gambling activity, or the lottery drawing, on or during which the bet was placed, the amount of the bet, the time of the bet, the date of the bet, any counterparty to the event, the sports betting account, gaming account, or gambling account, used in placing the bet, and/or any information regarding whether or not any bet monies were instructed to be placed in escrow with the escrow agent computer 95, and/or any other information regarding the bet.

At step 1704, the individual or user, or any other individual(s) or user(s) watching and/or listening to the gaming activity, the gambling activity, or the lottery drawing, can request any data and/or information and/or analytics data and/or information at any time before, during, or after, the gaming activity, the gambling activity, or the lottery drawing. Any data and/or information and/or any analytics data and/or information requested, or any data and/or information and/or analytics data and/or information which is provided without request, can be transmitted from the information/analytics provider computer 70 and/or from the central processing computer 10 and can be viewed in or via the electronic forum, chat room, or webpage of the website.

At step 1704, the individual or user, or any other individual(s) or user(s) watching and/or listening to the gaming activity, the gambling activity, or the lottery drawing, can place any number of posts or comments in the electronic forum, chat room, or webpage of the website. At step 1704, the individual or user, or any other individual(s) or user(s) watching and/or listening to the gaming activity, the gambling activity, or the lottery drawing, can place any number of outcome bets, or game event bets or micro event bets, before or during the gaming activity, the gambling activity, or the lottery drawing.

In a preferred embodiment, the individual or user can, at step 1704 or at any other time, place any bet while in, or via, the respective electronic forum, chat room, or webpage of the website, or via the central processing computer 10. In all instances when the individual or user places any bet, information regarding or pertaining to the bet can be transmitted from the user communication device 20 and can be received and processed by the central processing computer 10. At step 1704, each time a bet is placed by the individual or user, information regarding the same can be stored in his or her sports betting account, gaming account, or gambling account, which information can be stored and maintained at the central processing computer 10, the individual's or user's user communication device 20, the financial institution computer 90, and/or the escrow agent computer 95.

In a preferred embodiment, the central processing computer 10 can transmit information regarding any and/or all of the individual's or user's bets which are placed on the gaming activity, the gambling activity, or the lottery drawing, as well as any information regarding any and/or all of the individual's or user's bets which are placed on any other gaming activities, gambling activities, or lottery drawings. In another preferred embodiment, in instances when the individual or user has bet on, seeks to bet on, or simply wants to watch and/or listen to, another gaming activity, gambling activity, or lottery drawing, the individual or user can request a link to the respective electronic forum, chat room, or website, on or via which that other gaming activity, gambling activity, or lottery drawing, can be watched or listened to.

With reference once again to FIGS. 17A and 17B, at any time during gaming activity, the gambling activity, or the lottery drawing, the central processing computer 10 can, at step 1704, provide, via the respective electronic forum, chat room, or website, for each bet placed by the individual or user, an indication as to whether the individual or user is winning the bet or losing the bet at that point in time or at that point in the gaming activity, the gambling activity, or the lottery drawing. For example, information regarding a bet which is a winning bet at that point in time, or at that point in the gaming activity, the gambling activity, or the lottery drawing, can be provided or displayed in one color, such as, for example, green, while information regarding a bet which is losing bet at that point in time, or at that point in the gaming activity, the gambling activity, or the lottery drawing, can be provided or displayed in another color, such as, for example, red. In instances in which it cannot be determined whether a bet is a winning or a losing bet, that bet can be provided or displayed in a third and neutral color such as, for example yellow, white, or any other appropriate color.

In a preferred embodiment, at step 1704, the central processing computer 10 can also provide, via the electronic forum, chat room, or webpage of the website, and during gaming activity, the gambling activity, or the lottery drawing, information regarding available new bets, betting odds for same, and/or any new or updated betting odds for bets corresponding to the gaming activity, the gambling activity, or the lottery drawing, as well as the availability of bets and/or betting odds for same which can provide the individual or user with an opportunity to increase his or her winnings, minimize his or her losses, or obtain any hedge position to protect his or her interests regarding any bets he or she has already placed. The individual or user can place any bet or bets using this above-described information. In a preferred embodiment, at step 1704, the central processing computer 10 can also provide, via the electronic forum, chat room, or webpage of the website, and during the gaming activity, the gambling activity, or the lottery drawing, information regarding a gaming insurance product or any number of gaming insurance products, and/or a gaming derivative product or any number of gaming derivative products, which the individual or user can purchase in order to minimize his or her losses.

If the individual or user chooses to purchase any gaming insurance product(s) or any gaming derivative product(s), the individual or user can enter the purchase request(s) at step 1704 and the same can be transmitted to the central processing computer 10 for processing and information storage regarding the same. Thereafter, any information regarding the individual's or user's purchase of any gaming insurance product(s) or any gaming derivative product(s) can be stored at the central processing computer 10 and, in particular, in the database 10H of same and in the individual's or user's sports betting account, gaming account, or gambling account.

Any information regarding any bets placed by the individual or user can be displayed to the individual or user in an appropriate location or section of the electronic forum, chat room, or webpage of the web site. Any information regarding any gaming insurance product(s) or any gaming derivative product(s) can also be displayed to the individual or user in an appropriate location or section of the electronic forum, chat room, or webpage of the website.

In a preferred embodiment, at step 1704, the individual or user, can also decide to sell his or her position in a bet or a lottery ticket, or purchase another individual's or user's position in a bet or a lottery ticket. In such instances, bets or lottery tickets available for sale can be displayed to the individual or user in an appropriate location or section of the electronic forum, chat room, or webpage of the web site.

In a preferred embodiment, at step 1704, the individual or user, as well any other individual(s) or user(s) watching and/or listening to the gaming activity, the gambling activity, or the lottery drawing, can report suspected instances of cheating, play irregularities, officiating irregularities, or any other instances which may call into question the integrity of the gaming activity, the gambling activity, or the lottery drawing. Information, postings, or comments, can be posted by the individual or user, or any other individual(s) or user(s) watching and/or listening to the gaming activity, the gambling activity, or the lottery drawing, in a section of the electronic forum, chat room, or webpage of the website, dedicated for same, and the information, postings, or comments, can be time stamped. This allows for information, postings, or comments, relating to the integrity of the respective gaming activity, the gambling activity, or the lottery drawing, to be posted by the individual or user, and by any other individual(s) or user(s) gaming activity, the gambling activity, or the lottery drawing, during the same. The posted information, postings, or comments can be transmitted to the central processing computer 10 for dissemination to the appropriate entities and/or authorities.

In this regard, the apparatus 100 of the present invention can be utilized to obtain and report instances of suspected cheating, as reported by the individuals or users who use the apparatus 100 of the present invention to watch and/or listen to gaming activities, gambling activities, or lottery drawings, on which they have placed bets and/or purchased a lottery ticket or lottery tickets.

The central processing computer 10 can receive the submitted information or comments received from the individual or user, or from any other individuals or users, store the same in a file associated with the gaming activity, the gambling activity, or the lottery drawing, and automatically transmit the same to the casino or gaming venue, the gaming facility computer 50 associated with the casino or the gaming venue, or to a governmental entity computer 40 associated with the governmental entity or agency overseeing the gaming activity, the gambling activity, or the lottery drawing. In this manner, the apparatus 100 can be utilized to report instances of suspected cheating activity or any other issues pertaining to the integrity of the gaming activity, the gambling activity, or the lottery drawing.

The central processing computer 10 can also automatically transmit information regarding suspected cheating activity, or any other integrity issue, to the respective governmental entity computer 40 for each government which may have an interest in receiving the same. In this regard, each government having an interest in receiving this information can be apprised of the suspected cheating activity or integrity issue.

In a preferred embodiment, at step 1704, the individual or user, as well any other individuals or users watching and/or listening to the gaming activity, the gambling activity, or the lottery drawing, can also report any complaints regarding the placing of any bets, the payment or satisfaction regarding any bets, and/or any suspected betting fraud, and/or any other problems encountered in using via the apparatus 100. Information regarding any such complaints can be transmitted from the user communication device 20 to the central processing computer 10.

In a preferred embodiment, if the individual or user is utilizing a headset as or with the user communication device 20, and any all data or information inputs, postings, comments, information requests, placing of bets, or reports or reportings of any kind, can be input verbally via the microphone of the video and/or audio recording device(s) 20J of the user communication device 20. Any voice inputs can also translated into text and displayed in the electronic forum, chat room, or webpage of the website. The present invention can also be equipped with any needed software for translating text from one language into another language and/or translating verbal information into text and then translating the text into another language.

In a preferred embodiment, any and all interactions between the individual or user and/or any other individuals or users which take place in or via the electronic forum, chat room, or webpage of the website, can be recorded and stored by and at the central processing computer 10 in a file associated with the electronic forum, chat room, or webpage of the website, and/or in a file associated with the gaming activity, the gambling activity, or the lottery drawing.

In a preferred embodiment, at step 1704, any governmental entity computer 40, any gaming facility computer 50, and/or any escrow agent computer 95, can be used by an authorized operator of same to monitor any and/or all activity occurring or transpiring in or via one or more electronic forums, chat rooms, or web pages of any websites, associated with any watching and/or listening to the gaming activity, the gambling activity, or the lottery drawing.

In a preferred embodiment, the gaming activity, the gambling activity, or the lottery drawing, and the streaming broadcast or transmission of the same, will end at step 1705. At step 1706, the individual or user can transmit a bet outcome request or a lottery drawing outcome request to the central processing computer 10 to request that the central processing computer 10 process and determine a bet outcome or result or a lottery drawing outcome or result, for each bet placed and/or for each lottery ticket purchased, so as to provide the individual or user with the results or outcome regarding his or her bets or lottery ticket purchases, such as, for example, whether the individual or user has won a bet or has lost a bet, and/or whether the individual or user has won on a lottery ticket or lost on a lottery ticket.

At step 1707, the central processing computer 10 can process each bet, one at a time as described herein, and can process information regarding each lottery ticket purchased, as described herein. For each bet, the central processing computer 10 can determine whether the bet which is being processed is a winning bet or a losing bet. For each lottery ticket purchased, the central processing computer 10 can determine whether the lottery ticket which is being processed is a winning lottery ticket or a losing lottery ticket. After determining whether the bet(s) and/or the lottery ticket(s) is/are a winning bet or a winning lottery ticket or a losing bet or a losing lottery ticket, the operation of the central processing computer 10 can proceed to step 1708 and the central processing computer 10 can determine whether or not a hold has been placed on any payout for any bet and/or for any payout on any lottery ticket, such as may occur in cases of suspected fraud or cheating.

If, at step 1708, it is determined that information regarding any suspected fraud or cheating, or any other issues pertaining to game or lottery integrity exists or has been reported to the central processing computer 10 regarding the gaming activity, the gambling activity, or the lottery drawing, by or from any governmental entity computer, by or from any gaming facility computer 50, by or from any information/analytics provider computer 70, by or from any social network computer 80, by or from any financial institution computer 90, by or from any escrow agent computer 95, or by any user communication device 20, such as can be reported in any electronic forum, chat room, or web page of a website, as described herein, or by or through any other independent or other means, then the operation of the central processing computer 10 will proceed to step 1709 and the central processing computer 10 can withhold any payment on a winning bet or winning lottery ticket, and/or suspend or withhold any charge on any losing bet, until the matter is resolved. In another preferred embodiment, the central processing computer 10 can also automatically process information for placing all bets and/or lottery ticket winnings into escrow with the escrow agent computer 95 until the matter is resolved. Thereafter, the operation of the apparatus will proceed to step 1711.

If, at step 1708, it is determined that no information regarding any suspected fraud or cheating activity, or any other issues pertaining to integrity, exists or has been reported to the central processing computer 10 regarding the gaming activity, the gambling activity, or the lottery drawing, then the operation of the central processing computer 10 will proceed to step 1710. At step 1710, the central processing computer 10 will effectuate a settlement of the bet and/or the lottery ticket results by, in the event of a winning bet or a winning lottery ticket, effectuating a payment to the sports betting account, gaming account, or gambling account, of the individual or user, or, in the event of a losing bet or a losing lottery ticket, extracting payment from the sports betting account, gaming account, or gambling account, of the individual or user.

In an instance where the individual or user placed the bet monies into escrow with the escrow agent computer 95, the central processing computer 10 can generate and transmit, to the escrow agent computer 95, a request for funds, along with an official certification that no suspected fraud or cheating activity, or any other issues pertaining to integrity, exists or has been reported for the gaming activity, the gambling activity, or the lottery drawing, and thereby request the escrow agent computer 95 release any bet monies to the central processing computer 10 if all other escrow agreement conditions have been met or satisfied.

At step 1710, the central processing computer 10 can also effectuate a gaming fee payment to the respective financial account associated with the respective governmental entity computer 40 for each governmental entity due a gaming fee payment, effectuate a gaming fee payment to the respective financial account associated with the respective gaming facility computer 50 for each gaming facility due a gaming fee payment, and/or effectuate a gaming fee payment to the respective financial account associated with the respective information/analytics provider computer 70 for each information/analytics provider, if any, due a gaming fee payment.

In instances in which a gaming fee is due to a jurisdiction, country, state, province, or political subdivision, from which a bet is placed or a lottery ticket has been purchased, or to a jurisdiction, country, state, province, or political subdivision, a gaming fee payment can be effectuated to the respective financial account associated with the respective governmental entity computer 40 for the respective jurisdiction(s), country or countries, state(s), province(s), or political subdivision(s). In this regard, any stakeholders in or of the sports betting system of the apparatus 100 of the present invention can be paid any gaming fees due them for each bet placed or lottery ticket purchased using the apparatus 100. Thereafter, the operation of the apparatus will proceed to step 1711.

At step 1711, the central processing computer 10 can determine if another bet or if any other bets need to be processed for the individual or user, or can determine if another lottery ticket or if any other lottery tickets need to be processed for the individual or user. If, at step 1711, it is determined that there are no more bets or lottery tickets that need to be processed for the individual or user, then the operation of the apparatus 100 will proceed to step 1712. If, however, it is determined that there are other bets or lottery tickets which need to be processed, then the operation of the apparatus 100 will proceed to step 1707 and the above-described processes of steps 1707 through 1711 can be repeated for the next bet to be processed or for the next lottery ticket to be processed, and thereafter for all remaining bets or lottery tickets to be processed.

At step 1712, the central processing computer 10 can also generate a final report regarding and including information regarding any and/or all of the bets placed and/or lottery tickets purchased on, for, or regarding, the gaming activity or gaming activities, the gambling activity or gambling activities, or the lottery drawing(s), the outcomes of all such bets and/or lottery ticket purchases, the identities of the all individuals or users who placed each of the bets and/or purchased each of the lottery tickets, and/or who watched and/or listened to the gaming activity or gaming activities, the gambling activity or gambling activities, or the lottery drawing(s), via any electronic forum, chat room, or web page of any website, and a record of all postings, comments, and messages, bets placed, and any and/or all activity which took place in or via the respective electronic forum(s), chat room(s), and web pages of any websites. The final report can also contain any comments or reports regarding any instances of any suspected fraud or cheating activity, or any other issues pertaining to integrity.

In a preferred embodiment, the final report can be stored in the database 10H of the central processing computer 10, can be transmitted to any party or entity requesting same, and/or can be transmitted to any governmental entity computer 40, any gaming facility computer 50, any information/analytics provider computer 70, any social network computer 80, any financial institution computer 90, and/or any escrow agent computer 95, either upon request or automatically. In a preferred embodiment, any requests for automated transmissions of any and/or all of the herein-described final reports, by any of the operators or owners of any of the above-described computers or communication devices, can be previously transmitted to, received by, and stored at, the central processing computer 10. Thereafter, the operation of the apparatus 100 will cease at step 1713.

In view of the foregoing, the apparatus 100 of the embodiment of FIGS. 17A and 17B can provide an individual or user with a broadcast of, or with a streaming video transmission of and/or a streaming audio transmission of, a gaming activity or gaming activities, a gambling activity or gambling activities, a lottery or lotteries, and/or a lottery drawing or lottery drawings, on, for, or regarding, which the individual or user may have placed a bet and/or desires to place a bet, via an electronic forum(s), a chat room(s), and/or a web page of a websites. The apparatus 100 of the embodiment of FIGS. 17A and 17B can also provide the individual or user with ability to participate in a gaming activity, a gambling activity, and/or a lottery or lottery drawing, place bets on, in, or regarding, the gaming activity, the gambling activity, or the lottery or lottery drawing, place bets on game events or micro-events which occur during the gaming activity, the gambling activity, or the lottery or lottery drawing, and/or place a derivative bet or derivative bets on, in, or regarding, the gaming activity, the gambling activity, or the lottery or lottery drawing. The apparatus of FIGS. 17A and 17B can also provide the individual or user with the ability to purchase a gaming or gambling loss insurance policy, product, or service, or a gaming or gambling derivative, in order to allow the individual or user to manage his or her risk of loss in his or her gaming activities, gambling activities, and/or lottery activities and/or lottery ticket purchasing activities.

In another preferred embodiment, as well an in any and/or all of the embodiments described herein, the apparatus 100 of the embodiment of FIGS. 17A and 17B can also be utilized in connection and/or in conjunction with any and/or all of the functionalities described herein in connection with the preferred embodiments of each of FIGS. 13A, 13B, 14A, 14B, 15, and 16 in a same, a similar, and/or an analogous, manner as described herein. In another preferred embodiment, the apparatus 100 can provide an individual or user with the ability to request to be notified regarding a gaming activity or gaming activities, a gambling activity or gambling activities, or a lottery or lotteries, and can provide a notification or notifications regarding the same to the individual or user in a same, a similar, and/or an analogous, manner as described herein in connection with the preferred embodiment of FIG. 16.

In another preferred embodiment, the apparatus and methods of the present invention can be utilized in connection with a distributed ledger and with Blockchain technology. In a preferred embodiment, a distributed ledger and Blockchain technology can be utilized along with a central processing computer, in a combined system, wherein certain of the transactions, described herein as being performed by the apparatus 100, can be processed and/or performed by and/or with a central processing computer and/or certain other transactions can be processed and/or performed by and/or with, and/or using, a distributed ledger and Blockchain technology or Blockchain technologies. In another preferred embodiment, any and/or all transactions, described herein as being performed by the apparatus 100, can also be processed and/or performed by and/or with, and/or using, a distributed ledger and Blockchain technology or Blockchain technologies, and/or any cryptocurrency Blockchain technology or technologies.

In a preferred embodiment, any type of Blockchain technology can be utilized in connection with the apparatus 100 and methods of the present invention. In a preferred embodiment, for example, the apparatus 100 and methods of the present invention can utilize a distributed ledger(s) along with any Blockchain technology or technologies, Bitcoin Blockchain technology or technologies, Ethereum Blockchain technology or technologies, Bitcoin Cash Blockchain technology or technologies, Litecoin Blockchain technology or technologies, Privacy Coin Bitcoin technology or technologies, and/or any other suitable Blockchain technology or technologies, and/or Smart contracts and/or Smart contract technology or technologies and/or decentralized autonomous organizations (DAOs), decentralized autonomous organizations (DAOs) technology or technologies, and/or any combination of same.

In any and/or all of the embodiments described herein, the apparatus and methods of the present invention can also be utilized with any suitable cryptocurrency, such as, but not limited to, Bitcoin, Bitcoin Cash, Ethereum, Ripple, Dash, Monero, Zcash, Digibyte, Litecoin, any privacy coins, and/or any other cryptocurrency and/or privacy coin cryptocurrency.

Applicant incorporates by reference herein the subject matter and teachings of "Blockchain Technology Explained" by Alan T. Norman, "Blockchain" by Abraham K. White, "Blockchain—A Practical Guide To Developing Business, Law, And Technology Solutions" by Joseph J. Bambara and Paul R. Allen, and "Blockchain—Ultimate Guide To Understanding Blockchain, Bitcoin, Cryptocurrencies, Smart Contracts And The Future of Money" by Mark Gates, in their entirety, for all of their respective subject matter and teachings regarding distributed ledger technology and/or technologies, Blockchain technology and/or technologies, Bitcoin technology and/or technologies, Bitcoin Blockchain technology and/or technologies, Ethereum technology and/or technologies, Ethereum Blockchain technology and/or technologies, cryptocurrencies, cryptocurrency technology and/or technologies, and/or smart contract technology and/or technologies, and/or decentralized autonomous organizations (DAOs) technologies, and/or peer-to-peer technology and/or technologies, and/or any other technology or technologies related thereto or which can be utilized in conjunction distributed ledgers, Blockchain technologies, Smart contracts, decentralized autonomous organizations (DAOs), and/or cryptocurrencies.

By utilizing a distributed ledger and a suitable Blockchain technology, the apparatus and methods of the present invention can reduce the amount of processing performed by, and reliance on, a central processing computer and/or can eliminate the need for a central processing computer and any centralized entity which might operate the central processing computer.

It is important to note that the distributed ledger and the Blockchain technology utilized with same can also be referred to herein as a "distributed ledger/Blockchain technology", "distributed ledger and Blockchain technology", "distributed ledger/Blockchain technology system", or "distributed ledger and Blockchain technology system", or that the distributed ledger and the Blockchain technology utilized with same can also be referred by using any suitable phrase or terminology indicative of an application or system which utilizes or which includes a distributed ledger which is used with any Blockchain technology or which is used in connection, or in conjunction, with any Blockchain technology.

Figure 18:
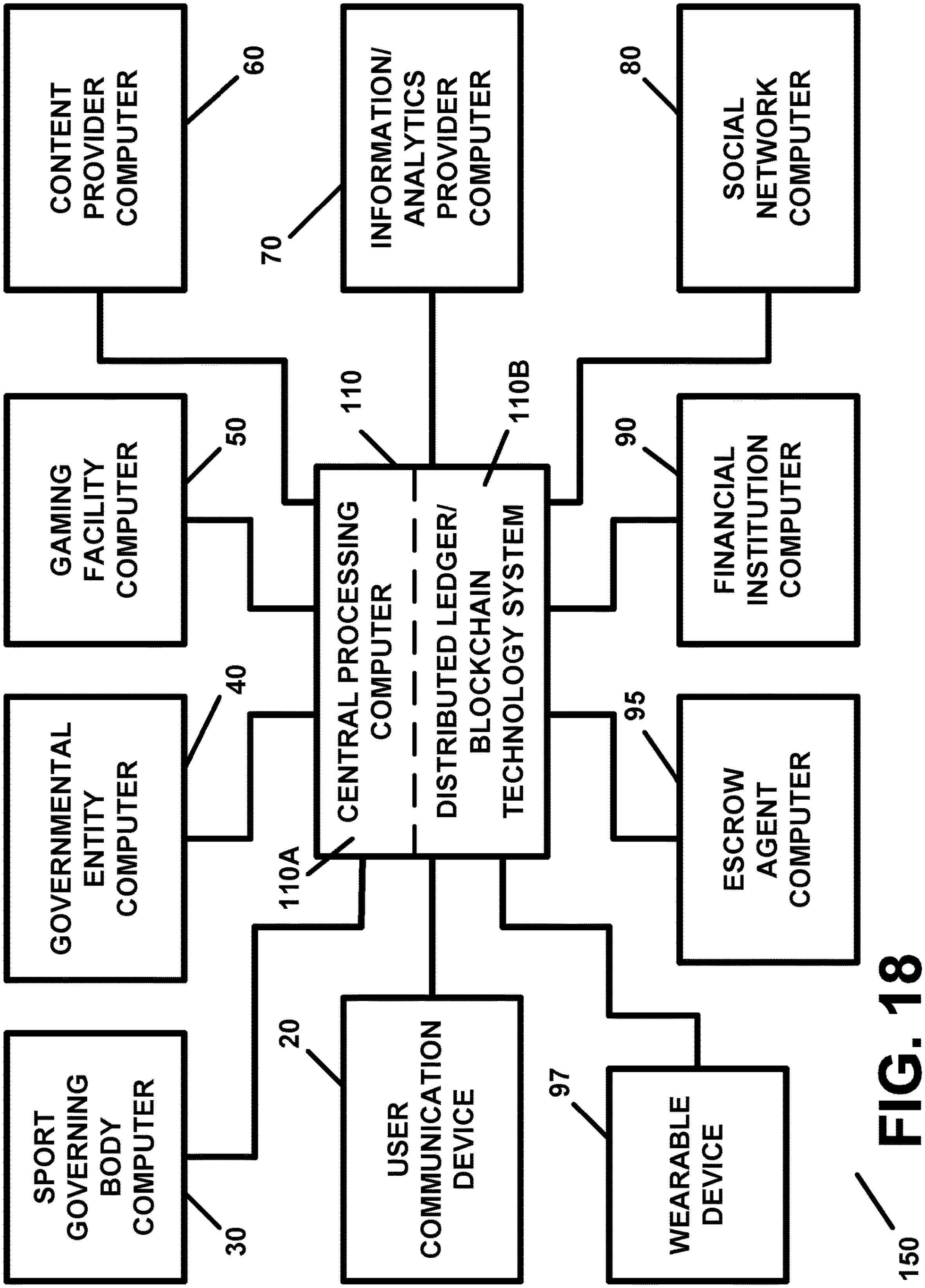
FIG. 18 illustrates another preferred embodiment of the apparatus of the present invention, in block diagram form.

FIG. 18 illustrates another preferred embodiment of the apparatus of the present invention, which is designated by the reference numeral 150, in block diagram form. With reference to FIG. 18, the apparatus 150 includes a central processing computer and distributed ledger/Blockchain technology system 110 (hereinafter "central processing computer/distributed ledger/Blockchain technology system 110"). The central processing computer/distributed ledger/Blockchain technology system 110 includes a central processing computer component 110A, which can perform any and/or all of the functions described herein as being performed by the central processing computer 10 of the apparatus 100 of FIG. 1, and a distributed ledger/Blockchain technology system component 110B.

With reference once again to FIG. 18, the apparatus 150 also includes any number of user communication devices 20, sport governing body computers 30, governmental entity computers 40, gaming facility computers 50, content provider computers 60, information/analytics provider computers 70, social network computers 80, financial institution computers 90, escrow agent computers 95, and/or wearable devices 97. In a preferred embodiment, any and/or all of the various transactions, functions, and/or functionalities, described herein as being provided or performed by the apparatus 100 of FIG. 1 can be provided or performed by the apparatus 150 of FIG. 18 and, in particular, can be performed by either the central processing computer component 110A of the central processing computer/distributed ledger/Blockchain technology system 110 and/or by the distributed ledger/Blockchain technology system component 110B of the central processing computer/distributed ledger/Blockchain technology system 110.

For example, in a preferred embodiment, any and/or all of the financial transactions described herein, which relate to the placing of a bet or bets or which relate to the settlement of a bet or bets, can be performed by the distributed ledger/Blockchain technology system component 110B of the central processing computer/distributed ledger/Blockchain technology system 110, while any and/or all non-financial transactions can be performed by the central processing computer component 110A of the central processing computer/distributed ledger/Blockchain technology system 110. In another preferred embodiment, any financial or non-financial transaction(s) or function(s) can be performed by the distributed ledger/Blockchain technology system component 110B of the central processing computer/distributed ledger/Blockchain technology system 110, and/or any financial or non-financial transaction(s) or function(s) can also be performed by the central processing computer component 110A of the central processing computer/distributed ledger/Blockchain technology system 110. In a preferred embodiment, the apparatus 150 can also be utilized with any cryptocurrency or cryptocurrencies or with no cryptocurrency.

Figure 19:
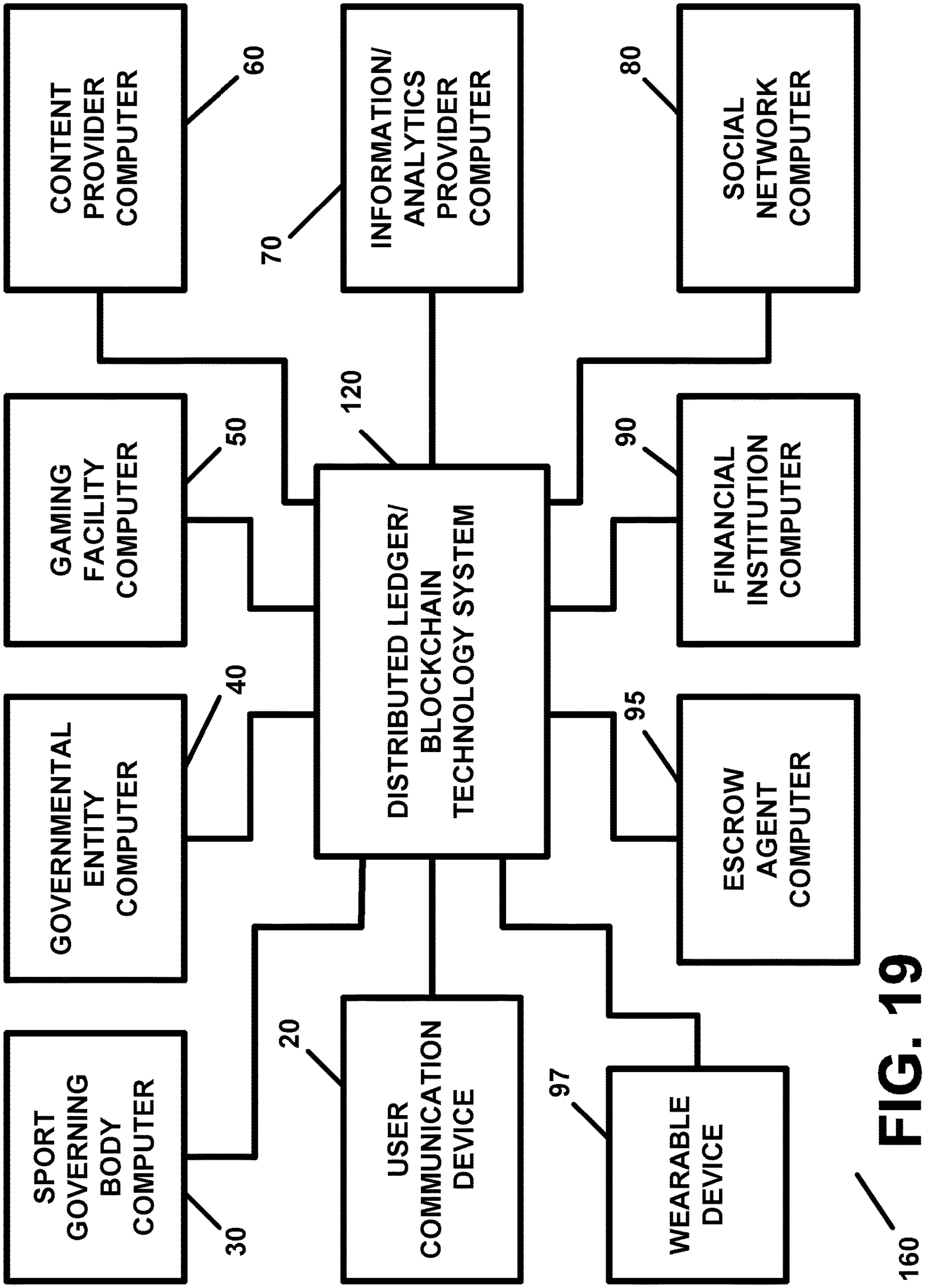
FIG. 19 illustrates yet another preferred embodiment of the apparatus of the present invention, in block diagram form.

In another preferred embodiment, a distributed ledger/Blockchain technology system can be utilized to process and/or perform any and/or all of the transactions and/or functions described herein as being provided and/or performed by the apparatus of the present invention. FIG. 19 illustrates another preferred embodiment of the apparatus of the present invention, which is designated by reference numeral 160, in block diagram form. With reference to FIG. 19, the apparatus 160 includes a distributed ledger/Blockchain technology system 120. The distributed ledger/Blockchain technology system 120 can perform any and/or all of the transaction and/or functions described herein as being performed by the central processing computer 10 of the apparatus 100 of FIG. 1.

With reference once again to FIG. 19, the apparatus 150 also includes any number of user communication devices 20, sport governing body computers 30, governmental entity computers 40, gaming facility computers 50, content provider computers 60, information/analytics provider computers 70, social network computers 80, financial institution computers 90, escrow agent computers 95, and/or wearable devices 97.

Any and/or all of the various transactions, functions, and/or functionalities, described herein as being provided or performed by the present invention can be provided or performed by the apparatus 160 of FIG. 19 and, in particular, can be performed by utilizing the distributed ledger/Blockchain technology system 120. In a preferred embodiment, the apparatus 160 can also be utilized with any cryptocurrency or cryptocurrencies or with no cryptocurrency.

In any and/or all of the embodiments described herein, the user communication device(s) 20 and/or the central processing computer 10, the central processing computer/distributed ledger/Blockchain technology system 110, and/or the distributed ledger/Blockchain technology system 120, can also transmit a control signal for activating and/or for controlling a selected camera, video recording device, microphone, and/or audio recording device, of any of the video and/or audio recording device(s) 50J, 60J, 70J, 80J, and/or 97K, described herein, and/or for activating and/or for controlling any wearable device(s) 97 described herein.

In any and/or all the preferred embodiments described herein, the apparatus of the present invention can also be utilized to gather and/or to collect analytics information from multiple sources and to provide analytics products and/or services to any of the herein-described stakeholders and users of the apparatus of the present invention. In a preferred embodiment, sports analytics information, casino gambling analytic information, and lottery analytics information, can be recorded, can be gathered and/or collected, and/or can be provided to an information/analytics computer 70. In a preferred embodiment, various analytics products and/or services can also be generated and/or provided to the various users and stakeholders described herein via the apparatus 100, the apparatus 150, and/or the methods, of the present invention.

In a preferred embodiment, analytics data and/or information and/or any other data and/or information deemed useful in serving the needs of users and/or stakeholders of the apparatus 100, the apparatus 150, and/or the methods, of the present invention, can be provided by various individuals, entities, or sources, at any time before, during, or after, any of the herein-described games, matches, competitions, or events, for which bets can or may be placed and/or for any casino games, lottery games, and/or lottery drawings. In a preferred embodiment, analytics data and/or information and/or any other data and/or information deemed useful in serving the needs of users and/or stakeholders of the apparatus 100, the apparatus 150, and/or the methods, of the present invention, can be provided by various individuals, entities, or sources, at any time. In a preferred embodiment, these individuals, entities, or sources, can include official data, unofficial data, and/or other analytics, sources, such as, for example, but not limited to, sports governing bodies, leagues, teams, tournaments, or competitions, governmental data and/or analytics sources such as, for example, but not limited to, countries, states, provinces, cities, municipalities, or any other political subdivisions, private data and/or analytics sources such as, for example, but not limited to, data and/or analytics entities and/or business entities, financial institutions, and/or escrow agents, and/or their employees and/or agents, private individuals and/or freelancers, and/or wearable devices which can be worn by players, athletes, and/or participants, in any of the herein-described games, matches, competitions, or events, casino games, lottery games, and/or lottery drawings, as well as any of the herein-described gaming facilities, gaming venues, content providers, and/or social networks.

In a preferred embodiment, analytics data and/or information can be entered by each of the herein-described users, individuals, sports governing bodies, leagues, teams, tournaments, or competitions, governmental data and/or analytics sources, data and/or analytics entities and/or business entities, financial institutions, escrow agents, and/or their employees and/or agents, private individuals and/or freelancers, and wearable devices, can utilize a respective computer or communication device to collect and/or gather, and to transmit, analytics data and/or information to the information/analytics computer 70. Thereafter, any desired analytics data and/or information and/or any analytics product(s) and/or service(s) derived from the same can be requested by and/or can be transmitted to any user, individual, sports governing body, governmental entity, gaming facility, content provider, information/analytics provider, social network, financial institution, and/or escrow agent, who or which utilizes the apparatus 100, the apparatus 150, and/or the methods, of the present invention. In a preferred embodiment, any desired analytics data and/or information and/or any analytics product(s) or service(s) derived from the same can be requested by and/or can be transmitted to any user, individual, sports governing body, governmental entity, gaming facility, content provider, information/analytics provider, social network, financial institution, and/or escrow agent, at any time.

Figure 20:
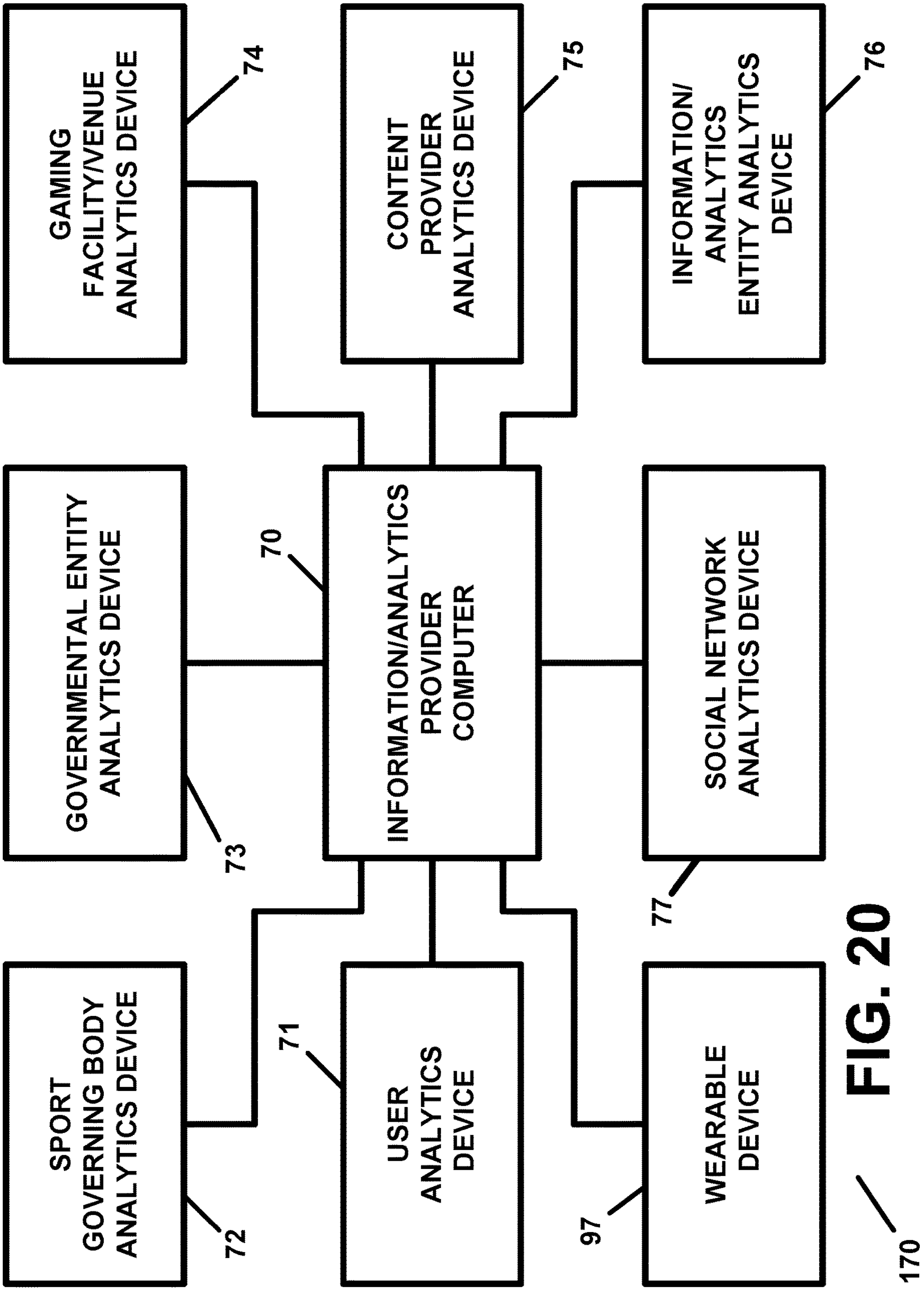
FIG. 20 illustrates a preferred embodiment of an analytics apparatus which can be utilized in connection with the apparatus and method of the present invention, in block diagram form.

FIG. 20 illustrates a preferred embodiment of an analytics apparatus, which is designated by the reference numeral 170, which can be utilized in connection with the apparatus and methods of the present invention, in block diagram form. With reference to FIG. 20, the analytics apparatus 170 includes the information/analytics provider computer 70 of FIG. 1. The analytics apparatus 170 can also include a user analytics device 71, which in a preferred embodiment, can be any user communication device 20 which is suitably equipped to allow one to enter, collect, or gather, analytics data and/or information, and which can be utilized by any user or individual who or which utilizes the apparatus 100 or the apparatus 150 of the present invention. In a preferred embodiment, the user analytics device 71 can be connected with, or can be wirelessly linked to or with, the information/analytics provider computer 70. With reference once again to FIG. 20, the analytics apparatus 170 can also include a sport governing body analytics device 72, which can be utilized by any of the sports governing bodies described herein, and/or by any entities offering, sponsoring, or operating, a lottery or lotteries, in order to provide official or unofficial analytics data and/or information to the analytics apparatus 170. In a preferred embodiment, the sport governing body analytics device 72 can be connected with, or can be wirelessly linked to or with, the information/analytics provider computer 70.

With reference once again to FIG. 20, the analytics apparatus 170 can also include a governmental entity analytics device 73, which can be utilized by any of the governmental entities described herein in order to provide official or unofficial analytics data and/or information to the analytics apparatus 170. In a preferred embodiment, the governmental entity analytics device 73 can be connected with, or can be wirelessly linked to or with, the information/analytics provider computer 70. With reference once again to FIG. 20, the analytics apparatus 170 can also include a gaming facility/venue analytics device 74, which can be utilized by any of the gaming facilities or venues described herein, or by any casino or on-line casino, in order to provide official or unofficial analytics data and/or information to the analytics apparatus 170. In a preferred embodiment, the gaming facility/venue analytics device 74 can be connected with, or can be wirelessly linked to or with, the information/analytics provider computer 70. With reference once again to FIG. 20, the analytics apparatus 170 can also include a content provider analytics device 75, which can be utilized by any of the content providers described herein in order to provide official or unofficial analytics data and/or information to the analytics apparatus 170. In a preferred embodiment, the content provider analytics device 75 can be connected with, or can be wirelessly linked to or with, the information/analytics provider computer 70.

With reference once again to FIG. 20, the analytics apparatus 170 can also include an information entity analytics device 76, which can be utilized by any of the information/analytics providers, who or which utilize the apparatus 100 or the apparatus 150, and/or any employees or agents of same, by any financial institutions who or which utilize the apparatus 100 or the apparatus 150 and/or any employees or agents of same, and/or by any escrow agents who or which utilize the apparatus 100 or the apparatus 150 and/or any employees or agents of same, in order to provide official or unofficial analytics data and/or information to the analytics apparatus 170. In a preferred embodiment, the information entity analytics device 76 can be connected with, or can be wirelessly linked to or with, the information/analytics provider computer 70.

With reference once again to FIG. 20, the analytics apparatus 170 can also include a social network analytics device 77 which can be utilized by any of the social networks which utilize the apparatus 100 or the apparatus 150 and/or any employees or agents of same in order to provide official or unofficial analytics data and/or information to the analytics apparatus 170. In a preferred embodiment, the social network analytics device 77 can be connected with, or can be wirelessly linked to or with, the information/analytics provider computer 70.

With reference once again to FIG. 20, the analytics apparatus 170 can also include a wearable device 97 which can be worn by, attached to, or linked with, any player, athlete, or participant, of any sporting event, game, match, competition, or tournament, or to any clothing or equipment of the player, athlete, or participant. In a preferred embodiment, the wearable device 97 can be used by a player, athlete, or participant, at any time before, during, or after, a game, match, event, competition, tournament, or practice session, or any other time, in order to provide official or unofficial analytics data and/or information to the analytics apparatus 170. In a preferred embodiment, the wearable device 97 can be wirelessly linked to or with the information/analytics provider computer 70.

In a preferred embodiment, any number of user analytics devices 71, sport governing body analytics devices 72, governmental entity analytics devices 73, gaming facility/venue analytics devices 74, content provider analytics devices 75, information entity analytics devices 76, social network analytics devices 77, and/or wearable devices 97, can be utilized in and/or with the analytics apparatus 170 and/or the apparatus 100 and/or the apparatus 150 of the present invention.

In another preferred embodiment, any number of user analytics devices 71, sport governing body analytics devices 72, governmental entity analytics devices 73, gaming facility/venue analytics devices 74, content provider analytics devices 75, information entity analytics devices 76, social network analytics devices 77, and/or wearable devices 97, can also provide analytics data and/or information directly to the central processing computer 10 of the apparatus 100 of FIG. 1 and/or the central processing computer and distributed ledger/Blockchain technology system 110 of the apparatus 150. In a preferred embodiment, any of the herein-described user analytics devices 71, sport governing body analytics devices 72, governmental entity analytics devices 73, gaming facility/venue analytics devices 74, content provider analytics devices 75, information entity analytics devices 76, social network analytics devices 77, and/or wearable devices 97, can be connected to, or wirelessly linked to or with, the central processing computer 10 of the apparatus 100 of FIG. 1 and/or the central processing computer and distributed ledger/Blockchain technology system 110 of the apparatus 150.

In a preferred embodiment, the analytics apparatus 170, as well as any of the user analytics devices 71, the sport governing body analytics devices 72, the governmental entity analytics devices 73, the gaming facility/venue analytics devices 74, the content provider analytics devices 75, the information entity analytics devices 76, the social network analytics devices 77, and/or the wearable devices 97, can be utilized to perform analytics data collection, gathering, recording, and/or reporting, to any information/analytics provider computer 70, and/or the central processing computer 10 of the apparatus 100 and/or the central processing computer and distributed ledger/Blockchain technology system 110 of the apparatus 150.

In a preferred embodiment, the analytics apparatus 170, as well as any of the user analytics devices 71, the sport governing body analytics devices 72, the governmental entity analytics devices 73, the gaming facility/venue analytics devices 74, the content provider analytics devices 75, the information entity analytics devices 76, the social network analytics devices 77, and/or the wearable devices 97, can be utilized to facilitate analytics data collection, gathering, recording, and/or reporting, from any number of the various users and stakeholders who or which utilize the apparatus 100 or the apparatus 150.

In another preferred embodiment, the central processing computer 10, the central processing computer and distributed ledger/Blockchain technology system 110, the analytics apparatus 170, and/or any information/analytics provider computer 70, can be specially programmed to process any analytics data and/or information collected by the apparatus 100, the apparatus 150, the analytics apparatus, and/or any of the herein-described user analytics devices 71, sport governing body analytics devices 72, governmental entity analytics devices 73, gaming facility/venue analytics devices 74, content provider analytics devices 75, information entity analytics devices 76, social network analytics devices 77, and/or wearable devices 97, and can be specially programmed to generate any desired analytics product(s) and/or service(s). In another preferred embodiment, the central processing computer 10, the central processing computer and distributed ledger/Blockchain technology system 110, the analytics apparatus 170, and/or any information/analytics provider computer 70, can be specially programmed generate any desired analytics product(s) and/or service(s) for, or to meet the needs or requests of, any of the herein-described users, individuals, or stakeholders, who or which utilize the apparatus 100 of the apparatus 150 of the present invention.

In another preferred embodiment, as well as any and/or all of the embodiments described herein, the apparatus and methods of the present invention, the apparatus 100, the apparatus 150, and/or the analytics apparatus 170, and/or any of the herein-described user analytics devices 71, sport governing body analytics devices 72, governmental entity analytics devices 73, gaming facility/venue analytics devices 74, content provider analytics devices 75, information entity analytics devices 76, social network analytics devices 77, and/or wearable devices 97, can be utilized in order to collect, record, process, and/or disseminate, player performance tracking data and/or information and/or athlete performance tracking data and/or information, to any of the herein-described individuals, users, or stakeholders, who or which use the apparatus and methods of the present invention.

In another preferred embodiment, as well as any and/or all of the embodiments described herein, the apparatus and methods of the present invention, the apparatus 100, the apparatus 150, and/or the apparatus 170, and/or any of the herein-described user analytics devices 71, sport governing body analytics devices 72, governmental entity analytics devices 73, gaming facility/venue analytics devices 74, content provider analytics devices 75, information entity analytics devices 76, social network analytics devices 77, and/or wearable devices 97, can be utilized in conjunction with player performance tracking systems, and/or as a component of the same, for monitoring the performance of players or athletes in and/or during games or matches.

In a preferred embodiment, the apparatus and methods of the present invention can process player performance tracking data and/or information and/or athlete performance tracking data and/or information in conjunction with historical or past player performance tracking data and/or information and/or athlete performance tracking data and/or information in order to provide performance assessment information for assessing the performance of any player or athlete, of any number of players or athletes, or any team or any number of teams, before, during, and after a game or match. The player performance tracking data and/or information and/or athlete performance tracking data and/or information, the assessment information, and/or any historical player performance tracking data and/or information and/or historical athlete performance tracking data and/or information, and/or any other historical data or information, statistical data or information, and/or probabilistic data and/or information, can be provided to any of the herein-described individuals or users, sports governing bodies, governmental entities, gaming facilities, content providers, information/analytics providers, social networks, financial institutions, escrow agents, bookmakers, and fraud detection systems, who or which utilize the apparatus and methods of the present invention.

In a preferred embodiment, any of the herein-described individuals or users, sports governing bodies, governmental entities, gaming facilities, content providers, information/analytics providers, social networks, financial institutions, escrow agents, bookmakers, and fraud detection systems, can utilize the player performance tracking data and/or information and/or athlete performance tracking data and/or information, the assessment information, and/or any historical player performance tracking data and/or information and/or historical athlete performance tracking data and/or information, and/or any other historical data or information, statistical data or information, and/or probabilistic data and/or information, as they desire.

For example, the player performance tracking data and/or information and/or athlete performance tracking data and/or information, the assessment information, and/or any historical player performance tracking data and/or information and/or historical athlete performance tracking data and/or information, and/or any other historical data or information, statistical data or information, and/or probabilistic data and/or information, can be used by individuals or users to place bets, can be used by bookmakers to determine, ascertain, or establish, betting odds before and/or during a game, match, or competition, or to determine, ascertain, or establish, betting odds after a game, match, or competition, and/or can be used by sports governing bodies, governmental entities, bookmakers, fraud detection systems, gaming facilities, content providers, information/analytics providers, social networks, financial institutions, escrow agents, and/or any other stakeholders to detect, report, be notified of, and/or investigate, any evidence and/or allegations indicative of, or evidencing, instances of match fixing, game fixing, cheating, irregular betting activities, and/or any other suspicious or wrongful activities, behavior, or occurrences.

In another preferred embodiment, as well as any and/or all of the embodiments described herein, the apparatus and methods of the present invention, the apparatus 100, the apparatus 150, and/or the analytics apparatus 170, and/or any of the herein-described user analytics devices 71, sport governing body analytics devices 72, governmental entity analytics devices 73, gaming facility/venue analytics devices 74, content provider analytics devices 75, information entity analytics devices 76, and/or social network analytics devices 77, can be utilized in order to collect, record, process, and/or disseminate, bookmaker data and/or information regarding betting odds, betting lines, proposition bets, and/or betting activities, and/or any other sportsbook or sports betting data and/or information, established, determined, offered, or ascertained, by a bookmaker before, during, and/or after, any game(s), matches, or competitions, for which the bookmaker a sportsbook offers betting or wagering activities.

In another preferred embodiment, as well as any and/or all of the embodiments described herein, the apparatus and methods of the present invention, the apparatus 100, the apparatus 150, and/or the apparatus 170, and/or any of the herein-described user analytics devices 71, sport governing body analytics devices 72, governmental entity analytics devices 73, gaming facility/venue analytics devices 74, content provider analytics devices 75, information entity analytics devices 76, social network analytics devices 77, and/or wearable devices 97, can be utilized in conjunction with fraud detection systems which can be utilized to monitor and/or compare changes in betting odds or wagering odds for games or matches before and/or during games with in-game or in-match performance tracking data and/or information.

In a preferred embodiment, any number of bookmakers can provide any types or kinds of bookmaker data and/or information, which be provided to, or disseminated to, any of the individuals or users for placing bets or otherwise using the apparatus and methods of the present invention, to any other bookmakers to determine, ascertain, or establish, betting odds before and/or during a game, match, or competition, or to determine, ascertain, or establish, betting odds after a game, match, or competition, and/or to any sports governing bodies, governmental entities, bookmakers, fraud detection systems, gaming facilities, content providers, information/analytics providers, social networks, financial institutions, escrow agents, and/or any other stakeholders to detect, report, be notified of, and/or investigate, any evidence and/or allegations indicative of, or evidencing, instances of match fixing, game fixing, cheating, irregular betting activities, and/or any other suspicious or wrongful activities, behavior, or occurrences.

In a preferred embodiment, the herein-described bookmaker data and/or information can be provided to any of the herein-described individuals or users, sports governing bodies, governmental entities, other bookmakers, fraud detection systems, gaming facilities, content providers, information/analytics providers, social networks, financial institutions, escrow agents, and/or any other stakeholders, before, during, or after, a game, match, or competition, upon request, automatically, and/or live, in real-time, and/or otherwise.

In another preferred embodiment, the apparatus and methods of the present invention can correlate player performance tracking data and/or information and/or athlete performance tracking data and/or information, obtained from any player performance tracking system and/or from any athlete performance tracking system, or obtained from any number of player performance tracking systems and/or from any athlete performance tracking systems, with any type or kind of bookmaker data and/or information, provided by any bookmaker or provided by any number of bookmakers, in order to generate fraud detection system reports or other information which can be used for detecting, reporting, and/or investigating, instances of match fixing, game fixing, cheating, irregular betting activities, and/or any other suspicious or wrongful activities, behavior, or occurrences.

Figure 21:
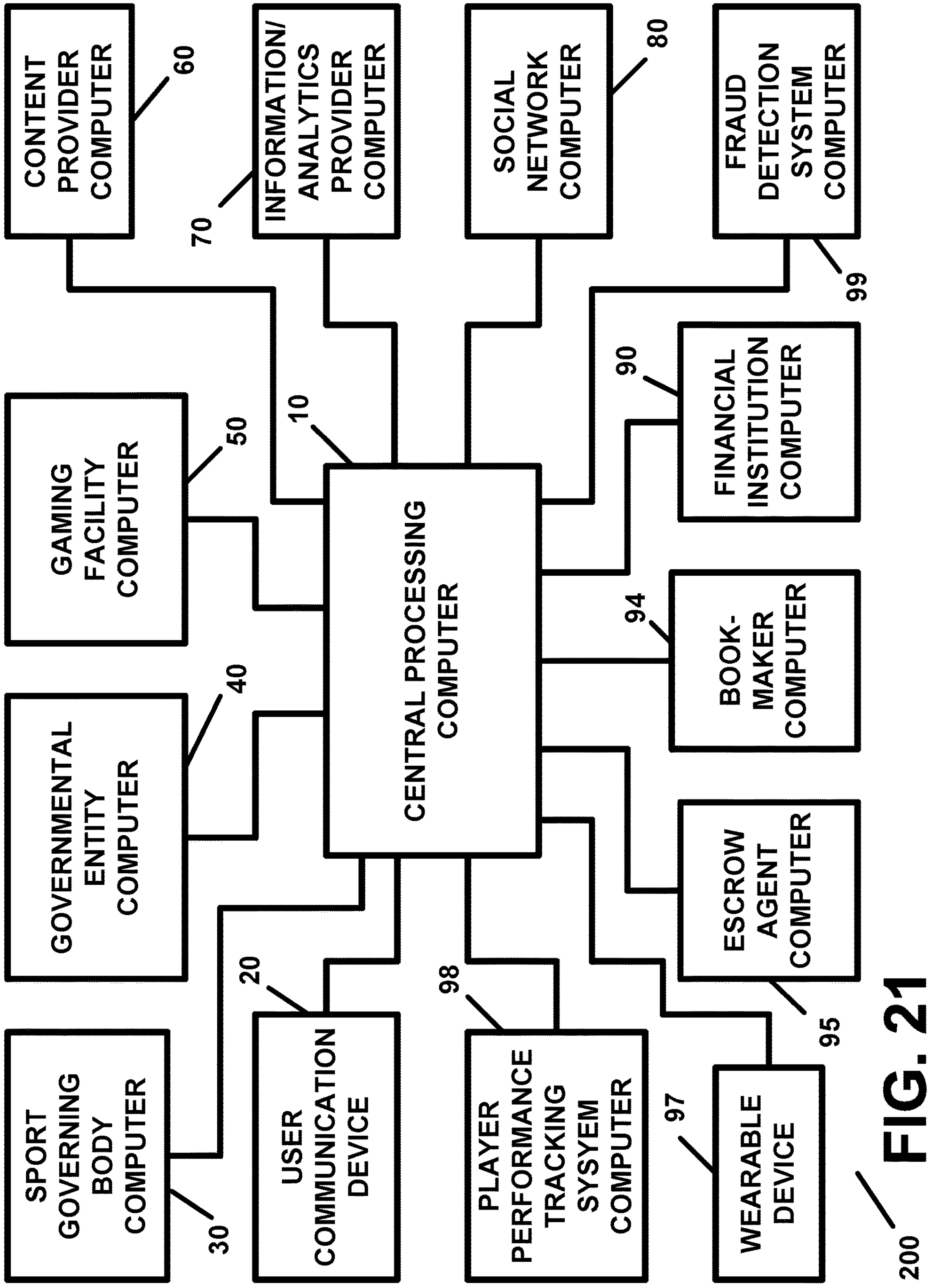
FIG. 21 illustrates another preferred embodiment of the apparatus of the present invention, in block diagram form.

FIG. 21 illustrates another preferred embodiment of the apparatus of the present invention, which is designated by the reference numeral 200, in block diagram form. With reference to FIG. 21, in a preferred embodiment, the apparatus 200 includes all of the components of the apparatus 100 of FIG. 1, including a central processing computer 10 or any number of the same, any number of user communication devices 20, any number of sport governing body computers 30, any number of governmental entity computers 40, any number of gaming facility computers 50, any number of content provider computers 60, any number of information/analytics provider computers 70, any number of social network computers 80, any number of financial institution computers 90, any number of escrow agent computers 95, and/or any number of wearable devices 97, each of which can be either connected to the central processing computer (s) 10 and/or wirelessly linked with the same.

In addition, in a preferred embodiment, the apparatus 200 of FIG. 21 can also include one or more bookmaker computers 94, each of which can be connected to or with, or which can be wirelessly linked to or with, the central processing computer 10. In a preferred embodiment, the bookmaker computer 94 can be utilized by, or can be associated with, a bookmaker or a sportsbook and can be used to allow the bookmaker to communicate with the central processing computer 10. Any number of bookmaker computers 94 can be utilized in connection with, or in conjunction with, the apparatus 200. In a preferred embodiment, each bookmaker computer 94 can be utilized by the bookmaker to provide, to the central processing computer 10, any betting or wagering information, such as, but not limited to, information regarding games or matches for which bets or wagers are offered by the bookmaker, betting odds, betting lines, the various bets or wagers offered by the bookmaker, including but not limited to, outcome bets or wagers, in-game bets or wagers, proposition bets or wagers, and/or any other activity or occurrence which can be the subject of a bet or wager, betting activities before, during, and/or after a game, match, or competition, information regarding betting or wagering activities and/or betting or wagering patterns, information regarding irregular or suspicious betting or wagering activities or occurrences, and/or any other data or information which can be collected by, recorded by, used by, offered by, and/or provided by, a bookmaker or sportsbook, and/or any data or information which can typically be provided by a bookmaker or sportsbook.

With reference once again to FIG. 21, the apparatus 200 of FIG. 21 can also include one or more player performance tracking system computers 98, each of which can be connected to or with, or which can be wirelessly linked to or with, the central processing computer 10. In a preferred embodiment, the player performance tracking system computer 98 can be utilized by, or can be associated with, any player performance tracking service provider, or any gaming facility or venue, sport governing body, content provider, information/analytics provider, social network, fraud detection system provider, and/or bookmaker, who or which tracks player performance or otherwise obtains, records, processes, and/or provides or reports, player performance and/or player performance tracking data and/or information. The player performance tracking system computer 98 can be used to allow any user of the same and/or any provider of player performance and/or player performance tracking data and/or information to communicate with the central processing computer 10.

Any number of player performance tracking system computer 98 can be utilized in connection with, or in conjunction with, the apparatus 200. In a preferred embodiment, each player performance tracking system computer 98 can be utilized by the user of the same and/or by any provider of player performance and/or player performance tracking data and/or information to provide or report, to the central processing computer 10, any player performance and/or player performance tracking data and/or information, historical player performance and/or player performance tracking data and/or information, and/or any data and/or information analyzing player performance and/or player performance tracking data and/or information, and/or any other data or information which is or which can typically be provided by a player performance tracking service provider.

With reference once again to FIG. 21, the apparatus 200 of FIG. 21 can also include one or more fraud detection system computers 99, each of which can be connected to or with, or which can be wirelessly linked to or with, the central processing computer 10. In a preferred embodiment, the fraud detection system computers 99 can be utilized by, or can be associated with, any fraud detection service or service provider which obtains, records, processes, and/or provides or reports to the central processing computer 10, data or information regarding fraud or suspected fraud relating to games, matches, or competitions, fraud or suspected fraud relating to any betting or wagering activities relating to games, matches, or competitions, and/or any other data and/or information which is or which can typically be provided by a fraud detection service, service provider, or system. The fraud detection system computer 99 can be used to allow any user of the same to communicate with the central processing computer 10.

Any number of fraud detection system computers 99 can be utilized in connection with, or in conjunction with, the apparatus 200. In a preferred embodiment, each player fraud detection system computer 99 can be utilized by the user of the same and/or by any provider of fraud detection services to provide, to the central processing computer 10, any data or information which is or which can typically be provided by a fraud detection service or system.

In a preferred embodiment, each bookmaker computer 94, each player performance tracking system computer 98, and/or each fraud detection system computer 99, can include a central processing unit, a random access memory (RAM), a read only memory (ROM), a user input device(s), a display device, a transmitter, a receiver, a database, an output device(s), and/or a video and/or audio recording device(s). In a preferred embodiment, each bookmaker computer 94, each player performance tracking system computer 98, and/or each fraud detection system computer 99, can transmit data and/or information to, and/or receive data and/or information from, and/or otherwise communicate with and/or interact with the central processing computer(s) 10, the user communication devices 20, the sport governing body computers 30, the governmental entity computers 40, the gaming facility computers 50, the content provider computers 60, the information/analytics provider computers 70, the social network computers 80, the financial institution computers 90, the escrow agent computers 95, the wearable devices 97, any bookmaker computers 94 or any other bookmaker computers 94, any player performance tracking system computers 98 or any other player performance tracking system computers 98, and/or any fraud detection system computers 99 or any other fraud detection system computers 99.

In another preferred embodiment, the player performance tracking system computer 98 can utilize, and/or can receive, player performance tracking data and/or information and/or athlete performance tracking data and/or information obtained with, by, or from, any one or more of the various electronic performance and tracking systems ("EPTS"), which are known by those skilled in the art as of the time of the filing of this patent application, and which can be utilized to monitor, measure, and/or track, the in-game, in-match, or in-competition, performance of any player(s), athlete(s), or participant(s), and/or team(s), participating and/or competing in the respective game, match, or competition, and/or which can also be utilized to monitor and/or to track ball movement and/or speed, puck movement and/or speed, bat movement and/or speed, stick movement and/or speed, and/or the movement and/or speed of any object utilized in the playing of the respective game, match, or competition, and/or any equipment utilized in the playing of the respective game, match, or competition.

In a preferred embodiment, the various electronic performance and tracking systems, which can be utilized in conjunction the apparatus and methods of the present invention, can include, but are not limited to, optical camera based systems ("OCBS"), local positioning systems ("LPS"), global positioning systems ("GPS") and/or global navigation satellite systems ("GNSS"), and/or any combination of same. In a preferred embodiment, each of the optical camera based systems ("OCBS"), local positioning systems ("LPS"), global positioning systems ("GPS") and/or global navigation satellite systems ("GNSS"), and/or any combination of same, can utilize any number of the wearable devices 97 described herein, as a component or components of same, and/or in, during, or for, data and/or information gathering, and/or during system operation, and/or in performing player performance tracking and/or team performance tracking. In this regard, the wearable devices 97 can be used as a component of each of, or of any one or more of, the herein-described electronic performance and tracking systems, including the optical camera based systems ("OCBS"), the local positioning systems ("LPS"), and/or the global positioning systems ("GPS") and/or global navigation satellite systems ("GNSS"), and/or any combination of same, which are described herein as being used in connection with the apparatus 200.

Figure 22:
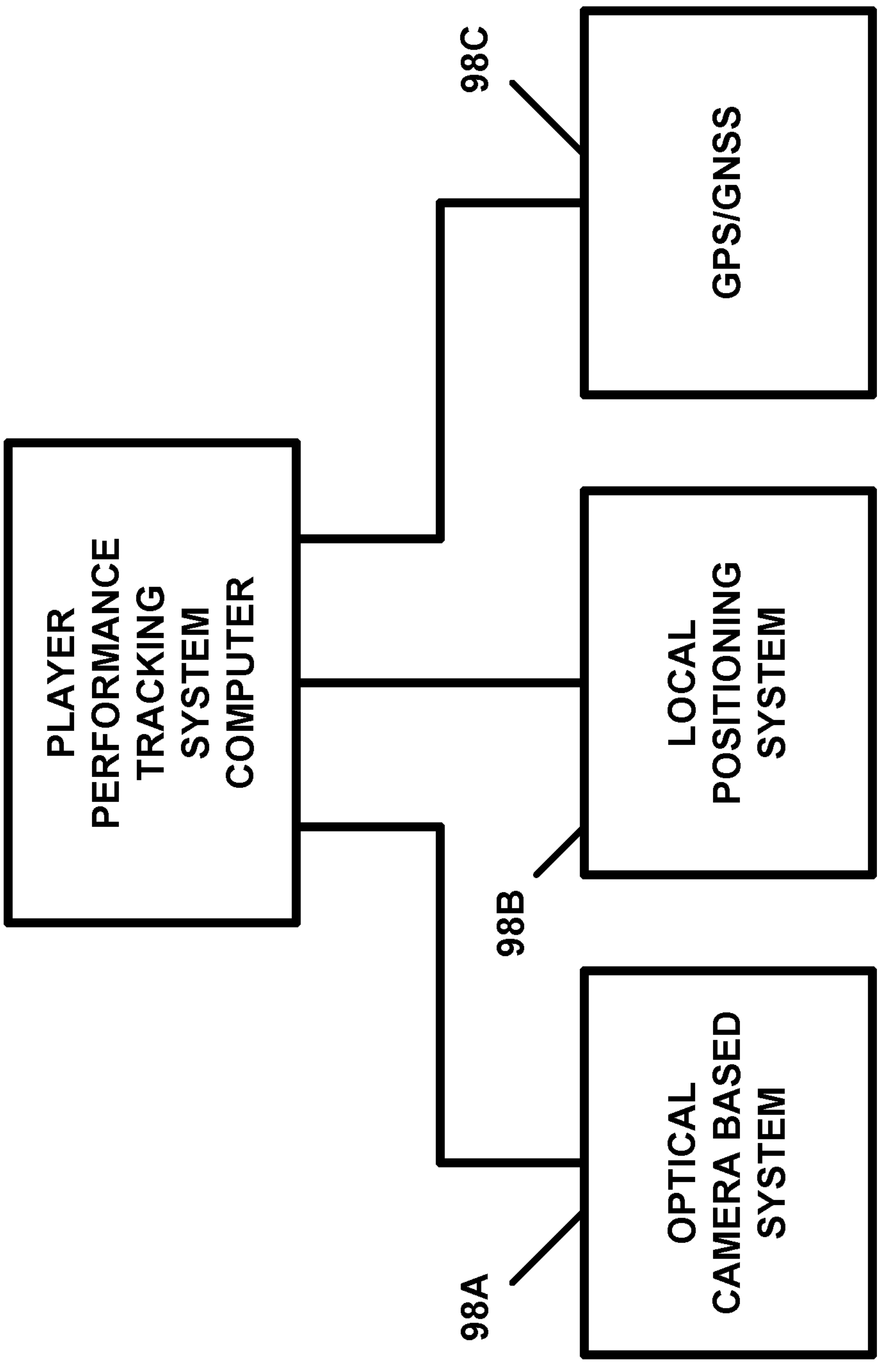
FIG. 22 illustrates a preferred embodiment of the player performance tracking system computer of FIG. 21.

FIG. 22 illustrates a preferred embodiment of the player performance tracking system computer 98 of FIG. 21 along with various electronic performance and tracking systems which can provide player performance tracking data and/or information or athlete performance tracking data and/or information to or for the player performance tracking system computer 98. With reference to FIG. 22, the player performance tracking system computer 98 can be connected to, linked with, and/or wirelessly linked with, optical camera based player performance tracking system ("OCBS") 98A, local positioning player performance tracking system ("LPS") 98B, and global positioning system ("GPS")/global navigation satellite system ("GNSS") player performance tracking system 98C ("GPS/GNSS 98C"), and can receive the respective provide player performance tracking data and/or information or athlete performance tracking data and/or information, and/or any ball, puck, bat, stick, object, or equipment, movement and/or speed, and/or other, tracking, data and/or information, and/or any team performance tracking data and/or information, which is collected, processed, and/or provided, by each of, or any combination of the optical camera based player performance tracking system ("OCBS") 98A, the local positioning player performance tracking system ("LPS") 98B, or the GPS/GNSS player performance tracking system 98C (hereinafter collectively referred to as "player performance tracking systems"). In a preferred embodiment, any one or any combination of "player performance tracking systems, that is, any one of, or any combination of, an optical camera based player performance tracking system 98A, a local positioning player performance tracking system 98B, or a GPS/GNSS player performance tracking system 98C, can be deployed at a gaming venue, stadium, arena, field, or other sporting venue or athletic venue, of or for, or which is hosting, a game, match, or competition, in order to obtain performing player performance tracking, team performance tracking, and/or ball, puck, bat, stick, object, or equipment, tracking, for and during any game, match, or competition.

In a preferred embodiment, historical player performance tracking data and/or information, for each player, and historical team performance tracking data, for each team, which can be previously obtained from any one or more of the respective optical camera based player performance tracking systems 98A, local positioning player performance tracking systems 98B, or GPS/GNSS player performance tracking systems 98C, can be recorded, processed, and stored, in the database 10H of the central processing computer 10, and/or in the respective database(s) of the bookmaker computer(s) 94, the player performance tracking system computer(s) 98, and/or the fraud detection system computer(s) 99. In a preferred embodiment, algorithms and/or data processing routines and/or techniques, such as those which are known by those skilled in the art of player and team performance data tracking and analysis at the time of the filing of this patent application, can be utilized by the central processing computer 10, and/or the respective database(s) of the bookmaker computer(s) 94, the player performance tracking system computer(s) 98, and/or the fraud detection system computer(s) 99, in order to process any of the herein-described player performance tracking data and/or information and/or any of the herein-described team performance tracking data and/or information, in order to identify averages, means, standard deviations, and/or any other statistical and/or probabilistic measures or metrics, or any number of player performance measurement categories and/or for any team performance measurement categories. In a preferred embodiment, for each player performance category or team performance category, historical norms can be identified for later use in future player performance evaluation and/or in team performance evaluation.

Thereafter, player performance tracking data and/or information, and/or team performance tracking data and/or information, obtained from a respective optical camera based player performance tracking systems 98A, local positioning player performance tracking systems 98B, or GPS/GNSS player performance tracking systems 98C, for, from, or during, any subsequent game, match, or competition, can be compared, for each player and/or for each team in order to ascertain the whether or not each player or each team is performing at, or within a range of, their normal performance level(s), below their normal performance level(s), or above their normal performance level(s). In the preferred embodiment, player or team performance irregularities can also be noted, analyzed, and/or recorded.

In a preferred embodiment, each of the central processing computer 10, the bookmaker computer(s) 94, the player performance tracking system computer(s) 98, and/or the fraud detection system computer(s) 99, can be provided with, and can store and/or can process and/or compare, using any suitable algorithms and/or data processing routines and/or techniques, any of the herein-described historical player performance tracking data and/or information, for each player, and the herein-described historical team performance tracking data, for each team, as well as any player performance tracking data and/or information, and/or team performance tracking data and/or information, obtained for, from, or during, any game, match, or competition.

In a preferred embodiment, each of the central processing computer 10, the bookmaker computer(s) 94, the player performance tracking system computer(s) 98, and/or the fraud detection system computer(s) 99, can compare the player performance tracking data and/or information for each player and/or the team performance tracking data and/or information for each team, which is obtained for, from, or during, any game, match, or competition against, or in conjunction with, the historical player performance tracking data and/or information for each player and/or the historical team performance tracking data for each team. In a preferred embodiment, each of the central processing computer 10, the bookmaker computer(s) 94, the player performance tracking system computer(s) 98, and/or the fraud detection system computer(s) 99, can then determine if each player or team is performing at their normal performance level(s), below their normal performance level(s), or above their normal performance level(s), during each game, match, or competition, or if each player or team had performed at their normal performance level(s), below their normal performance level(s), or above their normal performance level(s).

In a preferred embodiment, player performance tracking data and/or information and/or team performance tracking information, and/or any ball, puck, bat, stick, object, or equipment, tracking data and/or information can be transmitted to the central processing computer from a respective optical camera based player performance tracking system 98A, local positioning player performance tracking system 98B, or GPS/GNSS player performance tracking system 98C, during a game, match, or competition. In a preferred embodiment, the central processing computer 10 can also transmit the player performance tracking data and/or information and/or team performance tracking information, and/or any ball, puck, bat, stick, object, or equipment, tracking data and/or information to each bookmaker computer 94 during the game and/or as close to in real-time as possible so that the bookmaker computer 94 can process same and can calculate in-game, in-match, or in-competition, betting odds based on the player performance tracking data and/or information and/or team performance tracking information, and/or any ball, puck, bat, stick, object, or equipment, tracking data and/or information received. In another preferred embodiment, the player performance tracking system computer 98 can transmit any of the data and/or information it records directly to the bookmaker computer(s) 94 for processing thereat, to an information/analytics provider computer(s) for processing thereat, and/or to a fraud detection system computer 99 for processing thereat.

In a preferred embodiment, the central processing computer 10 can also transmit the player performance tracking data and/or information and/or team performance tracking information, and/or any ball, puck, bat, stick, object, or equipment, tracking data and/or information to each fraud detection system computer 99 during the game and/or as close to in real-time as possible so that the fraud detection system computer 99 can process the same and can determine if any suspicious activities regarding any action or actions of any player or of team has been identified or could have possibly occurred. In another preferred embodiment, the player performance tracking system computer 98 can transmit any of the data and/or information it records directly to the fraud detection system computer(s) 99.

In a preferred embodiment, the central processing computer 10 can also process the player performance tracking data and/or information and/or team performance tracking information, and/or any ball, puck, bat, stick, object, or equipment, tracking data and/or information, obtain results therefrom, and can transmit any results, or any data and/or information relating to, or indicative of, the results to any user communication device(s) 20 associated with any individuals or users who may be interested in the same and/or to any of the herein-described electronic forums, chat rooms, or websites. In another preferred embodiment, the player performance tracking system computer 98 can transmit any of the data and/or information it records directly to any user communication device(s) 20 associated with any individuals or users who may be interested in the same and/or to any of the herein-described electronic forums, chat rooms, or websites.

In a preferred embodiment, each bookmaker computer 94 can process information regarding any betting activities and/or any bets which have been placed, along with times corresponding to the same, and/or along with any noted irregularities of evidence of suspicious betting activities indicative of game-fixing, match-fixing, or cheating, for and/or during each game, match, or competition, and can transmit the same to the central processing computer 10 and/or to the fraud detection system computer 99. The central processing computer 10 and/or the fraud detection system computer 99, can receive and process the information transmitted from the bookmaker 94 of received from any number of bookmaker computers 94, and determine if irregular or suspicious betting activities are occurring, or have occurred, during the game, match, or competition, which may be indicative of game-fixing, match-fixing, or cheating.

In a preferred embodiment, if irregular or suspicious betting activities have been identified, then the central processing computer 10 and/or the fraud detection system computer 99 can generate a suspicious activity report for the game, match, or competition, and can transmit the same to the bookmaker computer(s) 94, to the sports governing body computer(s) 30 for the particular sporting event or competition, and/or to the governmental entity computer(s) 40 for the jurisdiction in which the sporting event or competition is taking, or has taken, place, and/or to any other fraud detection system computer(s) 99. In addition, in a preferred embodiment, the central processing computer 10 and/or the fraud detection system computer 99 can generate and transmit a suspicious betting activity message and transmit the same to the user communication device(s) 20 of any individual or user who placed a bet on the sporting event or competition and/or to any of the herein-described electronic forums, chat rooms, or websites, associated with or providing a transmission or broadcast of the sporting event or competition.

In another preferred embodiment, the apparatus 200 can provide information regarding player performance and/or team performance to individuals or users who have placed bets or wagers, or who are placing, or who are continuing to place, bets or wagers, on games, matches, or competitions, via the apparatus 200 of the present invention. In another preferred embodiment, the apparatus 200 can provide bookmaker information, odds for bets or wagers and/or changes in odds for bets or wagers which are offered by one or more bookmakers or sportsbooks, and/or information regarding fraud alerts related to suspicious betting activities and/or related to questionable player performance or team performance, before and/or during a game, match, or competition. In another preferred embodiment, the apparatus 200 can provide information regarding player performance and/or team performance to individuals or users who have placed bets or wagers, or who are placing, or who are continuing to place, bets or wagers, on games, matches, or competitions, bookmaker information, odds for bets or wagers and/or changes in odds for bets or wagers which are offered by one or more bookmakers or sportsbooks, and/or information regarding fraud alerts related to suspicious betting activities and/or related to questionable player performance or team performance, before and/or during a game, match, or competition, to any of the herein-described sport governing bodies, governmental entities, gaming facilities, content providers, information/analytics providers, social networks, fraud detection systems, financial institutions, bookmakers, escrow agents, and/or any other individuals or entities who or which use the apparatus 200.

Figure 23:
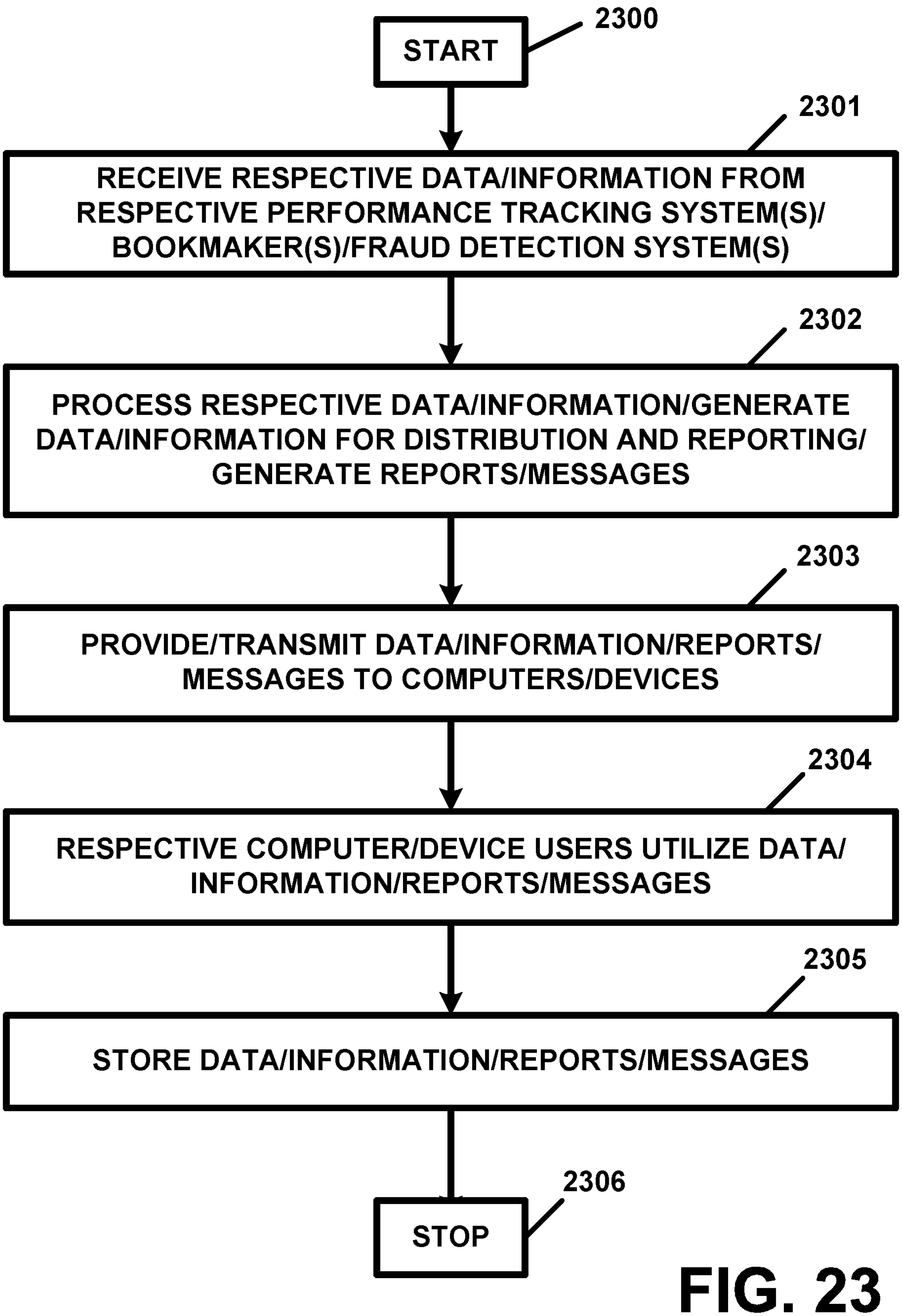
FIG. 23 illustrate another preferred embodiment method for utilizing the apparatus and methods of the present invention, in flow diagram form.

FIG. 23 illustrates another preferred embodiment method for utilizing the apparatus 200 of the present invention, in flow diagram form. With reference to FIG. 23, the operation of the apparatus 200 commences at step 2300. At step 2301, the central processing computer 10 can receive data and/or information transmitted, or otherwise provided, from each of the respective player performance tracking system computers 98 which are obtaining player performance tracking data and/or information and/or team performance tracking data and/or information for a respective game, match, or competition. In a preferred embodiment, player performance tracking data and/or information and/or team performance tracking data and/or information can be obtained by, recorded by, and/or processed by, any one or more the respective optical camera based player performance tracking system 98A, local positioning player performance tracking system 98B, or GPS/GNSS player performance tracking system 98C, associated with each player performance tracking system computer 98 located the venue of the respective game, match, or competition.

At step 2301, the central processing computer 10 can also receive data and/or information transmitted, or otherwise provided, from each bookmaker computer 94 of each bookmaker or sportsbook which has offered or provided, or which is offering or providing, bets or wagers of any and/or all types or kinds, betting odds, or information regarding betting activities, and/or any other information typically obtained by or processed by a bookmaker or sportsbook, on, for, regarding, and/or relating to, the respective game, match, or competition.

At step 2301, the central processing computer 10 can also receive data and/or information transmitted, or otherwise provided, from each fraud detection system computer 99 of each fraud detection system service provider which has offered or provided, or which is offering or providing, information regarding suspicious activities, suspicious betting activities, suspicious player performance, and/or suspicious team performance, for, regarding, and/or relating to, the respective game, match, or competition.

At step 2302, the central processing computer 10 can process any and/or all of the information it receives, from the player performance tracking system computer(s) 98, the bookmaker computers 94, and/or the fraud detection system computers 98, at step 2301, for the respective game, match, or competition. In a preferred embodiment, the central processing computer 10 can be provided with, can be programmed with, or can be otherwise equipped with, any needed, required, or desired, software or programs for processing player performance tracking information processing programs or software, team performance tracking programs or software, betting activity processing programs or software, and/or fraud detection programs or software. In preferred embodiment, at step 2302, the central processing computer 10 can perform processing of any and/or all player performance data and/or information and/or team performance tracking data and/or information obtained from the respective game, match, or competition, compare the same to the respective historical player performance tracking data and/or information and/or the respective team performance tracking data and/or information, determine if the respective performance levels of each player and of each team is within a normal performance range, below a normal performance range, or above a normal performance range, for, regarding, or during, the respective game, match, or competition, and generate any player performance report(s) or message(s) and/or team performance report(s) or message(s) regarding the results obtained.

In preferred embodiment, at step 2302, the central processing computer 10 can also perform processing of any data and/or information obtained from bookmaker computers 94 regarding any betting activities reported by the various and respective bookmakers or sportsbooks which have offered or are offering bets or wagers on or regarding the respective game, match, or competition, and/or which are otherwise monitoring betting activities regarding the respective game, match, or competition. At step 2302, the central processing computer can be provided with, can be programmed with, or can be otherwise equipped with, any needed, required, or desired, software or programs for processing betting activities data and/or information for determining whether the betting activities on, for, or regarding, the respective game, match, or competition, are normal or whether they are, or could be, indicative of, and possibly evidence of, suspicious betting activities and possibly evidence of game-fixing, match-fixing, or cheating regarding the respective game, match, or competition.

At step 2302, the central processing computer 10 can perform any data and/or information processing routines which can be performed by any bookmaker computer 94 or by any fraud detection system computer. At step 2302, the central processing computer 10 can generate a betting activities report(s) or message(s) for the respective game, match, or competition. At step 2302, the central processing computer 10 can also process any betting activity data and/or information using appropriate algorithms or software programs in order to cancel all betting activities and to cancel all bets or wagers on, for, or regarding, the respective game, match, or competition, if it is determined that evidence of game-fixing, match-fixing, or cheating, has taken place or is taking place on, with, or in conjunction with, the respective game, match, or competition. In this regard, the central processing computer 10 can, at step 2202, cancel all bets or wagers on, for, or regarding, the respective game, match, or competition. In such as instance, where the central processing computer 10 cancels all bets or wagers on, for, or regarding, the respective game, match, or competition, the central processing computer 10 can generate a betting cancellation report or message regarding the respective game, match, or competition. In this regard, the apparatus 200 can be utilized to cancel all bets or wagers on a game, match, or competition, where instances of fraud, fraudulent betting activities, game-fixing, match-fixing, or cheating, has been deemed to have occurred. This functionality can serve as a disincentive to those individuals or entities who engage in illegal behavior, fraudulent betting activity, game-fixing, match-fixing, or cheating, while also serving to protect the interests of bookmakers, sportsbooks, individual and user who place bets, the integrity of the sport or game, and any other stakeholders who or which utilize the apparatus 200 of the present invention.

At step 2302, the central processing computer 10 can also perform processing of any fraud detection data and/or information obtained from any fraud detection system computers 99 of any fraud detection system service provider which is offering or providing, information regarding suspected fraudulent activity, suspicious activities, suspicious betting activities, and/or suspicious player performance and/or suspicious team performance, for, regarding, and/or relating to, the respective game, match, or competition.

In a preferred embodiment, the central processing computer 10 can be programmed, or can be otherwise equipped, any needed, required, or desired, software or program for processing any and/or all fraud detection data and/or information for determining whether or not fraudulent activities and/or evidence of game-fixing, match-fixing, or cheating, regarding the respective game, match, or competition, has been identified. In a preferred embodiment, the central processing computer 10 can perform any and/or all of the data and/or information processing routines which can be performed by any fraud detection system computer 99. In a preferred embodiment, if the central processing computer 10 determines that fraudulent activities and/or evidence of game-fixing, match-fixing, or cheating, has been identified or detected, regarding the respective game, match, or competition, the central processing computer 10 can generate a fraud detection report or message and/or the central processing computer can cancel all bets or wagers on, for, or regarding, the respective game, match, or competition. In a preferred embodiment, in the event the central processing computer cancels all bets or wagers on, for, or regarding, the respective game, match, or competition, the central processing computer can generate a betting cancellation report or message regarding the respective game, match, or competition. In a preferred embodiment, if a betting cancellation report or message is generated, the central processing computer 10 can, at step 2202, cancel all bets or wagers on, for, or regarding, the respective game, match, or competition.

As noted above, in this manner, the apparatus 200 can be utilized to cancel all bets or wagers on a game, match, or competition, where instances of fraud, fraudulent betting activities, game-fixing, match-fixing, or cheating, has been deemed to have occurred. As also noted above, this functionality can serve as a disincentive to those individuals or entities who engage in illegal behavior, fraudulent betting activity, game-fixing, match-fixing, or cheating, while also serving to protect the interests of bookmakers, sportsbooks, individual and user who place bets, the integrity of the sport or game, and any other stakeholders who or which utilize the apparatus 200 of the present invention.

Thereafter, the operation of the apparatus 200 will proceed to step 2303. At step 2303, the central processing computer 10 can perform any one or more of any number of functions in providing and/or transmitting any of the herein-described data and/or information it receives at step 2301, and/or any of the herein-described data and/or information it processes at step 2302, and/or any or the herein-described reports or messages it generates at step 2302, to any one or more of the respective user communication devices 20, the sport governing body computers 30, the governmental entity computers 40, the gaming facility computers 50, the content provider computers 60, the information/analytics provider computers 70, the social network computers 80, the financial institution computers 90, the escrow agent computers 95, bookmaker computers 94, or fraud detection system computers 99.

In a preferred embodiment, at step 2303, the central processing computer 10 can provide or transmit player performance tracking data and/or information and/or team performance tracking data and/or information for the respective game, match, or competition, to the user communication device(s) 20 of any individual or user who has bet or wagered on, who desires to bet or wager on, or who is watching, viewing, or listening to, the respective game, match, or competition. In a preferred embodiment, at step 2303, the central processing computer 10 can also provide or transmit player performance tracking data and/or information and/or team performance tracking data and/or information for the respective game, match, or competition, to the electronic forum, chat room, or website, in or on which the respective game, match, or competition, is being broadcast, shown, displayed, or provided.

At step 2303, the central processing computer 10 can also provide or transmit any of the herein-described data and/or information provided by any and/or all bookmakers or sportbooks for or regarding the respective game, match, or competition, including, but not limited to, bets or wagers of any and/or all types or kinds, betting odds, or information regarding betting activities, and/or any other information typically obtained by or processed by a bookmaker or sportsbook, on, for, regarding, and/or relating to, the respective game, match, or competition, to the user communication device(s) 20 of any individual or user who has bet or wagered on, who desires to bet or wager on, or who is watching, viewing, or listening to, the respective game, match, or competition. In a preferred embodiment, at step 2303, the central processing computer 10 can also provide or transmit any of the herein-described data and/or information provided by any and/or all bookmakers or sportbooks for or regarding the respective game, match, or competition, including, but not limited to, bets or wagers of any and/or all types or kinds, betting odds, or information regarding betting activities, and/or any other information typically obtained by or processed by a bookmaker or sportsbook, on, for, regarding, and/or relating to, the respective game, match, or competition, to the electronic forum, chat room, or website, in or on which the respective game, match, or competition, is being broadcast, shown, displayed, or provided.

In a preferred embodiment, at step 2303, the central processing computer 10 can also provide or transmit any data and/or information provided by any fraud detection system service providers, such as, but not limited to, information regarding suspicious activities, suspicious betting activities, suspicious player performance, and/or suspicious team performance, for, regarding, and/or relating to, the respective game, match, or competition, to the user communication device(s) 20 of any individual or user who has bet or wagered on, who desires to bet or wager on, or who is watching, viewing, or listening to, the respective game, match, or competition. In a preferred embodiment, at step 2303, the central processing computer 10 can also provide or transmit any data and/or information provided by any fraud detection system service providers, such as, but not limited to, data and/or information regarding suspicious activities, suspicious betting activities, suspicious player performance, and/or suspicious team performance, for, regarding, and/or relating to, the respective game, match, or competition, to the electronic forum, chat room, or website, in or on which the respective game, match, or competition, is being broadcast, shown, displayed, or provided.

In a preferred embodiment, at step 2303, the central processing computer 10 can also provide or transmit any data and/or information obtained from its processing of any player performance tracking data and/or information, team performance tracking data and/or information, data and/or information regarding betting activities, and/or data and/or information regarding suspicious activities, suspicious betting activities, suspicious player performance, and/or suspicious team performance, and/or any player performance report(s) or message(s) or team performance reports or messages, any betting activities report(s) or message(s), and/or any fraud detection report or message, and/or a betting cancellation report or message, for or regarding the respective game, match, or competition, to the user communication device(s) 20 of any individual or user who has bet or wagered on, who desires to bet or wager on, or who is watching, viewing, or listening to, the respective game, match, or competition. In a preferred embodiment, at step 2303, the central processing computer 10 can also provide or transmit any data and/or information obtained from its processing of any player performance tracking data and/or information, team performance tracking data and/or information, data and/or information regarding betting activities, and/or data and/or information regarding suspicious activities, suspicious betting activities, suspicious player performance, and/or suspicious team performance, and/or any player performance report(s) or message(s) or team performance reports or messages, any betting activities report(s) or message(s), and/or any fraud detection report or message, and/or a betting cancellation report or message, for or regarding the respective game, match, or competition, to the electronic forum, chat room, or website, in or on which the respective game, match, or competition, is being broadcast, shown, displayed, or provided.

In a preferred embodiment, at step 2303, the central processing computer 10 can also provide or transmit any and/or all of the herein-described player performance tracking data and/or information and/or team performance tracking data and/or information, data and/or information provided by any and/or all bookmakers or sportbooks, data and/or information provided by any fraud detection system service providers, and/or any of the data and/or information obtained from its processing of any player performance tracking data and/or information, team performance tracking data and/or information, data and/or information regarding betting activities, and/or data and/or information regarding suspicious activities, suspicious betting activities, suspicious player performance, and/or suspicious team performance, and/or any player performance report(s) or message(s) or team performance reports or messages, any betting activities report(s) or message(s), and/or any fraud detection report or message, and/or a betting cancellation report or message, for the respective game, match, or competition, to each of, or to any one of more of, any other user communication devices 20, the sport governing body computers 30, the governmental entity computers 40, the gaming facility computers 50, the content provider computers 60, the information/analytics provider computers 70, the social network computers 80, the financial institution computers 90, the escrow agent computers 95, the bookmaker computers 94, or the fraud detection system computers 99. In this regard, the apparatus 200 can serve as a fraud alert notification system for all individual, users, sports governing bodies, governmental entities, gaming facilities or venues, content providers, information/analytics providers, social networks, fraud detection system service providers, financial institutions, bookmakers or sportbooks, or escrow agents, who or which utilize the apparatus 200 of the present invention. Thereafter, the operation of the apparatus 200 will proceed to step 2304.

At step 2304, each respective user of the apparatus 200 can utilize any of the respective data and/or information, reports, and/or messages, described herein as being provided by, or transmitted from, the central processing computer 10, at step 2303, in any manner and/or as they see fit. In the case of individuals or users, who or which utilize the apparatus 200 of the present invention in order to place bets or wagers and/or to view or listen to games, matches, or competitions, these individuals or users can utilize any of the respective data and/or information, reports, and/or messages, in order to place bets or wagers, to place additional bets or wagers, to place in-game bets or wagers, to hedge previously placed bets pr wagers, to change bets or wagers, sell positions in bets or wagers, sell bets or wagers, place bets or wagers with other individuals or users, place bets or wagers with other bookmakers or sportsbooks, or cancel bets or wagers.

In the case of sports governing bodies, governmental entities, gaming facilities or venues, content providers, information/analytics providers, social networks, fraud detection system service providers, financial institutions, bookmakers or sportbooks, or escrow agents, who or which utilize the apparatus 200 of the present invention for their respective purposes, can utilize the respective data and/or information, reports, and/or messages, in order to investigate fraudulent activities, suspicious betting activities, alleged game-fixing, match-fixing, or cheating, in order to provide notification, to bookmakers, sportsbooks, individuals, users, and/or any other entities who or which utilize the apparatus 200 as a stakeholder in gambling or gaming activities. regarding activities which are occurring or which have occurred, in order update odds for bets or wagers, in order to cancel bets or wagers, and/or in order to perform any activity which they deem appropriate or in their respective best interests. Thereafter, the operation of the apparatus 200 will proceed to step 2305.

At step 2305, the central processing computer 10 can store, in the database 10H, any and/or all of the herein-described data and/or information it receives at step 2301, any and/or all the herein-described data and/or information, reports, or messages, it processes or generates at step 2302, and any and/or all of the herein described data and/or information it provides to the various user communication devices 20, sport governing body computers 30, governmental entity computers 40, gaming facility computers 50, content provider computers 60, information/analytics provider computers 70, social network computers 80, financial institution computers 90, escrow agent computers 95, bookmaker computers 94, or fraud detection system computers 99, and/or to any of the various electronic forums, chat rooms, or websites, described herein. Thereafter, the operation of the apparatus 200 will cease at step 2306.

In another preferred embodiment, the apparatus of the present invention and/or the central processing computer 10 can determine if a bet or wager is legal in a jurisdiction, state, country, or political subdivision, based on the individual's or user's position or location when he or she places the bet. In a preferred embodiment, if an individual or user must be physically located within a respective jurisdiction, state, country, or political subdivision, when placing a bet or wager, the apparatus 100, 150, or 200, and/or the central processing computer 10, can determine, using position or location data or information obtained by the global positioning device 20K of the user's user communication device 20, whether or not the individual or user is located within the respective jurisdiction, state, country, or political subdivision, when placing the bet or the wager.

In a preferred embodiment, if the individual or user is determined to be within the respective jurisdiction, state, country, or political subdivision, then the apparatus 100, 150, or 200, and/or the central processing computer 10, can determine that the bet or the wager is legal and can process information for placing the bet or the wager. If, however, the apparatus 100, 150, or 200, and/or the central processing computer 10, determines that the individual or user is not located within the respective jurisdiction, state, country, or political subdivision, when placing the bet or the wager, then the apparatus 100, 150, or 200, and/or the central processing computer 10 can determine that the bet or the wager is not legal and can disallow the placing of the bet or the wager. In a preferred embodiment, the apparatus 100, 150, or 200, and/or the central processing computer 10, can transmit navigation directions to a destination within the respective jurisdiction, state, country, or political subdivision, so that the bet can be placed automatically by or from the user's user communication device 10 when individual or user arrives at that destination.

Figure 24:
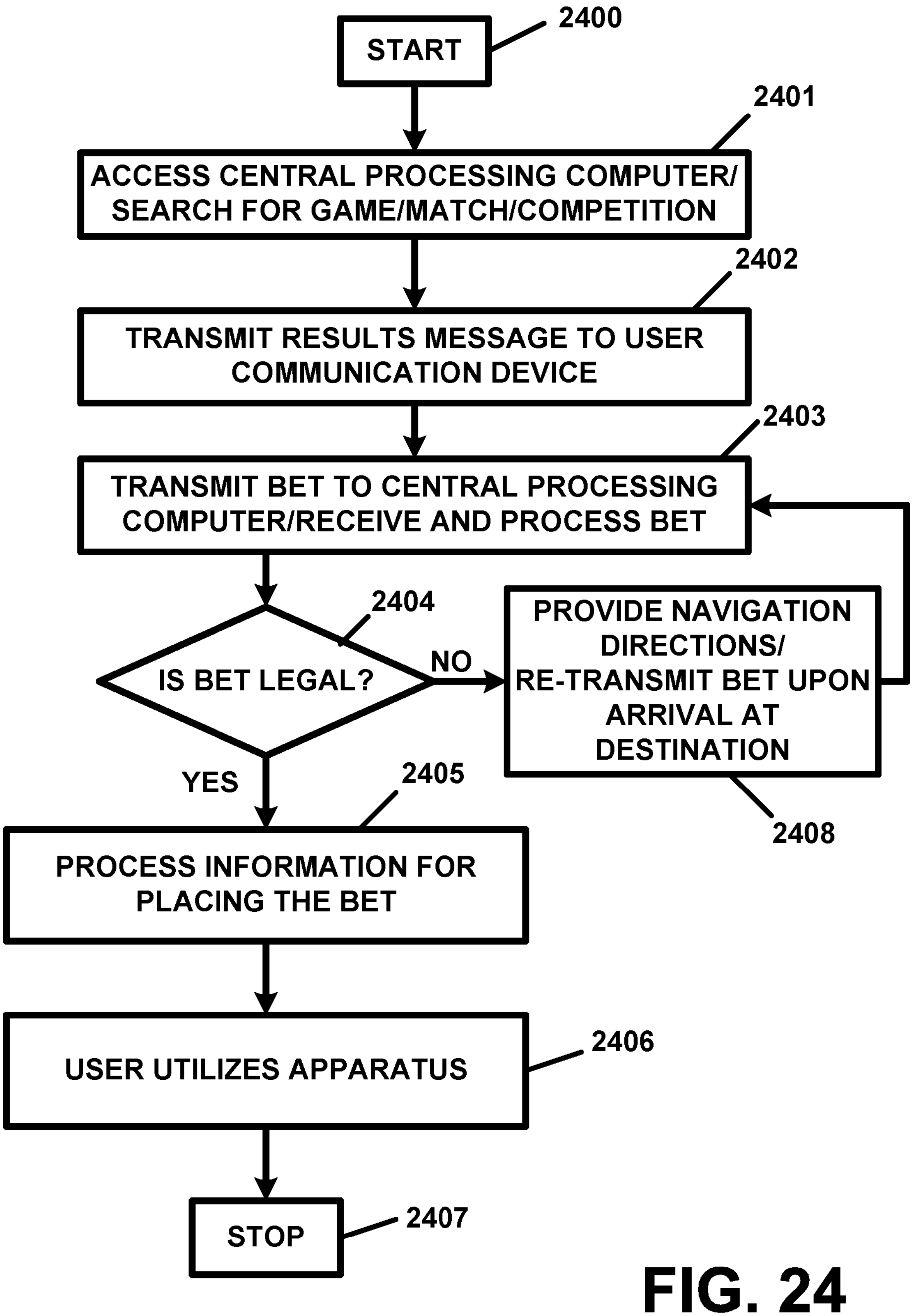
FIG. 24 illustrates yet another preferred embodiment for utilizing the apparatus of the present invention, in flow diagram form.

FIG. 24 illustrates another preferred embodiment for utilizing the apparatus of the present invention, in flow diagram form. The embodiment of FIG. 24 will be described with reference to using the apparatus 100. It is, however, important to note, that the embodiment of FIG. 24 can also be utilized in a same, a similar, and/or an analogous manner, in conjunction with the apparatus 150 and/or the apparatus 200. With reference to FIG. 24, the operation of the apparatus 100 commences at step 2400.

At step 2401, the individual or user can access the central processing computer 10 by using the user communication device 20. In a preferred embodiment, the central processing computer 10 can be operated and/or maintained by any on-line sports betting, gaming, or gambling, company or entity of any type of kind. In a preferred embodiment, the user communication device 20 used by the individual or user can be any mobile communication device equipped with a global positioning device. In a preferred embodiment, in the embodiment of FIG. 24, the user communication device 20 can be a smart phone, a cellular telephone, a wireless telephone, a videophone, a video telephone, a personal digital assistant, a watch, a smart watch, a 360 degree video headset or interface, a VR (virtual reality) headset or interface, an AR (augmented reality) headset or interface, a wearable communication device, glasses equipped with communications equipment, a beeper or a pager, or any other mobile communication device or equipment.

With reference once again to step 2401, the individual or user can search for a sporting event, game, match, activity, competition, or tournament, on which he or she can place a bet. At step 2401, the individual or user can, using the user communication device 20 in communication with the central processing computer 10, search for the sporting event, game, match, activity, competition, or tournament, on which he or she wants to place a bet, or the individual or user can search for and locate a sporting event, game, match, activity, competition, or tournament, by searching for same via the central processing computer 10. In instances when the individual or user is in search of a sporting event, game, match, activity, competition, or tournament, on which to place a bet, the individual or user can search for the same by searching by sport, by country or region in the world in which the sporting event, game, match, activity, competition, or tournament, is being held, by team or teams playing in or participating in the sporting event, game, match, activity, competition, or tournament, by player or players playing in or participating in the sporting event, game, match, activity, competition, or tournament, by betting odds placed on the sporting event, game, match, activity, competition, or tournament, or by any other criteria. At step 2401, after entering the search criteria into the user communication device 20, the search criteria can be transmitted to, and received by, the central processing computer 10. At step 2401, the central processing computer 10 can receive and process the search criteria and can generate a search results message containing information regarding one or more sporting events, games, matches, activities, competitions, or tournaments, on or for which a bet(s) can be placed.

At step 2402, central processing computer 10 can transmit the search results message to the user communication device 20. At step 2402, user communication device 20 can receive the search results message. At step 2402, the individual or user can review the information contained in the search results message and select the sporting event, game, match, activity, competition, or tournament, on or for which he or she desires to place a bet. In a preferred embodiment, the individual or user, at step 2402, can, but not need, access the information/analytics provider computer 70 in order to obtain any data and/or information, or analytics data and/or information, which he or she may want to obtain and review in advance of placing any bet.

At step 2402, the individual or user can also request that the information/analytics provider computer 70 transmit updated data and/or information, including, but not limited to, analytics data and/or information, information regarding betting odds or betting odds changes, information regarding new betting opportunities, and/or any other data and/or information regarding the sporting event, game, match, activity, competition, or tournament, for which the individual or user wants to place a bet, or data and/or information regarding any teams and/or players or participants in or of same, to the user communication device 20, before the start of, during, or after, the selected sporting event, game, match, activity, competition, or tournament. At step 2402, the individual or user can also request to be notified regarding, and be provided with, data and/or information, including, but not limited to, analytics data and/or information, data and/or information regarding betting odds or betting odds changes, information regarding new betting opportunities, and/or any other data and/or information regarding any other sporting sporting events, games, matches, activities, competitions, or tournaments, or any teams, players, or participants, involved in same, in which the individual or user may be interested.

At step 2403, the individual or user can place a bet on the selected sporting event, game, match, activity, competition, or tournament. In a preferred embodiment, the individual or user can place a bet by transmitting information regarding the bet or a bet message from the user communication device 20 to the central processing computer 10. In a preferred embodiment, the information regarding the bet or the bet message can contain information regarding the bet, the betting position taken, and/or the amount of the bet. In a preferred embodiment, the bet, information regarding the bet, or the bet message, can also contain information regarding the position or location of the user communication device 20 at the time of the placing of the bet or at the time of the transmission of the information regarding the bet or the bet message from the user communication device 20 to the central processing computer 10.

In a preferred embodiment, the position or location of the user communication device 20 can be determined by the global positioning device 20K of the user communication device 20. In a preferred embodiment, information regarding the position or location of the user communication device 20, at the time of the placing of the bet or at the time of the transmission of the information regarding the bet, or the bet message, can be used to determine the jurisdiction, country, state, province, or political subdivision, from which the bet is placed so that the central processing computer 10 can ascertain the same in order to determine whether or not the bet is a legal, authorized, or allowed, bet in the jurisdiction, country, state, province, or political subdivision, and so as to effectuate a payment of a gaming fee or betting fee, if needed, to the respective jurisdiction, country, state, province, or political subdivision.

At step 2403, the central processing computer 10 can receive and process the information regarding the position or location of the user communication device 20 at the time of the placing or the transmission of the bet from the user communication device 20, and can determine whether or not the bet is a legal bet, an authorized bet, or an allowed bet, or an illegal bet, an unauthorized bet, or a disallowed bet.

At step 2404, the central processing computer 10 can determine whether or not the bet is a legal bet, an authorized bet, or an allowed bet, based on the information regarding the position or location of the user communication device 20 at the time of the placing, or the transmission, of the bet from the user communication device 20. If, at step 2404, the central processing computer 10 determines that the bet is a legal bet, an authorized bet, or an allowed bet, based on the information regarding the position or location of the user communication device 20 at the time of the placing, or the transmission, of the bet from the user communication device 20, then the operation of the central processing computer 10 will proceed to step 2405 and the central processing computer 10 can process information for placing the bet. Thereafter, at step 2406, the individual or user can utilize the apparatus 100 in any manner and/or in any manner described herein in any and/or all of the embodiments described herein. Once the individual or user has completed using the apparatus 100, the operation of the apparatus 100 will cease at step 2407.

If, however, the central processing computer 10 determines the bet is not a legal bet, not an authorized bet, or not an allowed bet, based on the information regarding the position or location of the user communication device 20 at the time of the placing, or the transmission, of the bet from the user communication device 20, then the operation of the central processing computer 10 can proceed to step 2408, and the central processing computer 10 can transmit navigation instructions to the nearest destination which is identified as being located with the respective jurisdiction, country, state, province, or political subdivision, so that the individual or user can be located within the respective jurisdiction, country, state, province, or political subdivision, to attempt to place the bet again. At step 2408, the central processing computer 10 can transmit navigation instructions to the user communication device 20, which can be provided via the display device 20E or via a speaker of the output device 201 of the user communication device 20. In a preferred embodiment, the central processing computer 10 can have any and/or all needed, required, or desired, navigation software and/or data and/or information stored in its database 10H in order to provide navigation instructions to the user communication device 20.

At or during step 2408, the individual or user can travel to the identified nearest destination in the respective jurisdiction, country, state, province, or political subdivision. At step 2408, once the individual or user has arrived at or reached that identified nearest destination in the respective jurisdiction, country, state, province, or political subdivision, the individual or user can, at step 2408, re-transmit the bet to the central processing computer 10 from the user communication device 20 and from within the respective jurisdiction, country, state, province, or political subdivision. In a preferred embodiment, the individual or user can re-transmit the bet manually using the user communication device 20. In another preferred embodiment, the user communication device 20 can be programmed to automatically re-transmit the bet to the central processing computer 10 once it is determined that the user communication device 20 has arrived at the identified nearest destination in the respective jurisdiction, country, state, province, or political subdivision. Once the bet has been re-transmitted at step 2408, the operation of the apparatus 100 will proceed to step 2403 and the central processing computer 10 will receive the re-transmitted bet.

Thereafter, the central processing computer 10, at step 2404, can determine that the bet is a legal bet, an authorized bet, or an allowed bet, based on the information regarding the position or location of the user communication device 20 at the time of the placing, or the transmission, of the re-transmitted bet from the user communication device 20. Once the central processing computer 10 has determined, at step 2404, that the re-transmitted bet is a legal bet, an authorized bet, or an allowed bet, the operation of the central processing computer 10 can proceed to step 2405 and the central processing computer 10 can process information for placing the bet. Thereafter, at step 2406, the individual or user can utilize the apparatus 100 in any manner and/or in any manner described herein in any and/or all of the embodiments described herein. Once the individual or user has completed using the apparatus 100, the operation of the apparatus 100 will cease at step 2407.

In another preferred embodiment, the apparatus 100 of FIG. 24 and/or the central processing computer 10 can also be programmed to use the position or location information regarding or obtained from the user communication device 20 in order to identify a jurisdiction, country, state, province, or political subdivision, in which is sport betting activities are legal and which is located nearest to the user communication device 20. In this regard, in another preferred embodiment, the apparatus 100 and/or the central processing computer 10, at or during any one of more of steps 2401, 2402, and/or 2403 of the embodiment of FIG. 24, can identify, and provide information to the user communication device 20 regarding, a jurisdiction, country, state, province, or political subdivision, in which is sport betting activities are legal and which is located nearest to the user communication device 20.

It is important to note that the database 10H of the central processing computer 10, and/or the central processing computer 10, should include and/or be equipped with any data and/or information, software programs, software applications, and/or algorithms, needed. desired, or required, for performing all of the operations, functions, and/or functionalities, described herein as being performed by the central processing computer 10 in any and/and all embodiments disclosed herein.

It is important to note that each of the user communication devices 20, sport governing body computers 30, governmental entity computers 40, gaming facility computers 50, content provider computers 60, information/analytics provider computers 70, social network computers 80, financial institution computers 90, escrow agent computers 95, bookmaker computers 94, or fraud detection system computers 99, and/or the respective databases of the same, should include and/or be equipped with any data and/or information, software programs, software applications, and/or algorithms, needed. desired, or required, for performing all of the operations, functions, and/or functionalities, described herein as being performed by the respective user communication devices 20, sport governing body computers 30, governmental entity computers 40, gaming facility computers 50, content provider computers 60, information/analytics provider computers 70, social network computers 80, financial institution computers 90, escrow agent computers 95, bookmaker computers 94, or fraud detection system computers 99.

In a preferred embodiment, the collection, gathering, recording, and/or reporting, of various analytics data and/or information, player performance tracking data and/or information, bookmaker and/or sportsbook data and/or information, fraud detection system data and/or information, from the various and respective users and stakeholders, can provide for more efficient data and/or information gathering, and can provide the apparatus 100 and/or the apparatus 150 and/or the apparatus 200 with the capability to generate and/or to provide improved analytics products and services, betting or wagering products and services, integrity and/or integrity monitoring products and services, and/or any other products or services which obtained from, and/or derived from, the apparatus and methods of the present invention, as well as new and next generation analytics products and services and/or other products and services which can be specifically tailored for, and directed at serving the needs, of any of the various user, individuals, and stakeholders, who or which utilize the apparatus 100, the apparatus 150, and/or the apparatus 200. For example, a sport governing body can obtain and/or can be provided with analytics products or services regarding and/or pertaining to the number and/or amounts of bets placed, or taking place, on or regarding the league, teams, competitions, or tournaments, which the sport governing body governs, or can obtain analytics products or services regarding and/or pertaining to various player actions, game integrity or match integrity, and/or regarding and/or pertaining to any other subject of interest to that, or any other, sport governing body.

As and for another example, a governmental entity can, among numerous other things, obtain and/or be provided with analytics products and services regarding and/or pertaining to the number and/or amounts of bets placed, or being placed, by sport, game, match, tournament, or competition, which takes place within its borders, as well as the amounts of gaming fees which are or may be due to be paid to that governmental entity, and/or regarding and/or pertaining to any other subject of interest to that, or any other, governmental entity.

As and for still another example, a gaming facility or venue can, among numerous other things, obtain and/or be provided with analytics products and services regarding the number and/or amounts of bets placed, or being placed, by sport, game, match, tournament, or competition, which takes place at or within its facility or venue, as well as the amounts of gaming fees which are or may be due to be paid to that gaming facility or venue, and/or regarding and/or pertaining to any other subject of interest to that, or any other, gaming facility or venue.

As and for another example, a content provider can, among numerous other things, obtain and/or be provided with analytics products and services regarding the number and/or amounts of bets placed, or being placed, by sport, game, match, tournament, or competition, which takes place before, during, or after, its providing of its content via the apparatus 100, the apparatus 150, or the apparatus 200, as well as the amounts of gaming fees which are or may be due to be paid to that content provider, and/or regarding and/or pertaining to any other subject of interest to that, or any other, content provider.

In a same, a similar, and/or an analogous manner, any information/analytics provider, financial institution, escrow agent, and/or social network, can obtain and/or be provided with any analytics products and services regarding any aspect of, or any subject of interest regarding and/or pertaining to, their respective business or businesses.

In a preferred embodiment, any analytics data and/or information obtained by or from any of the herein-described user analytics devices, sport governing body analytics devices, governmental entity analytics devices, gaming facility/venue analytics devices, content provider analytics devices, information entity analytics devices, social network analytics devices, and/or wearable devices, can include data and/or information of any kind or type, and can also include data and/or information which can include video information, audio information, and/or text information.

In another preferred embodiment, any of the analytics data and/or information products and/or services described herein can be provided to any user, individual, or stakeholder, who or which utilizes the apparatus of the present invention. Further, any of the analytics data and/or information products and/or services described herein can be provided to any user, individual, or stakeholder, who or which utilizes the apparatus of the present invention, before, during, or after, any game, match, competition, tournament, or event, and/or at any other time.

The apparatus can also be utilized to provide any user, individual, or stakeholder, who or which utilizes the apparatus 100, the apparatus 150, the apparatus 200, or the methods, of the present invention, with any analytics products and/or services at any time, at scheduled times, and/or on demand. The apparatus 100, the apparatus 150, the apparatus 200, the central processing computer 10, the information/analytics provider computer 70, and/or the central processing computer and distributed ledger/Blockchain technology system 110, can be specially programmed to generate any type or kind of analytics product(s) and/or service(s), as well any type or kind of customized analytics product(s) and/or service(s) for any user, individual, or stakeholder, who or which utilizes the apparatus 100 or the apparatus 150 of the present invention. The apparatus 100, the apparatus 150, the apparatus 200, the central processing computer 10, the information/analytics provider computer 70, and/or the central processing computer and distributed ledger/Blockchain technology system 110, can be specially programmed to generate any type or kind of any analytics product(s) and/or service(s), as well any type or kind of customized analytics products and/or services for any user, individual, or stakeholder, who or which utilizes apparatus 100, the apparatus 150, the apparatus 200, and methods of the present invention at any time, upon demand, and/or pursuant to a subscription or other service.

The apparatus 100, the apparatus 150, the apparatus 200, and methods, of the present invention provides and facilitates a global sports betting platform whereby individuals, users, or entities, can place bets on various sporting events, games, matches, activities, competitions, or tournaments, and/or any of the herein-described gaming activities, gambling activities, and/or lotteries, in a safe and secure manner, and in a socially enjoyable environment, and provides a platform whereby governmental entities can regulate and oversee sports betting activities while sports governing bodies can regulate and oversee sports betting activities to maintain the integrity of their sport.

The apparatus 100, the apparatus 150, the apparatus 200, and methods, of the present invention can also be utilized as a content distribution platform as well as an analytics products and/or services distribution platform.

The apparatus 100, the apparatus 150, the apparatus 200, and methods, of the present invention can also be utilized as a player performance tracking data and/or team performance tracking data distribution platform as well as a distribution platform for data and/or information provided by bookmakers and/or by sportbooks.

The apparatus 100, the apparatus 150, the apparatus 200, and methods, of the present invention can also be utilized as a distribution platform for data and/or information provided by fraud detection services and/or by fraud detection service providers.

The apparatus and methods of the present invention, as described in the various disclosed embodiments and/or otherwise, can also be utilized as, and/or to serve as, a centralized clearinghouse for sports betting activities, for on-line casino gambling activities, and/or for on-line lottery activities.

The apparatus and methods of the present invention, as described in the various disclosed embodiments and/or otherwise, can also be utilized as, and/or to serve as, a centralized clearinghouse for monitoring integrity for sports in a sports betting environment, for monitoring integrity for on-line casino gambling, and/or for monitoring integrity of lottery drawings.

The apparatus and methods of the present invention can also be utilized as, and/or to serve as, a clearinghouse for fraud detection data and/or information.

While the present invention has been described and illustrated in various preferred and alternate embodiments, such descriptions are merely illustrative of the present invention and are not to be construed to be limitations thereof. In this regard, the present invention encompasses all modifications, variations, and/or alternate embodiments, with the scope of the present invention being limited only by the claims which follow.

What is claimed is:

1. An apparatus, comprising:

a central processing computer;

a distributed ledger and Blockchain technology system;

a player performance tracking computer; and an electronic performance and tracking system, wherein the electronic performance and tracking system includes an optical camera based system, a local positioning system, or a global positioning system (GPS) or a global navigation satellite system (GNSS), wherein the optical camera based system, the local positioning system, or the global positioning system (GPS) or the global navigation satellite system (GNSS), collects, processes, or provides, player performance tracking information, wherein the central processing computer is specially programmed to provide an electronic forum capable of providing a video or audio broadcast of a sporting event to a plurality of users, wherein the electronic forum is capable of allowing at least some of the plurality of users to communicate with one another before, during, or after, the sporting event via text messaging or via video conferencing or audio conferencing, post comments or messages in the electronic forum before, during, or after, the video or audio broadcast, and receive information regarding bets available, betting odds, changes in betting odds, or analytics information, before, during, or after, the video or audio broadcast;

and further wherein the central processing computer further comprises:

a transmitter, wherein the transmitter transmits the electronic forum to a user communication device associated with a user of the plurality of users; and a receiver, wherein the receiver receives information transmitted from the user communication device associated with a user of the plurality of users, wherein the apparatus provides, via or in the electronic forum, the player performance tracking information or team performance tracking information along with information regarding betting odds or changes in betting odds corresponding to, or based on, the player performance tracking information or the team performance tracking information, wherein the distributed ledger and Blockchain technology system processes information regarding an outcome of a bet on or for the sporting event or on an in- game occurrence during the sporting event and determines if the bet is a winning bet or if the bet is a losing bet, and further wherein the distributed ledger and Blockchain technology system processes information for effectuating a settlement or payment, or for withholding a settlement, for or regarding the bet, and further wherein the apparatus processes information for placing the bet on the sporting event, wherein the bet is placed by the user of the plurality of users, and further wherein the apparatus generates a bet confirmation message containing information regarding the date and time of the bet, the amount of the bet, the date and time of the sporting event, and a link to the electronic forum, and further wherein the apparatus transmits the bet confirmation message to the user communication device or to a second user communication device associated with the user.

2. The apparatus of claim 1, wherein the apparatus processes information for purchasing a lottery ticket, and further wherein the apparatus generates a lottery ticket purchase confirmation message containing information regarding the date and time of the purchase, the amount of the purchase, or the lottery drawing, and a link to the electronic forum, and further wherein the apparatus transmits the lottery ticket purchase confirmation message to the user communication device or to the second user communication device associated with the user.

3. The apparatus of claim 1, wherein the user communication device is specially programmed or specially configured to provide the video or audio broadcast in 360 degree video, in virtual reality, or in augmented reality.

4. The apparatus of claim 1, wherein the apparatus transmits a notification message to the user communication device or to the second user communication device, wherein the notification message contains information regarding the sporting event.

5. The apparatus of claim 1, wherein the apparatus transmits a notification message to the user communication device or to the second user communication device, wherein the notification message contains information regarding a gaming event, a gambling event, or a lottery drawing.

6. The apparatus of claim 1, wherein the distributed ledger and Blockchain technology system includes a Bitcoin Blockchain technology or an Ethereum Blockchain technology.

7. The apparatus of claim 1, wherein the distributed ledger and Blockchain technology system includes a smart contract.

8. The apparatus of claim 1, wherein the sporting event is an esports game, an esports match, or an esports competition.

9. A computer-implemented method, comprising:

providing, with a processor of a central processing computer, an electronic forum, wherein the processor is specially programmed to provide the electronic forum, and further wherein the electronic forum is capable of providing a video or audio broadcast of a sporting event to a plurality of users, and further wherein the electronic forum is capable of allowing at least some of the plurality of users to communicate with one another before, during, or after, the sporting event via text messaging or via video conferencing or audio conferencing, and receive information regarding bets available, betting odds, changes in betting odds, or analytics information, before, during, or after, the video or audio broadcast;

transmitting, from a transmitter of the central processing computer, the electronic forum to a user communication device associated with a user of the plurality of users;

receiving, with a receiver of the central processing computer, information transmitted from the user communication device associated with a user of the plurality of users;

receiving player performance tracking information collected, processed, or provided, by an optical camera based system, a local positioning system, or a global positioning system (GPS) or a global navigation satellite system (GNSS);

providing, via or in the electronic forum, the player performance tracking information or team performance tracking information along with information regarding betting odds or changes in betting odds corresponding to, or based on, the player performance tracking information or the team performance tracking information;

processing, with the central processing computer, an outcome of a bet on the sporting event or on an in-game occurrence during the sporting event;

determining, with the central processing computer, if the bet is a winning bet or a losing bet;

processing, with the central processing computer, information for settling the bet or for withholding a settlement of the bet;

processing, with the central processing computer, information for placing the bet on the sporting event, wherein the bet is placed by the user of the plurality of users;

generating, with the central processing computer, a bet confirmation message containing information regarding the date and time of the bet, the amount of the bet, the date and time of the sporting event, and a link to the electronic forum; and transmitting the bet confirmation message to the user communication device or to a second user communication device associated with the user.

10. The computer-implemented method of claim 9, further comprising:

processing, with the central processing computer, information for placing a second bet on an in-game occurrence during the sporting event.

11. The computer-implemented method of claim 10, further comprising:

processing information for purchasing a lottery ticket;

generating a lottery ticket purchase confirmation message containing information regarding the date and time of the purchase, the amount of the purchase, or the lottery drawing, and a link to the electronic forum; and transmitting the lottery ticket purchase confirmation message to the user communication device or to the second user communication device associated with the user.

12. The computer-implemented method of claim 9, wherein the sporting event is an esports game, an esports match, or an esports competition.

13. The computer-implemented method of claim 9, further comprising:

transmitting a notification message to the user communication device or to the second user communication device, wherein the notification message contains information regarding the sporting event or wherein the notification message contains information regarding a gaming event, a gambling event, or a lottery drawing.

14. The computer-implemented method of claim 9, further comprising:

processing, with or using a distributed ledger and Blockchain technology system, information regarding an outcome of a bet on or for the sporting event or on an in- game occurrence during the sporting event;

determining, with or using the distributed ledger and Blockchain technology system, if the bet is a winning bet or if the bet is a losing bet; and processing, with or using the distributed ledger and Blockchain technology system, information for effectuating a settlement or payment, or for withholding a settlement, for or regarding the bet.

15. The computer-implemented method of claim 14, wherein the distributed ledger and Blockchain technology system includes a smart contract.

16. An apparatus, comprising:

a central processing computer, wherein the central processing computer further comprises:

a processor, wherein the processor is specially programmed to provide an electronic forum capable of providing a video or audio broadcast of a sporting event to a plurality of users, wherein the electronic forum is capable of allowing at least some of the plurality of users to communicate with one another before, during, or after, the sporting event via text messaging or via video conferencing or audio conferencing, and post comments or messages in the electronic forum before, during, or after, the video or audio broadcast;

a transmitter, wherein the transmitter transmits the electronic forum to a user communication device associated with a user of the plurality of users; and a receiver, wherein the receiver receives information transmitted from the user communication device associated with a user of the plurality of users;

a player performance tracking computer; and an electronic performance and tracking system, wherein the electronic performance and tracking system includes an optical camera based system, a local positioning system, or a global positioning system (GPS) or a global navigation satellite system (GNSS), wherein the optical camera based system, the local positioning system, or the global positioning system (GPS) or the global navigation satellite system (GNSS), collects, processes, or provides, player performance tracking information, wherein the apparatus provides, via or in the electronic forum, the player performance tracking information or team performance tracking information, wherein the electronic forum is capable of allowing at least some of the plurality of users to receive information regarding bets available, betting odds, changes in betting odds, or analytics information, before, during, or after, the video or audio broadcast, and further wherein the apparatus provides, via or in the electronic forum, the player performance tracking information or team performance tracking information along with information regarding betting odds or changes in betting odds corresponding to, or based on, the player performance tracking information or the team performance tracking information, and further wherein the processor processes an outcome of a bet on the sporting event or on an in-game occurrence during the sporting event and determines if the bet is a winning bet or a losing bet, and further wherein the processor processes information for settling the bet or for withholding a settlement of the bet, and further wherein the apparatus processes information for placing the bet on the sporting event, wherein the bet is placed by the user of the plurality of users, and further wherein the apparatus generates a bet confirmation message containing information regarding the date and time of the bet, the amount of the bet, the date and time of the sporting event, and a link to the electronic forum, and further wherein the apparatus transmits the bet confirmation message to the user communication device or to a second user communication device associated with the user.

17. The apparatus of claim 16, wherein the apparatus processes information for placing a second bet on an in-game occurrence during the sporting event.

18. The apparatus of claim 16, wherein the user communication device is specially programmed or specially configured to provide the video or audio broadcast in 360 degree video, in virtual reality, or in augmented reality.

19. The apparatus of claim 16, wherein the sporting event is an esports game, an esports match, or an esports competition.

20. The apparatus of claim 16, wherein the apparatus processes information for purchasing a lottery ticket, and further wherein the apparatus generates a lottery ticket purchase confirmation message containing information regarding the date and time of the purchase, the amount of the purchase, or the lottery drawing, and a link to the electronic forum, and further wherein the apparatus transmits the lottery ticket purchase confirmation message to the user communication device or to the second user communication device associated with the user.

21. The apparatus of claim 16, wherein the apparatus transmits a notification message to the user communication device or to the second user communication device, wherein the notification message contains information regarding the sporting event or wherein the notification message contains information regarding a gaming event, a gambling event, or a lottery drawing.

* * * * *